(12) United States Patent
Beshai

(10) Patent No.: US 9,154,255 B2
(45) Date of Patent: *Oct. 6, 2015

(54) SINGLE-ROTATOR LATENT SPACE SWITCH WITH AN EXTERNAL CONTROLLER

(76) Inventor: Maged E. Beshai, Maberly (CA)

(*) Notice: Subject to any disclaimer, the term of this patent is extended or adjusted under 35 U.S.C. 154(b) by 511 days.

This patent is subject to a terminal disclaimer.

(21) Appl. No.: 13/525,866

(22) Filed: Jun. 18, 2012

(65) Prior Publication Data

US 2012/0257616 A1   Oct. 11, 2012

Related U.S. Application Data

(63) Continuation-in-part of application No. 12/549,000, filed on Aug. 27, 2009, now Pat. No. 8,204,050.

(51) Int. Cl.
| | | |
|---|---|---|
| *G01R 31/08* | (2006.01) | |
| *H04L 12/28* | (2006.01) | |
| *H04J 14/02* | (2006.01) | |
| *H04Q 11/00* | (2006.01) | |

(52) U.S. Cl.
CPC ......... *H04J 14/0209* (2013.01); *H04J 14/0212* (2013.01); *H04J 14/0267* (2013.01); *H04Q 11/0005* (2013.01); *H04J 14/0217* (2013.01); *H04J 14/0227* (2013.01); *H04J 14/0256* (2013.01); *H04Q 2011/0024* (2013.01); *H04Q 2011/0032* (2013.01); *H04Q 2011/0033* (2013.01); *H04Q 2011/0039* (2013.01); *H04Q 2011/0052* (2013.01)

(58) Field of Classification Search
USPC ................................................. 370/252, 401
See application file for complete search history.

(56) References Cited

U.S. PATENT DOCUMENTS

| | | | |
|---|---|---|---|
| 5,168,492 A * | 12/1992 | Beshai et al. ................. | 370/353 |
| 5,528,406 A | 6/1996 | Jeffrey et al. | |
| 5,544,168 A | 8/1996 | Jeffrey et al. | |
| 5,649,217 A | 7/1997 | Yamanaka et al. | |
| 5,703,879 A | 12/1997 | Proctor et al. | |
| 5,745,486 A | 4/1998 | Beshai et al. | |
| 6,307,852 B1 | 10/2001 | Fisher et al. | |
| 6,486,983 B1 | 11/2002 | Beshai et al. | |
| 6,721,271 B1 | 4/2004 | Beshai et al. | |
| 6,876,649 B1 | 4/2005 | Beshai | |
| 7,184,431 B2 * | 2/2007 | Munter et al. ................. | 370/360 |
| 7,215,666 B1 * | 5/2007 | Beshai et al. ................. | 370/380 |
| 7,519,053 B2 | 4/2009 | Beshai | |
| 7,606,262 B1 | 10/2009 | Beshai et al. | |

(Continued)

FOREIGN PATENT DOCUMENTS

| | | |
|---|---|---|
| EP | 1087635 B1 | 1/2007 |
| EP | 1450524 B1 | 7/2012 |

*Primary Examiner* — Omar Ghowrwal
*Assistant Examiner* — Angel Brockman

(57) ABSTRACT

A latent space switch based on a single rotator and an array of memory devices is disclosed. The switch interfaces with external nodes through a set of access ports. The rotator has a set of inlets and a set of outlets with each inlet connecting to each outlet during a time frame organized into time slots. During each time slot, an inlet alternately connects to an access port and a memory device while a transposed outlet of the inlet alternately connects to the same memory device and another access port. Multiple temporal multiplexers submit upstream control messages from the access ports to a multiport master controller. Multiple temporal demultiplexers distribute downstream control messages sent from the master controller to the access ports.

23 Claims, 89 Drawing Sheets

(56) References Cited

U.S. PATENT DOCUMENTS

| | | | |
|---|---|---|---|
| 7,660,300 B2 | 2/2010 | Beshai | |
| 7,961,649 B2 | 6/2011 | Beshai | |
| 2012/0257637 A1* | 10/2012 | Beshai | 370/401 |

\* cited by examiner

| Switch Configuration | 3300 FIG. 33 (state 0) | 3300 FIG. 33 (state 1) |
|---|---|---|
| Static connection from switch elements to rotator | Ordinary | Transposed |
| Static connection from rotator to switch elements | Transposed | Ordinary |
| Index of rotator inlet {To Intermediate switch element} | $j$ | $L-j$ |
| Index of rotator outlet {To Intermediate switch element} | $j+t_1$ $\left.\begin{array}{c}\\\end{array}\right\}$ Modulo $N$ | $L-j+t_1$ $\left.\begin{array}{c}\\\end{array}\right\}$ Modulo $N$ |
| Index of transit switch element | $L-(j+t_1)$ | $L-j+t_1$ |
| Index of rotator inlet {From Intermediate switch element} | $L-(j+t_1)$ | $j-t_1$ |
| Index of rotator outlet {From Intermediate switch element} | $L-k$ | $k$ |
| Transit time $t_2$ | $\{j-k+t_1\}_{\text{modulo } N}$ | $\{k-j+t_1\}_{\text{modulo } N}$ |
| Transit delay $(t_2-t_1)$ | $\{j-k\}_{\text{modulo } N}$ | $\{k-j\}_{\text{modulo } N}$ |

*FIG. 37*

| Switch Configuration | 4120, 4320, 4520<br>Figures 41, 43, 45 | 4220, 4420, 4620<br>Figures 42, 44, 46 |
|---|---|---|
| Static connection from first rotator to transit-memory devices | Transposed | Direct |
| Static connection from transit-memory devices to second rotator | Direct | Transposed |
| Index of first-rotator inlet | $j$ | $j$ |
| Index of first-rotator outlet | $j+t_1$ | $j+t_1$ |
| Index of transit-memory device | $\{L-(j+t_1)\}\ modulo\ N$ | $\{L-j-t_1\}\ modulo\ N$ |
| Index of second-rotator inlet | $L-(j+t_1)$ | $L-j-t_1$ |
| Index of second-rotator outlet | $k$ | $k$ |
| Transit time $t_2$ | $\{j+k-L+t_1\}_{modulo\ N}$ | $\{j+k-L+t_1\}_{modulo\ N}$ |
| Transit delay $(t_2-t_1)$ | $\{j+k-L\}_{modulo\ N}$ | $\{j+k-L\}_{modulo\ N}$ |

*FIG. 47*

| Switch Configuration | 4820 FIG. 48 | 5020, 5220 FIG. 50, FIG. 52 |
|---|---|---|
| Static connection from transit-memory devices to rotator | Transposed | Ordinary |
| Static connection from rotator to transit-memory devices | Ordinary | Transposed |
| Index of rotator inlet $\Big\}$ State(0) | $j$ | $j$ |
| Index of rotator outlet | $j+t_1$ | $j+t_1$ |
| Index of transit-memory device | $\{j+t_1\}$ modulo $N$ | $L-(j+t_1)$ |
| Index of rotator inlet $\Big\}$ State(1) | $L-(j+t_1)$ | $L-(j+t_1)$ |
| Index of rotator outlet | $k$ | $k$ |
| Transit time $t_2$ | $\{j+k-L+t_1\}$ modulo N | $\{j+k-L+t_1\}$ modulo N |
| Transit delay $(t_2-t_1)$ | $\{j+k-L\}$ modulo N | $\{j+k-L\}$ modulo N |

*FIG. 57*

| Switch Configuration | 5320 FIG. 53 (transposed egress) | 5420 FIG. 54 (transposed egress) |
|---|---|---|
| Static connection from transit-memory devices to rotator | Transposed | Ordinary |
| Static connection from rotator to transit-memory devices | Ordinary | Transposed |
| Index of rotator inlet } State(0) | $j$ | $j$ |
| Index of rotator outlet | $j + t_1$ | $j + t_1$ |
| Index of transit-memory device | $\{L - (j + t_1)\}\ modulo\ N$ | $\{L - (j + t_1)\}\ modulo\ N$ |
| Index of rotator inlet } State(1) | $\boxed{L - k}$ | $\boxed{L - k}$ |
| Index of rotator outlet | $\{j - k + t_1\}_{modulo\ N}$ | $\{j - k + t_1\}_{modulo\ N}$ |
| Transit time $t_2$ | $\{j - k\}_{modulo\ N}$ | $\{j - k\}_{modulo\ N}$ |
| Transit delay $(t_2 - t_1)$ | | |

*FIG. 58*

| Switch Configuration | FIG. 48 with a descending rotator | Figures 50-52 with descending rotator |
|---|---|---|
| Static connection from transit-memory devices to rotator | Transposed | Ordinary |
| Static connection from rotator to transit-memory devices | Ordinary | Transposed |
| Index of rotator inlet $\Big\}$ State(0) | $j$ | $j$ |
| Index of rotator outlet | $\left.\begin{array}{l}j - t_1 \\ j - t_1\end{array}\right\}$ modulo $N$ | $\left.\begin{array}{l}j - t_1 \\ L - (j - t_1)\end{array}\right\}$ modulo $N$ |
| Index of transit-memory device | $L - (j - t_1)$ | $L - (j - t_1)$ |
| Index of rotator inlet $\Big\}$ State(1) | $k$ | $k$ |
| Index of rotator outlet | $\{L - j - k + t_1\}_{\text{modulo } N}$ | $\{L - j - k + t_1\}_{\text{modulo } N}$ |
| Transit time $t_2$ | $\{L - j - k\}_{\text{modulo } N}$ | $\{L - j - k\}_{\text{modulo } N}$ |
| Transit delay ($t_2 - t_1$) | | |

*FIG. 59*

| Switch Configuration | FIG. 53 with a descending rotator (transposed egress) | FIG. 54 with a descending rotator (transposed egress) |
|---|---|---|
| Static connection from transit-memory devices to rotator | Transposed | Ordinary |
| Static connection from rotator to transit-memory devices | Ordinary | Transposed |
| Index of rotator inlet $\Big\}$ State(0) | $j$ | $j$ |
| Index of rotator outlet | $j - t_1$ | $j - t_1$ |
| Index of transit-memory device | $\underbrace{j - t_1}_{\text{modulo } N}$ | $\underbrace{L - (j - t_1)}_{\text{modulo } N}$ |
| Index of rotator inlet $\Big\}$ State(1) | $L - (j - t_1)$ | $L - (j - t_1)$ |
| Index of rotator outlet | $\boxed{L - k}$ | $\boxed{L - k}$ |
| Transit time $t_2$ | $\{k - j + t_1\}_{\text{modulo } N}$ | $\{k - j + t_1\}_{\text{modulo } N}$ |
| Transit delay $(t_2 - t_1)$ | $\{k - j\}_{\text{modulo } N}$ | $\{k - j\}_{\text{modulo } N}$ |

*FIG. 60*

| Switch Configuration | 4820-FIG. 48 Ascending rotator | 4820-FIG. 48 Descending rotator |
|---|---|---|
| Static connection from transit-memory devices to rotator | Ordinary | Ordinary |
| Static connection from rotator to transit-memory devices | Ordinary | Ordinary |
| Index of rotator inlet $\Big\}$ State(0) | $j$ | $j$ |
| Index of rotator outlet | $\{j+t_1\}\, modulo\, N$ | $\{j-t_1\}\, modulo\, N$ |
| Index of transit-memory device | $m = j + t_1$ | $m = j - t_1$ |
| Index of rotator inlet $\Big\}$ State(1) | $m$ | $m$ |
| Index of rotator outlet | $k$ | $k$ |
| Transit time $t_2$ | $\{k - m\}_{modulo\, N}$ | $\{m - k\}_{modulo\, N}$ |
| Transit delay ($t_2 - t_1$) | $\{j + k - 2 \times m\}_{modulo\, N}$ | $\{2 \times m - j - k\}_{modulo\, N}$ |

*FIG. 66*

| Counter | Rotator direction | |
|---|---|---|
| | Descending | Ascending |
| Up | $E(0) = m$<br>$\Delta = (k-j)_{\text{modulo } N}$ | $E(0) = (L-m)_{\text{modulo } N}$<br>$\Delta = (j+k-L)_{\text{modulo } N}$ |
| Down | $E(0) = (L-m)_{\text{modulo } N}$<br>$\Delta = (L-j-k)_{\text{modulo } N}$ | $E(0) = m$<br>$\Delta = (j-k)_{\text{modulo } N}$ |

$E(0)$: index of memory section at t=0, of transit memory of index m, $0 \leq m < N$ $\Delta$: Systematic switching delay, ingress port 4840(j) to egress port 4860(k),
$0 \leq j < N$, $0 \leq k < N$ L: transposition order, $0 \leq L < N$

Index of upstream control time slot corresponding to control port $K_0$: $\{K_0-j\}_{modulo\ N}$, $\{K_1-j\}_{modulo\ N}$, ...

Index of upstream control time slot corresponding to control port $K_{(\Omega-1)}$: $\{K_{\Omega-2}-j\}_{modulo\ N}$, $\{K_{\Omega-1}-j\}_{modulo\ N}$ $N = 2048$, $\Omega=4$, $K_0 = 0$, $K_1 = 512$, $K_2 = 1024$, $K_3 = 1536$

| j | | | | | |
|---|---|---|---|---|---|
| j=2000 | 48  $K_0$ | 560 $K_1$ | 1072 $K_2$ | 1584 $K_3$ | |
| j=1500 | 36  $K_3$ | 548 $K_0$ | 1060 $K_1$ | 1572 $K_2$ | |
| j=1000 | 24  $K_2$ | 536 $K_3$ | 1048 $K_0$ | 1560 $K_1$ | |
| j=500  | 12  $K_1$ | 524 $K_2$ | 1036 $K_3$ | 1548 $K_0$ | |
| j=0    | 0   $K_0$ | 512 $K_1$ | 1024 $K_2$ | 1536 $K_3$ | |

Index of downstream control time slot corresponding to input control port $J_0$ $\{k-J_0\}_{\text{modulo } N}$  $\{k-J_1\}_{\text{modulo } N}$  •••  $\{k-J_{\Omega-2}\}_{\text{modulo } N}$  $\{k-J_{\Omega-1}\}_{\text{modulo } N}$ Index of downstream control time slot corresponding to input control port $J_{(\Omega-1)}$ $N = 2048, \Omega=4, J_0 = 511, J_1 = 1023, J_2 = 1535, J_3 = 2047$

| k=2000 | 465 $J_2$ | 977 $J_1$ | 1489 $J_0$ | 2001 $J_3$ |
| --- | --- | --- | --- | --- |
| k=1500 | 477 $J_1$ | 989 $J_0$ | 1501 $J_3$ | 2013 $J_2$ |
| k=1000 | 489 $J_0$ | 1001 $J_3$ | 1513 $J_2$ | 2025 $J_1$ |
| k=500 | 501 $J_3$ | 1013 $J_2$ | 1525 $J_1$ | 2037 $J_0$ |
| k=0 | 1 $J_3$ | 513 $J_2$ | 1025 $J_1$ | 1537 $J_0$ |

FIG. 82

| Switch Configuration | FIG. 87 or FIG. 88 with a descending transposing rotator | FIG. 87 or FIG. 88 with an ascending transposing rotator |
|---|---|---|
| Index of rotator inlet $\Big\}$ State(0) <br> Index of rotator outlet | $j$ <br> $m = L - j - t_1$ | $j$ <br> $m = L - j + t_1$ |
| Index of transit-memory device | $\left. \begin{array}{c} L - j - t_1 \\ m \end{array} \right\} \ modulo\ N$ | $\left. \begin{array}{c} L - j + t_1 \\ m \end{array} \right\} \ modulo\ N$ |
| Index of rotator inlet $\Big\}$ State(1) <br> Index of rotator outlet | $k = \{L - m - t_2\}_{modulo\ N}$ | $k = \{L - m + t_2\}_{modulo\ N}$ |
| Transit delay ($t_2 - t_1$) | $\{j - k\}_{modulo\ N}$ | $\{k - j\}_{modulo\ N}$ |

*FIG. 89*

SINGLE-ROTATOR LATENT SPACE SWITCH WITH AN EXTERNAL CONTROLLER

CROSS-REFERENCE TO RELATED APPLICATIONS

The present application is a continuation-in-part of U.S. patent application Ser. No. 12/549,000, filed on Aug. 27, 2009, the content of which is incorporated herein by reference.

FIELD OF THE INVENTION

The present invention relates to switching nodes employed in a high-capacity wide-coverage network.

BACKGROUND

Present wide-coverage data networks are generally multi-hop networks of large diameter where a path from one edge node to another may traverse several intermediate nodes. Such networks employ routers of moderate dimensions and have performance challenges. A multi-hop packet-switching network suffers from cumulative performance degradation as a path from source to destination traverses numerous routing nodes. It is well known that structural simplicity reduces network cost and improves network performance. In order to facilitate the introduction of high-quality broadband services, the network structure need be simplified and the network diameter need be reduced. It is desirable that a path from one edge node to another traverse a small number of intermediate nodes.

Realization of such a network is greatly facilitated by employing switching nodes of large dimensions and simple structures.

SUMMARY

In accordance with one aspect, the present invention provides a single-rotator latent space switch. The switch comprises a single rotator having N inlets and N outlets, N>2, N inlet selectors, N outlet selectors, and a set of N memory devices. The single rotator cyclically connects each inlet to each outlet during a repetitive time frame organized into N time slots. Each inlet connects to a corresponding inlet selector of the set of N inlet selectors, and each outlet connects to a corresponding outlet selector of the set of N outlet selectors. Each memory device connects to an input port of an inlet selector and an output port of an outlet selector. Each inlet selector connects to both a memory device of the set of N memory devices and an ingress port which receives upstream data from an external source, such as an edge node. Each outlet selector connects to both a memory device of the set of N memory devices and an egress port which sends downstream data to an external sink, such as an edge node.

During each time slot of the time frame, each memory device and a respective ingress port alternately connect to a respective inlet of the N inlets through a respective inlet selector. Likewise, during each time slot, each outlet alternately connects to a memory device and a respective egress port through a respective outlet selector. During a same time slot, a memory device connects to a respective inlet and a transposed outlet of the respective inlet.

In order to precisely describe the connectivity pattern and data-flow timing, the time slots of the time frame are indexed as time slots 0 to (N−1), the N inlets are indexed as inlets 0 to (N−1), the N outlets are indexed as outlets 0 to (N−1), the N inlet selectors are indexed as inlet selectors 0 to (N−1), the N outlet selectors are indexed as outlet selectors 0 to (N−1), and the N memory devices are indexed as memory devices 0 to (N−1). The rotator may be an ascending rotator or a descending rotator. In either case, each inlet cyclically connects to each outlet during the N time slots of a time frame. An inlet of index j, $0 \leq j < N$, connects to an outlet of index $(j+\Theta)_{modulo\ N}$, $0 \leq \Theta < N$, during an initial time slot. Without loss of generality, the initial time slot is selected to be a time slot of index zero, and $\Delta$ is selected to be zero. Accordingly, during a time slot t, $0 \leq t < N$, an inlet j connects to an outlet k, where $k=\{j+t\}_{modulo\ N}$, if the rotator is an ascending rotator or $k=\{j-t\}_{modulo\ N}$, if the rotator is a descending rotator.

An inlet and an outlet are labeled as an aligned inlet-outlet pair if the indices of the inlet and outlet are equal. An inlet and an outlet are labeled as a transposed inlet-outlet pair if the sum of indices of the inlet and outlet equal a predetermined transposition order L, $0 \leq L < N$. An inlet selector and an outlet selector of an aligned inlet-outlet pair are labeled as an aligned selector pair. An inlet selector and an outlet selector of a transposed inlet-outlet pair are labeled as a transposed selector pair. An ingress port and an egress port connecting to an aligned selector pair are labeled as an aligned ingress-egress pair. An ingress port and an egress port connecting to a transposed selector pair are labeled as a transposed ingress-egress pair.

In each of the switch configurations claimed herein, each memory device connects to a transposed inlet-outlet pair. Thus, a memory device which connects to a specific inlet of inlet index p, $0 \leq p < N$, connects to a transposed outlet of outlet index $(L-p)_{modulo\ N}$, where $0 \leq L < N$.

The inlet selectors and the outlet selectors are time-coordinated so that, each ingress port connects to a memory device during a time slice of a time slot, and each memory device connects to an egress port during another time slice of the time slot. Thus, during a time frame, each ingress port cyclically accesses each memory device, and each memory device cyclically accesses each egress port.

An aligned ingress-egress pair may connect to an aligned selector pair or a transposed selector pair. In the former case, data transferred from an inlet of index j to be delivered to an outlet of index k experiences a systematic switching delay of $(j+k-L)_{modulo\ N}$ time slots, if the rotator is an ascending rotator, or $(L-j-k)_{modulo\ N}$ time slots if the rotator is an ascending rotator, L being a predetermined transposition order. In the latter case, data transferred from an inlet of index j to be delivered to an outlet of index k experiences a systematic switching delay of $(j-k)_{modulo\ N}$ time slots, if the rotator is an ascending rotator, or $(k-j)_{modulo\ N}$ time slots if the rotator is a descending rotator, which is independent of the transposition order.

The single-rotator latent space switch further comprises N port controllers and a master controller. Each port controller is dedicated to one ingress port. Each ingress port is integrated with a respective egress port and share a respective port controller.

A temporal multiplexer combines upstream control signals generated at the N port controllers and the combined control signals are submitted to the master controller. Downstream control signals generated at the master controller are distributed to the N port controllers through a temporal demultiplexer.

Preferably, each memory device is logically organized into N sections, each section for storing data directed to a respective egress port of said N egress ports. During each time slot, an ingress port transfers a data segment destined for an egress port to a memory device to which the ingress port connects through the rotator. The WRITE address of the memory device is a function of the destined egress port. The occupancy state of the outlet leading to the destined egress port during each time slot is determined by the master controller which oversees the occupancy states of all inlets and all outlets. The master controller selects, for each ingress port, a destination egress port during each time slot and communicates the selection to the port controller coupled to the ingress port. The port controller may then determine a WRITE address and affixes the WRITE address to a data segment to be transferred to the destined egress port.

Unlike the WRITE addresses in a memory device which may vary during successive time slots, the READ addresses are sequential. With each memory device logically partitioned into N sections, each section for storing data directed to a respective egress port of said N egress ports, data segments are read from successive sections during successive time slots. During the N time slots of a time frame, data segments are read from a memory device of index m, $0 \le m < N$, from sections m, $(m+1)_{modulo\ N}, \ldots, (m+N-1)_{modulo\ N}$, if the rotator is an ascending rotator or from sections m, $(m-1)_{modulo\ N}, \ldots, (m-N+1)_{modulo\ N}$, if the rotator is a descending rotator. A memory controller of each memory device may be configured to sequentially generate memory addresses of the N sections.

In accordance with another aspect, the present invention provides a single-rotator latent space switch comprising a single rotator and a number N of memory devices, N>2. The single rotator has N outlets, N outlet selectors, N inlets, and N inlet selectors. Each inlet cyclically connects to each outlet during a repetitive time frame organized into N time slots. Each memory device connects to a respective inlet, through an inlet selector, and a transposed outlet of the respective inlet, through an outlet selector.

During each time slot, each outlet alternately accesses two output ports of a respective outlet selector. A designated output port of the two output ports is configured to transmit data to external sinks and the other output connects to one memory device. Each inlet selector has two input ports which alternately access a respective inlet during each time slot. A designated input port of the two input ports is configured to receive data from external sources and the other input port connects to a memory device.

With the inlets sequentially indexed as 0 to (N−1) and the outlets being sequentially indexed as 0 to (N−1), a sum of indices of the respective inlet and the transposed outlet equals a predetermined transposition order L, $0 \le L < N$.

The N inlet selectors and the N outlet selectors are time coordinated so that N input ports designated to receive data from external sources and N output ports designated to transmit data to external sinks successively access the single rotator during each time slot.

Each memory device may be logically partitioned into N memory sections, each memory section for holding a data segment directed to a respective outlet of said N outlets.

The single rotator may be an ascending rotator connecting an inlet of index j to an outlet of index $\{j+t\}_{modulo\ N}$, during a time slot t of said repetitive time frame, $0 \le t < N$. Alternatively, the single rotator may be a descending rotator connecting an inlet of index j to an outlet of index $\{j-t\}_{modulo\ N}$, during a time slot t of said repetitive time frame, $0 \le t < N$.

The Read-address of a memory device during each time slot may be determined by an up-counter coupled to the memory device. If the single rotator is an ascending rotator, an up-counter coupled to a memory device of index m, $0 \le m < N$, is initialized to $(L-m)_{modulo\ N}$ during time slot t=0. If the single rotator is a descending rotator, an up-counter coupled to a memory device of index m, $0 \le m < N$, is initialized to m during time slot t=0.

The Read-address of a memory device during each time slot may also be determined by a down-counter coupled to the memory device. If the single rotator is an ascending rotator, a down-counter coupled to a memory device of index m, $0 \le m < N$, is initialized to m during time slot t=0. This corresponds to the configuration of FIG. 53. If the single rotator is a descending rotator, a down-counter coupled to a memory device of index m, $0 \le m < N$, is initialized to $L-m)_{modulo\ N}$ during time slot t=0.

In accordance with a further aspect, the present invention provides a single-rotator latent space switch comprising N memory devices, N>2, N ingress ports for receiving data from external sources, N egress ports for transmitting data to external sinks, and a single rotator having N inlets and N outlets.

The single rotator cyclically connects each inlet to each outlet during a time frame organized into N time slots. For each transposed inlet-outlet pair, the inlet alternately connects to a respective ingress port and a respective memory device during each time slot of said time frame, and the outlet alternately connects to the memory device and a respective egress port during said each time slot.

A control system coupled to the single-rotator latent space switch comprises N port controllers, each port controller dedicated to one ingress port of the N ingress ports, and a master controller. Each ingress port is integrated with an egress port to form an access port. The integrated ingress port and egress port of an access port share a port controller. A temporal multiplexer time-multiplexes control signals sent from the N port controllers to the master controller. A temporal demultiplexer distributes control signals sent from the master controller to the N port controllers.

A master time indicator is coupled to the master controller and provides a reference-time indication to be followed by external device, such as an edge node, which connects to the single-rotator latent space switch. The master controller distributes the reference-time indication to the N port controllers which, in turn, distributes the reference-time indication to external devices.

The master controller is configured to receive a reading of a source time indicator from an external controller of a device connecting to an ingress port of the N ingress ports and send a corresponding reading of the master time indicator to the external controller to enable the external controller to time lock to the master time indicator.

In accordance with a further aspect, the present invention provides a single-rotator latent space switch comprising a single rotator having a number N of inlets and N outlets, N>2, a master controller, M memory devices, M<N, N ingress ports, N egress ports, N inlet selectors, and N outlet selectors. Each inlet cyclically connects to each outlet during a repetitive time frame organized into N time slots. Each inlet selector connects to a respective inlet of the single rotator and each outlet selector connects to a respective outlet. Each of M inlet selectors connects to a respective ingress port and a memory device. Each of the remaining (N−M) inlet selectors connects to a respective ingress port and a channel from the master controller. Each of M outlet selectors connects to a respective egress port and a memory device. Each of the remaining (N−M) outlet selectors connects to a respective egress port and a channel to the master controller.

During each time slot of the time frame, the inlet selectors and outlet selectors are time coordinated so that:
(1) each of M inlet selectors alternately connects a particular ingress port and a particular memory device to a respective inlet;
(2) each of the remaining (N−M) inlet selectors alternately connects a respective ingress port and the master controller to a corresponding inlet;
(3) a transposed outlet of said respective inlet alternately connects to the particular memory device and a particular egress port through a respective outlet selector; and
(4) a transposed outlet of the corresponding inlet alternately connects to the master controller and a particular egress port through a corresponding outlet selector.

Each ingress port accesses the master controller during at most (N−M) time slots of the repetitive time frame and the master controller accesses each egress port during at most (N−M) time slots of the repetitive time frame.

The single-rotator latent space switch further comprises N port controllers, where each port controller is coupled to a particular ingress port of the N ingress ports. A port controller coupled to an ingress port may be configured to affix WRITE memory addresses to data segments received at the ingress port. Each ingress port is preferably integrated with an egress port to form an integrated access port.

BRIEF DESCRIPTION OF THE DRAWINGS

Embodiments of the present invention will be further described with reference to the accompanying exemplary drawings, in which:

FIG. 37 tabulates data-transfer timing of the two-phase single-rotator circulating switch of FIG. 33;

FIG. 47 tabulates data-transfer timing of a latent space switch of the type illustrated in FIG. 41 to FIG. 46, with an arbitrary number of switch elements and an arbitrary value of the order of transposed connections, in accordance with an embodiment of the present invention;

FIG. 57 tabulates data-transfer timing of a single-rotator latent space switch of the type illustrated in FIG. 48, FIG. 50, and FIG. 52, with an arbitrary number of switch elements and an arbitrary value of the order of transposed connections, in accordance with an embodiment of the present invention;

FIG. 58 tabulates data-transfer timing of a single-rotator latent space switch of the type illustrated in FIG. 53 and FIG. 54, with an arbitrary number of switch elements and an arbitrary value of the order of transposed connections, with transposed connections from the outlets of the single rotator to the output ports of the single-rotator latent space switch, in accordance with an embodiment of the present invention;

FIG. 59 tabulates data-transfer timing of a single-rotator latent space switch of the type illustrated in FIG. 48, FIG. 50, and FIG. 52, but using a descending rotator, in accordance with an embodiment of the present invention;

FIG. 60 tabulates data-transfer timing of a single-rotator latent space switch of the type illustrated in FIG. 53 and FIG. 54, using a descending rotator, in accordance with an embodiment of the present invention;

FIG. 66 tabulates data-transfer timing of a single-rotator latent space switch with each transit memory device connected to a peer inlet-outlet pair, using an ascending or a descending rotator;

FIG. 79 illustrates settings of initial states of counters used to provide sequential READ-addresses of transit-memory devices for switch configurations employing an ascending rotator or a descending rotator and an up-counter or a down-counter, in accordance with an embodiment of the present invention;

FIG. 81 illustrates indices of upstream control time slots of a time frame organized in 2048 time slots at selected ingress ports of the single rotator of FIG. 77, where the single rotator is an ascending rotator;

FIG. 82 illustrates indices of downstream control time slots of a time frame organized in 2048 time slots at each control inlet port of the single rotator of FIG. 77, where the single rotator is an ascending rotator;

FIG. 89 tabulates data-transfer timing of a single-rotator latent space switch of FIG. 87.

DETAILED DESCRIPTION

Terminology

Figure 1:
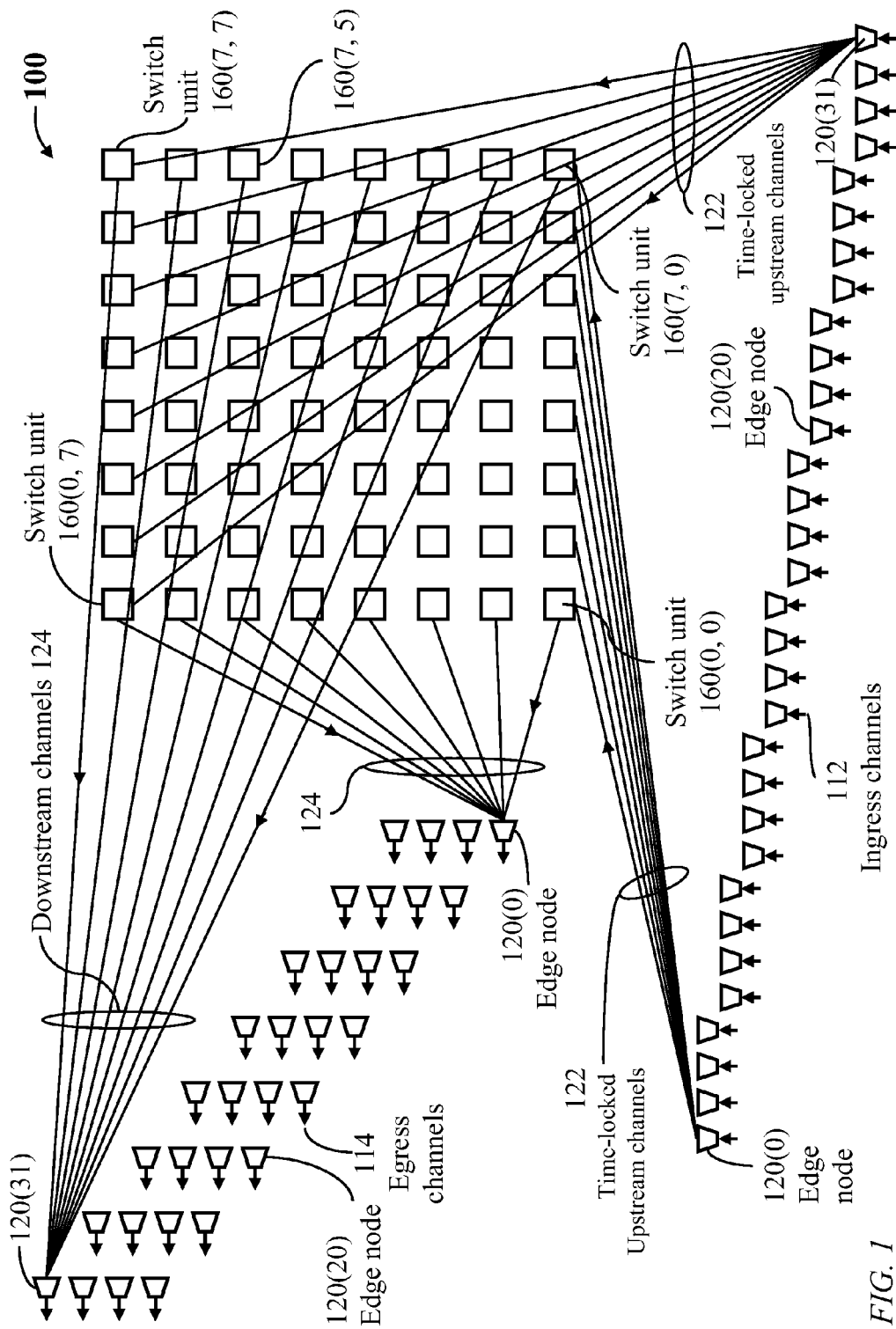
FIG. 1 illustrates a time-coherent network comprising edge nodes interconnected through independent switch units arranged in a matrix where each edge node has upstream communication channels to switch units of a row and downstream communication channels from switch units of a column, in accordance with an embodiment of the present invention.

Modulo operation: The operation X modulo W, herein denoted $X_{modulo\ W}$, where X is any integer, which may be a positive integer or a negative integer, and W is a positive integer is a remainder determined as: $X_{modulo\ W} = X - W \times \lfloor X/W \rfloor$,
where $\lfloor R \rfloor$ is the nearest integer that is less than R or equal to R if R is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$.

Thus, $7_{modulo\ 8} = 7$, $(-7)_{modulo\ 8} = \{-7-(-1) \times 8\} = 1$, $8_{modulo\ 8} = 0$, $(-8)_{modulo\ 8} = 0$, $9_{modulo\ 8} = 1$, and $(-9)_{modulo\ 8} = 7$.

Circular sum: The circular sum of two arbitrary integers X and Y, with respect to a positive integer W, is defined as $(X+Y)_{modulo\ W}$. In the present application, a circular sum is determined with respect to a positive number N of inlets (or outlets) of a rotator. Thus, hereinafter, a circular sum is understood to be with respect to N. The circular sum is a non-negative integer between 0 and (N−1).

Circular difference: The circular difference between two arbitrary integers X and Y, with respect to a positive integer W, is defined as $(X-Y)_{modulo\ W}$. In the present application, a circular difference is determined with respect to a positive number N of inlets (or outlets) of a rotator. Thus, hereinafter, a circular difference is understood to be with respect to N. Like the circular sum, a circular difference is a non-negative integer between 0 and (N−1).

Rotator: A rotator is a simple device having multiple inlets and multiple outlets. The rotator cyclically connects each inlet to each outlet during every rotation cycle. The rotator itself is not a switching device because it lacks the steering capability.

Uniform rotator: Consider a rotator having N inlets and N outlets with the N inlets indexed as inlets 0 to (N−1) and the N outlets indexed as outlets 0 to (N−1). During a rotation cycle of N time slots, each inlet connects to each outlet. A uniform rotator connects an inlet of index j to an outlet of index $k=(j+\beta \times t)_{modulo\ N}$, where β is either 1 or −1.

Transposing rotator: A transposing rotator connects an inlet of index j to an outlet of index $k=(L-j+\beta \times t)_{modulo\ N}$, where β is either 1 or −1, and L is a transposition order, 0≤L<N. Hereinafter, a rotator is considered uniform unless explicitly described as a transposing rotator.

Peer inlet-outlet pair: An inlet and an outlet of a same index are herein called a peer inlet-outlet pair or an aligned inlet-outlet pair.

Transposed inlet-outlet pair: Where the circular sum of indices of an inlet and an outlet equals a predefined transposition order L, 0≤L<N, the inlet and outlet are said to form a transposed inlet-outlet pair.

Space switch: A space switch has ingress ports and egress ports and is configured to connect any ingress port to any egress port. An instantaneous space switch transfers data from an ingress port to a selected egress port with negligible delay. A latent space switch transfers data from an ingress port to an egress port after a systematic switching delay.

Time-Coherent switching: A process of switching signals from any bufferless input port of a switch unit having bufferless input ports to any of output ports of the switch unit is a time-coherent switching process. The signals may originate from geographically distributed sources and each source controls the timing of signal transmission so that a transmitted signal arrives at the switch unit at an instant of time dictated by a controller of the switch unit. A source need not be aware of the magnitude of the propagation delay along the path to the switch unit. The control of the switch unit dictates the time at which signals are transmitted from respective distributed sources.

Time-coherent network: A network having a set of switch units, each switch unit in the set having bufferless input ports and enforcing time-coherent switching is herein referenced as a time-coherent network.

Edge node: A switching node connecting data sources and data sinks to external switching nodes is referenced as an edge node. An edge node may also switch data directly from a data source to a data sink.

Switch unit: A switching node having bufferless input ports receiving signals from a first group of edge nodes and output ports transmitting signals to a second group of edge nodes is hereinafter referenced as a switch unit. A switch unit may be implemented as a fast optical switch or an electronic space switch. The electronic space switch may have internal memory devices.

Upstream direction: The direction of signal flow from an edge node towards a switch unit is referenced as the upstream direction.

Downstream direction: The direction of signal flow from a switch unit towards an edge node is referenced as the downstream direction.

Master controller: A controller coupled to a switch unit is herein called a master controller. A master controller of a switch unit dictates the timing of transmission of signals from subtending edge nodes, hence the classification as a master controller.

Edge controller: A controller coupled to an edge node is herein referenced as an edge controller. An edge controller communicates with master controllers of switch units to which the edge node connects. The edge controller also communicates with element controllers associated with switch elements of the edge node.

Master time indicator: A time indicator coupled to a master controller of a switch unit is herein referenced as a master time indicator. The master time indicator may be implemented as a cyclic c-bit-wide clock-driven time counter which resets to zero every $2^c$ clock intervals. The duration of a cycle of the time counter exceeds the propagation delay between any edge node and a switch unit to which the edge node connects. The master time indicators of all switch units in a time-coherent network are functionally identical.

Edge time indicator: A time indicator coupled to an edge controller is herein referenced as an edge time indicator. An edge time indicator is functionally identical to a master time indicator.

Time locking: A process of adjusting sending times of signals from each outbound port of an edge node to a switch unit to which the each outbound port connects is a time-locking process.

Time-locked channel: A channel from an edge node to a switch unit, where the edge node is time-locked to the switch unit, is herein called a time-locked channel.

It is noted that a reference numeral may individually or collectively refer to items of a same type. A reference numeral may further be indexed to distinguish individual items of a same type.

Network Structure

FIG. 1 illustrates a time-coherent network 100 comprising edge nodes, collectively referenced as 120 and individually identified as 120(0), 120(1), ..., 120(Q−1) and switch units, collectively referenced as 160, logically arranged in a matrix having ν rows and ν columns. The rows of the matrix are indexed as row 0 to row (ν−1), where row 0 is the bottom row and row (ν−1) is the top row. The columns are indexed as column 0 to column (ν−1), where column 0 is the leftmost column and column (ν−1) is the rightmost column; ν=8 in the exemplary network of FIG. 1. The switch units 160 are individually identified as 160(j, k), j being a column identifier and k a row identifier in the matrix. An edge node 120 has a number of ingress channels 112 for receiving data from data sources, a number of egress channels 114 for transmitting data to data sinks. An edge node 120 has a number κ≥ν of upstream channels 122 connecting the edge node to ν switch units 160, and a number κ of downstream channels 124 connecting ν switch units 160 to the edge node. The κ upstream channels 122 connect the edge node to a switch unit 160 in each of the ν columns. The downstream channels 124 connect ν switch units, one from each of the ν rows, to the edge node. Preferably κ=ν so that an edge node has one upstream channel 122 to each of ν switch units 160 of different columns and one downstream channels from ν switch units 160 of different rows. To simplify addressing and routing, the κ downstream channels leading to the edge node originate from switch units belonging to one column.

An edge node 120 comprises a source node integrated with a sink node. For clarity, each edge node 120 is indicated in FIG. 1 as a source-node side having upstream channels 122 and a sink-node side connecting to downstream channels 124. It is understood, however, that a source-node side and a corresponding sink-node side, though illustrated as separate entities, together constitute one of the edge nodes 120. Each edge node 120 comprises an integrated switch fabric to switch data from any ingress channel 112 or any downstream channel 124 to any egress channel 114 or any upstream channel 122. An edge node 120 has ingress ports for receiving data from data sources, egress ports for transmitting data to data sinks, inbound ports for receiving signals from respective switch units 160 through downstream channels 124, and outbound ports for transmitting signals to respective switch units 160 through upstream channels 122.

In the network configuration of FIG. 1, edge node 120(0) has eight upstream channels 122 to eight switch units 160(0,0) to 160(7,0) of row 0. Edge node 120(31) has eight upstream channels 122 to eight switch units 160(0,7) to 160(7,7) of row 7. Switch unit 120(0) has downstream channels 124 from eight switch units 160(0,0) to 160(0,7) of column 0. Switch unit 120(31) has downstream channels 124 from eight switch units 160(7,0) to 160(7,7) of column 7.

Figure 2:
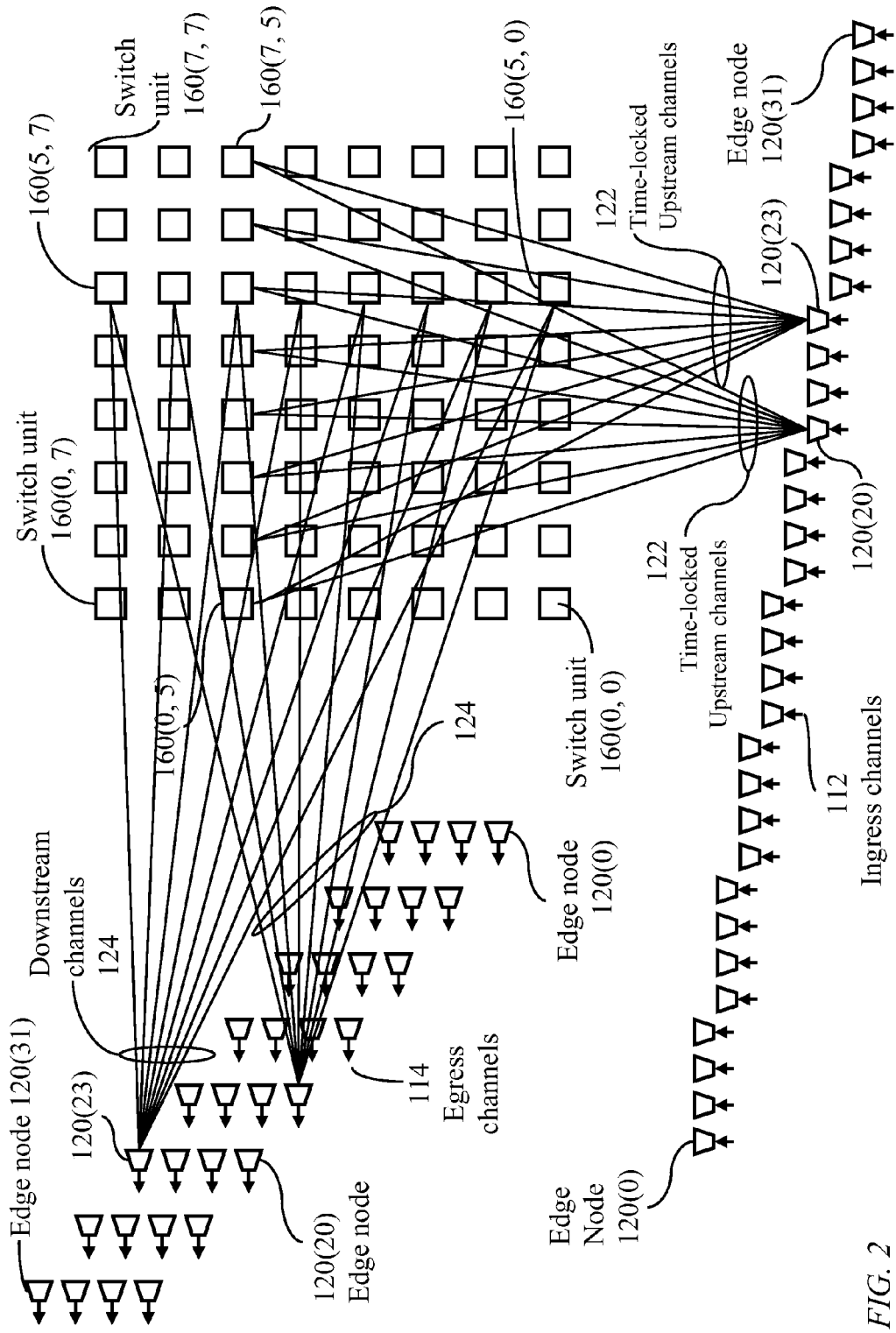
FIG. 2 further illustrates edge-node connections to switch units in the time-coherent network of FIG. 1.

FIG. 2 illustrates the connectivity of a set of edge nodes {120(20), ..., 120(23)} where each edge node in the set has eight upstream channels 122, one to each of eight switch units 160(0,5) to 160(7,5) and eight downstream channels 124, one from each of eight switch units 160(5,0) to 160(5,7).

Figure 3:
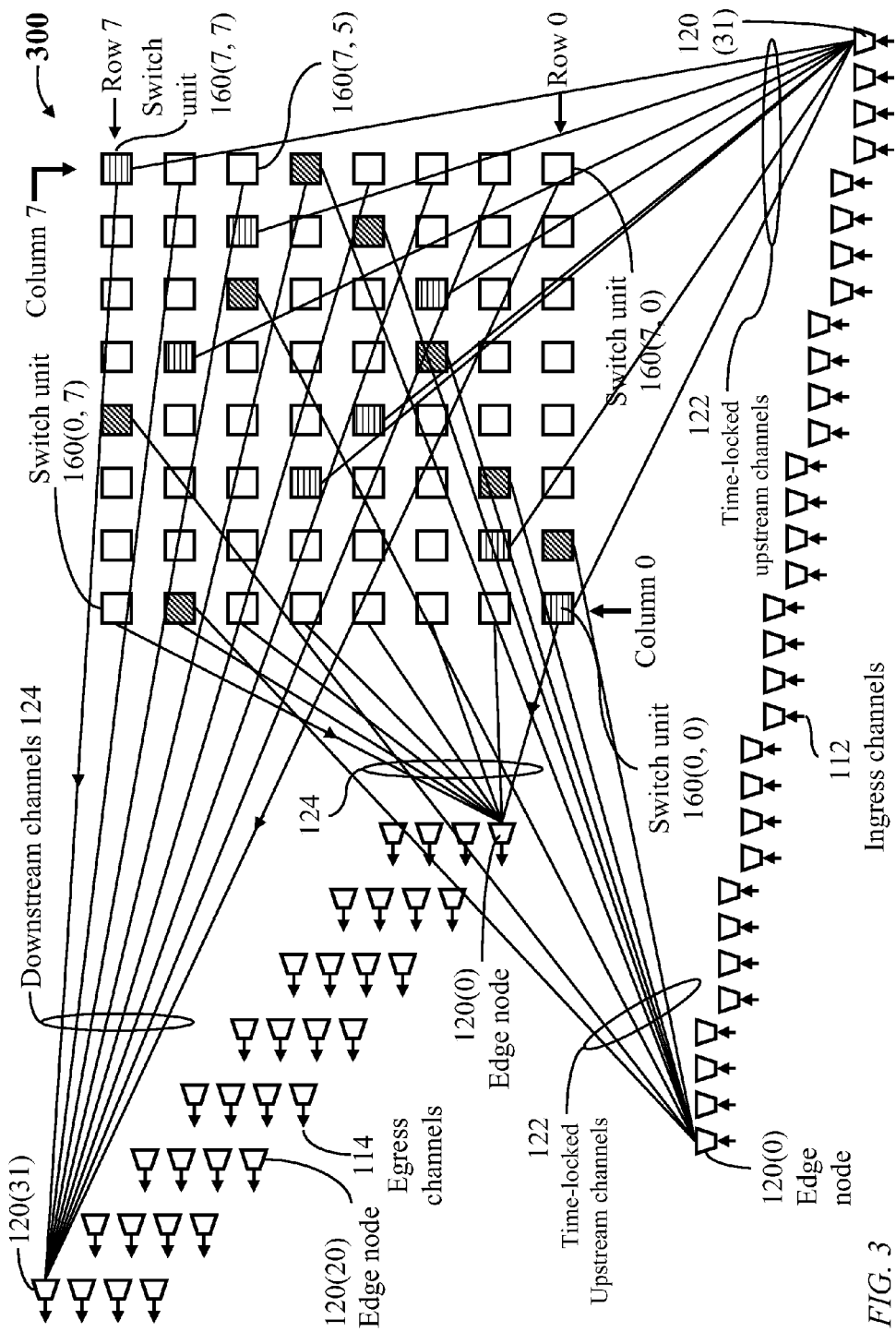
FIG. 3 illustrates a time-coherent network comprising edge nodes interconnected through independent switch units arranged in a matrix where each edge node has upstream communication channels to switch units in different columns and downstream communication channels from switch units of a column, in accordance with an embodiment of the present invention.

FIG. 3 illustrates a time-coherent network 300 having a configuration similar to that of the time-coherent network 100 of FIG. 1 except that each of edge nodes 120 has time-locked upstream channels 122 to switch units 160 of different rows and different columns of the matrix of switch units instead of time-locked upstream channels 122 to switch units 160 of a single row. The downstream connectivity from switch units 160 to the edge nodes 120 is the same as that of network 100 of FIG. 1. In the exemplary configuration of FIG. 3, edge node 120(0) has eight upstream channels 122 to eight switch units 160(0,6), 160(1,0), 160(2, 1), 160(3,7), 160(4,2), 160(5,5), 160(6,3) and 160(7, 4). Edge node 120(31) has eight upstream channels 122 to eight switch units 160(0, 0), 160(1, 1), 160(2,4), 160(3,3), 160(4,6), 160(5,2), 160(6,5), and 160(7,7). The downstream connectivity of switch units 120(0) and 120(31) is identical to that of FIG. 1.

A major advantage of the network configuration of FIG. 1 or FIG. 3 is that each edge node 120 has a simple path to each other switch unit 120 traversing a single switch unit 160. This greatly simplifies signaling, connection setup, and connection tracking. Several compound paths may be established between a source edge node and a destination edge node. A compound path comprises two simple paths joined at an intermediate edge node 120. There are (2ν−2) compound paths from any edge node 120(j) to any other edge node 120(k), j≠k. However, the (2ν−2) compound paths include partly overlapping paths. Each edge node has ν upstream channels and ν downstream channels. Therefore, a maximum of (ν−1) non-overlapping compound paths may be established from any edge-node to any other edge node.

Figure 4:
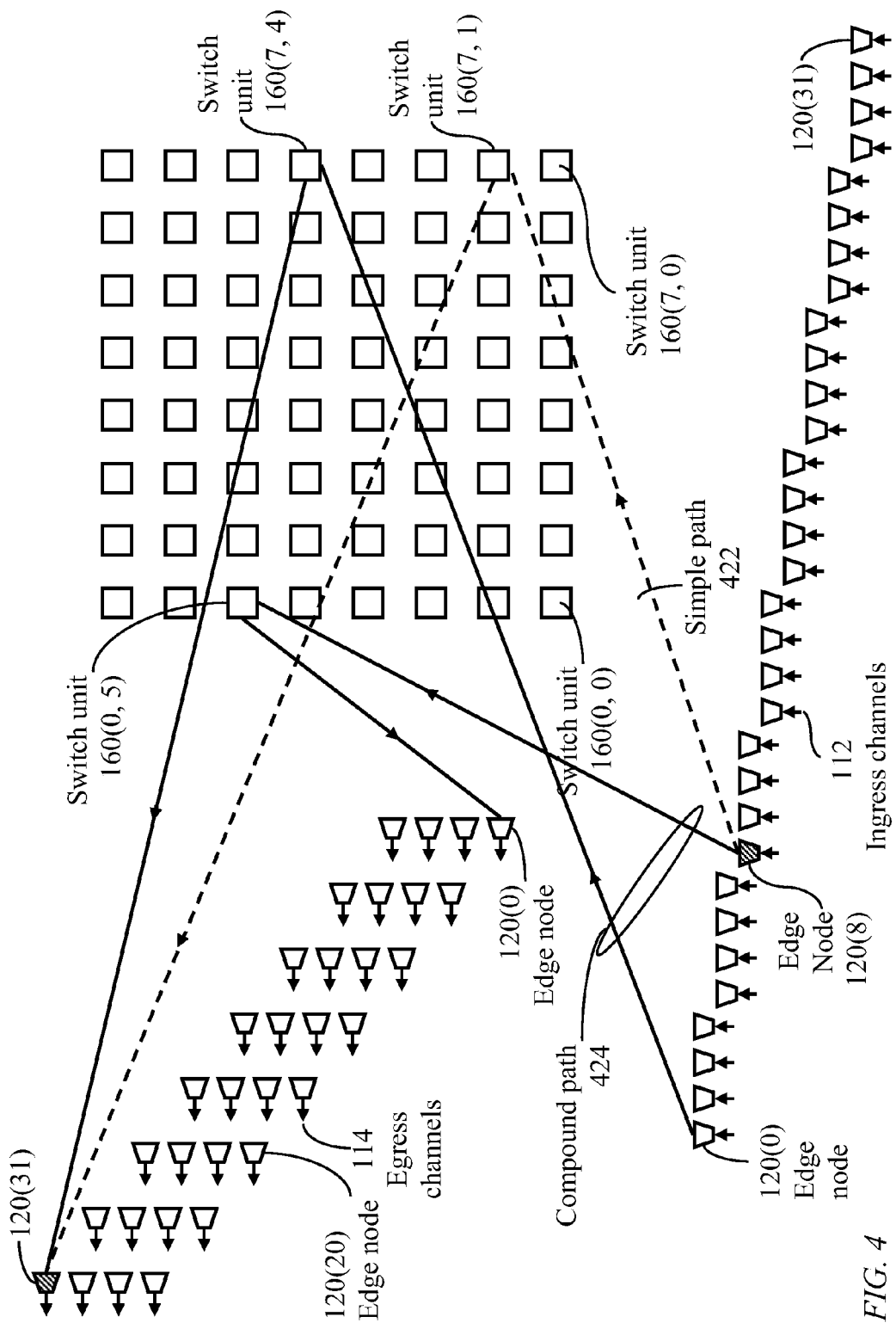
FIG. 4 illustrates a simple connection and a compound connection in the network of FIG. 3 in accordance with an embodiment of the present invention.

FIG. 4 illustrates a simple path 422 from an originating edge node 120(8) to a destination edge node 120(31) traversing switch unit 160(7,1). An exemplary compound path 424 from originating edge node 120(8) to destination edge node 120(31) is illustrated. Compound path 424 traverses switch unit 160(0,5), intermediate edge node 120(0), and switch unit 160(7,4).

The network of FIG. 1 or FIG. 3 comprises a single matrix of switch units 160 forming a single core plane. Preferably, the switch units 160 are fast optical switches. A fast optical switch may be limited to medium dimensions, 64×64 for example. It may be desirable, however, to provide a parallel core plane using electronic switch units. A single-rotator latent space switch, to be described below with reference to FIG. 48 to FIG. 56, has a simple structure and scales to relatively large dimensions; 1024×1024 for example.

Figure 5:
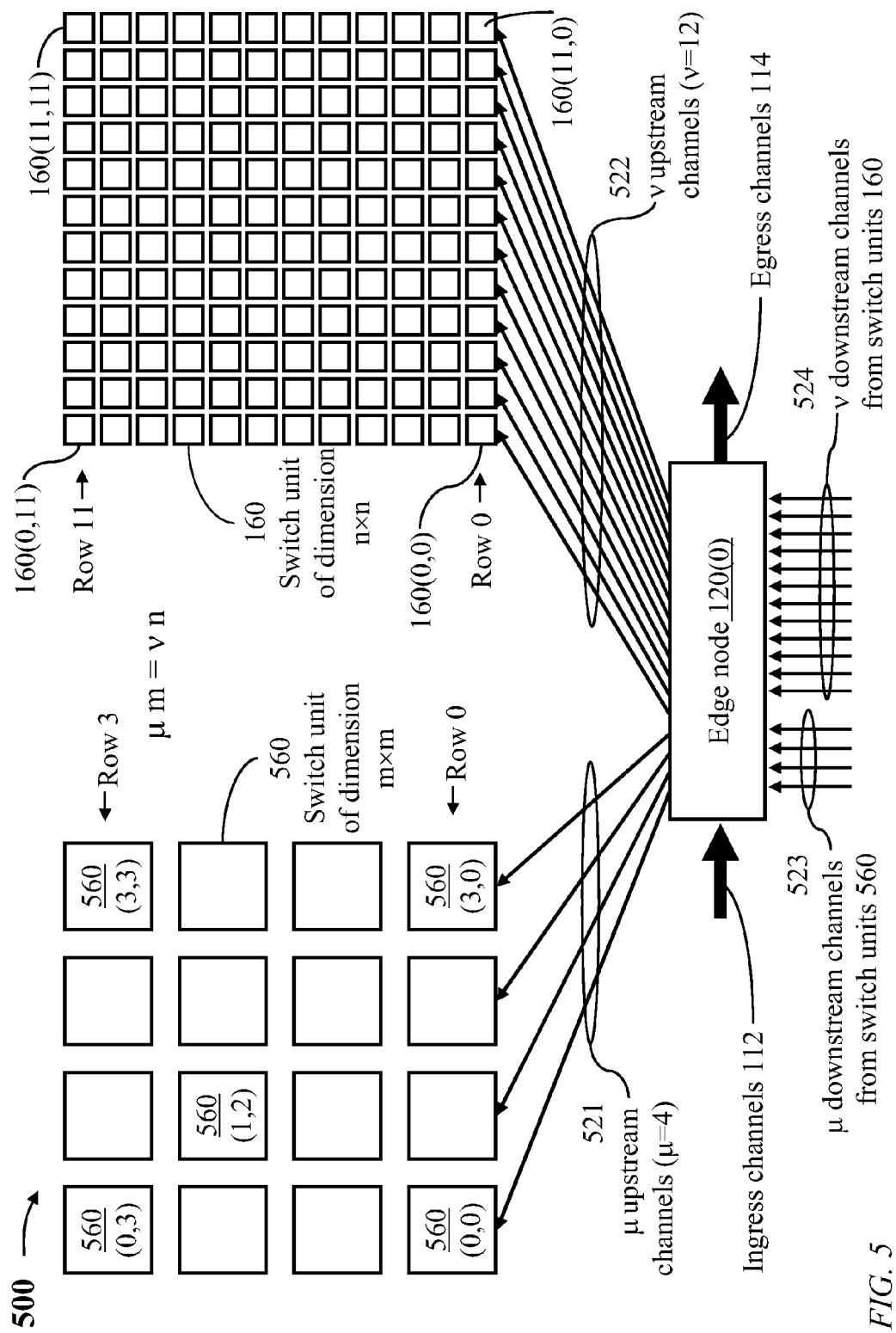
FIG. 5 illustrates a time-coherent network comprising edge nodes interconnected through a network core comprising a first matrix of electronic switch units, each switch unit having a first number of dual inlet-outlet ports, and a second matrix of photonic switch units, each switch unit having a second number of dual inlet-outlet ports, each edge node having time-locked upstream channels to switch units of a row of the first matrix and time-locked upstream channels to a row of the second matrix where the first number is an integer multiple of the second number, in accordance with an embodiment of the present invention.

FIG. 5 illustrates an edge node 120 having μ upstream channels 521 to μ switch units 560 each of dimension m×m (m=12) arranged in a first matrix of μ columns and μ rows (for the case of μ=4). The edge node also has ν upstream channels 522 to ν switch units 160 each of dimension n×n (n=4) arranged in a second matrix of ν columns and ν rows (for the case of ν=12). The edge node has μ downstream channels 523 from switch units 560 and ν downstream channels 424 from switch units 160. The edge node receives data from data sources through ingress channels 112 and transmits data to data sinks through egress channels 114. The total number of edge nodes is ν×n=μ×m=48.

Figure 6:
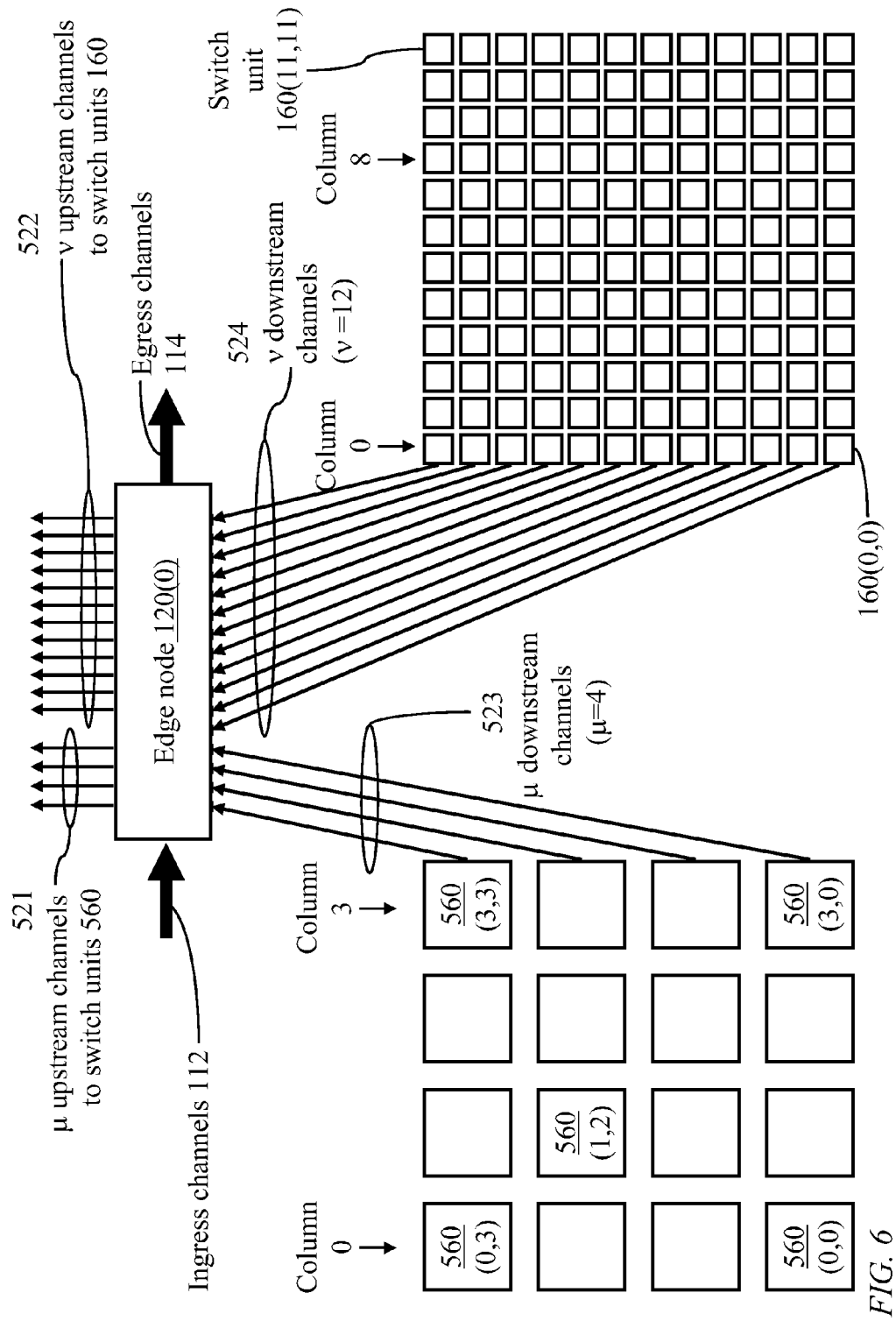
FIG. 6 illustrates downstream channels, in the network of FIG. 5, from switch units of a column of the first matrix to an edge node and downstream channels from a column of the second matrix to the edge node, in accordance with an embodiment of the present invention.

FIG. 6 illustrates downstream connectivity of the edge node 120 of FIG. 5 where the edge node connects to μ downstream channels 523 from μ switch units 560 of column 3 of the first matrix and ν downstream channels 524 to ν switch units 160 in column 0 of the second matrix.

Figure 7:
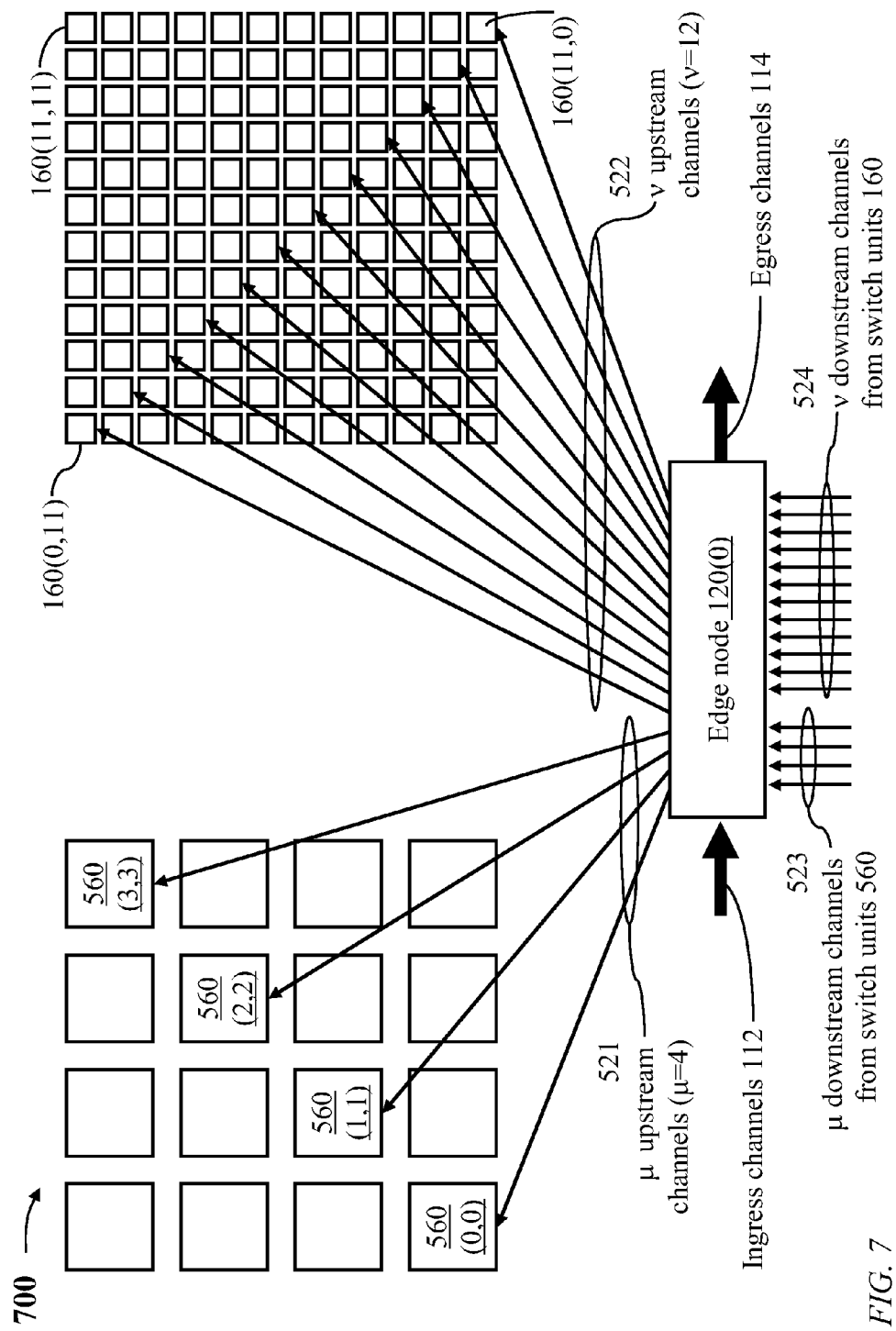
FIG. 7 illustrates upstream channels from an edge node to switch units in different rows and different columns of the two matrices of switch units of the network of FIG. 5, in accordance with an embodiment of the present invention.

FIG. 7 illustrates an alternative upstream connectivity of the edge node 120 of FIG. 5 where the upstream channels 521 connect to switch units 560 in different rows and different columns in the first matrix and the upstream channels 522 connect to switch units 160 in different rows and different columns in the second matrix.

Figure 8:
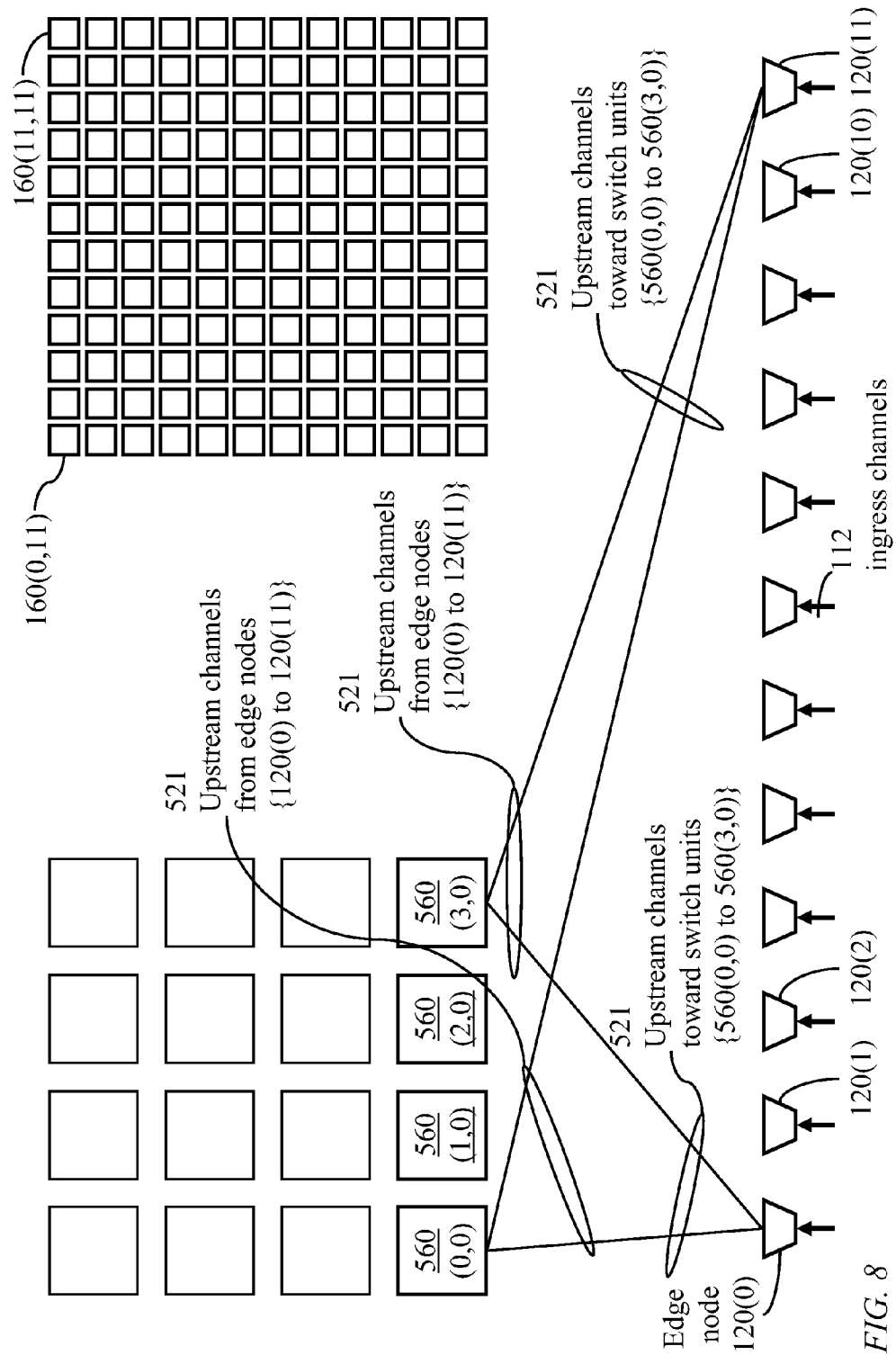
FIG. 8 illustrates time-locked upstream channels from a set of edge nodes to the first matrix of switch units of the network of FIG. 5, in accordance with an embodiment of the present invention.

FIG. 8 illustrates upstream connectivity of 12 edge nodes 120(0) to 120(11) to the first matrix of FIG. 5. Each edge node has 4 upstream channels 521 to switch units 560 in a row of the first matrix and 12 upstream channels 522 to switch units 160 in a row of the second matrix. The total number of upstream channels from the 12 edge nodes to the first matrix is 48 and the total number of upstream channels from the 12 edge nodes to the second matrix is 192.

Figure 9:
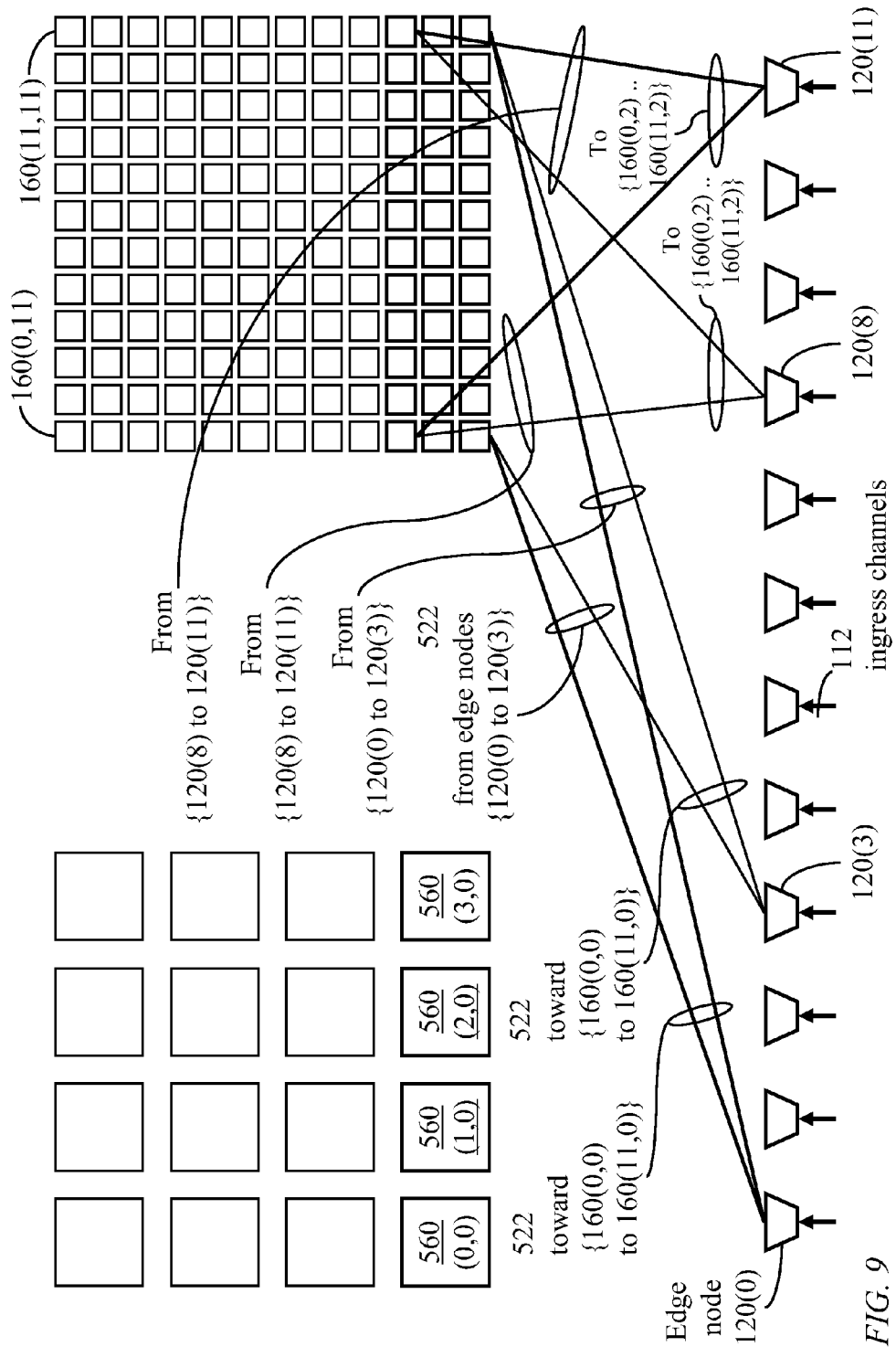
FIG. 9 illustrates time-locked upstream channels from a set of edge nodes to the second matrix of switch units of the network of FIG. 5, in accordance with an embodiment of the present invention.

FIG. 9 illustrates upstream channels from the 12 edge nodes {120(0) to 120(11)} to the second matrix of FIG. 5. The upstream channels 522 connect to switch units 160 of three rows. The switch units 560 in a row of the first matrix collectively connect to 48 upstream channels and, similarly, the switch units 160 in a row of the second matrix collectively connect to 48 upstream channels.

Figure 10:
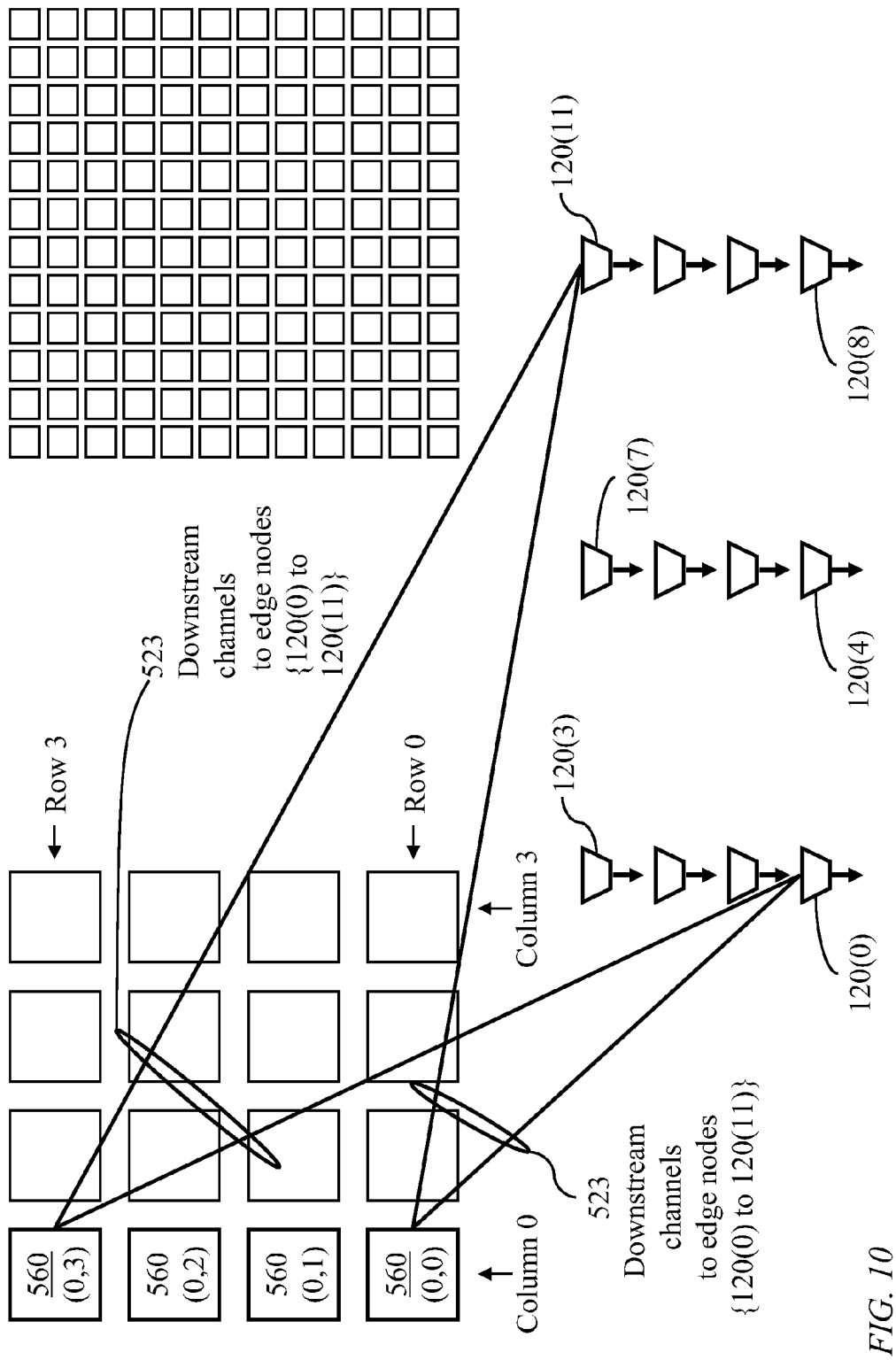
FIG. 10 illustrates downstream channels from the first matrix of switch units of the network of FIG. 5 to a set of edge nodes, in accordance with an embodiment of the present invention.

FIG. 10 illustrates downstream channels from the first matrix of switch units of the network of FIG. 5 to each of the 12 edge nodes 120(0) to 120(11). The 12 edge nodes have downstream channels from switch units 560 of one column (column 0).

Figure 11:
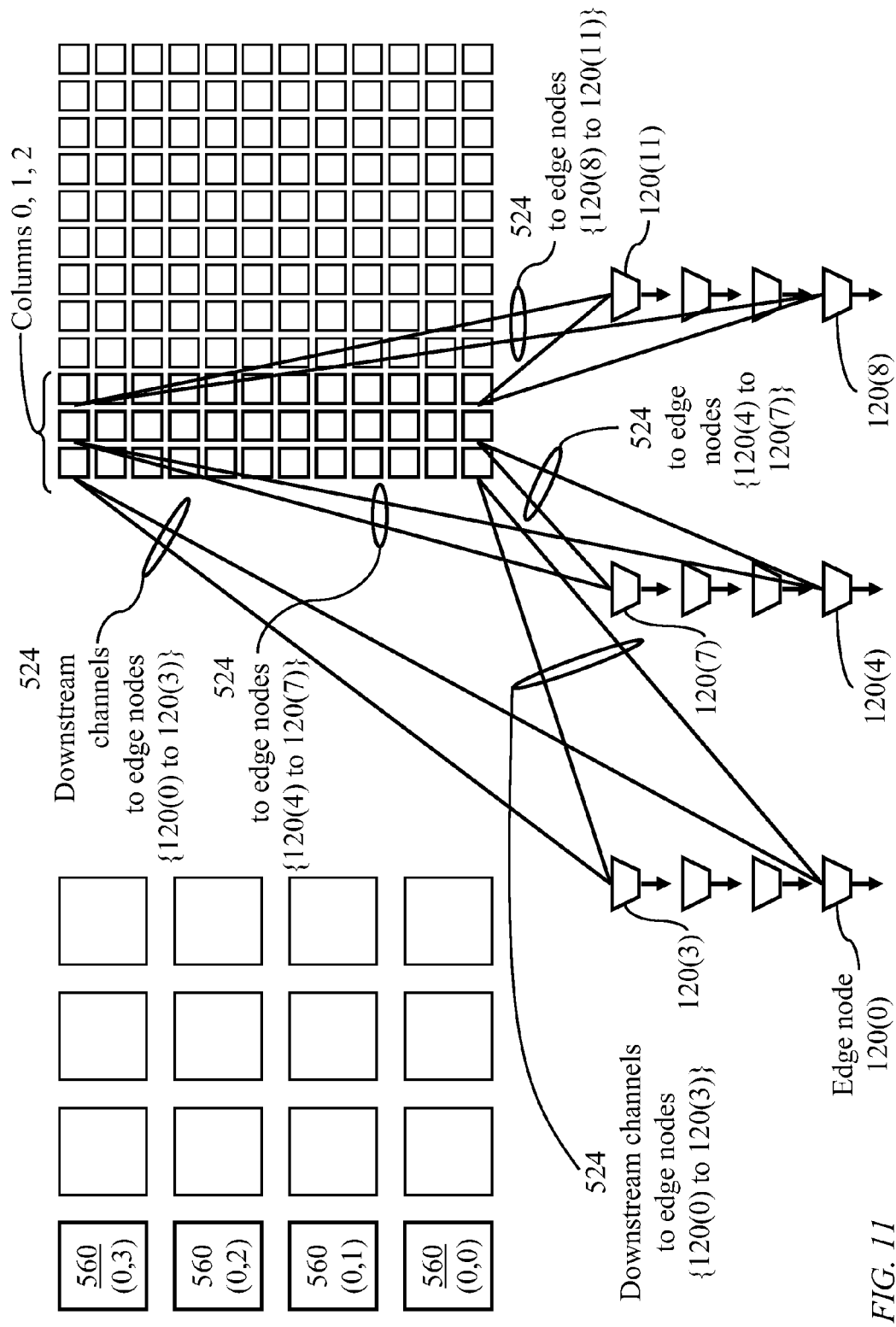
FIG. 11 illustrates downstream channels from the second matrix of switch units of the network of FIG. 5 to a set of edge nodes, in accordance with an embodiment of the present invention.

FIG. 11 illustrates downstream channels from the second matrix of switch units of the network of FIG. 5 to each of the 12 edge nodes 120(0) to 120(11). The 12 edge nodes have downstream channels from switch units 160 of three columns (column 0, column 1, and column 2).

Global Coverage

One may envisage a global network initially serving one billion users each equipped to transmit and receive data at a rate of 100 megabits per second in any format; which is likely to be the network-user's expectation in the near future. The access capacity of such a network would be 100 petabits per second. With a user utilization factor of 0.1 for example, and with traffic efficiency of the order of 0.8, the network should have a core capacity (throughput) of at least 12.5 petabits per second.

An edge node providing traffic-switching capacity of 10 terabits per second, for example, would support one million users, and only 1000 edge nodes of such capacity would be needed to serve a user population of one billion. However, with Earth's land area of 150 million $km^2$, the use of only 1000 edge nodes may necessitate long access lines from the users' premises to the edge nodes, taking into account the uneven population distribution and the uninhabited areas. A more realistic number of edge nodes would be of the order of 50,000. Within the United States, 10000 edge nodes would be quite adequate to cover the land area of 9 million $km^2$, and the required capacity of an edge node would vary from a hundred gigabits per second to tens of terabits per second.

Thus, in a network of global coverage, the number ν of upstream channels 122 connecting an edge node 120 to ν switch units 160 or downstream channels 124 connecting ν switch units 160 to an edge node 120 may be significantly large; 1024 for example. Each upstream channel 122 or downstream channel 124 is a wavelength channel within a respective fiber-optic link. A group of upstream channels 122 occupying separate spectral bands may share a wavelength-division-multiplexed (WDM) fiber link. Likewise, a group of downstream channels 124 occupying separate spectral bands may share a wavelength-division-multiplexed (WDM) fiber link. Wavelength routers may be used to connect the edge nodes 120 to the switch units 160 or 560 (FIG. 5) using a relatively small number of WDM links as will be illustrated in FIG. 12 and FIG. 13.

Figure 12:
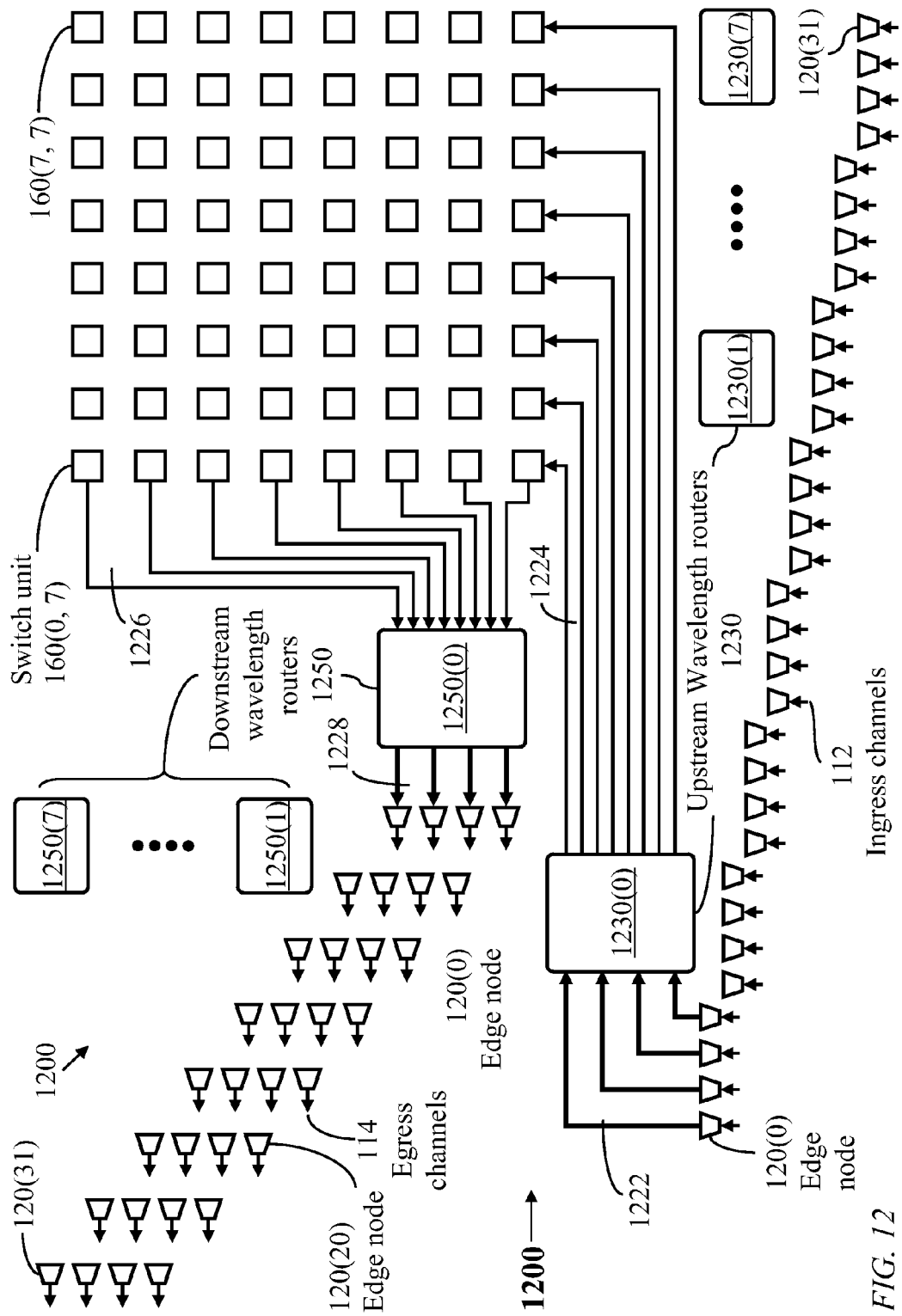
FIG. 12 illustrates a network comprising edge nodes and switch units arranged in a matrix, each edge node having upstream wavelength-division-multiplexed (WDM) links to upstream wavelength routers and downstream WDM links from downstream routers, each upstream wavelength router having WDM links to switch units of one row and each downstream wavelength router having WDM links from switch units of one column, in accordance with an embodiment of the present invention.

FIG. 12 illustrates a network 1200 comprising edge nodes and switch units arranged in one matrix, each edge node having upstream wavelength-division-multiplexed (WDM) links to upstream wavelength routers and downstream WDM links from downstream routers, each upstream wavelength router having WDM links to switch units of one row and each downstream wavelength router having WDM links from switch units of one column. The edge nodes 120 are individually identified as 120(0) to 120(Q−1), Q being the total number of edge nodes. The switch units 160 are arranged in a single matrix having ν columns and ν rows, each switch unit having n input ports and n output ports. Each edge node 120 comprises an edge controller as will be described with reference to FIG. 20 and each switch unit 160 comprises a switch-unit controller as will be described with reference to FIG. 22. In the exemplary network of FIG. 12, ν=8 and n=4, hence Q=ν×n=32.

Upstream wavelength routers 1230 may be used to connect the edge nodes 120 to the switch units 160 and downstream wavelength routers 1250 may be used to connect the switch units 160 to the edge nodes 120. For example, in a wide-coverage network, an upstream wavelength router 1230 may connect 32 upstream WDM links 1222 from a set of 32 edge nodes 120 to 32 WDM links 1224 leading to 32 switch units 160. Each WDM link 1222 carries 32 wavelength channels from a single edge node 120 and each WDM link 1224 carries a wavelength channel from each edge node in the set of 32 edge nodes. Likewise, a downstream wavelength router 1250 may connect 32 WDM links 1226 from 32 switch units 160 to 32 WDM links 1228 leading to 32 edge nodes 120. Each WDM link 1228 carries channels directed to a single edge node 120. Thus, with ν=1024, an edge node 120 would have 32 upstream links 1222 leading to 32 upstream wavelength routers 1230 and 32 downstream links 1228 from 32 downstream wavelength routes 1250.

Figure 13:
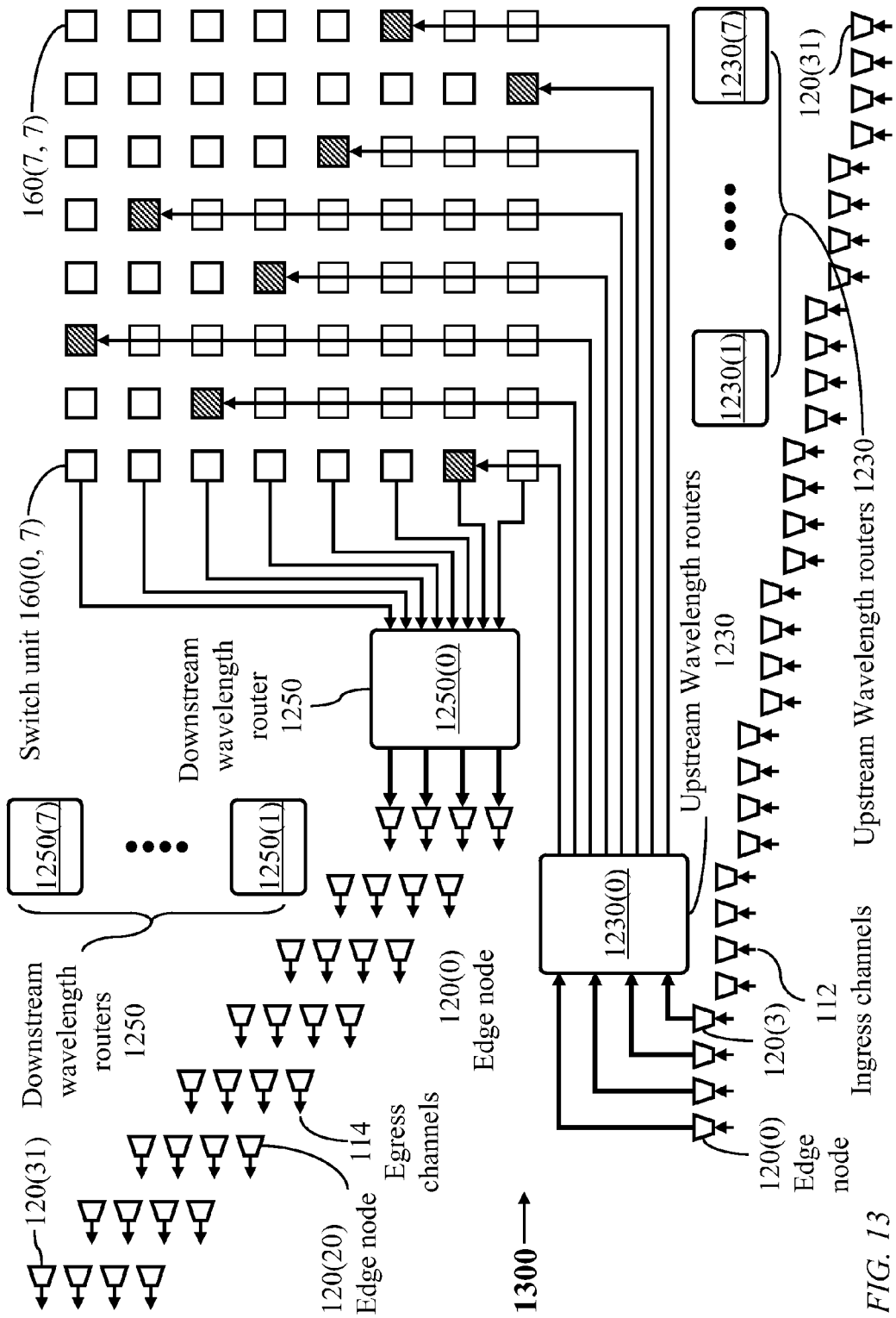
FIG. 13 illustrates a network comprising edge nodes and switch units arranged in a matrix, each edge node having upstream wavelength-division-multiplexed (WDM) links to upstream wavelength routers and downstream WDM links from downstream routers, each upstream wavelength router having WDM links to switch units in different rows and different columns and each downstream wavelength router having WDM links from switch units of one column, in accordance with an embodiment of the present invention.

FIG. 13 illustrates a network similar to the network of FIG. 12 but with a different upstream connectivity. Each upstream wavelength router 1230 has WDM links to switch units in different rows and different columns. Each downstream wavelength router 1250 has WDM links from switch units of one column as in the network of FIG. 12.

As will be described below, with reference to FIG. 20, an edge node 120 has ingress ports, connecting to ingress channels 112, for receiving data from data sources, egress ports, connecting to egress channels 114, for transmitting data to data sinks, inbound ports, connecting to downstream channels 124, for receiving signals from respective switch units 160 through downstream wavelength routers 1250, and outbound ports, connecting to upstream channels 122, for transmitting signals to respective switch units 160 though upstream wavelength routers 1230.

The connections of the upstream wavelength routers 1230 to the edge nodes 120 are configured so that each edge node 120 connects to a respective set of ν switch units, one in each of the ν columns. The connections of the downstream wavelength routers 1250 to the edge nodes 120 are configured so that each edge node 120 connects to a respective group of ν switch units, one in each of the ν rows. Preferably, each group of ν switch units connecting to an edge node in the downstream direction belongs to a single column in the matrix of switch units.

With identical switch units 160, the number Q of edge nodes 120 is determined by the dimension of a switch unit 160 and the number ν of rows or columns in the matrix of switch units. With each switch unit having n inlet ports and n outlet ports, the number Q of edge nodes is determined as Q=ν×n, and the number of switch units 160 is $\nu^2$.

A switch unit 160 may be: (1) a bufferless electronic space switch; (2) a single-rotator latent space switch (to be described below with reference to FIG. 48 to FIG. 56) or (3) a fast switching optical space switch. Preferably, the switch units 160 of network 1200 are fast optical switches.

In the network of FIG. 12, an upstream wavelength router 1230 connects a subset of edge nodes 120 to switch units 160 of one row. It may be desirable to connect the subset of edge nodes 120 to switch units in different rows and different columns. In the network of FIG. 13, upstream wavelength router 1230(0) connects the subset of edge nodes {120(0), 120(1), 120(2), 120(3)} to eight switch units {160(0,1), 160(1,5), 160(2,7), 160(3,4), 160(4,6), 160(5,3), 160(6,0), 160(7,2)} so that each edge node in the subset has one upstream channel to each of the eight switch units.

Figure 14:
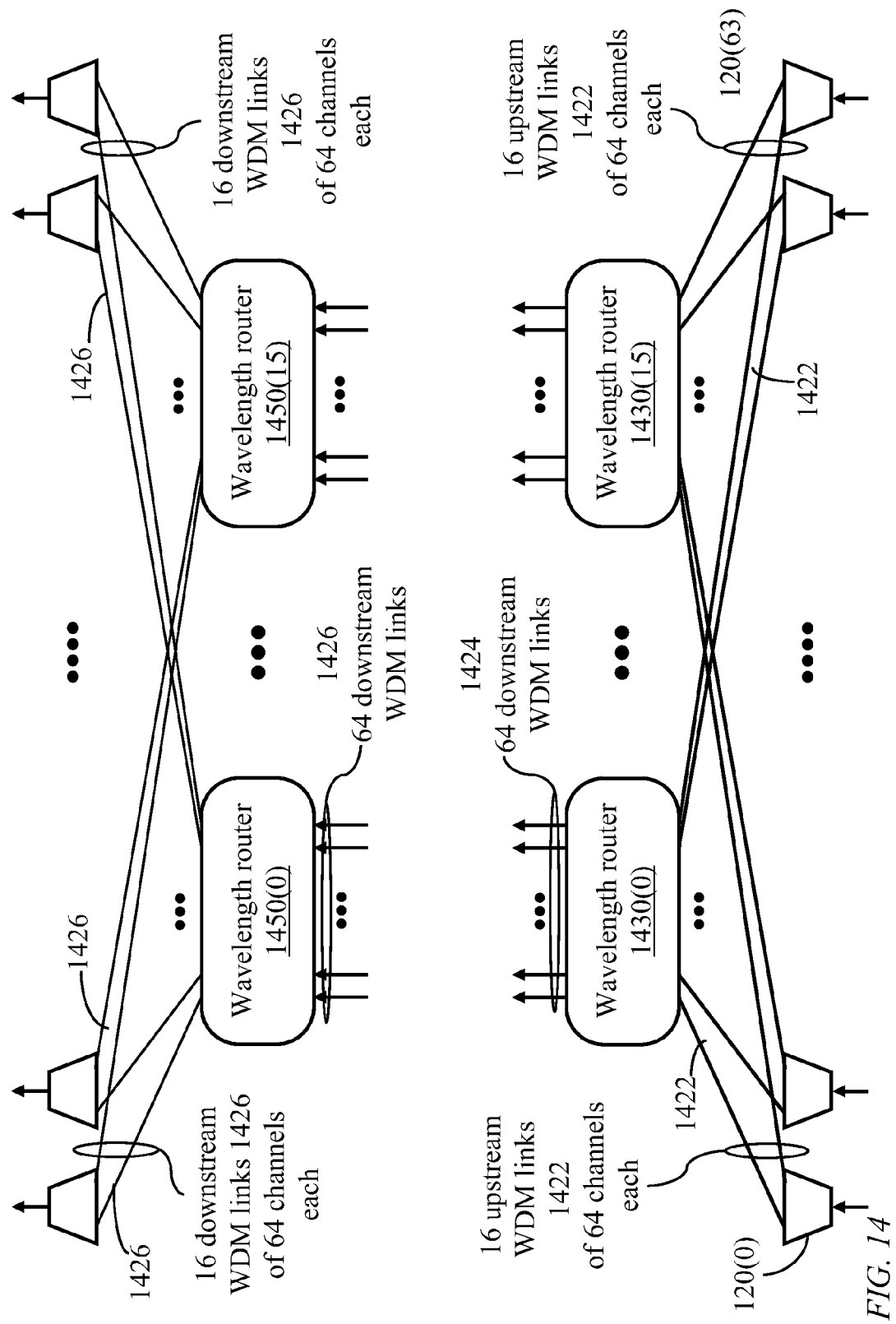
FIG. 14 illustrates edge-node connectivity to switch units in the network of FIG. 12, in accordance with an embodiment of the present invention.

FIG. 14 illustrates exemplary connections of a group of 64 edge nodes 120 arbitrarily indexed as 120(0) to 120(63) each having 1024 upstream wavelength channels to switch units 160 and 1024 downstream wavelength channels from switch units 160. The 1024 upstream wavelength channels emanating from an edge node are grouped into 16 upstream WDM links 1422 each WDM link multiplexing 64 wavelength channels and terminating onto one switch unit 160. Likewise, the 1024 downstream wavelength channels terminating on an edge node are grouped into 16 downstream WDM links 1426 each WDM link multiplexing 64 wavelength channels, each downstream WDM link emanating from one switch unit 160. Each switch unit 160 is of dimension 64×64, having 64 input ports and 64 output ports, each input port supporting one upstream wavelength channel and each output port supporting one downstream wavelength channel. Each switch unit 160 has a spectral demultiplexer at input for demultiplexing wavelength channels of an input WDM link and directing each wavelength channel to a respective input port of the switch unit. Each switch unit 160 has a spectral multiplexer at output for multiplexing output wavelength channels onto an output WDM link.

Sixteen upstream wavelength routers 1430, individually identified as 1430(0) to 1430(15) are used to direct the 1024 upstream wavelength channels emanating from each of edge nodes 120(0) to 120(63) to 1024 different switch units 160, subject to the connectivity conditions described with reference to FIG. 1 and FIG. 3. A wavelength router 1430 has 64 upstream WDM links 1422 each carrying 64 wavelength channels and 64 output WDM links 1424 each carrying one wavelength channel from each of the upstream WDM links.

Likewise, sixteen downstream wavelength routers 1450, individually identified as 1450(0) to 1450(15) are used to direct downstream wavelength channels of 1024 downstream WDM links emanating from 1024 different switch units 160 to edge nodes 120(0) to 120(63), so that each edge node 120 receives wavelength channels from switch units 160 belonging to one column of the switch-unit matrix as described with reference to FIG. 1 and FIG. 3. A wavelength router 1450 has 64 downstream WDM links 1426 each carrying 64 wavelength channels and 64 output WDM links 1428 each carrying one downstream wavelength channel from each of the 64 downstream WDM links 1426.

Figure 15:
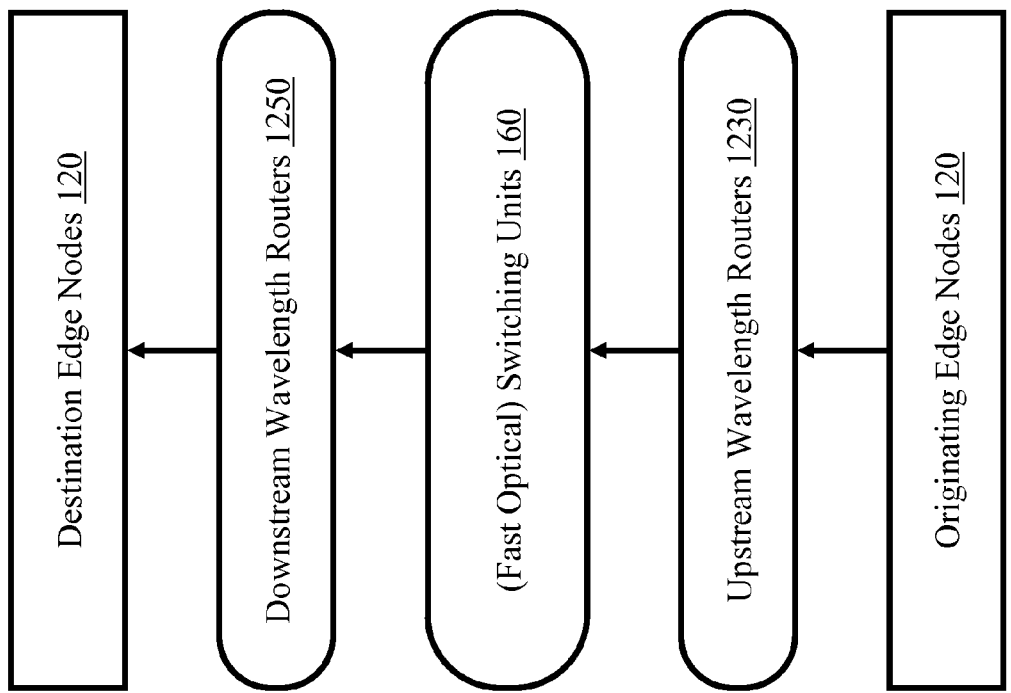
FIG. 15 illustrates signals flow from originating edge nodes to destination edge nodes in the network of FIG. 12 or FIG. 13, where a signal traverses an upstream wavelength router, a switch unit, and a downstream wavelength router.

FIG. 15 provides an overview of simple paths in the network of FIG. 12 or the network of FIG. 13. Each simple path originates from a source edge node 120 and terminates in a destination edge node 120. A simple path traverses an upstream wavelength router 1230, a switch unit 160, and a downstream wavelength router 1250.

Time-Coordination

A switch unit 160 has a master time indicator which provides a time reference to be observed by each edge node 120 having an upstream channel to the switch unit 160. The master time indicators of the $\nu^2$ switch units are independent of each other.

Each edge node 120 has ν output ports connecting to ν switch units in ν different columns through upstream channels. An output port of an edge node 120 has a slave time indicator which time locks to a master time indicator of a switch unit 160 to which the output port connects.

Figure 22:
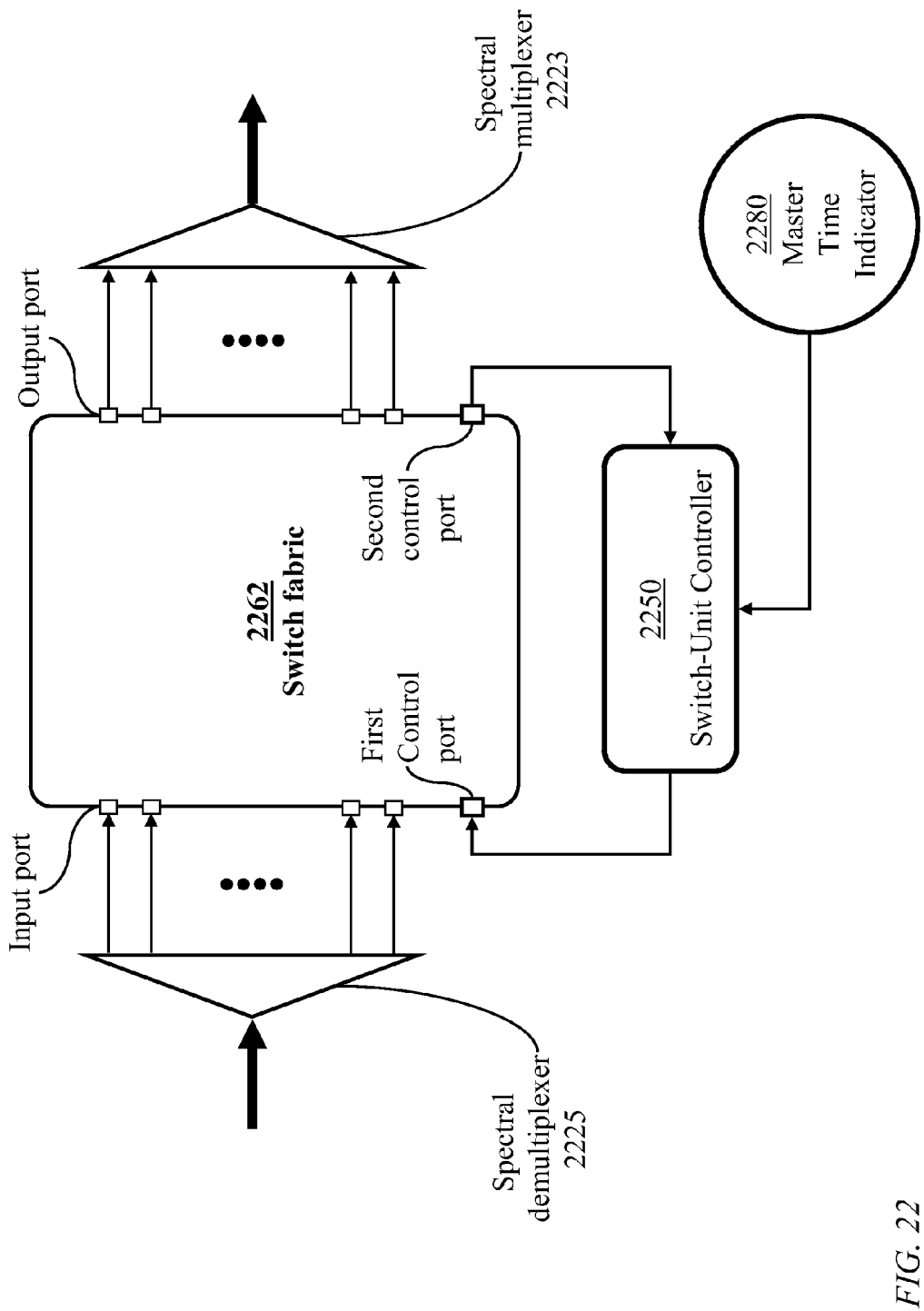
FIG. 22 illustrates a switch unit in any of the networks of FIG. 1, FIG. 3, FIG. 5, FIG. 7, FIG. 12, and FIG. 13, in accordance with an embodiment of the present invention.

Data units arrive at the n inlet ports of a switch unit 160 at time instants dictated by a controller of the switch unit 160. The time instants are specified according to a time reference of the master time indicator of the switch unit (FIG. 22). Thus, no signal buffering is needed at the switch unit and the switching function at the switch unit is time coherent. A latent space switch has a constant transit delay specific to each input-output connection. However, an arriving data unit is not buffered at input and the switching function at the latent space switch is also time coherent.

Wavelength-Routers Configuration

Figure 16:
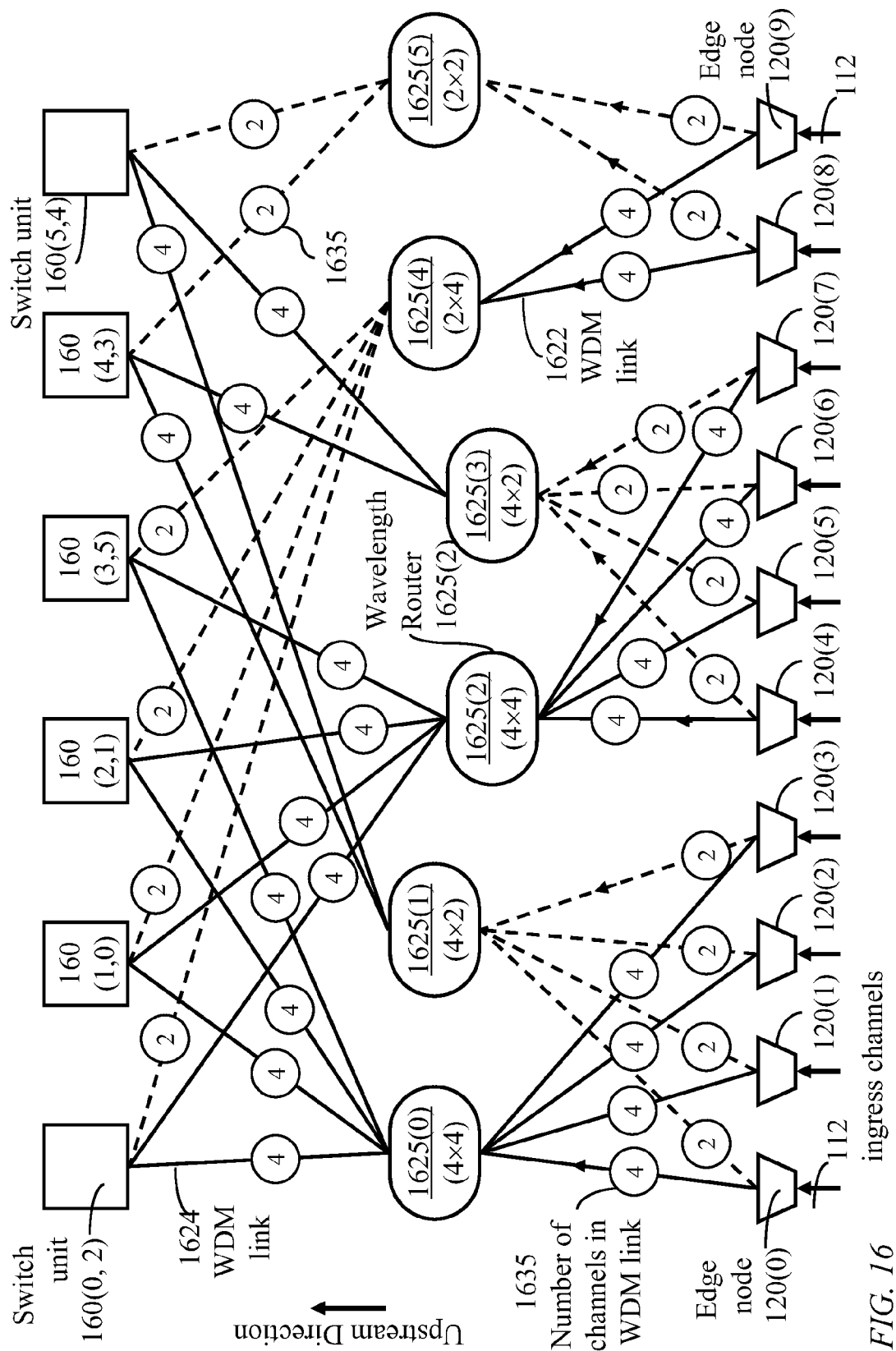
FIG. 16 illustrates an exemplary arrangement of upstream wavelength routers connecting a set of edge nodes to a set of switch units, in accordance with an embodiment of the present invention.

FIG. 16 illustrates a configuration of upstream wavelength routers connecting ten edge nodes 120(0) to 120(9) to six switch units 160(0,2), 160(1, 0), 160(2, 1), 160(3, 5), 160(4, 3), and 160(5,4), belonging to different columns in a matrix of switch units 160, using wavelength routers 1625 each having at most four input WDM links 1622 and at most four output WDM links 1624, where each output WDM link 1624 carries a wavelength channel from each input WDM link 1622. Each switch unit 160 is of dimension 10×10 (having 10 inlet ports and 10 outlet ports). The wavelength routers 1625 are configured so that each edge node 120 has an upstream channel to each of the six switch units 160. As illustrated, six wavelength routers 1625(0) to 1625(5) of dimensions (4×4), (4×2), (4×4), (4×2), (2×4), and (2×2) are used, where the dimension of a wavelength router is defined by the number of input WDM links and the number of output WDM links.

Figure 17:
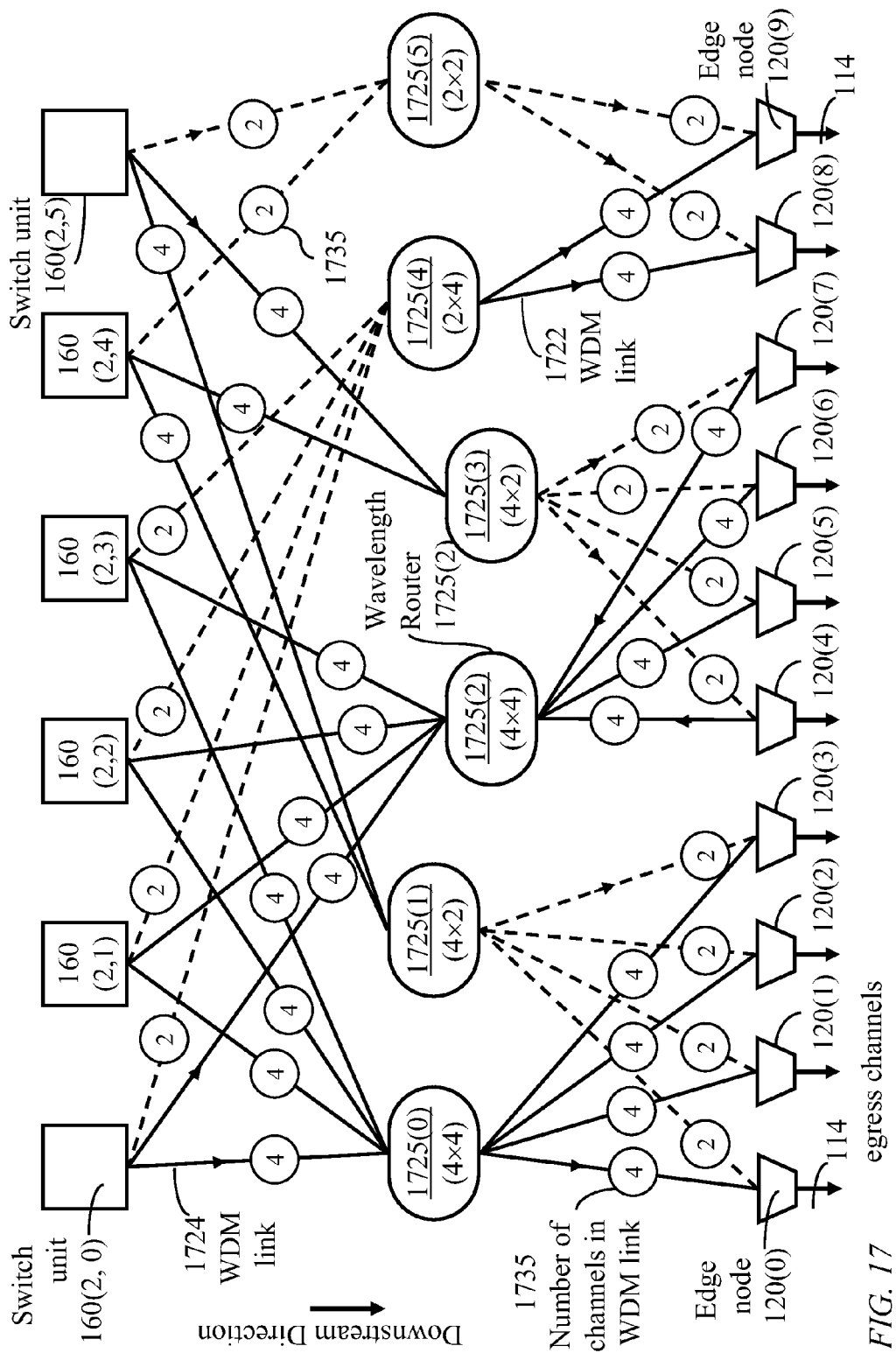
FIG. 17 illustrates an exemplary arrangement of downstream wavelength routers connecting a set of switch units to a set of edge nodes, in accordance with an embodiment of the present invention.

FIG. 17 illustrates a configuration of downstream wavelength routers 1725 connecting six switch units 160(2,0), 160(2,1), 160(2, 2), 160(2,3), 160(2,4), and 160(2,5), all belonging to column 2, to the ten edge nodes 120(0) to 120(9) using wavelength routers 1725 each having at most four input WDM links 1724 and at most four output WDM links 1722, where each output WDM link 1722 carries a wavelength channel from each input WDM link 1724. Each switch unit 160 is of dimension 10×10 (n=10). The wavelength routers 1725 are configured so that each edge node 120 has a downstream channel from each of the six switch units 160. As illustrated, six wavelength routers 1725(0) to 1725(5) of dimensions (4×4), (4×2), (4×4), (4×2), (2×4), and (2×2) are used.

The maximum dimension of a wavelength router 1625 or 1725 in the exemplary configurations of FIG. 16 and FIG. 17 is selected to be only 4×4 for clarity. In a wide-coverage network, wavelength routers each of a dimension of 32×32, for example, may be used.

Figure 18:
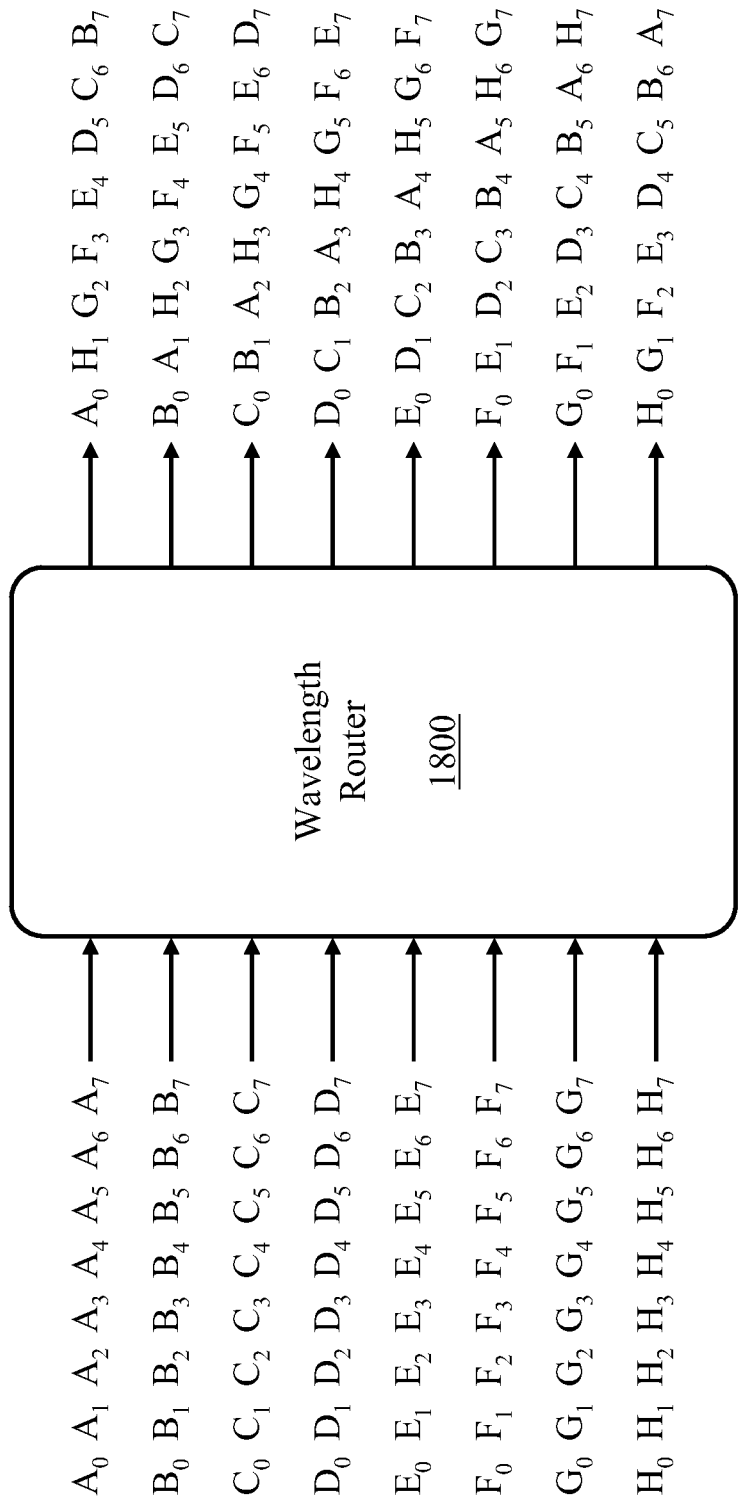
FIG. 18 illustrates wavelength-channel assignments in a conventional wavelength router having a number of input wavelength-division-multiplexed links equal to a number of output wavelength-division-multiplexed links.

FIG. 18 illustrates wavelength-channel assignments in a conventional wavelength router. The figure illustrates an exemplary wavelength router 1800 of a small dimension. Network 1200 (FIG. 12) would employ wavelength routers of significantly larger dimensions. Exemplary wavelength router 1800 may be employed as an upstream wavelength router or a downstream wavelength router. Wavelength router 1800 has eight input wavelength-division-multiplexed (WDM) links each carrying a multiplex of eight wavelength channels and eight output WDM links each carrying a wavelength channel from each input WDM link. The wavelength channels of a first input WDM links are denoted $\{A_0, A_1, \ldots, A_7\}$, the wavelength channels of a second input WDM link are denoted $\{B_0, B_1, \ldots, B_7\}$, and so on, where a character A, B, . . . , identifies an input WDM link and a subscript $\{0, 1, \ldots, 7\}$ identifies a spectral band allocated to a respective wavelength channel. As illustrated, each output WDM link carries channels from different input WDM links and of different spectral bands.

Figure 19:
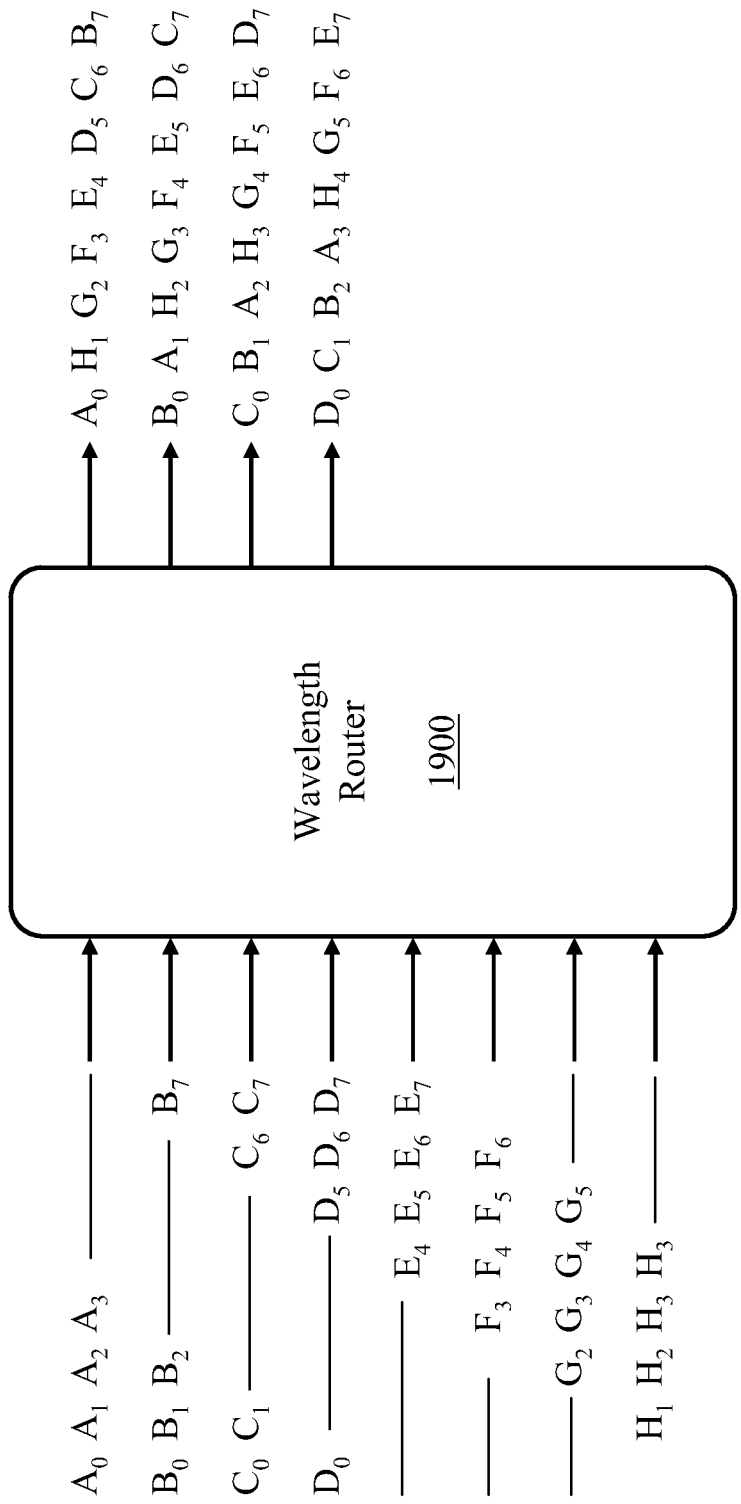
FIG. 19 illustrates wavelength-channel assignments in a wavelength router having a number of input wavelength-multiplexed links exceeding a number of output wavelength-division-multiplexed links.

FIG. 19 illustrates wavelength-channel assignments in a wavelength router 1900, structurally identical to wavelength router 1800 except that only four output WDM links are used. Each input WDM channel carries four wavelength channels selected so that each of the four output WDM links carries eight wavelength channels of different spectral bands, one wavelength channel from each input WDM channel. As illustrated in FIG. 16 and FIG. 17, some wavelength routers may be partially provisioned depending on the network configuration.

Figure 20:
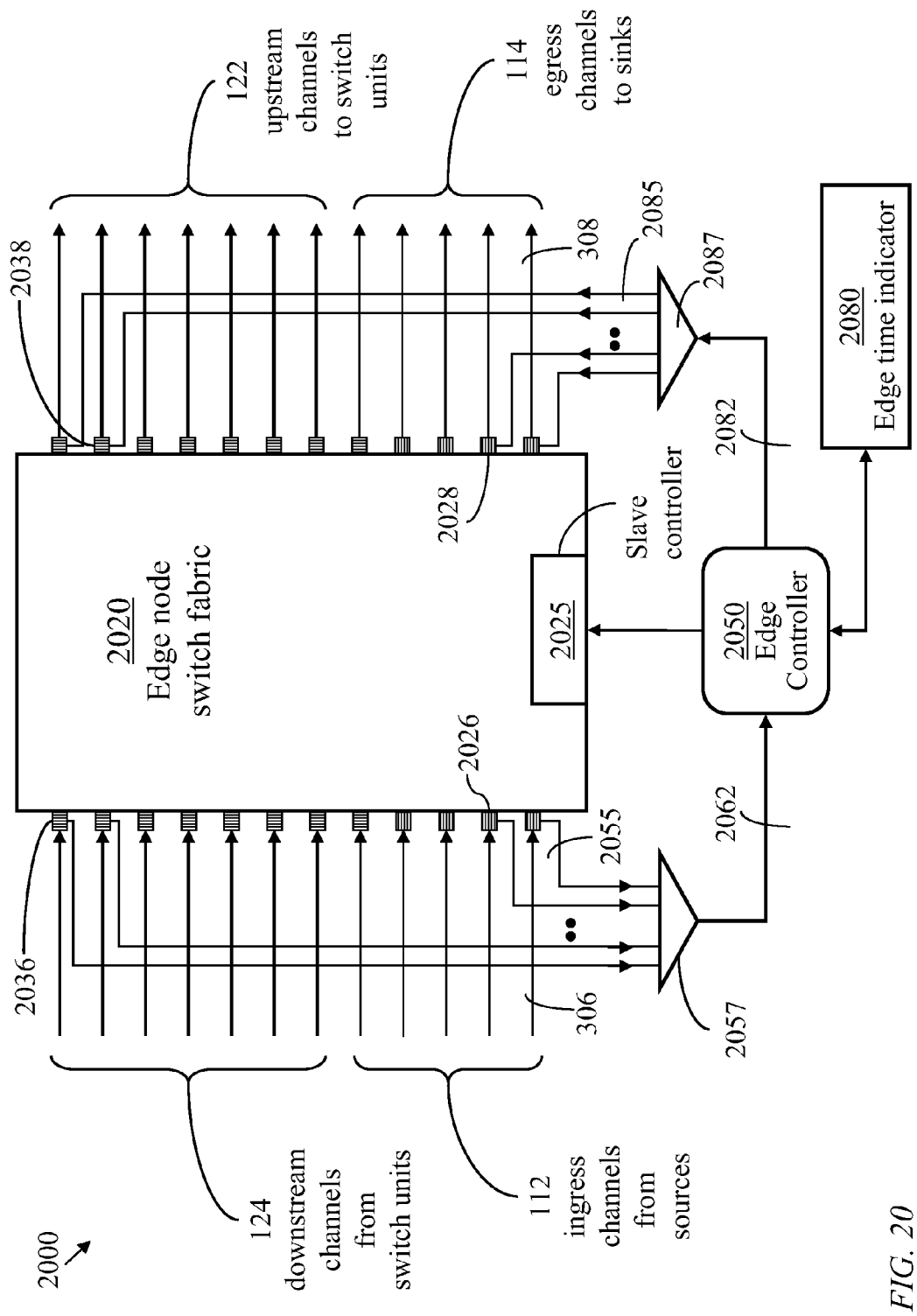
FIG. 20 illustrates an edge node in any of the networks of FIG. 1, FIG. 3, FIG. 5, FIG. 7, FIG. 12, and FIG. 13, in accordance with an embodiment of the present invention.

FIG. 20 illustrates an edge node 2000 for use in any of the networks of FIG. 1, FIG. 3, FIG. 5, FIG. 7, FIG. 12, and FIG. 13. Edge node 2000 has a switch fabric 2020, an edge controller 2050, input ports, and output ports. The input ports include ingress ports 2026 for receiving data from data sources through ingress channels 112 and inbound ports 2036 for receiving data from switch units through downstream channels 124. The output ports include egress ports 2028 for transmitting data to data sinks through egress channels 114 and outbound ports 2038 for transmitting data to switch units through upstream channels 122.

Control signals from input ports 2026 and 2036 sent on control channels 2055 are time multiplexed in temporal multiplexer 2057 onto a channel 2062 connecting to edge controller 2050. Control signals from edge controller 2050 to egress ports 2028 and outbound ports 2038 are transferred through a channel 2082, a temporal demultiplexer 2087 and channels 2085.

Each egress port 2028 is preferably paired with an ingress port 2026, and each outbound port 2038 is preferably paired with an inbound port 2036. Control signals from the edge controller 2050 to the ingress ports 2026 and inbound ports 2036 may be transferred through corresponding paired output ports (egress ports and outbound ports).

Other arrangements for exchanging control signals between the edge controller 2050 and the input or output ports may be devised; for example the control signals may be transferred through the switch fabric instead of channels 2055 and 2085.

Edge controller 2050 schedules connections from input ports (ingress and inbound ports) to output ports (egress and outbound ports) and instructs a configuration controller (slave controller) 2025 associated with the switch fabric 2020 to establish scheduled connections. Configuration controllers associated with switch fabrics are well known in the art. The edge controller 2050 is coupled to an edge time indicator 2080 which distributes timing data to the outbound ports 2038. Each outbound port adjusts transmission time of data sent to a specific switch unit 160 according to the time data and time indications received from a master time indicator of the specific switch unit. The edge time indicator has the same periodicity and granularity of the master time indicator.

Control Time Slots

The time domain is organized into time frames each divided into a number T of time slots of equal duration. Each connection (data stream) is allocated a respective number σ of time slots per time frame, $0<\sigma<T$. A connection is preferably confined to a single upstream channel 122 from a source edge node 120 to a switch unit 160. Control time slots from edge controller 2050 to a switch-unit controller and vice versa may be transferred through dedicated control channels. A number $\Lambda_1$ of upstream control time slots per time frame may be reserved in each upstream channel 122 from a source node 120 and a number $\Lambda_2$ of downstream control time slots per time frame may be reserved in each downstream channel 124 from a switch unit 160. Although the flow rate of control signals generated by edge controller 2050 may differ from the flow rate of control signals generated by a switch-unit controller, it is preferable that $\Lambda_1=\Lambda_2$.

Figure 21:
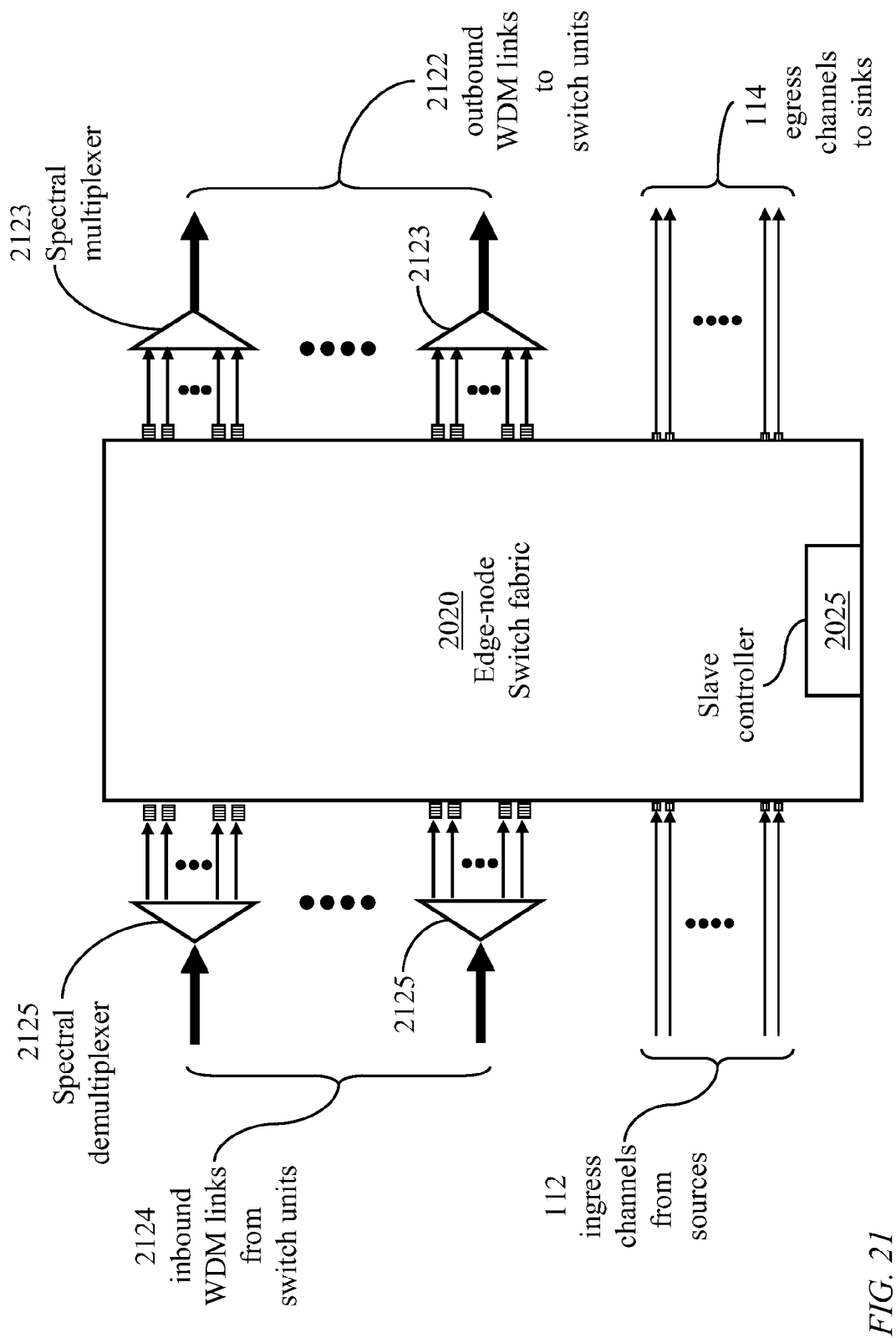
FIG. 21 illustrates an edge node connecting to WDM links, in accordance with an embodiment of the present invention.

As illustrated in FIG. 12, upstream channels 122 from an edge node 120 are multiplexed onto an upstream WDM link 1222 connecting to a wavelength router 1230 and a downstream WDM link 1228 carries downstream channels 124 directed to an edge node 120. Each inbound port 2036 of edge node 2000 has an optical-to-electrical converter and each outbound port 2038 has an electrical-to-optical converter (not illustrated). An edge node 120 may have a large number of upstream channels 122 and downstream channels 124. Thus, upstream WDM link 1222 may actually comprise a number of WDM links each carrying a smaller number of upstream channels 122. For example, with 1024 upstream channels 122 emanating from a single edge node 120 and 1024 downstream channels 124 terminating on the edge node, WDM link 1222 may be implemented as 16 WDM links each multiplexing 64 upstream channels 122 and WDM link 1228 may be implemented as 16 WDM links each multiplexing 64 downstream channels 124. Thus, an edge node 120 may have a number of spectral multiplexers each for multiplexing outputs of a number of electrical-to-optical convertors onto an upstream WDM link and a number of spectral demultiplexers for demultiplexing optical signals received through a downstream WDM link. FIG. 21 illustrates an edge node 120 equipped with a number of spectral multiplexers 2123 and a number of spectral demultiplexers 2125.

FIG. 22 illustrates a switch unit 160 for use in any of the networks of FIG. 1, FIG. 3, FIG. 5, FIG. 7, FIG. 12, and FIG. 13. The switch unit may have a photonic or electronic switching fabric 2262. Spectral demultiplexers 2225 (only one is illustrated) are employed at input and spectral multiplexers 2223 (only one is illustrated) may be employed at output. With an electronic fabric, optical-to-electrical converters are employed at input and electrical-to-optical converters are employed at output. A fast-switching optical switch fabric may be limited to a relatively small dimension; 64×64, for example.

Figure 23:
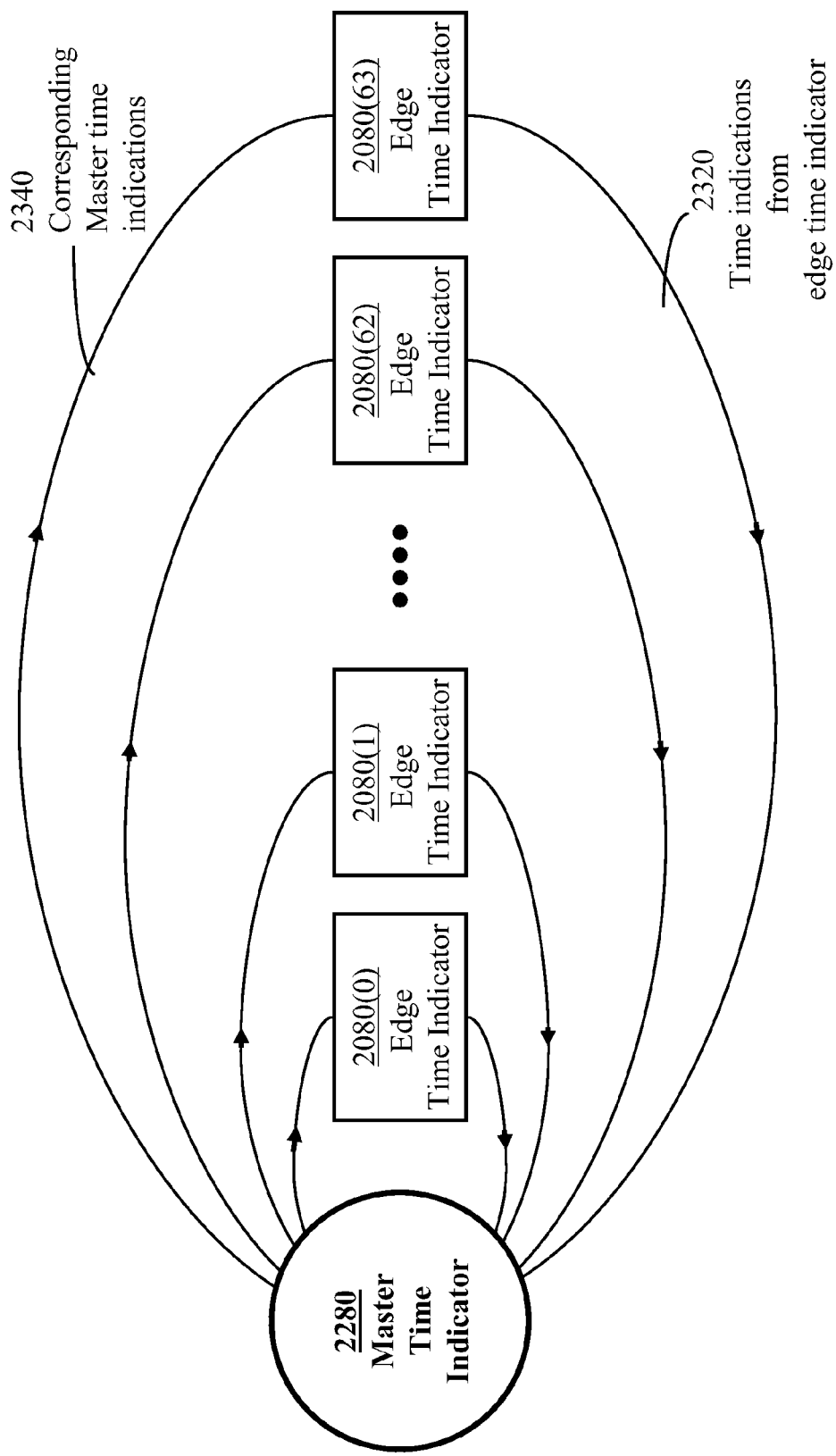
FIG. 23 illustrates exchange of time indications between a master controller of a switch unit and edge controllers to enable coherent switching at the switch units in any of the networks of FIG. 1, FIG. 3, FIG. 5, FIG. 7, FIG. 12, and FIG. 13, in accordance with an embodiment of the present invention.

A switch unit controller 2250 may be accessed through the switch fabric 2262 or through other arrangements known in the art. The switch controller 2250 receives connection requests from edge nodes 120, allocates time slots for each connection, and communicates relevant information to the edge nodes 120. A switch unit 160 does not buffer payload signals received from the edge nodes 120. Thus, to enable time-coherent switching, at a switch unit 160, of signals received from multiple edge nodes 120, outbound ports 2038 of the edge nodes are time-locked to the switch unit 160. The switch unit controller 2250 is coupled to a master time indicator 2280 and exchanges time indications with edge controllers 2050 coupled to respective time indicators 2080 to timelock outbound ports 2038 of each subtending edge node to the switch unit 160. FIG. 23 illustrates exchange of time indications of a master time indicator 2280 of a switch unit 160 and edge time indicators {2080(0), 2080(1), . . . , 2080(63)} to enable coherent switching at a switch unit in any of the networks of FIG. 1, FIG. 3, FIG. 5, FIG. 7, FIG. 12, and FIG. 13.

The edge controller 2050 has an edge processor and an edge scheduling module which includes a memory device storing processor executable instructions which cause the edge processor to implement time-locking and scheduling functions of an edge node. The switch unit controller 2250 has a switch-unit processor and a switch-unit scheduling module which includes a memory device storing processor executable instructions which cause the processor to implement time-locking and scheduling functions of a switch unit.

Exemplary Edge-Node Structure

Figure 24:
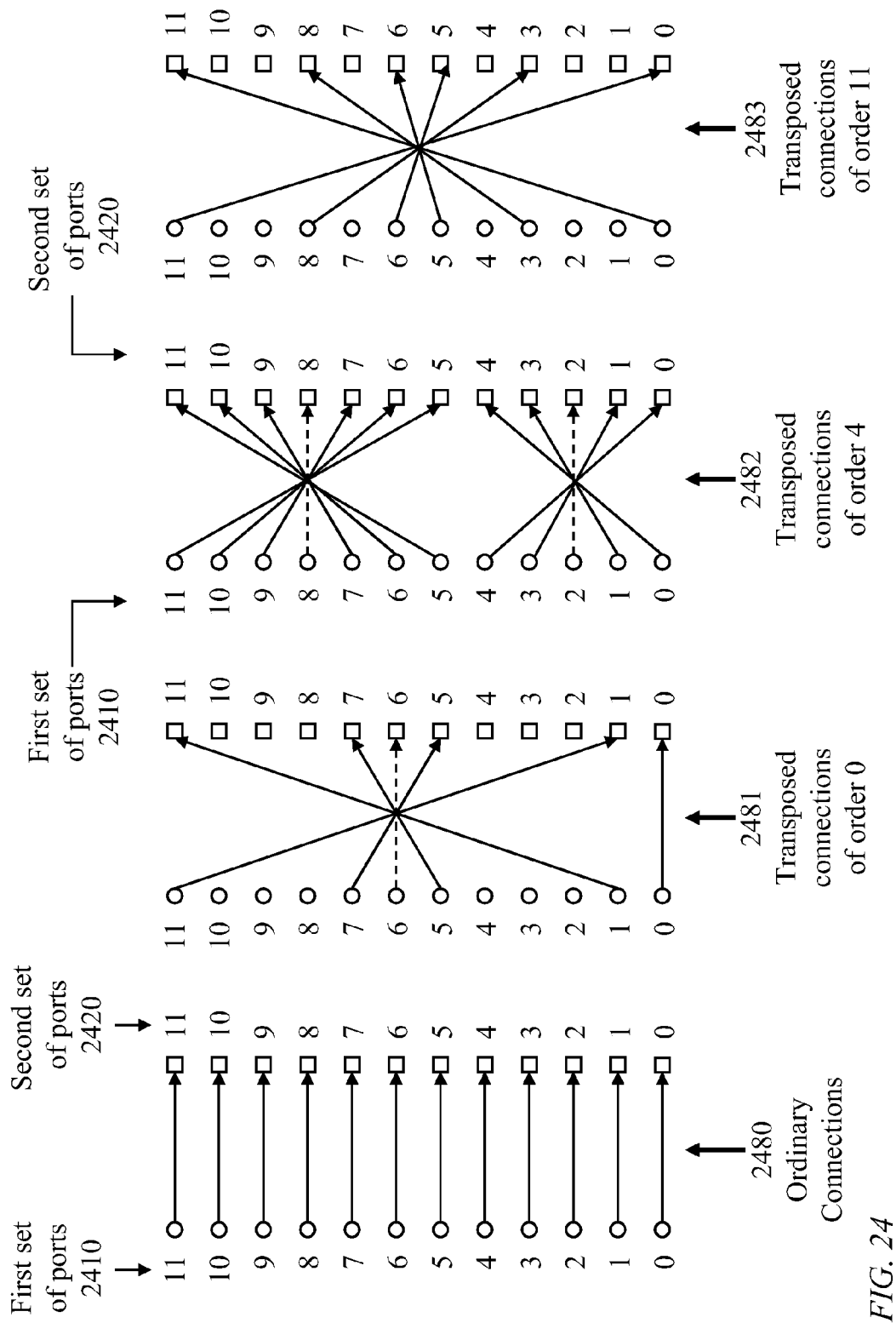
FIG. 24 illustrates ordinary and transposed connections used in switch configurations in accordance with an embodiment of the present invention.

FIG. 24 illustrates ordinary and transposed connections of a first set of ports 2410 having a number N>2 of ports and a second set of ports 2420 having N ports; N equals 12 in the exemplary case of FIG. 24. The N ports of the first set are indexed as 0, 1, . . . , (N−1), and the N ports of the second set are likewise indexed as 0, 1, . . . , (N−1). Thus, the ports of the first set are individually identified as {2410(0), 2410(1), . . . , (2410(N−1)} and the ports of the second set are individually identified as {2410(0), 2410(1), . . . , (2410(N−1)}. The ports of the first set have one-to-one static connections to the ports of the second set. The first set of ports is said to have ordinary connections to the second set of ports if each port 2410(j) is connected to a likewise indexed port 2420(j), 0≤j<N. The first set of ports is said to have transposed connections of order L to the second set of ports if each port 2410(j) is connected to a port 2420|L−j|, 0≤j<N, 0≤L<N, where |X| denotes $X_{modulo\ N}$, i.e., |X|=X, if X≥0, and X=(N−X), if X<0. Thus, |L−j|=L−j, if L≥j and |L−j|=(N−L+j), if L<j.

Four connection patterns are illustrated in FIG. 24. In a first pattern, the first set of ports 2410 has ordinary connections 2480 to the second set of ports 2420. In a second pattern, the first set of ports 2410 has transposed connections of order 0 to the second set of ports 2420. In a third pattern, the first set of ports 2410 has transposed connections of order 4 to the second set of ports 2420. In a fourth pattern, the first set of ports 2410 has transposed connections of order (N−1) to the second set of ports 2420.

Single-Rotator Circulating Switch

Figure 25:
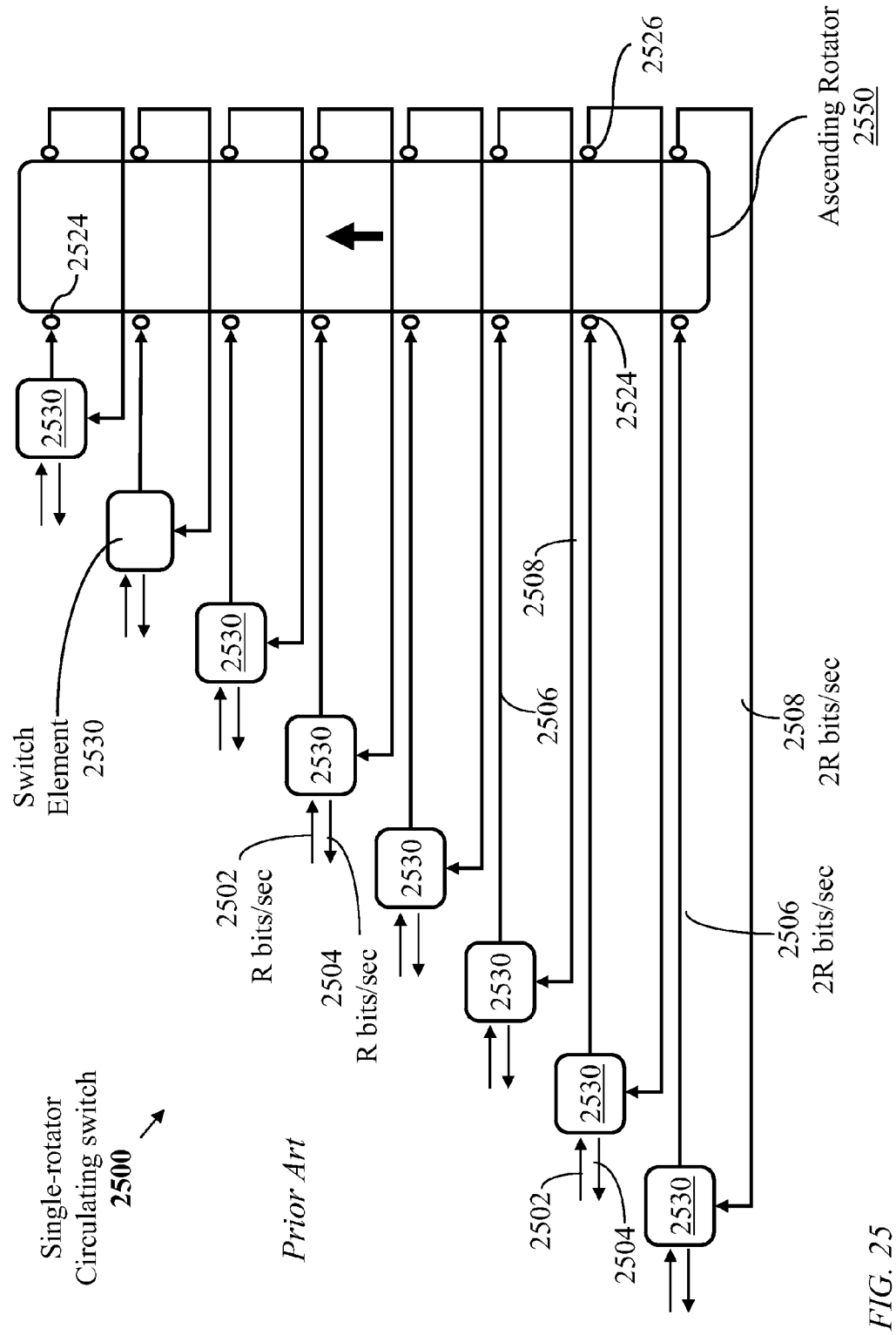
FIG. 25 illustrates a prior art single-rotator circulating switch which requires reordering of switched data segments of a data stream.

FIG. 25 illustrates an exemplary single-rotator circulating switch 2500 disclosed in U.S. Pat. No. 7,567,556. Circulating switch 2500 comprises eight switch elements 2530 and a single rotator 2550 having eight inlets 2524 and eight outlets 2526. Each switch element 2530 receives data from data sources (not illustrated) through an ingress channel 2502 and transmits data to data sinks (not illustrated) through an egress channel 2504. Each switch element connects to a respective inlet 2524 of rotator 2550 through an output channel 2506 and connects to a respective outlet 2526 of rotator 2550 through an input channel 2508. Each ingress channel 2502 has a capacity R bits per second, each egress channel 2504 has a capacity R, each output channel 2506 has a capacity of 2R and each input channel 2508 has a capacity of 2R. A typical value of R is 10 gigabits per second (Gb/s).

Switch elements 2530 are individually identified by indices 0, 1, . . . , (N−1), where N=8 in the exemplary circulating switch 2500. An inlet 2524 connecting to a switch element of index j, 0≤j<N is further identified by the index j as 2524(j) and an outlet 2526 connecting to a switch element of index j is further identified by the index j as 2526(j). Thus the inlets 2524 are referenced as 2524(0) to 2524(N−1) and the outlets 2526 are referenced as 2526(0) to 2526(N−1). For brevity, a switch element 2530 of index j may be referenced as switch element j, an inlet 2524 of index j may be referenced as inlet j, and an outlet 2526 of index j may be referenced as outlet j.

Rotator 2550 may be an ascending rotator or a descending rotator. An ascending rotator 2550 connects an inlet j to an outlet $\{j+t\}_{modulo\ N}$ during time slot t of a repetitive time frame organized into N time slots. A descending rotator 2550 connects an inlet j to an outlet $\{j-t\}_{modulo\ N}$ during time slot t.

During time slot t, a switch element of index j may transfer data to a switch element $\chi=\{j+t\}_{modulo\ N}$ through an ascending rotator 2550. Thus, $t=\{\chi-j\}_{modulo\ N}$. If the transferred data is destined to a switch element k, k≠χ, the data is held in switch element χ until inlet χ connects to outlet k. Thus, a data unit written in switch element χ during time slot t is transferred to switch element k during a time slot τ where $\tau=\{k-\chi\}_{modulo\ N}$, and the delay D in transit switch element χ is determined as $D=\tau-t=\{k+j-2\chi\}_{modulo\ N}$. Thus, data transferred from switch element j to switch element k may be held in a transit switch element χ for a period of time determined by j, k, and χ. A transit switch element 2530(χ) may be any switch element 2530 other than the originating switch element 2530(j) and the destination switch element 2530(k). Data units of a data stream from switch element j to switch element k may use more than one transit switch element χ and because of the dependency of the delay D on the transit switch elements, the data units may not be received at switch element k in the order in which the data units were sent from switch element j. Thus, data reordering at a receiving switch element 2530 is needed as described in the aforementioned U.S. Pat. No. 7,567,556.

Figure 26:
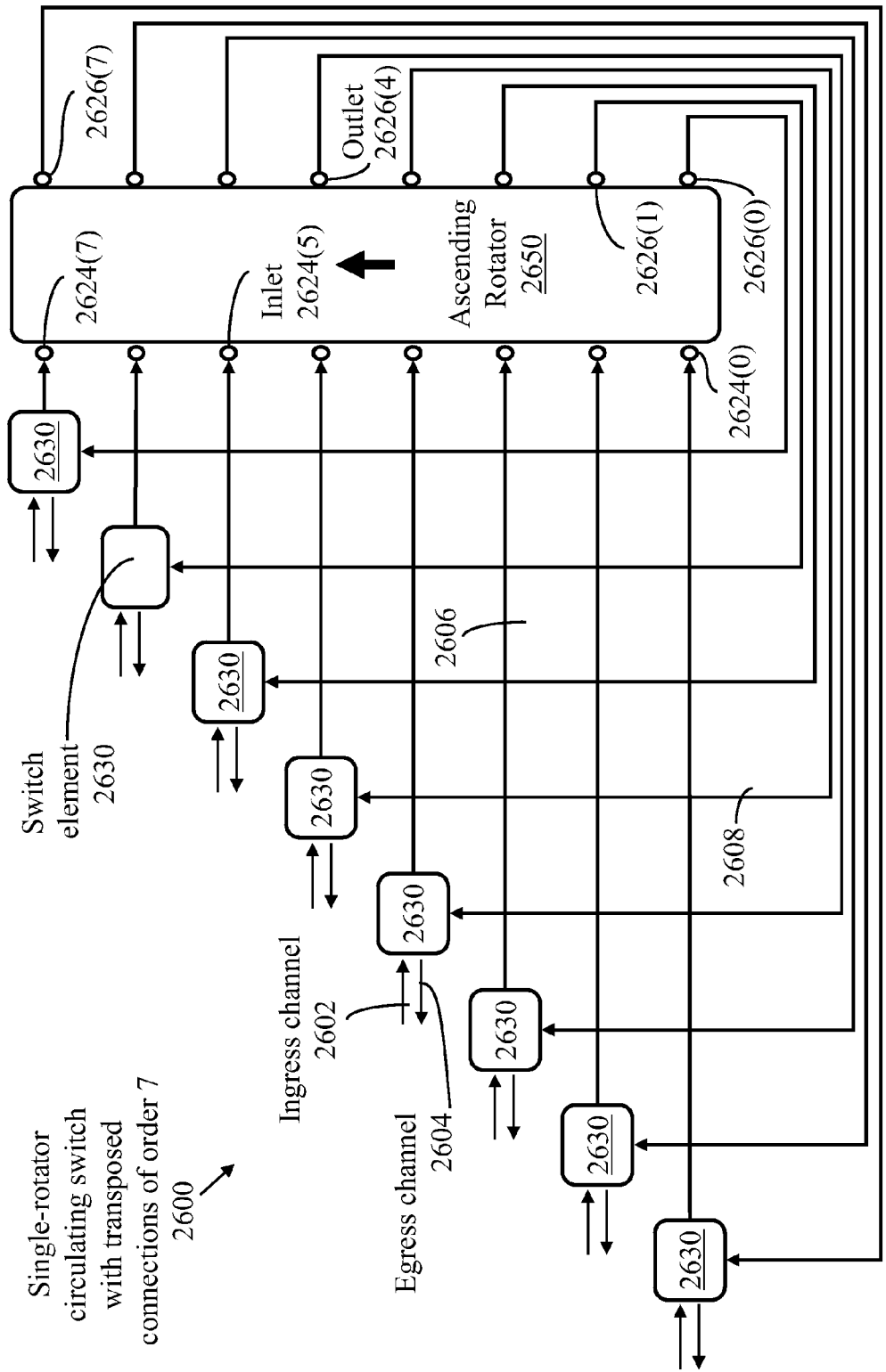
FIG. 26 illustrates a first configuration of a single-rotator circulating switch employing transposed connections for preserving sequential order of data segments of each data stream in accordance with an embodiment of the present invention.

FIG. 26 illustrates a first configuration of a single-rotator circulating switch 2600 employing transposed connections in order to preserve sequential order of data segments of each data stream. Circulating switch 2600 comprises eight switch elements 2630 and a single rotator 2650 having eight inlets 2624 and eight outlets 2626. Each switch element 2630 receives data from data sources (not illustrated) through an ingress channel 2602 and transmits data to data sinks (not illustrated) through an egress channel 2604. Each switch element 2630 connects to a respective inlet 2624 of rotator 2550 through an output channel 2606 and connects to a respective outlet 2626 of rotator 2650 through an input channel 2608. Each ingress channel 2602 has a capacity R, each egress channel 2604 has a capacity R, each output channel 2606 has a capacity of 2R and each input channel 2608 has a capacity of 2R.

Switch elements 2630 are individually identified by indices $0, 1, \ldots, (N-1)$, where N=8 in the exemplary circulating switch 2600. An inlet 2624 connecting to a switch element of index j, $0 \le j < N$ is further identified by the index j as 2624(j) and an outlet 2626 connecting to a switch element of index j is further identified by the index j as 2626(j). Thus the inlets 2624 are referenced as 2624(0) to 2624(N−1) and the outlets 2626 are referenced as 2626(0) to 2626(N−1).

Switch elements 2630 have ordinary connections to inlets 2624 where a switch element 2630(j) connects to inlet 2624(j), $0 \le j < N$. However, outlets 2626 have transposed connections to switch elements 2630 where an outlet 2626(j) connects to switch element 2630 of index $(L-j)_{modulo\,N}$, $0 \le j < N$, where L=7 in the exemplary network 2600. The use of the transposed connections ensures proper sequential order of data segments of each data stream, where a data stream is defined according to an originating switch element 2630 and a terminating switch element 2630.

Figure 27:
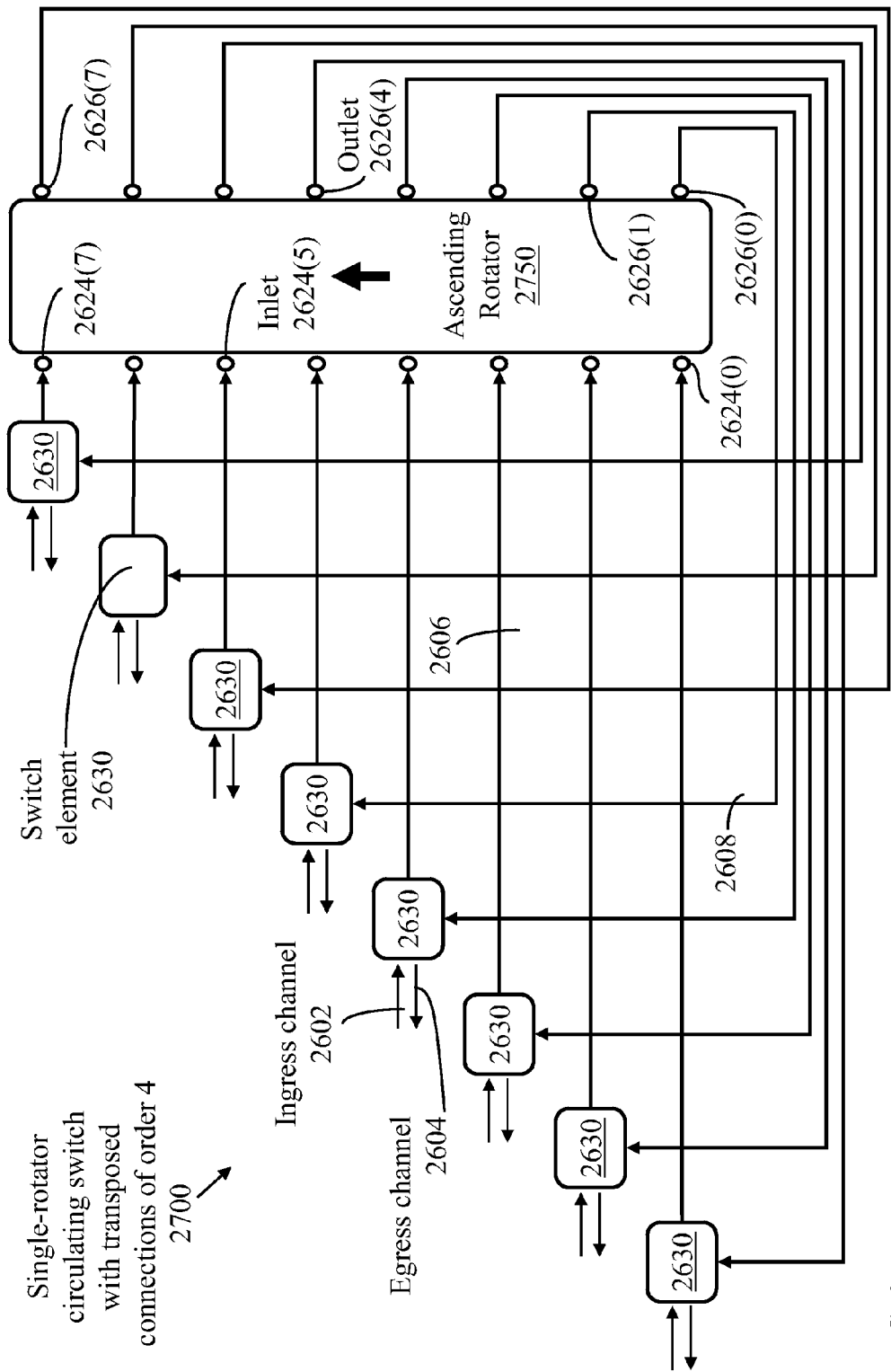
FIG. 27 illustrates a second configuration of a single-rotator circulating switch employing transposed connections for preserving sequential order of data segments of each data stream in accordance with an embodiment of the present invention.

FIG. 27 illustrates a configuration of a single-rotator circulating switch 2700 in which switch elements 2630 have transposed connections to inlets 2624 where a switch element 2630(j) connects to inlet 2624 of index $(L-j)_{modulo\,N}$, $0 \le j < N$, L=7. However, outlets 2626 have ordinary connections to switch elements 2630 where an outlet 2626(j) connects to switch element 2630(j), $0 \le j < N$. The use of the transposed connections ensures proper sequential order of data segments of each data stream.

Figure 28:
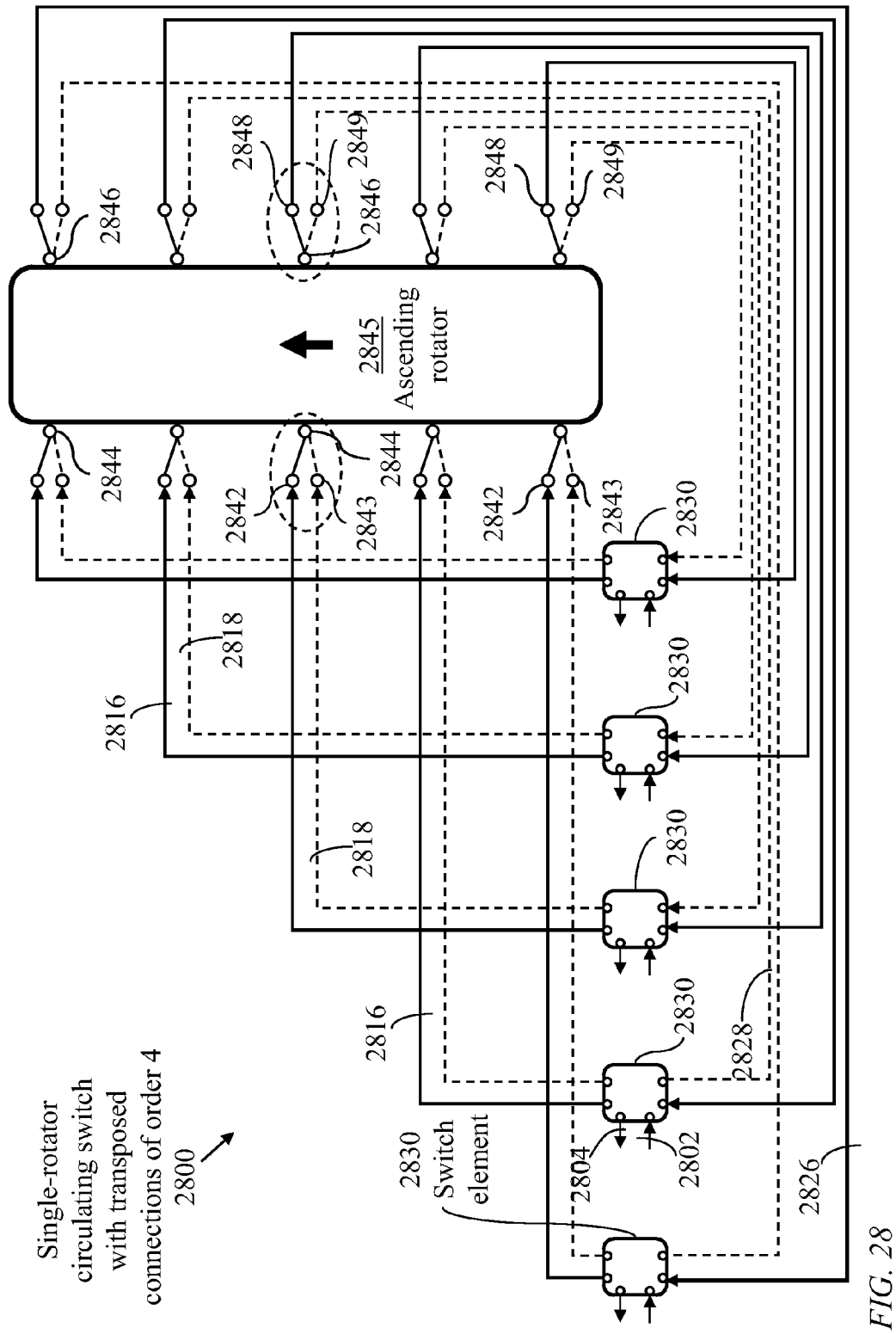
FIG. 28 illustrates a configuration of a uniphase single-rotator circulating switch employing transposed connections for preserving sequential order of data segments of each data stream, where switch elements connect to a single rotator through inlet selectors and outlet selectors, for use as an edge node in any of the networks of FIG. 1, FIG. 3, FIG. 5, FIG. 7, FIG. 12 and FIG. 13, in accordance with an embodiment of the present invention.

FIG. 28 illustrates an exemplary single-rotator circulating switch 2800 which comprises five switch elements 2830 and a single rotator 2845 having five inlets 2844 and five outlets 2846. Each switch element 2830 receives data from data sources (not illustrated) through an external input channel 2802 and transmits data to data sinks (not illustrated) through an external output channel 2804. Each switch element connects to a respective inlet 2844 of rotator 2845 through two internal output channels 2816 and 2818, and connects to a respective outlet 2846 through two internal input channels 2826 and 2828. Each of external input channels 2802, external output channels 2804, internal output channels 2816, 2818, and internal input channels 2826, 2828 has the same capacity of R bits/second (for example R=10 Gb/s). Each switch unit 2830 has an external input port for receiving data through external channel 2802, an external output port for transmitting data through external channel 2804, two internal output ports for transmitting data through internal output channels 2816 and 2818, and two internal input ports for receiving data through internal input channels 2826 and 2828. Each port of a switch unit may include a short buffer sufficient to hold one data unit (data segment).

An inlet selector 2835 is provided at each inlet 2844 and an output selector 2855 is provided at each outlet 2846. An inlet selector 2835 has two inlet ports 2842 and 2843 alternately connecting one of two channels 2816 and 2818 originating from a respective switch element 2830 to an inlet 2844. An outlet selector 2855 has two outlet ports 2848 and 2849 alternately connecting an outlet 2846 to one of two channels 2826 and 2828 terminating on a respective switch element 2830.

Switch elements 2830 are individually identified by indices $0, 1, \ldots, (N-1)$, where N=8 in the exemplary circulating switch 2800. In general, the number N of switch elements exceeds 2 and may have an upper bound dictated by transit delay. A practical upper bound of N would be of the order of 2000. An inlet 2844 connecting to a switch element of index j, $0 \le j < N$ is identified by the index j as 2844(j) and an outlet 2846 connecting to a switch element of index j is identified by the index j as 2846(j).

The switch elements 2830 have ordinary connections to the inlets 2844 so that a switch element 2830(j) connects to a selector 2835 of inlet 2844(j). The outlets 2846 have transposed connections to the switch elements 2830 so that a selector 2855 of outlet $(L-j)_{modulo\,N}$ connects to switch element 2830(j). In the exemplary configuration of FIG. 28, $0 \le j < N$, $0 \le L < N$, and L=7. For brevity, hereinafter, a switch element 2830 of index j may be referenced as switch element j, an inlet 2844 of index j may be referenced as inlet j, and an outlet 2846 of index j may be referenced as outlet j.

Using an ascending rotator 2845, inlet j connects to outlet $\chi$, where $\chi = \{j+t\}_{modulo\,N}$ during time slot t. Thus, $t = \{\chi - j\}_{modulo\,N}$. Outlet $\chi$ connects to switch element $(L-\chi)$. During time slot t, switch element j may transfer data to a switch element $(L-\chi)$. If the transferred data is destined to a switch element k, $k \ne \chi$, the data is held in switch element $(L-\chi)$ until inlet $(L-\chi)$ connects to outlet $(L-k)$, noting that outlet $(L-k)$ connects to switch element k. Thus, a data unit written in switch element $(L-\chi)$ during time slot t is transferred to outlet $(L-k)$ during a time slot $\tau$ where $\tau = \{\chi - k\}_{modulo\,N}$. The delay D in transit switch element $\chi$ is determined as $D = \tau - t = \{j - k\}_{modulo\,N}$. Thus, data transferred from switch element j to outlet k may be held in a transit switch element $(N - \chi)$ for a period of time D which is independent of $\chi$ and determined only by j and k.

Data units of a data stream from switch element j to switch element k may use more than one transit switch element $\chi$ and because of the independence of the transit delay D of the transit switch element $\chi$ used, data units from switch element j are received at switch element k in the order in which the data units were sent from switch element j.

Notably, in the configuration of FIG. 28, switch element j connects to both inlet ports 2842 and 2843 of an inlet selector 2835 of inlet j and switch element j connects to both outlet ports 2848 and 2849 of an outlet selector 2855 of outlet (N−j). A data stream from switch element j to switch element k, $0 \le j < N$, $0 \le k < N$, $k \ne j$, may be routed through either of two simple paths. A first simple path traverses a channel 2816 to inlet j and a channel 2826 from outlet (L−k) to switch element k. A second simple path traverses a channel 2818 to inlet j and a channel 2828 from outlet (L−k) to switch element k. The two simple connections take place during time slot $t = \{L - j - k\}_{modulo\,N}$. The data stream from switch element j to a switch element k may also be routed through either of two sets of compound paths. A path in the first set traverses a channel 2816 from switch element j to inlet j, a channel 2826 from an outlet $\chi$, $0 \le \chi < N$, $\chi \ne j$, to switch element $(L-\chi)$, a channel 2816 from switch element $(L-\chi)$ to inlet $(L-\chi)$, and a channel 2826 from outlet (L−k) to switch element k. A path in the second set traverses a channel 2818 from switch element j to inlet j, a channel 2828 from outlet $\chi$ to switch element $(L-\chi)$, a channel 2818 from switch element $(L-\chi)$ to inlet $(L-\chi)$, and a channel 2828 from outlet (L−k) to switch element k. The transit delay D is determined as $D = \{j - k\}_{modulo\,N}$ for either of the two paths and the configuration 2800 provides uniphase paths for a pair of originating and destination switch units 2830.

Figure 29:
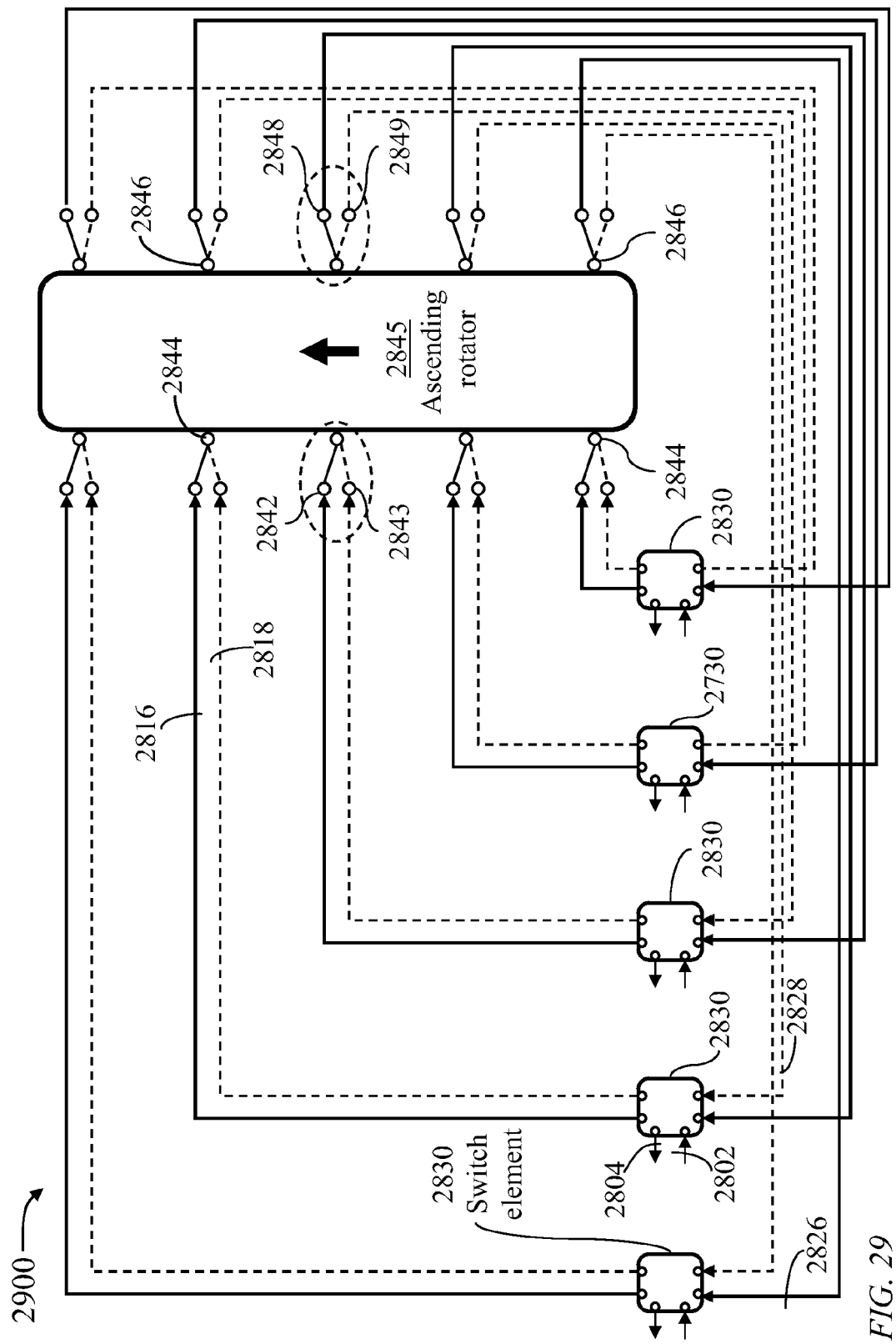
FIG. 29 illustrates an alternate configuration of the uniphase single-rotator circulating switch of FIG. 28, in accordance with an embodiment of the present invention.

FIG. 29 illustrates an alternate configuration of the uniphase single-rotator circulating switch of FIG. 28 where the switch elements 2830 have transposed connections to the inlets 2844 so that a switch element 2830(j) connects to a selector 2835 of inlet 2844 of index $(L-j)_{modulo\ N}$. In the exemplary configuration of FIG. 29, 0≤j<N, 0≤L<N, and L=7. The outlets 2846 have ordinary connections to the switch elements 2830 so that a selector 2855 of outlet (j) connects to switch element 2830(j).

Figure 30:
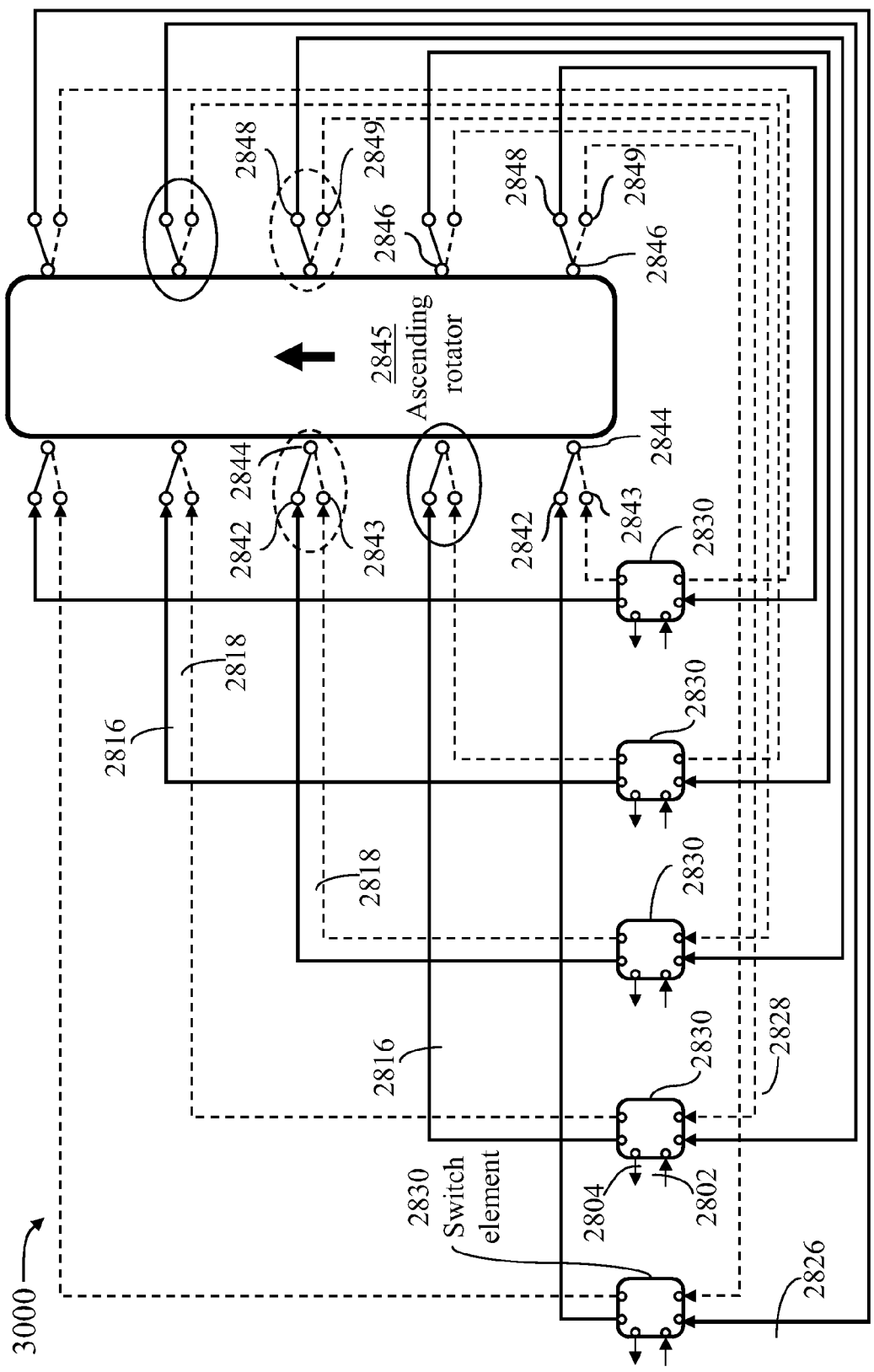
FIG. 30 illustrates a two-phase single-rotator circulating switch derived from the uniphase single-rotator circulating switch of FIG. 28 by rearranging switch-element connectivity to the inlet selectors and outlet selectors, in accordance with an embodiment of the present invention.

FIG. 30 illustrates a configuration 3000 in which the switch elements 2830 have ordinary connections to inlet ports 2842 of inlet selectors 2835 and transposed connections to inlet ports 2843 of inlet selectors 2835. Outlet ports 2848 of outlet selectors 2855 have transposed connections to the switch units 2830 and outlet ports 2849 of outlet selectors 2855 have ordinary connections to the switch units 2830. Thus, a switch element 2830(j) connects to inlet port 2842 of an inlet selector 2835 of inlet 2844(j) through a channel 2816 and inlet port 2823 of inlet selector 2835 of inlet 2844|L-j|, where |L-j| denotes $(L-j)_{modulo\ N}$, through a channel 2818, 0≤j<N, L=7. Outlet port 2848 of an outlet selector 2855 of outlet 2846(j) connects to switch element 2830|L-j| through a channel 2826 and outlet port 2849 of an outlet selector of outlet 2846(j) connects to switch element 1830(j) through a channel 2828.

A data stream from switch element j to switch element k, 0≤j<N, 0≤k<N, k≠j, may be routed through either of two simple paths. A first simple path traverses a channel 2816 to inlet j and a channel 2826 from outlet (L-k) to switch element k. A second simple path traverses a channel 2818 to inlet (L-j) and a channel 2828 from outlet k to switch element k. The first simple connection takes place during time slot $t=\{L-j-k\}_{modulo\ N}$ and the second simple connections takes place during time slot $t=\{j+k-L\}_{modulo\ N}$. The data stream from switch element j to a switch element k may also be routed through either of two sets of compound paths. A path in the first set traverses a channel 2816 from switch element j to inlet j, a channel 2826 from an outlet χ, 0≤χ<N, χ≠j, to switch element (L-χ), a channel 2816 from switch element (L-χ) to inlet (L-χ), and a channel 2826 from outlet (L-k) to switch element k. A path in the second set traverses a channel 2818 from switch element j to inlet (L-j), a channel from an outlet χ to switch element (L-χ), a channel 2818 from switch element (L-χ) to inlet χ, and a channel 2828 from outlet (L-k) to switch element k. The transit delay is $D=\{j-k\}_{modulo\ N}$ for the first path and $D=\{k-j\}_{modulo\ N}$ for the second phase. Thus configuration 3000 provides two-phase paths for each pair of originating and destination switch units 2830 and a controller of the originating switch element 2830 may select a path of lower transit delay. The first set of path is preferred if $\{j-k\}_{modulo\ N}$ is less than ⌊(N+1)/2⌋, where ⌊y⌋ denotes the integer part of any real number y; otherwise the second set of paths is preferred. For example, with j=6 and k=0, any compound path in the first set of paths has a transit delay $D_1=\{6-0\}_{modulo\ 8}=6$ time slots and any compound path in the second set of paths has a transit delay $D_1=\{0-6\}_{modulo\ 8}=2$ time slots; the second path may be selected.

Figure 31:
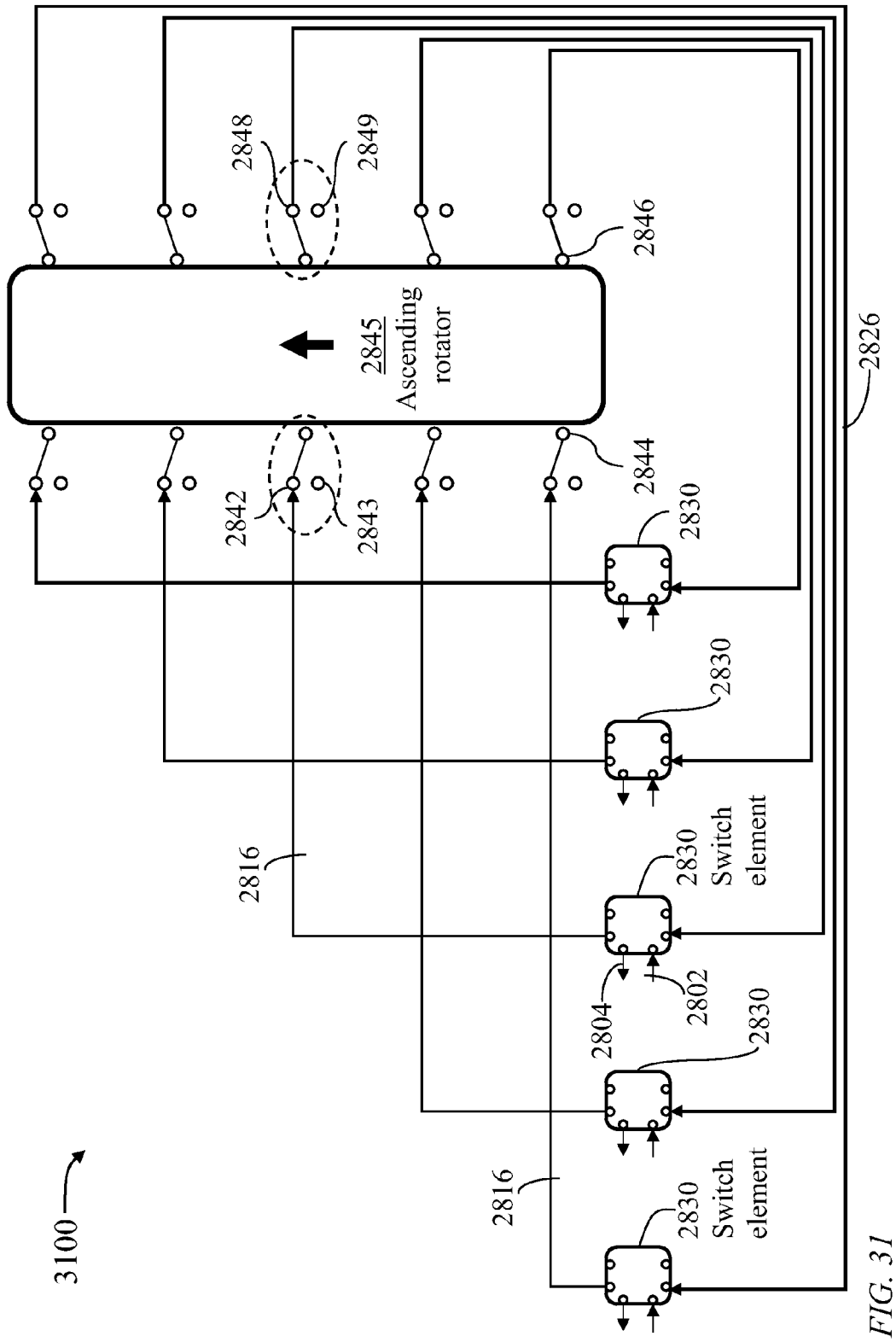
FIG. 31 illustrates connectivity of the two-phase single-rotator circulating switch of FIG. 30 during a first part of a time slot.

FIG. 31 illustrates a first connectivity of the two-phase single-rotator circulating switch of FIG. 30 sustaining the first set of compound paths described above. The first connectivity is effective during a first part of a time slot.

Figure 32:
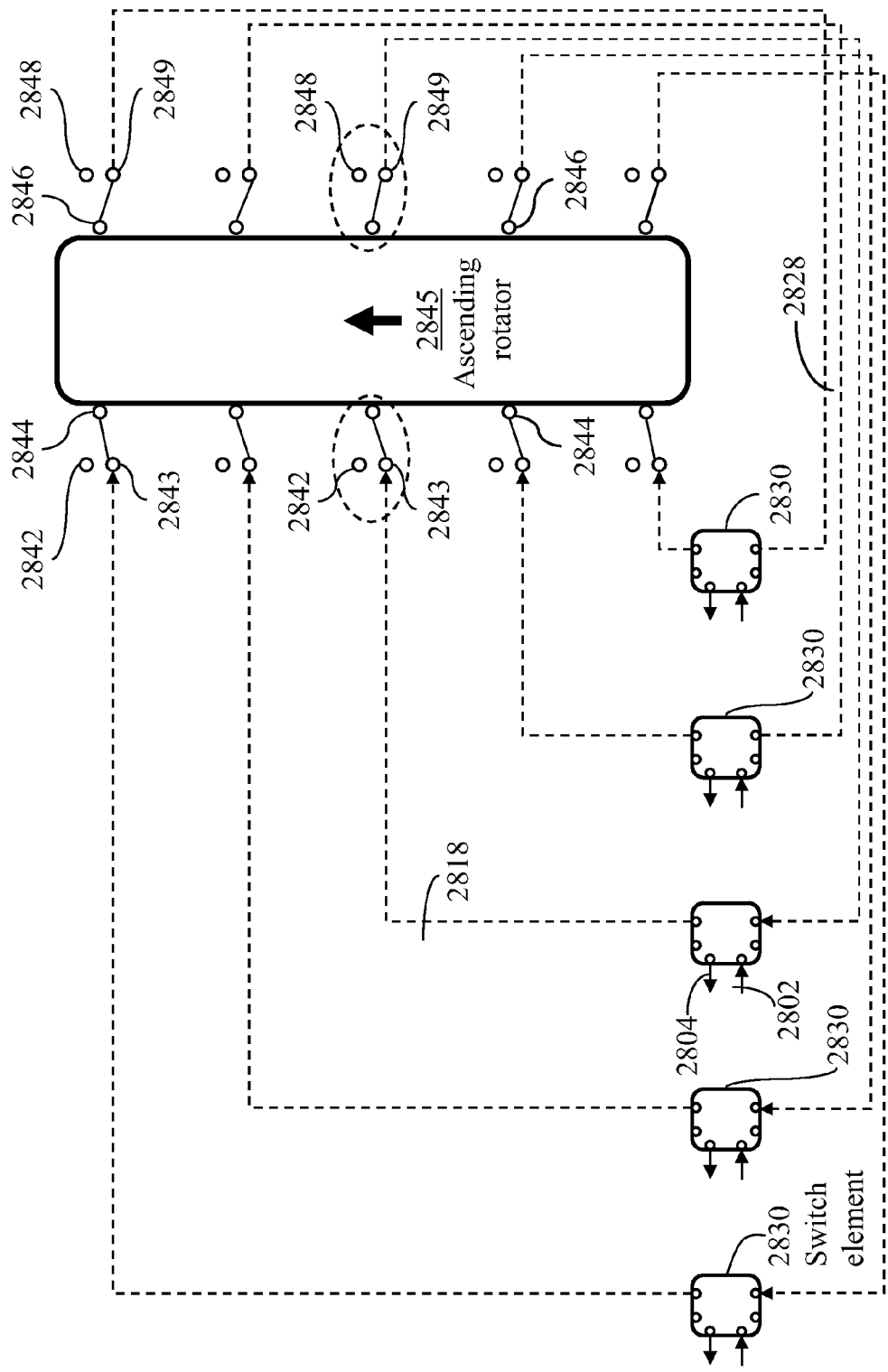
FIG. 32 illustrates connectivity of the two-phase single-rotator circulating switch of FIG. 30 during a second part of a time slot.

FIG. 32 illustrates a second connectivity of the two-phase single-rotator circulating switch of FIG. 30 sustaining the second set of compound paths described above. The second connectivity is effective during a second part of a time slot.

Figure 33:
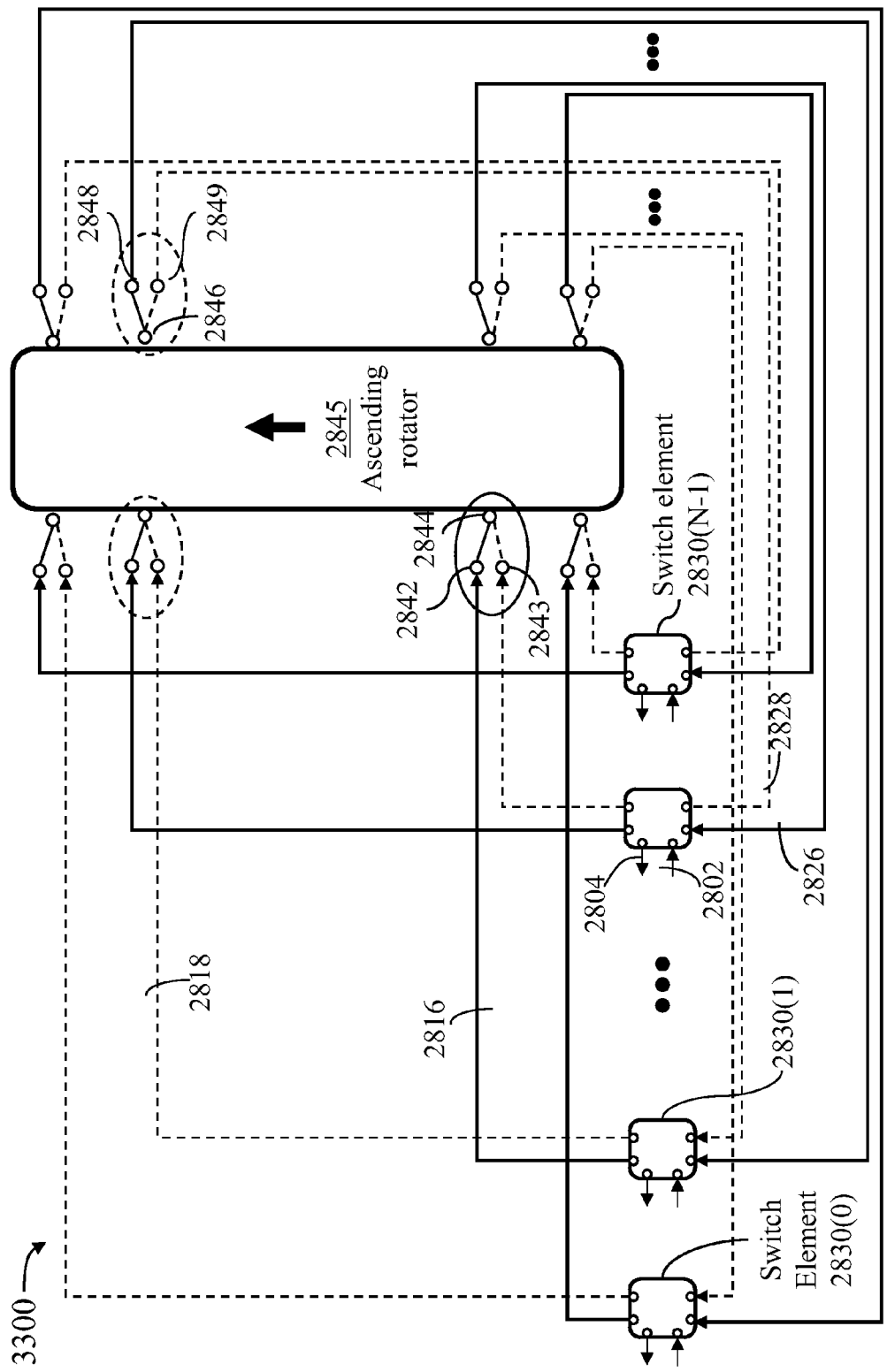
FIG. 33 illustrates a two-phase single-rotator circulating switch having an arbitrary number of switch elements and preserving sequential order of data segments of each data stream, in accordance with an embodiment of the present invention.

FIG. 33 illustrates a two-phase single-rotator circulating switch 3300 having an arbitrary number N>2 of switch elements and preserving sequential order of data segments of each data stream. The N switch elements has ordinary connections to N inlet ports 2842, transposed connections to N inlet ports 2843, transposed connections from N outlet ports 2848, and ordinary connections from outlet ports 2849.

Figure 34:
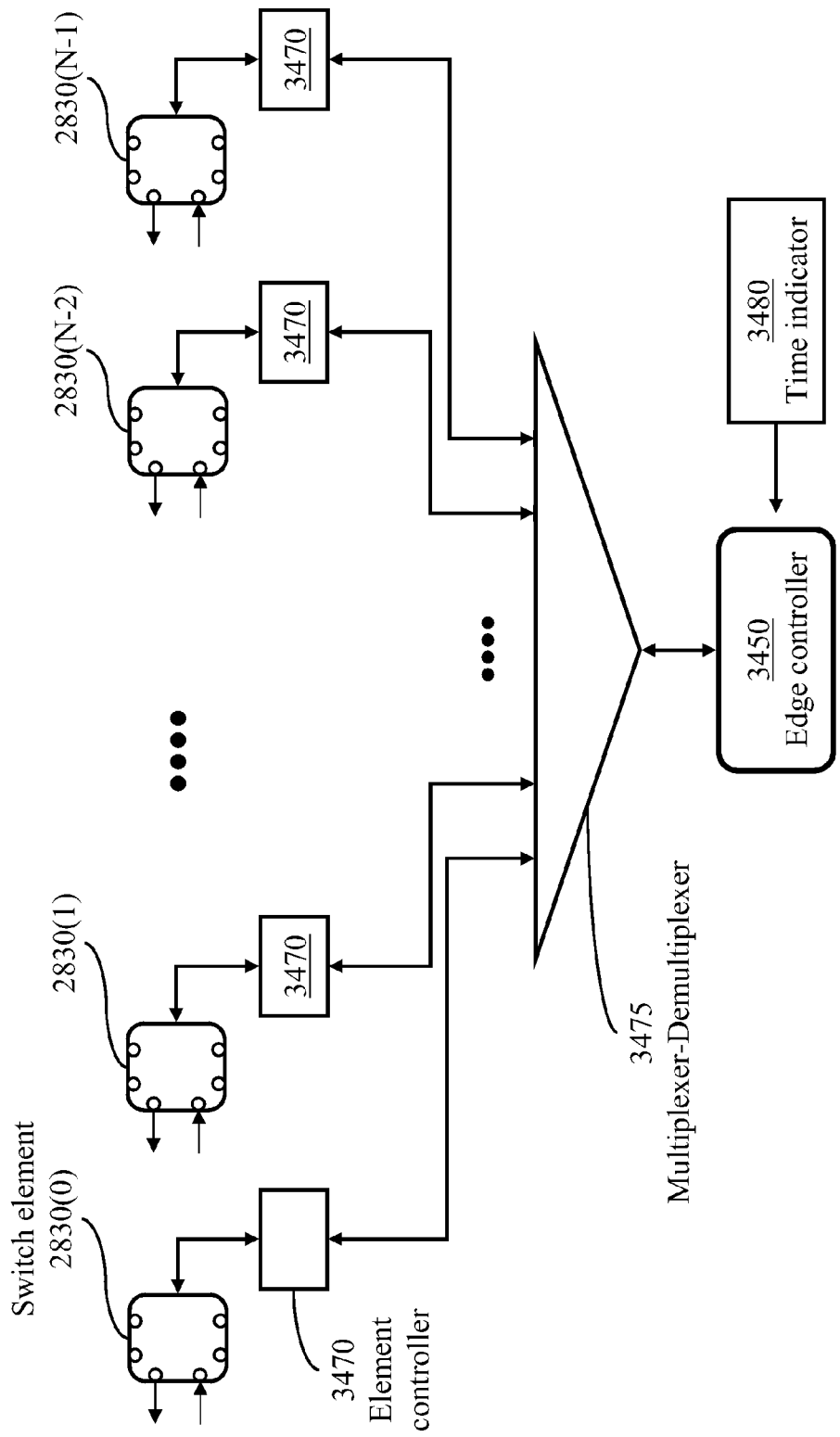
FIG. 34 illustrates a control system of the single-rotator circulating switch of FIG. 33.

FIG. 34 illustrates a control system of the single-rotator circulating switch of FIG. 33. Each switch element 2830 has an element controller 3470 which communicates with an edge controller 3450. A control time frame is organized into N equal control time slots with each control time slot allocated to a respective switch-element controller 3470 for two-way communications with the edge controller 3480. A switch element controller 3470 may be allocated a specific control time slot for transmitting control signals to the edge controller 3480 and a different control time slot for receiving control signals from the edge controller.

Figure 35:
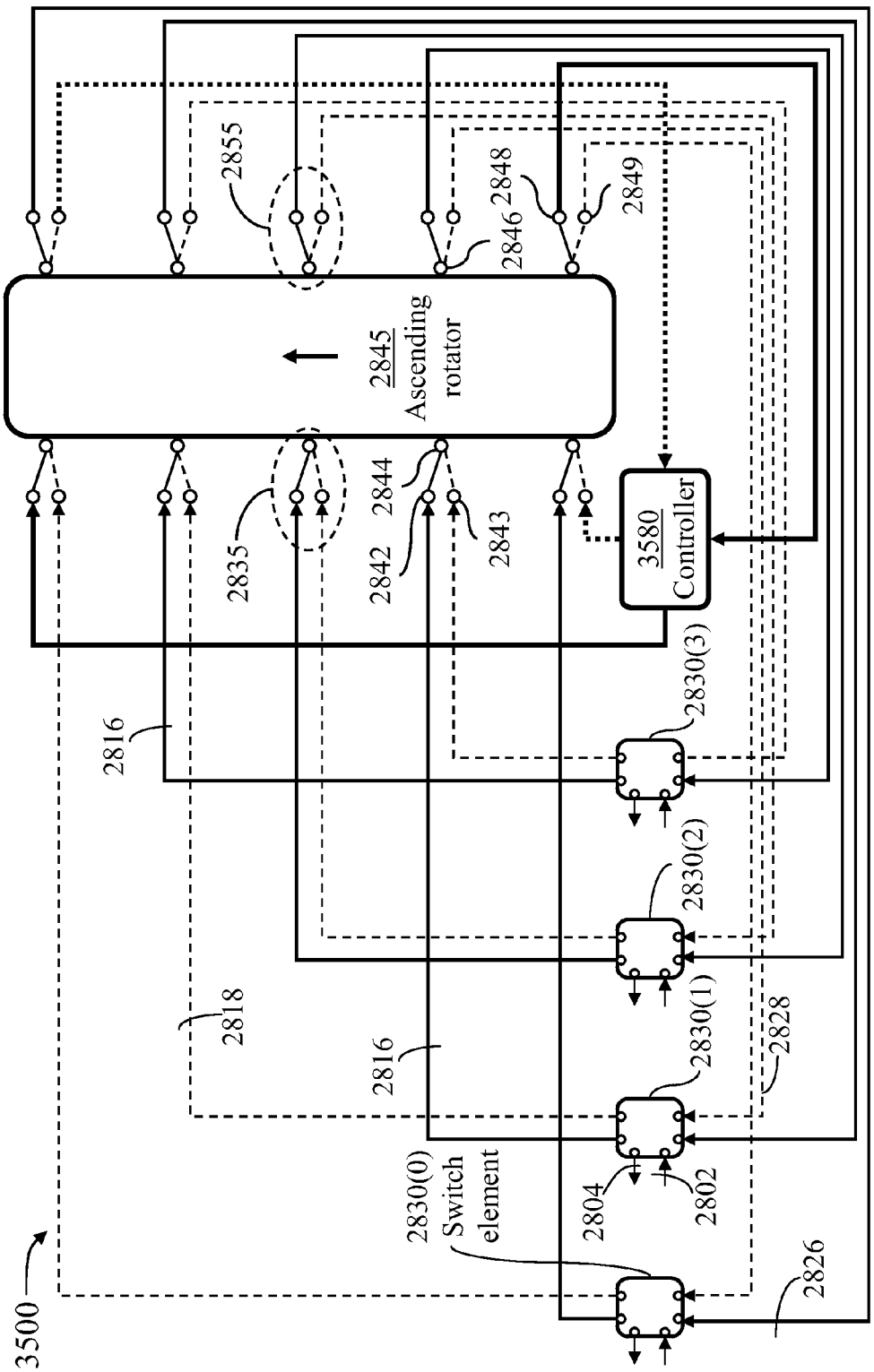
FIG. 35 illustrates a two-phase single-rotator circulating switch having transposed connections to a single rotator and employing a controller accessible through the single rotator, in accordance with an embodiment of the present invention.

FIG. 35 illustrates a two-phase single-rotator circulating switch having five switch elements 2830 with transposed connections of order 4, and employing a controller 3580 accessible through the single rotator. Each switch element is allocated a time slot for communicating with the controller 3580.

Figure 36:
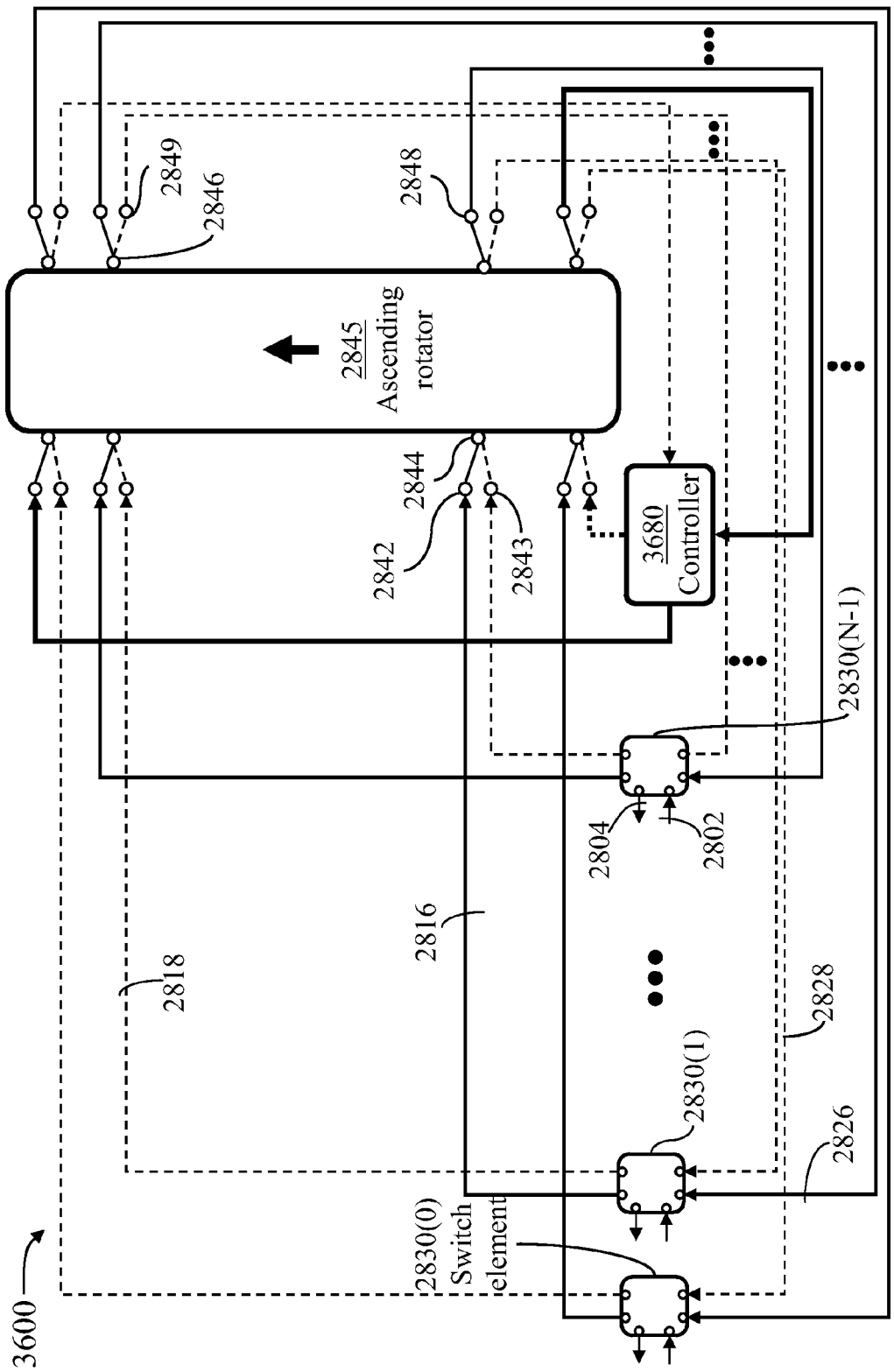
FIG. 36 illustrates a two-phase single-rotator circulating switch, with an arbitrary number of switch elements, having transposed connections to a single rotator and employing a controller accessible through the single rotator, in accordance with an embodiment of the present invention.

FIG. 36 illustrates a two-phase single-rotator circulating switch with an arbitrary number N>2 of switch elements having transposed connections of order L=(N-1) and employing a controller accessible through the single rotator. Each switch element is allocated a time slot for communicating with the controller 3680.

FIG. 37 tabulates data-transfer timing of the two-phase single-rotator circulating switch of FIG. 33. With static ordinary connections from the switch elements to single rotator and static transposed connections from the single rotator to the switch elements, a switch element j connects to inlet j (inlet port 2842(j)) and with an ascending rotator 2845, inlet j connects to outlet (j+t₁) during a first part of a time slot t₁, 0≤t₁<N. Outlet (j+t₁) connects to a transit (intermediate) switch element 2830 of index (L-(j+t₁)). Switch element (L-(j+t₁)) has a channel to inlet port 2842 of inlet (L-(j+t₁)). In order to reach destination switch element 2830(k), transit data in switch element (L-(j+t₁)) is transferred from inlet (L-(j+t₁)) to outlet (L-k) during a time slot t₂=(L-k)-(L-(j+t₁))=(j-k+t₁). Thus, the transit delay is t₂-t₁=j-k.

Likewise, with static transposed connections from the switch elements to single rotator and static ordinary connections from the single rotator to the switch elements, a switch element j connects to inlet (L-j) and with an ascending rotator 2845, inlet (L-j) connects to outlet (L-j+t₁) during a first part of a time slot t₁, 0≤t₁<N. Outlet (L-j+t₁) connects to a transit (intermediate) switch element 2830 of index (L-j+t₁). Switch element (L-j+t₁) has a channel to inlet port 2842 of inlet (j-t₁). In order to reach destination switch element 2830(k), transit data in switch element (L-j+t₁) is transferred from inlet (j-t₁) to outlet k during a time slot t₂=k-j+t₁. Thus, the transit delay is t₂-t₁=k-j.

During a rotation cycle, each inlet of rotator 2845 connects to each outlet during a time slot of predefined duration. Thus, rotator 2845 completes a rotation cycle of N time slots. Controller 3680 receives control signals from the switch elements 2830, schedules exchange of data among the switch elements, and communicates data-transfer schedules to the switch elements 2830. A scheduling time frame having a number Γ of time slots may be used to facilitate data-transfer scheduling. The number Γ is at least equal to the number N of rotator inlets which is also the number of time slots in a rotation cycle. To simplify communications between controller 3680 and individual controllers (not illustrated) of the switch elements 2830, the switch elements may be allocated non-overlapping control time slots within the scheduling time frame. With a large value of N, 1024 for example, the number Γ of time slots in a scheduling time frame may be selected to equal the number N of time slots of the rotation cycle. However, the number Γ may be any arbitrary integer exceeding N, and may substantially exceed N.

Figure 38:
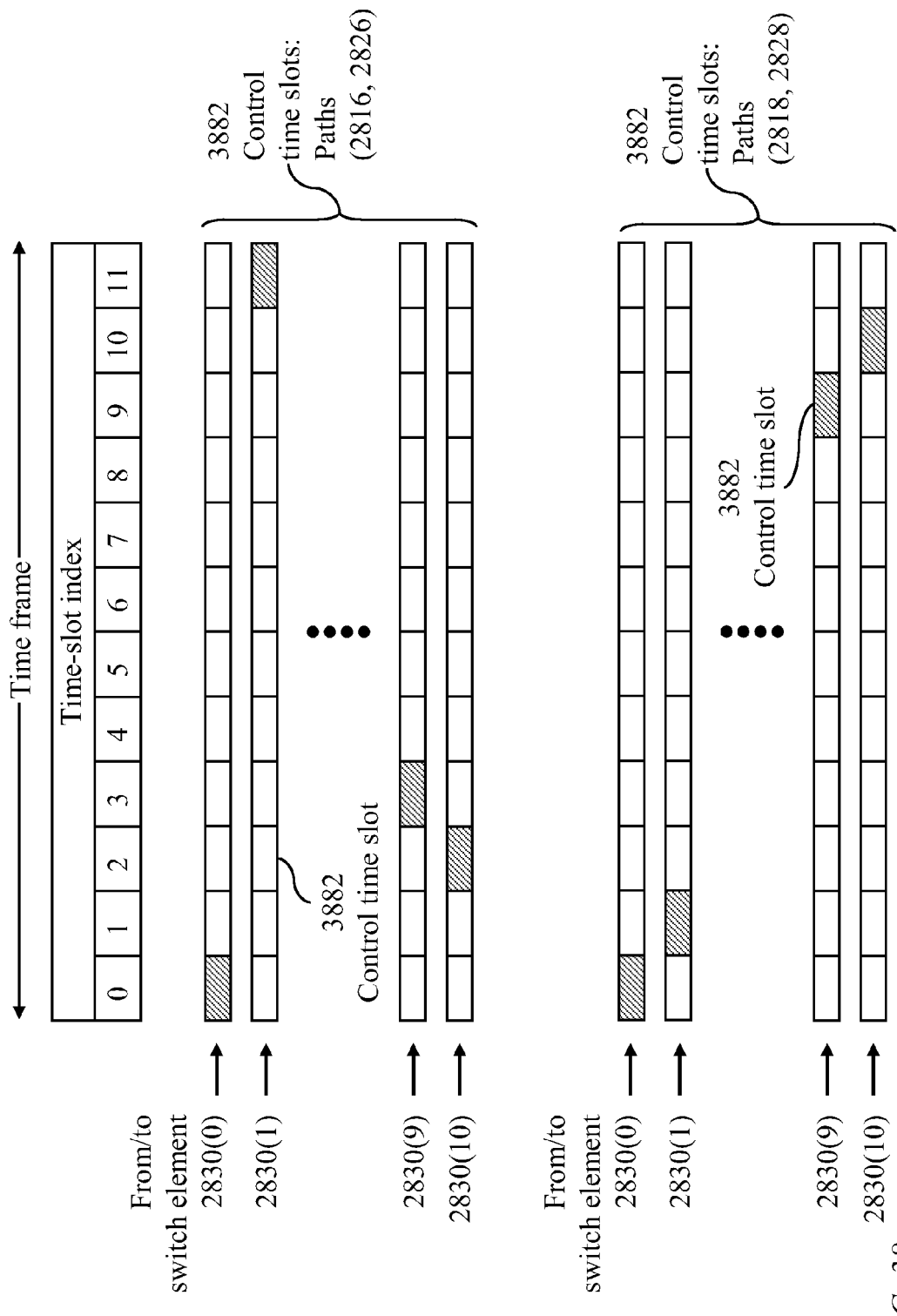
FIG. 38 illustrates allocation of control time slots for the two-phase single-rotator circulating switch of FIG. 37, in accordance with an embodiment of the present invention.

FIG. 38 illustrates an exemplary allocation of control time slots for the two-phase single-rotator circulating switch of FIG. 36 for a case where Γ=N=12. The controller 3680 has a channel 2816 to inlet 2844(N−1), a channel 2818 to inlet 2844(0), a channel 2826 from outlet 2846(0), and a channel 2828 from outlet 2846(N−1). Controller 3660 replaces switch element 2830(N−1). Each switch element 2830($j$), 0≤$j$<(N−2), has a first path to controller 3680 traversing channels 2816 and 2826, and a second path traversing channels 2818 and 2828. As illustrated in FIG. 37, a switch element 2830($j$) has a first path to a switch element 2830 of index $\{L-j-t_1\}_{modulo\ N}$, and a second path to a switch element 2830 of index $\{L-j+t_1\}_{modulo\ N}$, during a time slot $t_1$, 0≤$t_1$<N.

The time slot τ during which the first path from switch element 2830($j$) to the controller 3680 is established is determined from $\{L-j-\tau\}_{modulo\ N}$=(N−1). The configuration of FIG. 36 uses transposed connections of order L=(N−1). Thus, $\tau=\{-j\}_{modulo\ N}$=(N−j). The time slot 4 during which the second path from switch element 2830($j$) to the controller 3680 is established is determined from $\{L-j+\xi\}_{modulo\ N}$=(N−1). Thus, ξ=j. Time slot τ is allocated as a control time slot 3882 and time slot ξ is allocated as a control time slot for switch element 2830($j$). Thus, switch elements 2830(0), 2830(1), 2830(2) . . . , 3830(N−3), and 2830(N−2), have paths through channels 2816 and 2826 to the controller 3680, during control time slots 3882 of indices 0, (N−1), (N−2), . . . , 3, and 2, respectively, and paths through channels 2818 and 2828 to the controller 3680 during control time slots 3884 of indices 0, 1, 2, . . . , (N−2), and (N−1), respectively.

Single-Rotator Latent-Space Switch

Figure 39:
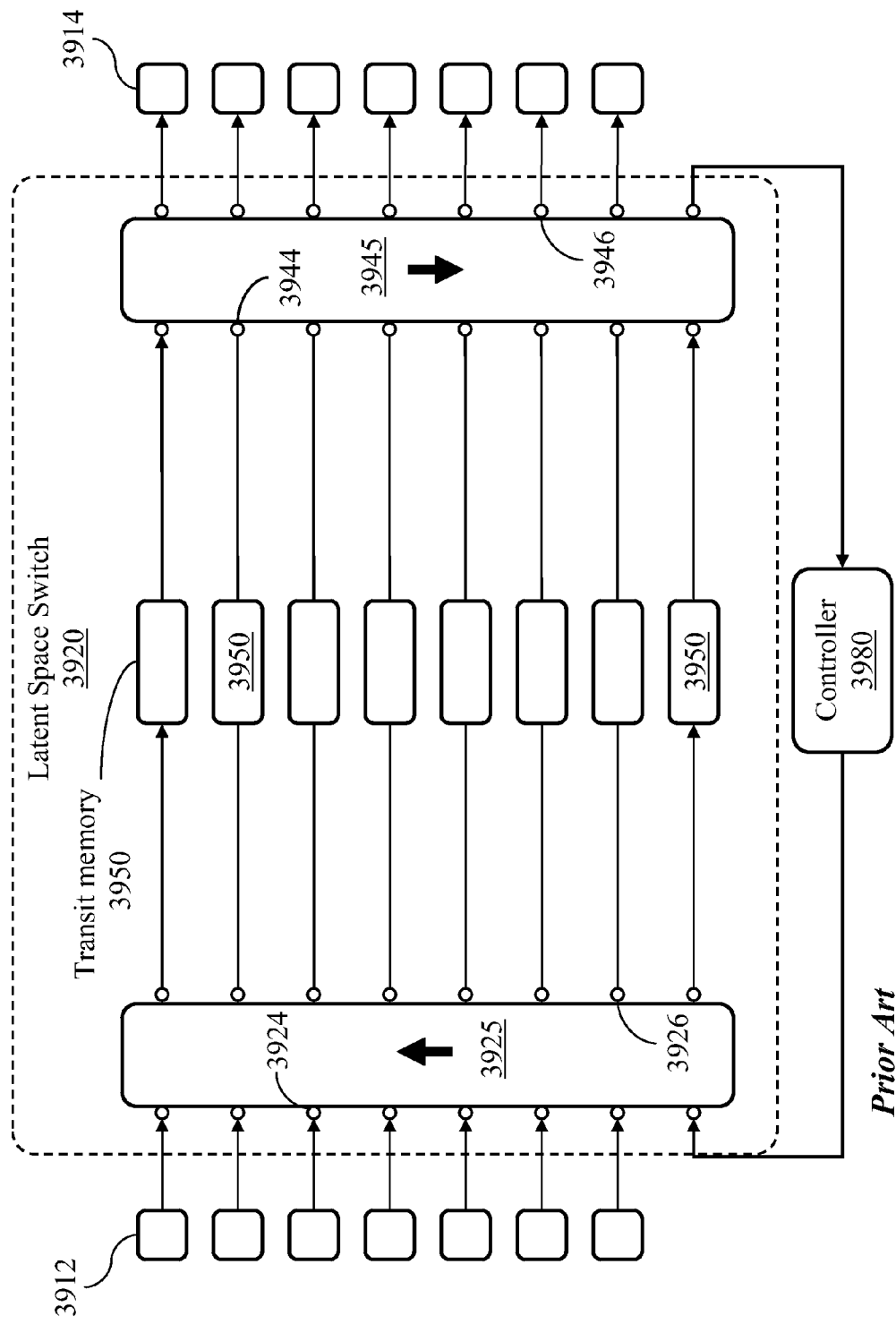
FIG. 39 illustrates a prior art latent space switch comprising a bank of transit memory devices between a first rotator and a second rotator and a controller connecting to an inlet of the first rotator and an outlet of the second rotator, where the first and second rotators are of opposite rotation directions so that the switching delay for a connection is independent of the transit memory device used.

FIG. 39 illustrates a known rotating access packet switch (U.S. Pat. Nos. 5,168,492, 5,745,486, and Publication 2006/0123162) comprising a latent space switch 3920, input buffers 3912 and output buffers 3914. The latent space switch 3920 comprises an input rotator 3925 having N inlets 3924 and N outlets 3926 and an output rotator 3945 having N inlets 3944 and N outlets 3946; N=8 in the illustrated exemplary rotating-access switch. A bank of N transit memory devices 3950 connects to the N outlets 3926 of input rotators 3925 and N inlets 3944 of output rotator 3945. A controller 3980 is connected to an outlet 3946 of output rotator 3945 and an inlet 3924 of input rotator 3925 leaving (N−1) inlets 3924 of input rotator 3925 to connect to (N−1) input buffers 3912 and (N−1) outlets 3946 of output rotator 3945 to connect to (N−1) output buffers 3914. One of the two rotators 3925 and 3945 is an ascending rotator and the other is a descending rotator. The input buffers are individually identified as 3912($j$), 0≤$j$<N. Likewise output buffers 3914 are individually identified as 3914($j$) and transit memory devices 3950 are individually identified as 3950($j$), 0≤$j$<N. During a time slot t in a repetitive time frame having N time slots, input rotator 3925 connects input buffer j to transit memory device $\{j+\beta \times t\}_{modulo\ N}$, and output rotator 3945 connects transit memory device j to output buffer $(j-\beta \times t)_{modulo\ N}$ where $\beta=1$ if rotator 3925 is an ascending rotator and rotator 3945 is a descending rotator and $\beta=-1$ if rotator 3925 is a descending rotator and rotator 3945 is an ascending rotator. A data unit transferred from an input buffer 3912($j$) to an output buffer 3914($k$) through any transit memory device 3950 is delayed in the transit memory device 3950 for a period of $\{j-k\}_{modulo\ N}$, if rotator 3925 is an ascending rotator and rotator 3945 is a descending rotator, or delayed for a period of $\{k-j\}_{modulo\ N}$, if rotator 3925 is a descending rotator and rotator 3945 is an ascending rotator.

Figure 40:
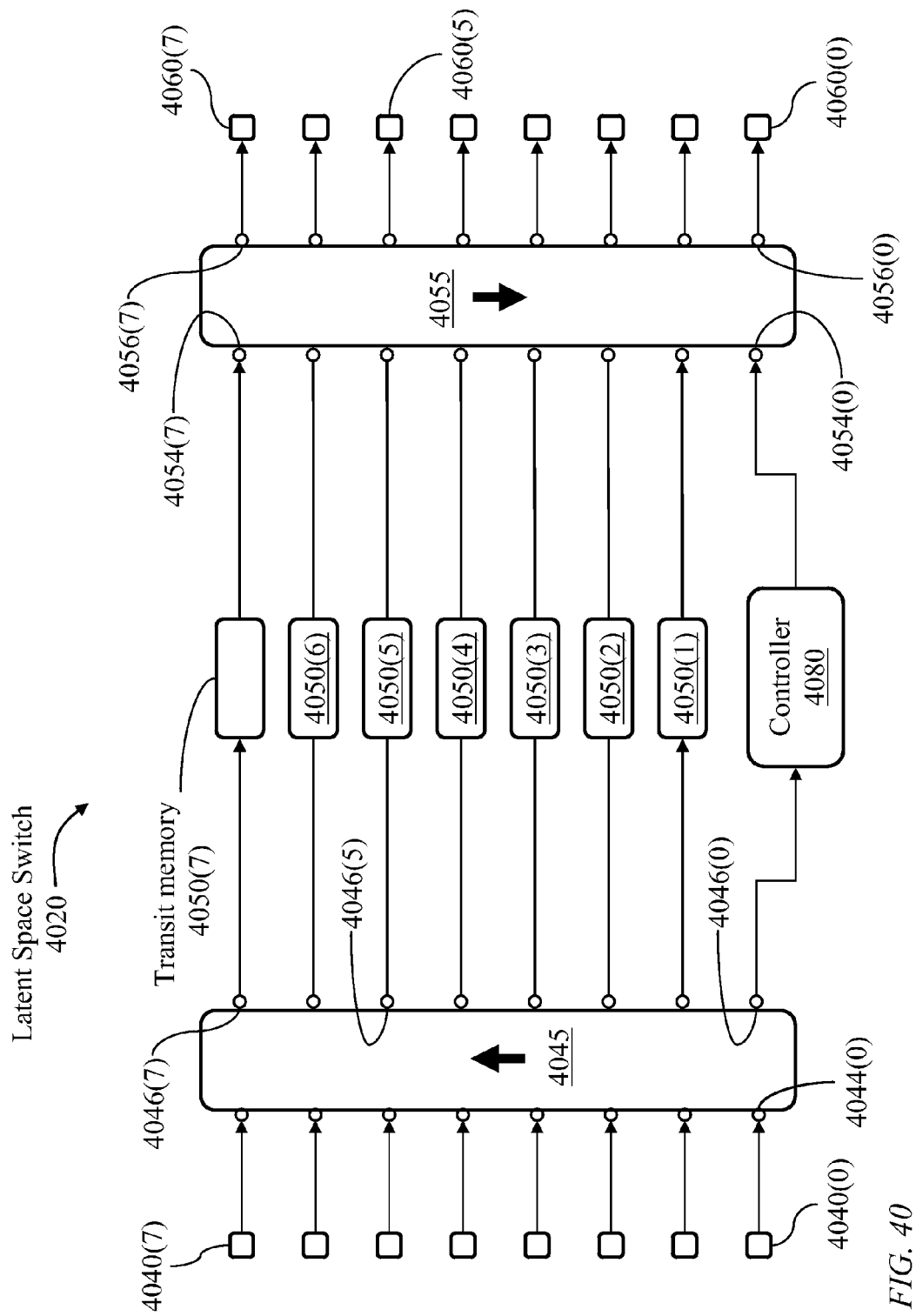
FIG. 40 illustrates a latent space switch comprising a bank of transit memory devices between a first rotator and a second rotator and a controller connecting to an outlet of the first rotator and an inlet of the second rotator, where the first and second rotators are of opposite rotation directions so that the switching delay for a connection is independent of the transit memory device used, in accordance with an embodiment of the present invention.

FIG. 40 illustrates a latent space switch 4020 comprising an input rotator 4045 having N inlets 4044 and N outlets 4046 and an output rotator 4055 having N inlets 4054 and N outlets 4056; N=8 in the illustrated latent space switch. A bank of (N−1) transit memory devices 4050 connects to (N−1) outlets 4046 of input rotator 4045 and (N−1) inlets 4054 of output rotator 4055. A controller 4080 is connected to an outlet 4046 of input rotator 4045 and an inlet 4054 of output rotator 4055. As in latent-space switch 3920, one of the two rotators 4045 and 4055 is an ascending rotator and the other is a descending rotator. The inlets 4044 are individually identified as 4044($j$), 0≤$j$<N. Likewise outlets 4056 are individually identified as 4056($j$) and transit memory devices 4050 are individually identified as 4050($j$), 0≤$j$<N. During a time slot t in a repetitive time frame having N time slots, input rotator 4045 connects inlet 4044($j$) to transit memory device $\{j+\beta \times t\}_{modulo\ N}$, and output rotator 4055 connects transit memory device j to outlet 4056($k$), $k=\{j+\beta \times t\}_{modulo\ N}$, where $\beta=1$ if rotator 4045 is an ascending rotator and rotator 4055 is a descending rotator and $\beta=-1$ if rotator 4045 is a descending rotator and rotator 4055 is an ascending rotator. A data unit transferred from an inlet 4044($j$) to an outlet 4056($k$) through any transit memory device 4050 is delayed in the transit memory device 4050 for a period of $\{j-k\}_{modulo\ N}$, if rotator 4045 is an ascending rotator and rotator 4055 is a descending rotator, or delayed for a period of $\{k-j\}_{modulo\ N}$, if rotator 4045 is a descending rotator and rotator 4045 is an ascending rotator.

An ingress port 4040 connecting to inlet 4044 dedicates a time slot within the time frame for receiving control signals from respective external sources and transferring the control signals to controller 4080. An egress port 4060 connecting to an outlet 4056 dedicates a time slot within the time frame for transmitting control signals from controller 4080 to respective external sinks.

Latent space switch 3920 uses N transit memory devices 3950 and supports (N−1) ingress ports and (N−1) egress ports. A control data unit transferred from an ingress port to controller 3980 is first written in a transit memory device 3950 then transferred to controller 3980. A control data unit transferred from controller 3980 to an egress port is first written in a transit memory device 3950 then transferred to the egress port. Latent space switch 4020 uses (N−1) transit memory devices 4050, supports N ingress ports and N egress ports, and simplifies access to the controller 4080.

During a first part of a time slot, data is transferred from inlets 4044 to controller 4080 and to transit memory devices 4050 through input rotator 4045. During a second part of the time slot, data is transferred from controller 4080 and transit memory devices 4050 to outlets 4056 through output rotator 4055. The two rotators 4045 and 4055 may, therefore, be replaced by a single rotator. However, rotators 4045 and 4055 should rotate in opposite directions, one being an ascending rotator and the other a descending rotator, in order to guarantee a transit delay for a path from an inlet 4044($j$) to an outlet 4056($k$) which is independent of the transit memory device 4050 used and depends only on the indices j and k.

A single rotator may be devised to be an ascending rotator during a first part of each time slot and a descending rotator during a second part of each time slot. Preferably, in accordance with an embodiment of the present invention, the connectivity of the transit memory devices to the input side and output side of a single rotator rotating in one direction, either ascending or descending, may be configured to realize delay independence of the transit memory devices traversed by a data stream.

Figure 41:
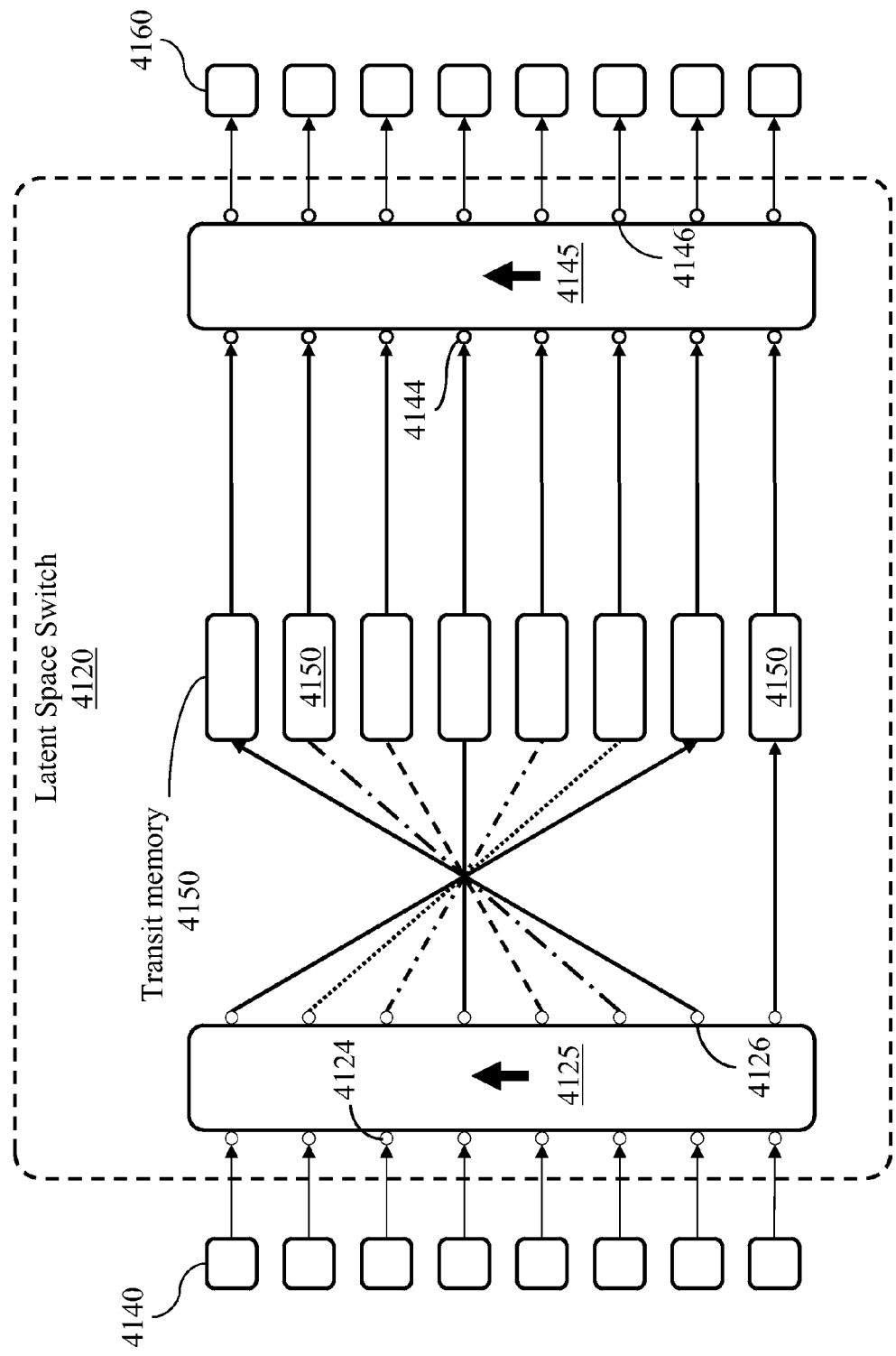
FIG. 41 illustrates a latent space switch comprising a first ascending rotator having transposed connections of order 0 to a bank of eight transit memory devices with the bank of transit memory devices having ordinary connection to a second ascending rotator, so that the switching delay for a connection is independent of the transit memory device used, in accordance with an embodiment of the present invention.

FIG. 41 illustrates a latent space switch 4120 comprising a first ascending rotator 4125 having eight inlets 4124 and eight outlets 4126, a bank of eight transit memory devices 4150, and a second ascending rotator 4145 having eight inlets 4144 and eight outlets 4146. The eight outlets 4126 of the first ascending rotator have static transposed connections of order 0 to the bank of transit memory devices 4150, and the bank of transit memory devices 4150 has ordinary connection to the inlets 4144 of the second ascending rotator. The inlets 4124 of the first ascending rotator may have ordinary connections to ingress ports 4140 and the outlets 4146 of the second ascending rotator may have ordinary connections to egress ports 4160.

An inlet 4124($j$) of the first ascending rotator connects to outlet 4126|$j+t_1$|, where |$j+t_1$| denotes $(j+t_1)_{modulo\ N}$, during a time slot $t_1$, $0 \le t_1 < N$. Outlet 4126|$j+t_1$| connects to a transit memory device 4150|L−($j+t_1$)|. Transit memory device |L−($j+t_1$)| connects to inlet 4144|L−($j+t_1$)| of the second ascending rotator. In order to reach outlet 4146($k$) of the second ascending rotator, transit data in transit memory device 4150|L−($j+t_1$)| is transferred from inlet 4144|L−($j+t_1$)| to outlet 4146($k$) during a time slot $t_2$=|k−(L−($j+t_1$))|=|$j+k-L+t_1$|. Thus, the transit delay is $t_2-t_1$=|$j+k-L$|, which is independent of the transit memory device used. The transit delay depends on the indices j and k of the ingress and egress ports and the order L, $0 \le L < N$, of the transposed connection, which is a fixed parameter for a specific configuration of a latent space switch 4120. The value of L is 0 in the configuration of FIG. 41.

To render the delay from an ingress port 4140($j$) to an egress port 4160($k$), $0 \le j < N$, $0 \le k < N$, independent of the transposition order L, the outlets 4146 of the second ascending rotator may have transposed connections of the same order L to the egress ports. Thus, in order to reach egress port 4160($k$), transit data in transit memory device 4150|L−($j+t_1$)| is transferred from inlet 4144|L−($j+t_1$)| to outlet 4146|L−k| during a time slot $t_2$=|(L−k)−(L−($j+t_1$))|=|$j-k+t_1$|, and the transit delay is $t_2-t_1$=|$j-k$|, which is independent of the transposition order L.

Figure 42:
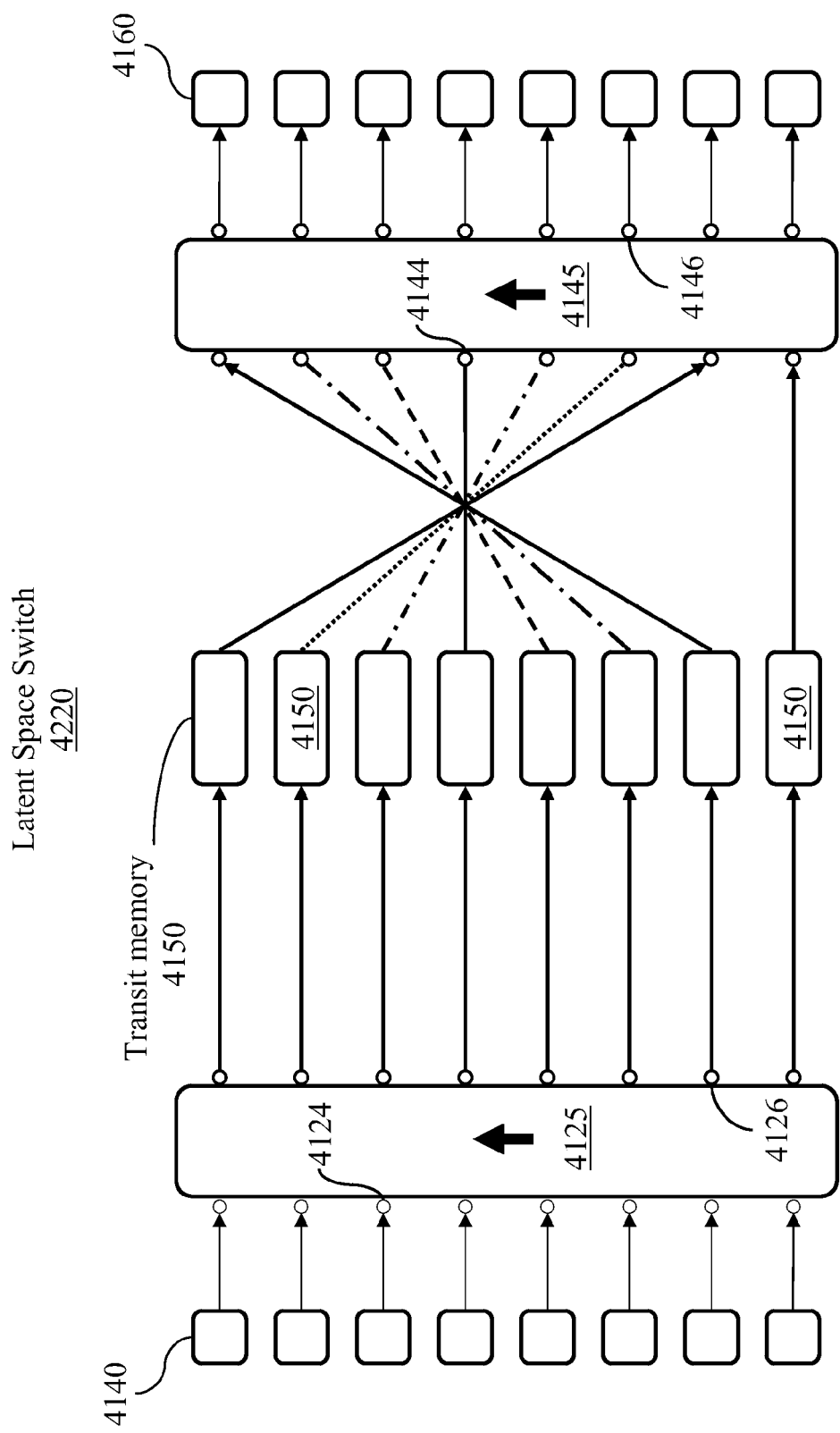
FIG. 42 illustrates a latent space switch comprising a first ascending rotator having ordinary connections to a bank of eight transit memory devices with the bank of transit memory devices having transposed connections of order 0 to a second ascending rotator, so that the switching delay for a connection is independent of the transit memory device used, in accordance with an embodiment of the present invention.

FIG. 42 illustrates a latent space switch 4220 comprising a first ascending rotator 4125 having eight inlets 4124 and eight outlets 4126, a bank of eight transit memory devices 4150, and a second ascending rotator 4145 having eight inlets 4144 and eight outlets 4146. The eight outlets 4126 of the first ascending rotator have static ordinary connections to the bank of transit memory devices 4150, and the bank of transit memory devices 4150 has transposed connections to the inlets 4144 of the second ascending rotator. The inlets 4124 of the first ascending rotator may have ordinary connections from ingress ports 4140 and the outlets 4146 of the second ascending rotator may have ordinary connections to egress ports 4160.

An inlet 4124($j$) of the first ascending rotator connects to outlet 4126|$j+t_1$| during a time slot $t_1$, $0 \le t_1 < N$. Outlet 4126|$j+t_1$| connects to a transit memory device 4150|$j+t_1$|. Transit memory device 4150|$j+t_1$| connects to inlet 4144|L−($j+t_1$)| of the second ascending rotator. In order to reach outlet 4146($k$), transit data in transit memory device 4150|$j+t_1$| is transferred from inlet 4144|L−($j+t_1$)| to outlet 4146($k$) during a time slot $t_2$=|k−(L−($j+t_1$))|=|$j+k-L+t_1$|. Thus, the transit delay is $t_2-t_1$=|$j+k-L$|. The value of L is 0 in the configuration of FIG. 42.

To render the delay from an ingress port 4140($j$) to an egress port 4160($k$), $0 \le j < N$, $0 \le k < N$, independent of the transposition order L, the outlets 4146 of the second ascending rotator may have transposed connections of the same order L to the egress ports 4160, resulting in a transit delay of |$j-k$|.

Figure 43:
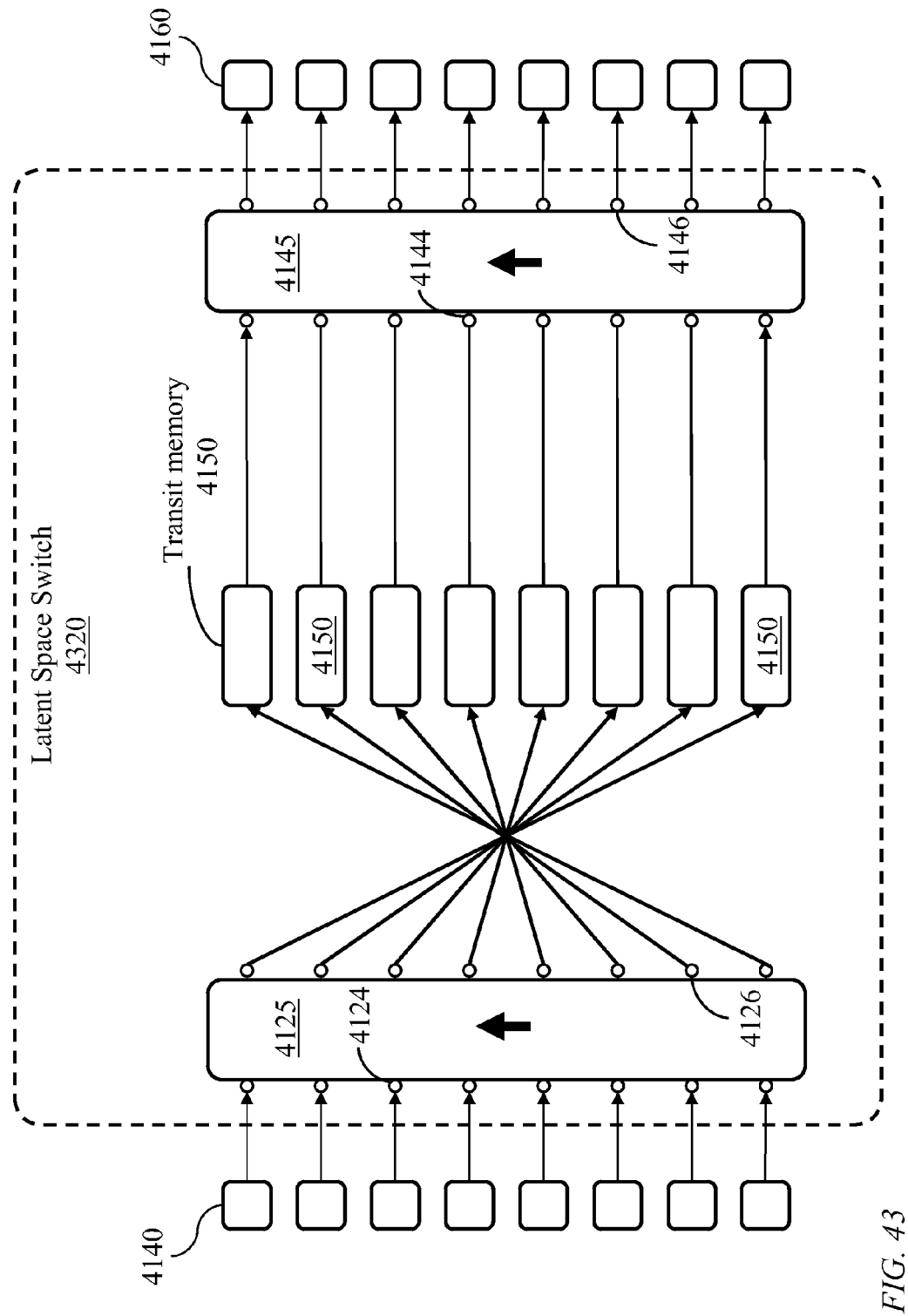
FIG. 43 illustrates a latent space switch similar to the latent space switch of FIG. 41 but with the first ascending rotator having transposed connections of order 7 to a bank of transit memory devices.

FIG. 43 illustrates a latent space switch similar to the latent space switch of FIG. 41 but with the first ascending rotator having transposed connections of order 7 to a bank of transit memory devices. The transit delay for a connection from an ingress port 4140($j$) to an egress port 4160($k$) is then |$j+k-7$| if the outlets 4146 of the second ascending rotator have ordinary connections to the egress ports 4160. With transposed connections of order 7 from the outlets 4146 of the second ascending rotator to the egress ports 4160, the transition delay from an ingress port 4140($j$) to an egress port 4160($k$) is |$j-k$|.

Figure 44:
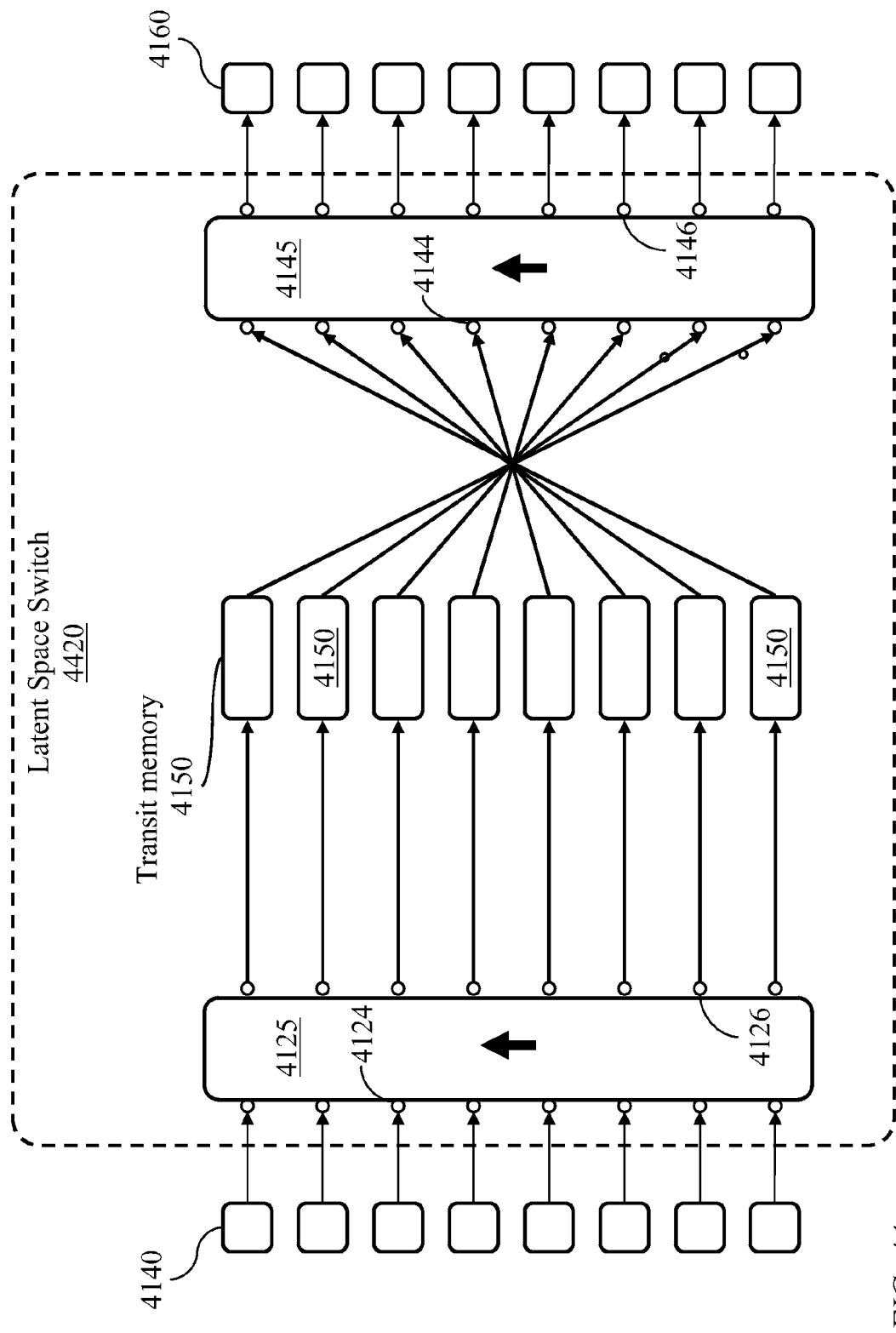
FIG. 44 illustrates a latent space switch similar to the latent space switch of FIG. 42 but with the bank of transit memory devices having transposed connections of order 7 to the second ascending rotator.

FIG. 44 illustrates a latent space switch similar to the latent space switch of FIG. 42 but with the bank of transit memory devices having transposed connections of order 7 to the inlets 4144 of the second ascending rotator. The transit delay for a connection from an ingress port 4140($j$) to an egress port 4160($k$) is then |$j+k-7$| if the outlets 4146 of the second ascending rotator have ordinary connections to the egress ports 4160. With transposed connections of order L from the outlets 4146 of the second ascending rotator to the egress ports 4160, the transition delay from an ingress port 4140($j$) to an egress port 4160($k$) is |$j-k$|.

Figure 45:
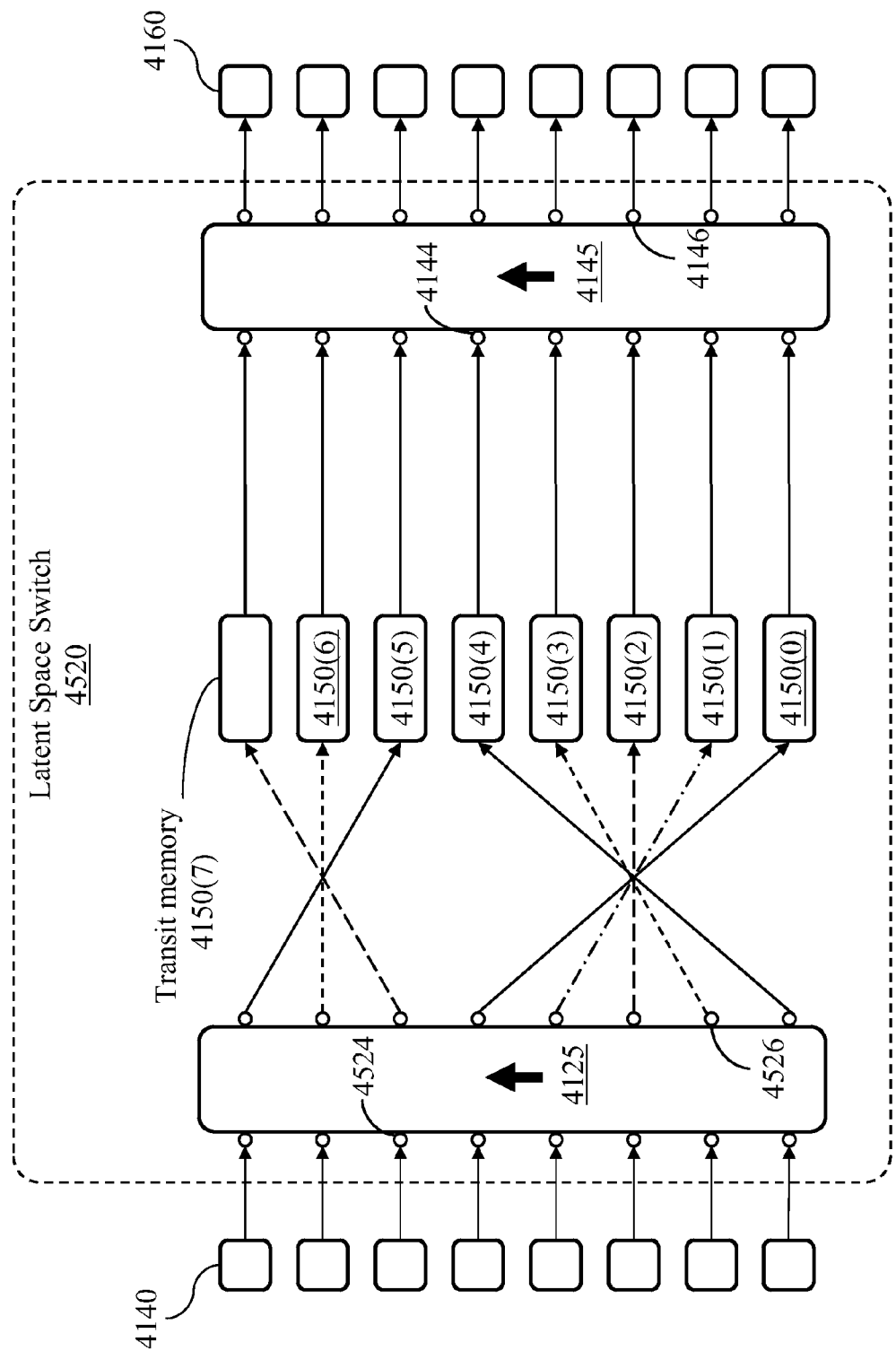
FIG. 45 illustrates a latent space switch similar to the latent space switch of FIG. 41 but with the first ascending rotator having transposed connections of index 4 to a bank of transit memory devices.

FIG. 45 illustrates a latent space switch similar to the latent space switch of FIG. 41 but with the first ascending rotator having transposed connections of order 4 to a bank of transit memory devices. The transit delay for a connection from an ingress port 4140($j$) to an egress port 4160($k$) is then |$j+k-4$| if the outlets 4146 of the second ascending rotator have ordinary connections to the egress ports 4160. With transposed connections of order 4 from the outlets 4146 of the second ascending rotator to the egress ports 4160, the transition delay from an ingress port 4140($j$) to an egress port 4160($k$) is |$j-k$|.

Figure 46:
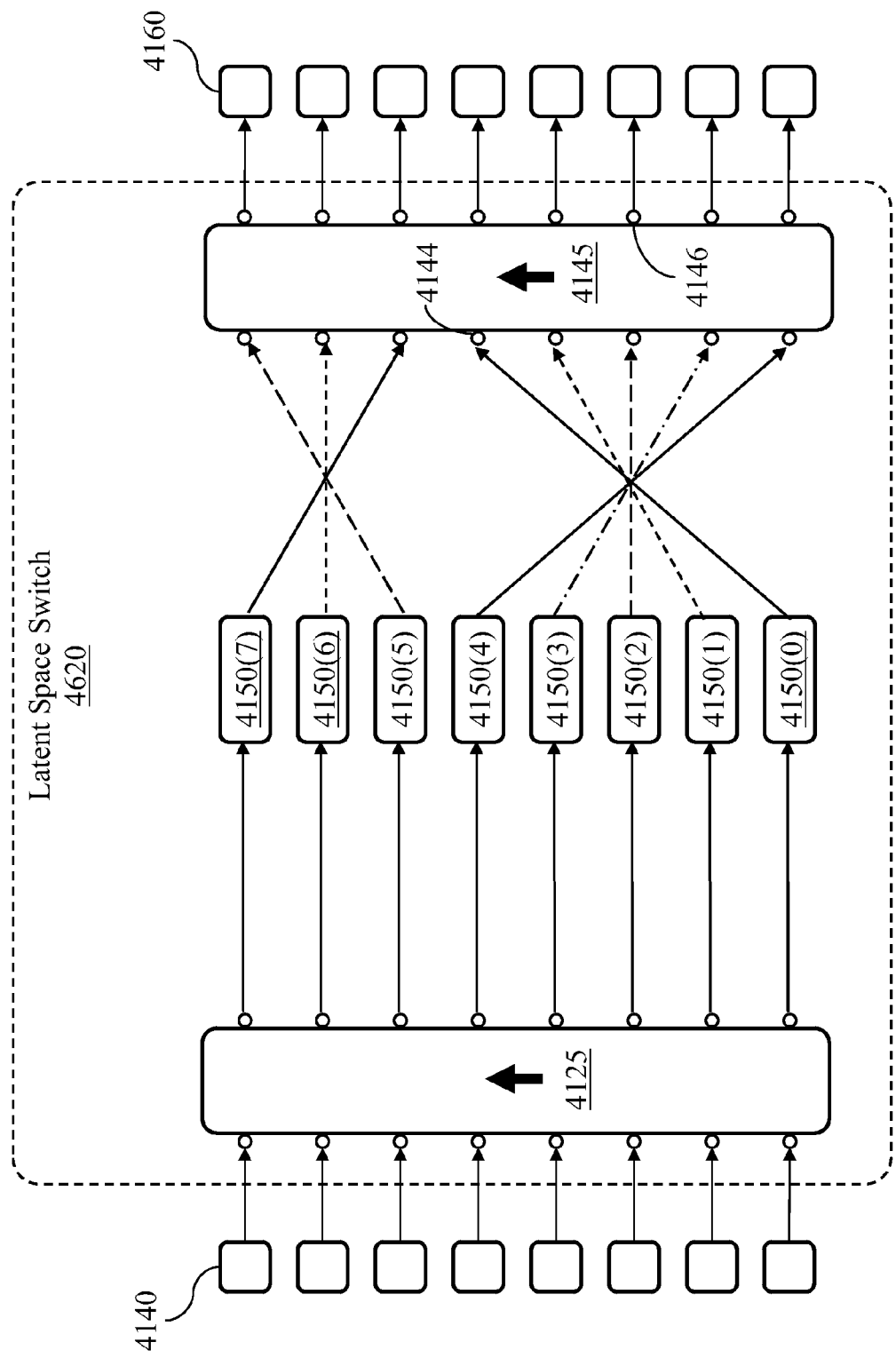
FIG. 46 illustrates a latent space switch similar to the latent space switch of FIG. 42 but with the bank of transit memory devices having transposed connections of order 4 to the second ascending rotator.

FIG. 46 illustrates a latent space switch similar to the latent space switch of FIG. 42 but with the bank of transit memory devices having transposed connections of order 4 to the inlets 4144 of the second ascending rotator. The transit delay for a connection from an ingress port 4140($j$) to an egress port 4160($k$) is then |$j+k-4$| if the outlets 4146 of the second ascending rotator have ordinary connections to the egress ports 4160. With transposed connections of order L from the outlets 4146 of the second ascending rotator to the egress ports 4160, the transition delay from an ingress port 4140($j$) to an egress port 4160($k$) is |$j-k$|.

FIG. 47 tabulates data-transfer timing of a latent space switch of the type illustrated in FIG. 41 to FIG. 46, with an arbitrary number of ports and an arbitrary value of the order of transposed connections.

The two rotators 4125 and 4145 of latent space switches 4120, 4220, 4320, 4420, 4520, and 4620 are of the same rotation direction and they are not active simultaneously. Thus, they may be replaced with a single rotator.

Transposing Rotator Versus Uniform Rotator

A rotator is a device connecting a number of inlets to a number of outlets where each inlet connects to each outlet during a rotation cycle. With N inlets and N outlets, N>1, the period of a rotation cycle may be divided into N time slots and the inlet-outlet connectivity of the rotator changes during successive time slots.

Several inlet-outlet rotator connectivity patterns may be devised and a rotator may be classified accordingly. The connectivity pattern may be characterized according to rotation order, rotation direction, and rotation step as described below. To facilitate defining the different patterns, the inlets are indexed as inlets 0 to (N−1) and the outlets are indexed as outlets 0 to (N−1).

The rotation order may be categorized as "uniform" or "transposing". With uniform rotation, a "uniform" rotator connects an inlet of index j, $0 \le j < N$, to an outlet of index $(j+\beta \times t+\Theta)_{modulo\,N}$, during a time slot t, $0 \le t < N$, of a repetitive time frame of N time slots. $\Theta$ is an arbitrary integer which may be set to equal zero without loss of generality. With "transposing" rotation, a "transposing" rotator connects an inlet of index j, $0 \le j < N$, to an outlet of index $(L−j+\beta \times t)_{modulo\,N}$, during a time slot t, $0 \le t < N$, of the repetitive time frame, where L is a predetermined transposition order L, $0 \le L < N$. The parameter $\beta$ is an integer, not equal to zero, which defines rotation direction and rotation step.

Regardless of the value of $\beta$ a uniform rotator connects consecutive inlets to consecutive outlets of a same order during any time slot t while a transposing rotator connects consecutive inlets to outlets of a reversed order. For example, with N=8, L=7, $\beta$=1, two inlets of indices 3 and 4 connect to outlets of indices 5 and 6, respectively, during time slot t=2, in a uniform rotator but connect to outlets of indices 6 and 5, respectively, in a transposing rotator.

The sign of $\beta$ defines rotation direction and the magnitude of $\beta$ defines a rotation step. A positive value of $\beta$ defines the rotation direction as "ascending" because the index of an outlet to which a specific inlet connects increases as the value of t increases. A negative value of $\beta$ defines the rotation direction as "descending" because the index of an outlet to which a specific inlet connects decreases as t increases. The magnitude of $\beta$ defines a rotation step which is selected to equal 1 in all latent-space switch configurations disclosed herein.

Figure 48:
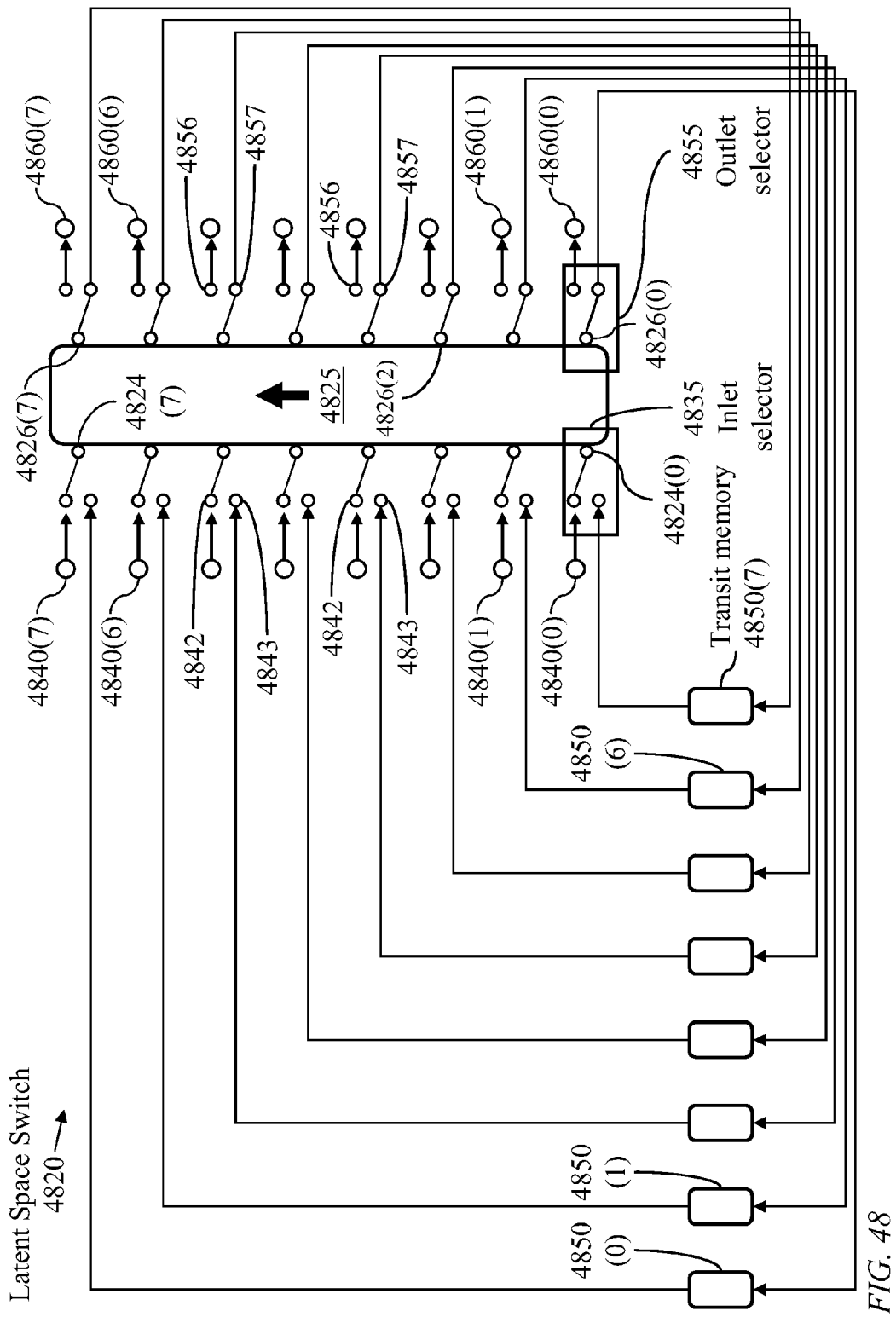
FIG. 48 illustrates a single-rotator latent space switch 4820, in accordance with an embodiment of the present invention, comprising a bank of eight transit memory devices connecting to inlet selectors and outlet selectors of a single rotator with transposed connections of order 7 from the transit memory devices to the inlet selectors and ordinary connections from the transit memory devices to the outlet selector, thus realizing a constant switching delay from an ingress port to an egress port, the figure illustrates a setting of the selectors during data transfer from data sources to the transit memory devices.

FIG. 48 illustrates a latent space switch 4820 having a single rotator 4825 with N inlets, individually or collectively referenced as 4824, and N outlets, individually or collectively referenced as 4826; N=8 in the exemplary configuration of FIG. 48. Each inlet 4824(j) is provided with an inlet selector 4835(j), $0 \le j < N$. An inlet selector 4835(j) has one inlet-selector port 4842 connecting to ingress port 4840(j) and one inlet-selector port 4843 connecting to transit memory device 4850|L−j| (|L−j| denotes $(L−j)_{modulo\,N}$); L=N−1. Each outlet 4826(j) is provided with an outlet selector 4855($\chi$), $0 \le \chi < N$. An outlet selector 4855($\chi$) has one outlet-selector port 4856 connecting to egress port 4860($\chi$) and one outlet-selector port 4857 connecting to transit memory device 4850($\chi$). Thus, the transit memory devices 4850 have transposed connections of order (N−1), to the single rotator 4825 and ordinary connections from the single rotator. Notably, an ingress port 4840 may have a short buffer for holding a data unit received from an external source and an egress port may have a short buffer for holding a data unit to be transmitted to an external sink. An inlet selector 4835 is a 2:1 selector and an outlet selector 4855 is a 1:2 selector.

Figure 49:
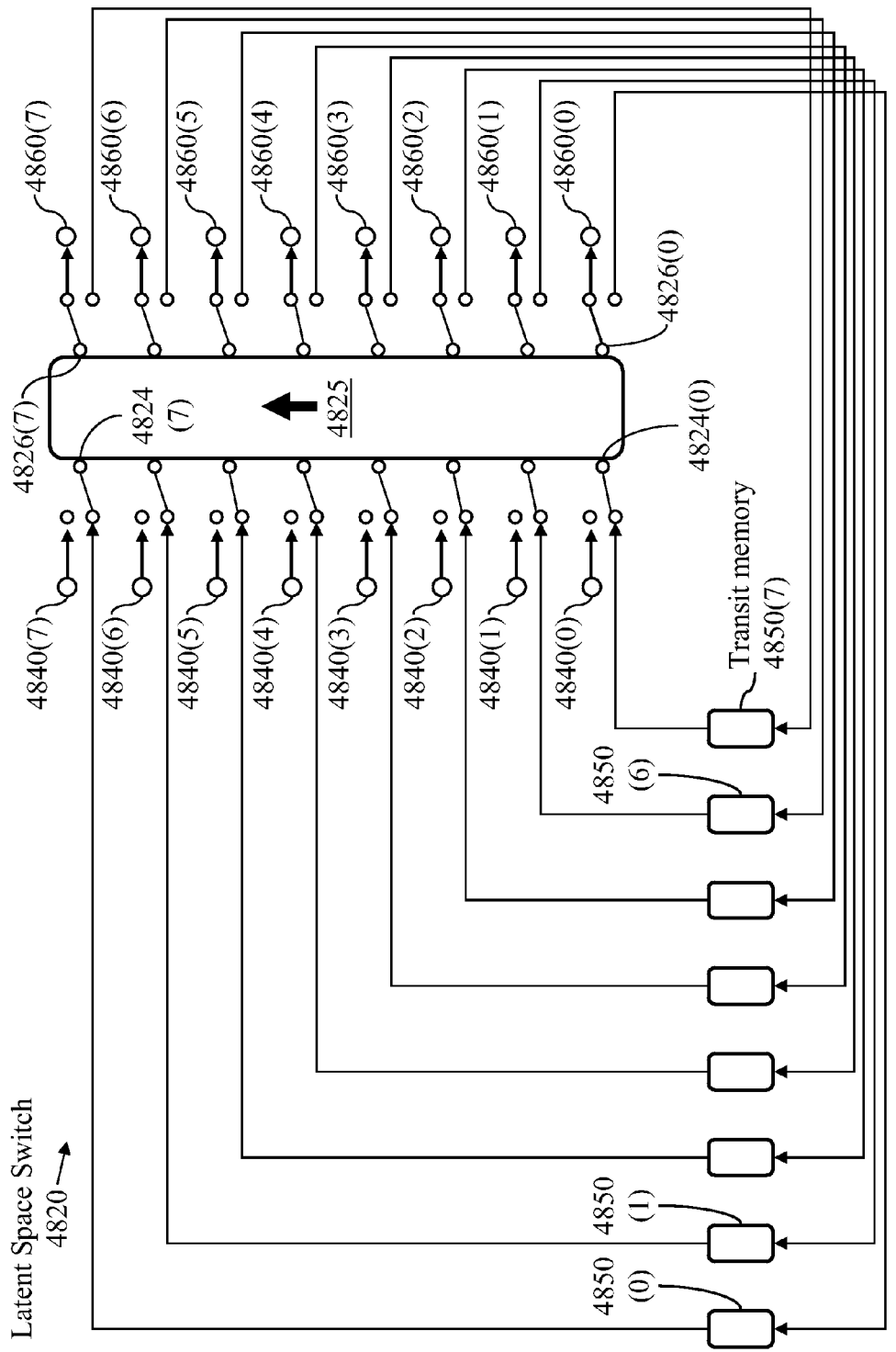
FIG. 49 illustrates a setting of the selectors in the latent space switch of FIG. 48 during data transfer from the transit memory devices to data sinks.

The transit delay (also called systematic switching delay) for data units received at an ingress port 4840(x) and destined to egress port 4860(y) is |x+y−L| (i.e., $(x+y−L)_{modulo\,N}$) if rotator 4825 is an ascending rotator or |L−x−y| (i.e., $(L−x−y)_{modulo\,N}$) if rotator 4825 is a descending rotator. FIG. 48 illustrates the states of the selectors 4835 and 4855 during a first part of a time slot. FIG. 49 illustrates the states of the selectors 4835 and 4855 of switch 4820 during a second part of a time slot. During the first part of the time slot, data is transferred from ingress ports 4840 to the transit memory devices 4850 and data is transferred from egress ports 4860 to respective external sinks. During the second part of the time slot, data is transferred from the transit memory devices 4850 to the egress ports 4860 and data is received at the ingress ports 4840 from respective external sources.

Figure 50:
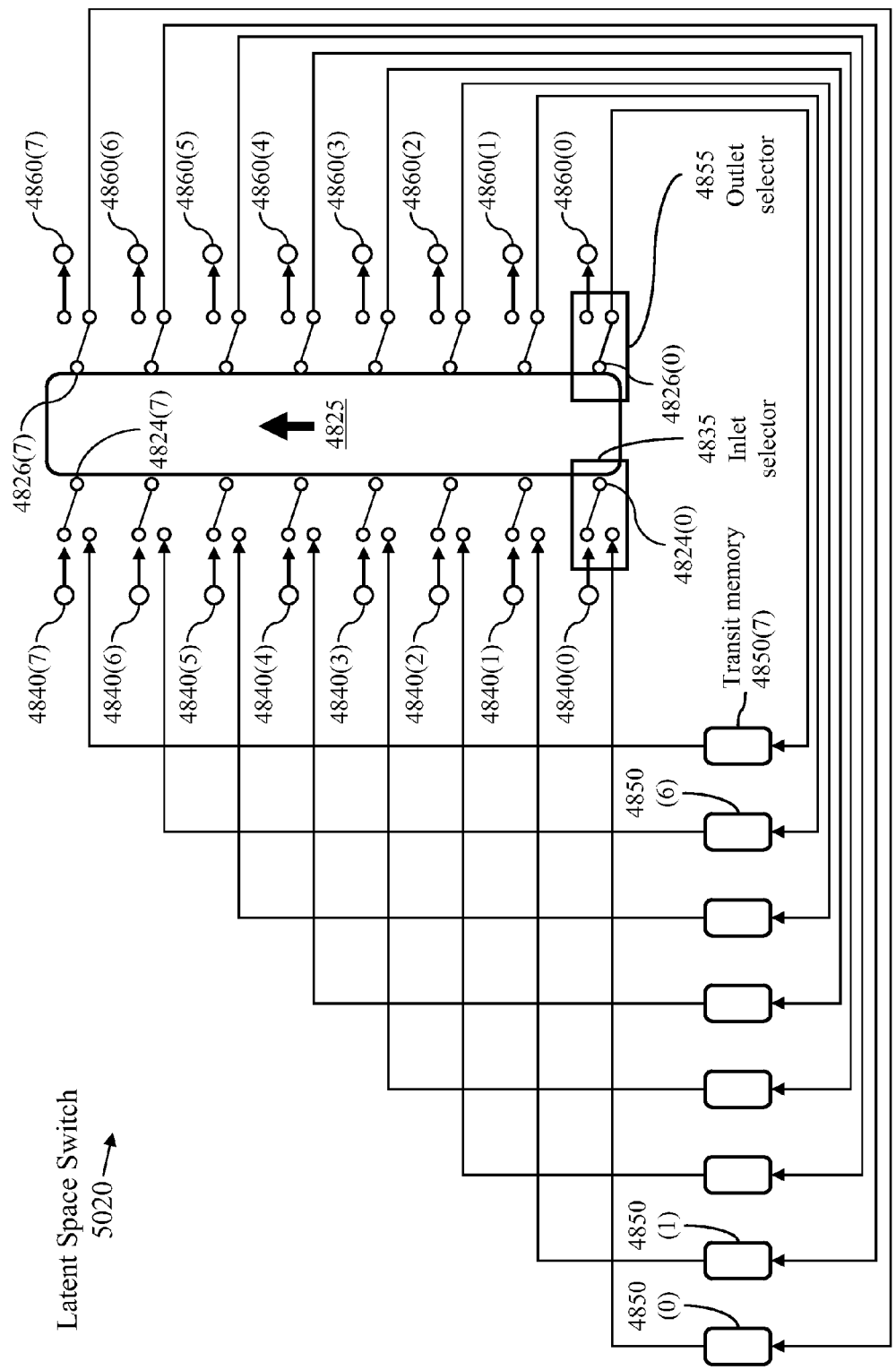
FIG. 50 illustrates a single-rotator latent space switch 5020, in accordance with an embodiment of the present invention, comprising a bank of eight transit memory devices connecting to inlet selectors and outlet selectors of a single rotator with ordinary connections from the transit memory devices to the inlet selectors and transposed connections of order 7 from the transit memory devices to the outlet selector, thus realizing a constant switching delay from an ingress port to an egress port, the figure illustrates a setting of the selectors during data transfer from data sources to the transit memory devices.

FIG. 50 illustrates a single-rotator latent space switch 5020 having the same single rotator, the same inlet selectors 4835, the same outlet selectors 4855, and the same transit-memory devices 4850, of switch 4820 of FIG. 48. However, the transit memory devices 4850 have ordinary connections to the single rotator and transposed connections of order (N−1) from the rotator. FIG. 50 indicates the states of the selectors 4835 and 4855 during a first part of a time slot, i.e. during data transfer from external data sources to the transit memory devices.

Figure 51:
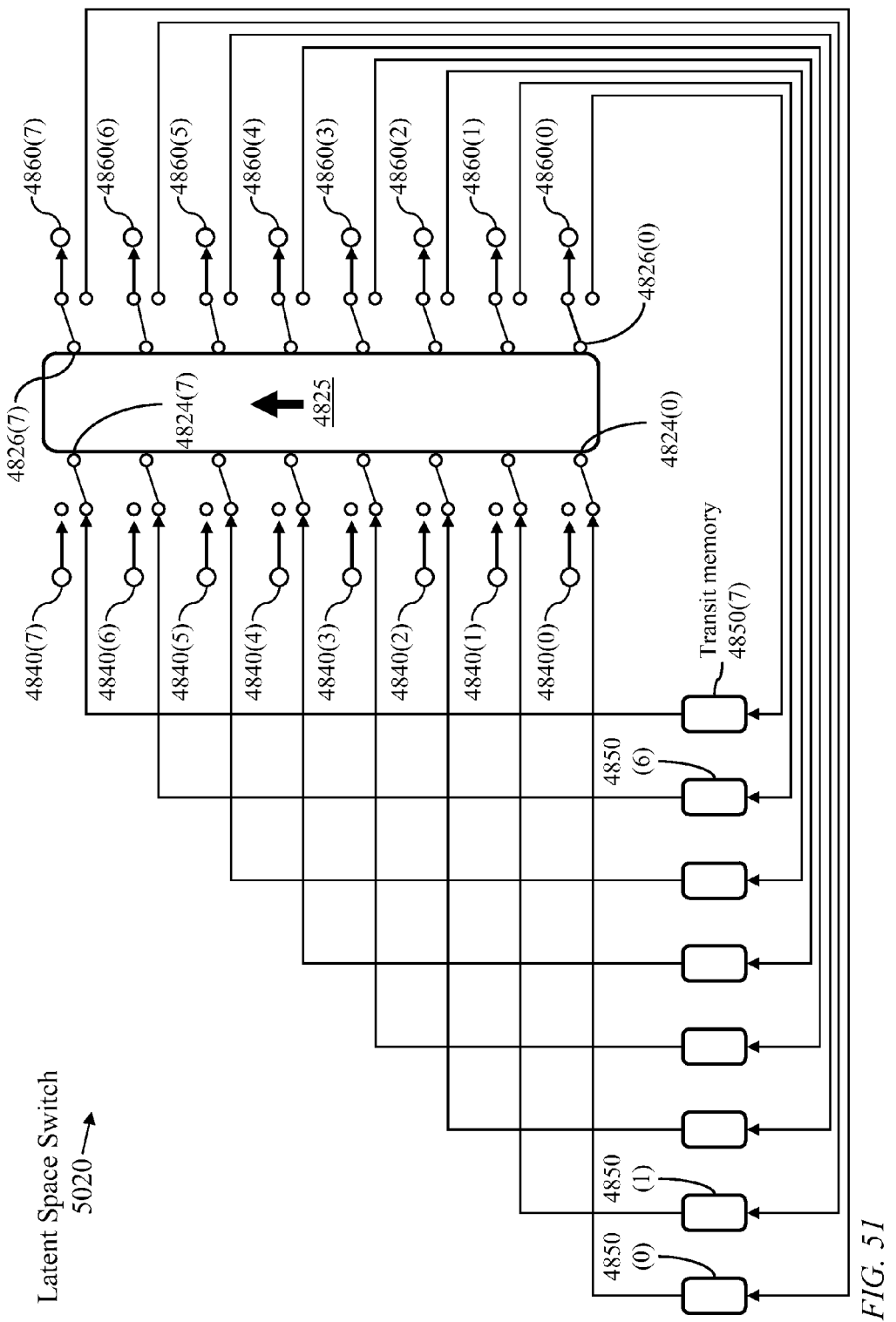
FIG. 51 illustrates a setting of the selectors in the latent space switch of FIG. 50 during data transfer from the transit memory devices to data sinks.

FIG. 51 illustrates the states of the selectors 4835 and 4855 of switch 5020 during a second part of a time slot, i.e. during data transfer from the transit memory devices to external data sinks.

Figure 52:
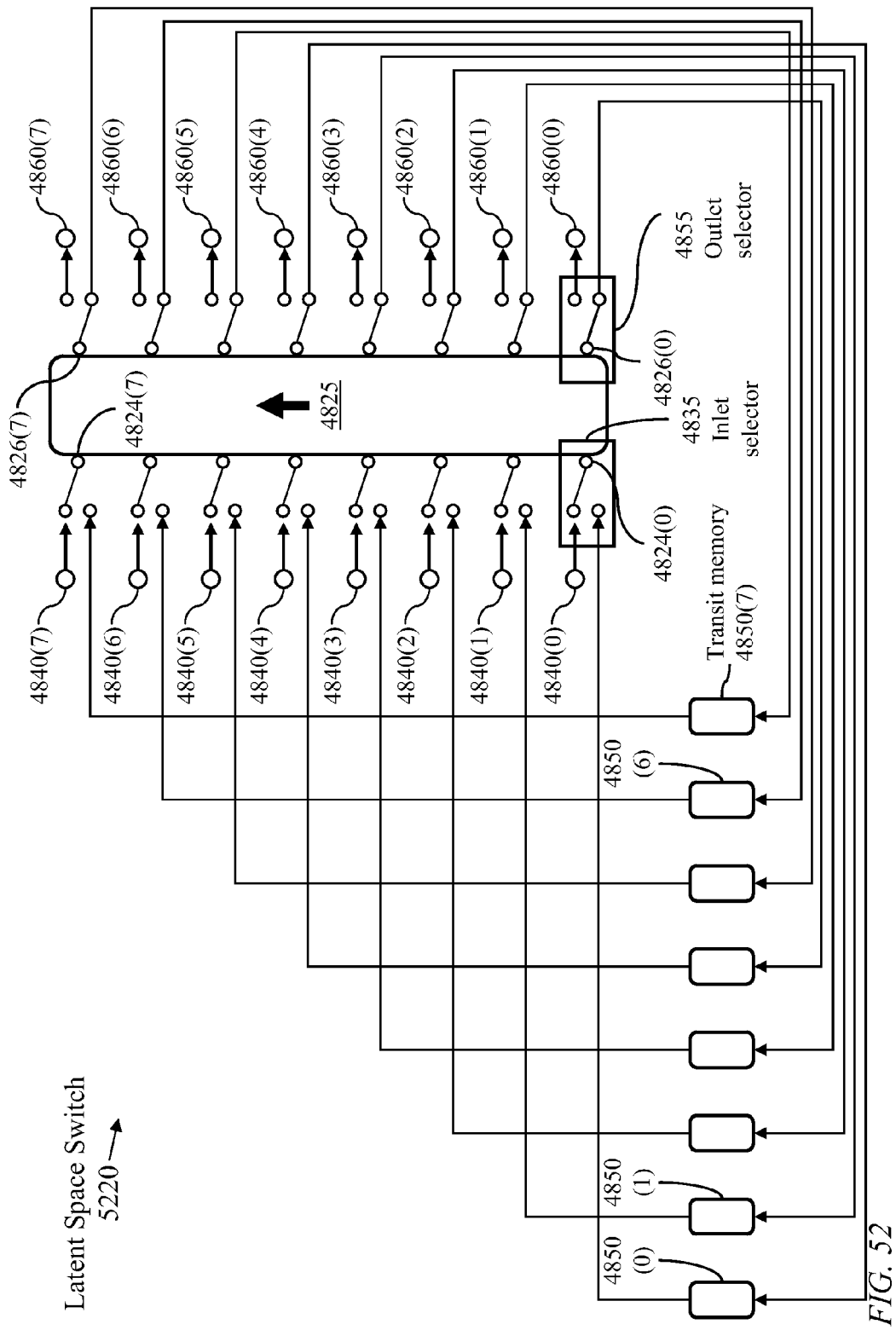
FIG. 52 illustrates a single-rotator latent space switch, in accordance with an embodiment of the present invention, comprising a bank of eight transit memory devices connecting to inlet selectors and outlet selectors of a single rotator with ordinary connections from the transit memory devices to the inlet selectors and transposed connections of order 4 from the transit memory devices to the outlet selector, thus realizing a constant switching delay from an ingress port to an egress port, the figure illustrates a setting of the selectors during data transfer from data sources to the transit memory devices.

FIG. 52 illustrates a single-rotator latent space switch 5220 having the same single rotator, the same inlet selectors 4835, the same outlet selectors 4855, and the same transit-memory devices 4850, of switch 5020 of FIG. 50. However, the transit memory devices 4850 have transposed connections of order 4 from the single rotator.

Figure 53:
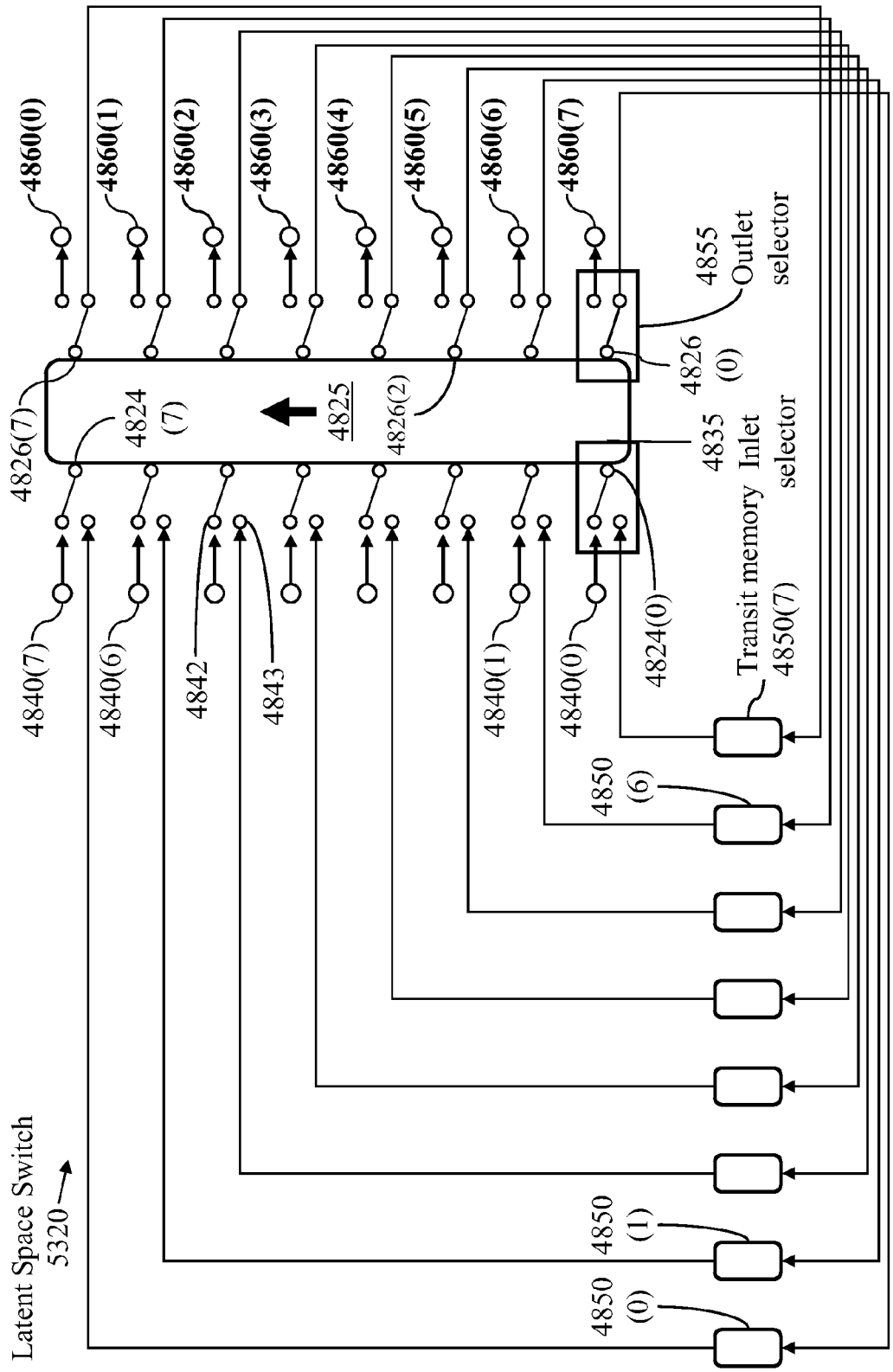
FIG. 53 illustrates a single-rotator space switch similar to the latent space switch of FIG. 48 but with transposed egress ports, in accordance with an embodiment of the present invention.

FIG. 53 illustrates a single-rotator space switch 5320 similar to the latent space switch of FIG. 48 but with transposed egress ports. This results in a transit delay which is independent of the transposition order as indicated in FIG. 58.

Figure 54:
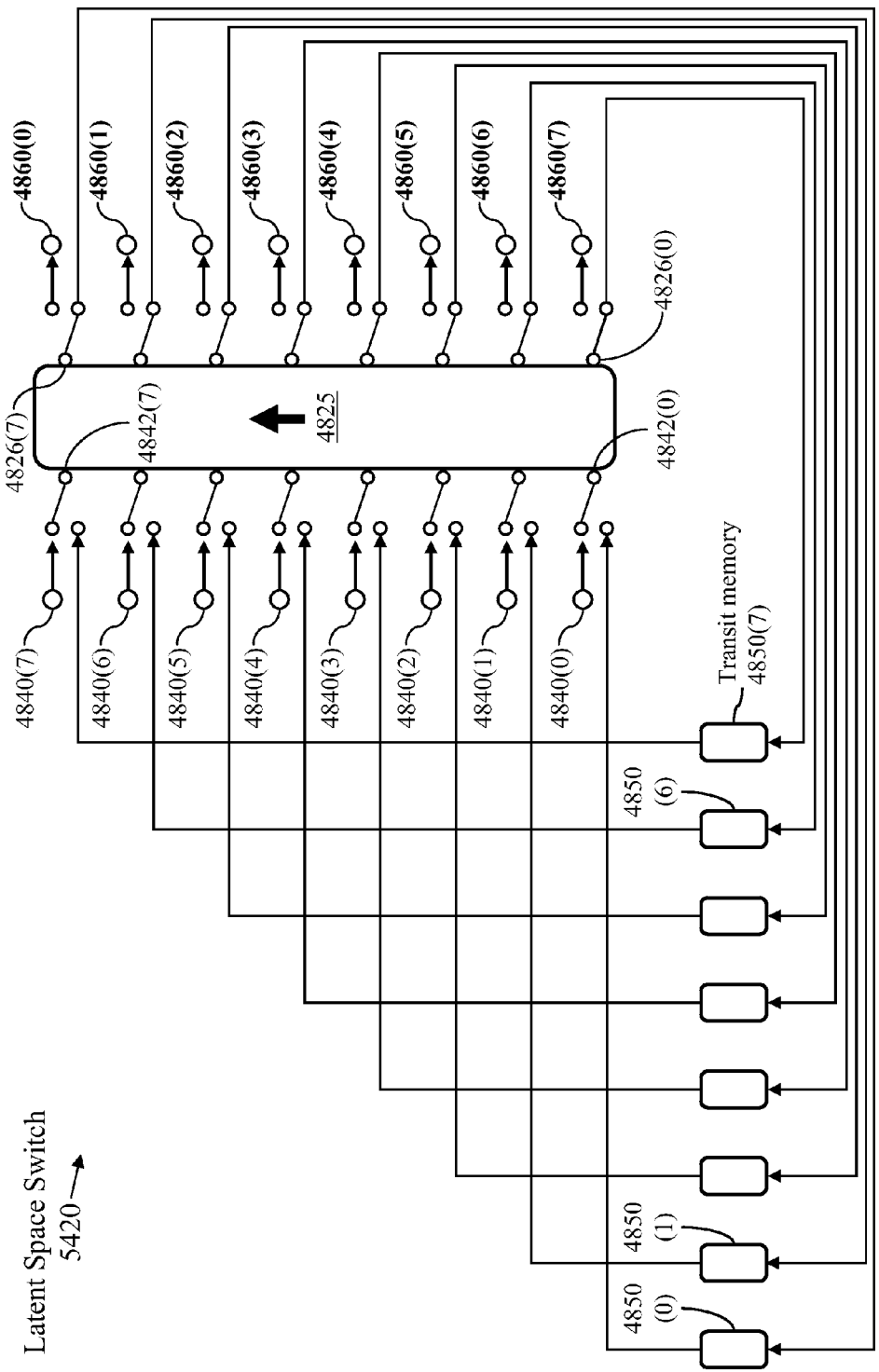
FIG. 54 illustrates a single-rotator space switch similar to the latent space switch of FIG. 50 but with transposed egress ports, in accordance with an embodiment of the present invention.

FIG. 54 illustrates a single-rotator space switch 5420 similar to the latent space switch of FIG. 50 but with transposed egress ports. This results in a transit delay which is independent of the transposition order as indicated in FIG. 58.

Figure 55:
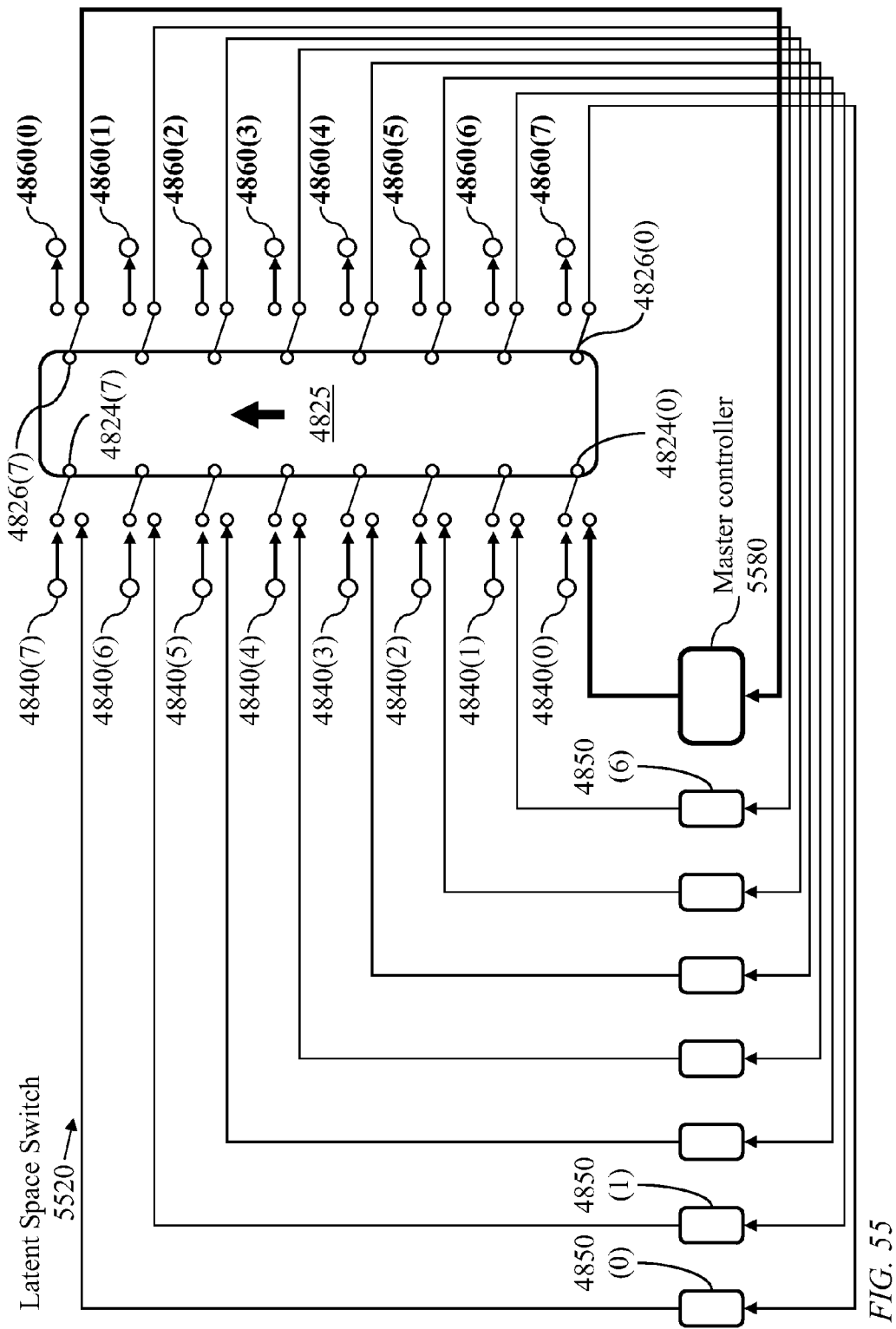
FIG. 55 illustrates the latent space switch of FIG. 48 comprising a controller connecting to an inlet and an outlet of the single rotator in accordance with an embodiment of the present invention.

FIG. 55 illustrates a latent space switch 5520 similar to latent space switch 4820 of FIG. 48 but with a master controller 5580 replacing transit memory device 4850(7).

Figure 56:
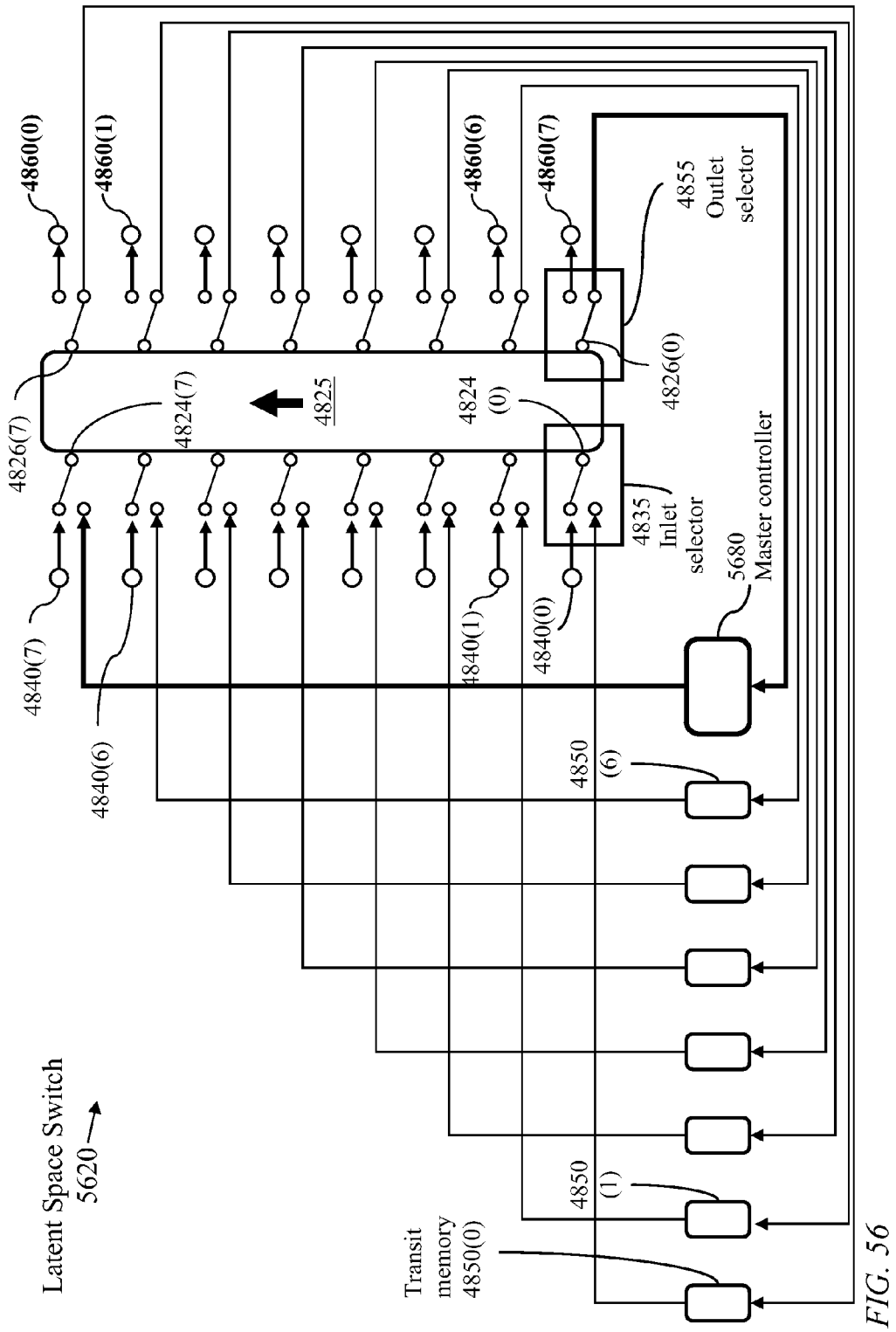
FIG. 56 illustrates the latent space switch of FIG. 50 comprising a controller connecting to an inlet and an outlet of the single rotator in accordance with an embodiment of the present invention.

FIG. 56 illustrates a latent space switch 5620 similar to latent space switch 5020 of FIG. 50 but with a master controller 5680 replacing transit memory device 4850(7).

FIG. 57 tabulates data-transfer timing of a single-rotator latent space switch of the type illustrated in FIG. 48, FIG. 50, and FIG. 52, with an ascending rotator having an arbitrary number N of inlets or outlets and with an arbitrary value L of the order of transposed connections.

Referring to FIG. 48, ingress port 4840(j) connects to outlet |j+$t_1$| during a first part of a time slot $t_1$, $0 \le t_1 < N$. With static ordinary connections from the ascending rotator 4825 to the transit memory devices, outlet |j+$t_1$| connects to a transit memory device 4850|j+$t_1$|. With static transposed connections of order L (L=7, N=8) from the transit memory devices 4850 to the ascending rotator 4825, a transit memory device 4850|j+$t_1$| connects to inlet |L−j−$t_1$| of the ascending rotator 4825. In order to reach egress port 4860(k), transit data in transit memory device 4850|j+$t_1$| is transferred from inlet |L−j−$t_1$| to outlet k during a time slot $t_2$=|k−(L−j−$t_1$))|= |(j+k−L+$t_1$)|. Thus, the transit delay is $t_2$−$t_1$=|j+k−L|.

Referring to FIG. 50 and FIG. 52, ingress port 4840(j) connects to outlet |j+$t_1$| during a first part of a time slot $t_1$, $0 \le t_1 < N$. With static transposed connections of order L (L=7 in latent space switch 5020 and L=4 in latent space switch 5220) from the ascending rotator 4825 to the transit memory devices, outlet |j+$t_1$| connects to a transit memory device 4850|L−j−$t_1$|. With static ordinary connections from the transit memory devices 4850 to the ascending rotator 4825, a transit memory device 4850|L−j−$t_1$| connects to inlet |L−j−$t_1$| of the ascending rotator 4825. In order to reach egress port 4860(k), transit data in transit memory device 4850|L−j−$t_1$| is transferred from inlet |L−j−$t_1$| to outlet k during a time slot $t_2$=|k−(L−j−$t_1$))|=|j+k−L+$t_1$|. Thus, the transit delay is $t_2$−$t_1$=|j+k−L|, as in the configuration of FIG. 48.

To render the delay from an ingress port $4840(j)$ to an egress port $4860(k)$, $0 \le h < N$, $0 \le k < N$, independent of the transposition order L, the outlets 4826 of the ascending rotator 4825 may have transposed connections of the same order L to the egress ports 4860. Thus, in order to reach egress port $4860(k)$, transit data is transferred from inlet $4824|L-j-t_1|$ to outlet $4826|L-k|$, hence to egress port $4860(k)$, during a time slot $t_2 = |(L-k)-(L-(j+t_1))| = |j-k+t_1|$, and the transit delay is $t_2 - t_1 = |j-k|$, which is independent of the transposition order L.

FIG. 58 tabulates data-transfer timing of a single-rotator latent space switch of the type illustrated in FIG. 53 and FIG. 54, using an ascending rotator having an arbitrary number of inlets, with transposed connections from the outlets 4826 of the single rotator 4825 to the egress ports 4860, and with an arbitrary value of the order of transposed connections. In the latent space switches 4820, 5020, 5220, egress port $4860(k)$ connects to outlet $4826(k)$, $0 \le k < N$. In the latent space switches 5320 and 5420, egress port $4860(k)$ connects to outlet $4826|L-k|$. This results in a transit delay, for a given data stream, which depends only on the indices of an ingress port 4840 and an egress port 4860 as indicated in FIG. 58.

FIG. 59 tabulates data-transfer timing of a single-rotator latent space switch of the type illustrated in FIG. 48, FIG. 50, and FIG. 52, with a descending rotator having an arbitrary number N of inlets or outlets and with an arbitrary value L of the order of transposed connections.

FIG. 60 tabulates data-transfer timing of a single-rotator latent space switch of the type illustrated in FIG. 53 and FIG. 54, using a descending rotator having an arbitrary number of inlets, with transposed connections from the outlets 4826 of the single rotator 4825 to the egress ports 4860, and with an arbitrary value of the order of transposed connections.

Scheduling Cycle Versus Rotation Cycle

During a rotation cycle of N time slots, rotator 4825 connects each inlet $4824(j)$ to each outlet $4826(k)$, $0 \le j < N$, $0 \le k < N$. In the exemplary configuration of FIG. 55, N=8 and the master controller 5580 has a channel to inlet 4824(0) of rotator 4825 and a channel from outlet 4826(7) of rotator 4825. An ingress port $4840(j)$, $0 \le j < 8$, connects to the master controller 5580 once per rotation cycle, during every relative time slot $|7-j|$ of a rotation cycle, i.e., during absolute time slots $(7-j)+8 \times \chi$, $0 \le \chi < \infty$. The master controller 5580 connects to an egress port $4860(k)$, $0 \le k < N$, once per rotation cycle, during every relative time slot k, i.e., during absolute time slots $(k+8 \times \chi)$, $0 \le \chi < \infty$. The master controller 5580 receives control signals from ingress port $4840(j)$ during time slots $(7-j)+8 \times \chi$ and transmits control signal to egress port k during time slots $(k+8 \times \chi)$, $0 \le \chi < \infty$. Preferably, each egress port is integrated with an ingress port so that master controller 5580 may send control data, including data transfer schedules, to a specific ingress port through an egress port integrated with the specific ingress port.

Master controller 5580 receives control signals from the ingress ports 4840 and schedules transfer of data from ingress ports $4840(j)$ to egress ports $4860(k)$, $0 \le j < N$, $0 \le k < N$, over a predefined scheduling time frame. The scheduling time frame is preferably selected to cover an integer number, exceeding zero, of rotation-cycle periods. However, the scheduling cycle may have any number of time slots, greater than or equal to N, that need not be an integer multiple of N.

Figure 61:
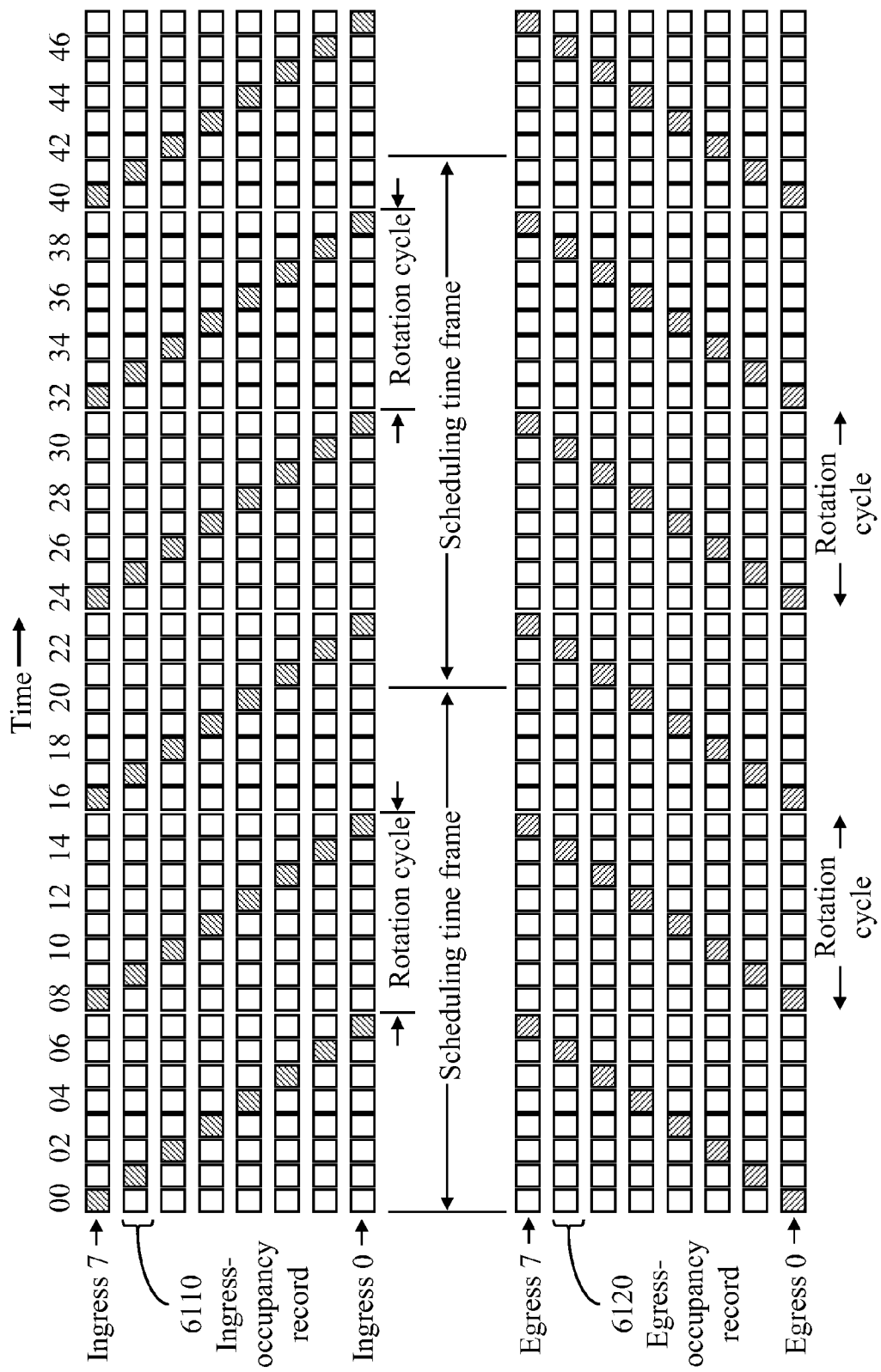
FIG. 61 illustrates occupancy records, over a scheduling time frame, used for scheduling data transfer in the latent space switch of FIG. 55 in accordance with an embodiment of the present invention.

The transfer of payload data from an ingress port to an egress port is subject to contention, hence the need for scheduling. FIG. 61 illustrates an exemplary scheduling frame of 21 time slots. The master controller maintains an ingress occupancy record (or a vacancy record) 6110 for each ingress port 4840 and an egress occupancy record (or vacancy record) 6120 for each egress port 4860. As indicated in FIG. 55, a data segment transferred from an ingress port $4840(j)$ at time $t_1$ relative to a rotation cycle is transferred to an egress port $4860(k)$ during a time slot $t_2$, relative to a rotation cycle, where $t_2 = \{j+k-L+t_1\}_{modulo\ N}$, where L=7 in the exemplary configuration of FIG. 48. Thus, to establish a connection from ingress port $4840(j)$ to egress port $4860(k)$, the master controller examines the occupancy state of ingress port $4840(j)$ during time slot $t_1$ and the occupancy state egress port $4860(k)$ during time slot $t_2$.

Preferably, the exchange of control data between the master controller 5580 and controllers of the ingress ports 4840 and egress ports 4860 take place during dedicated time slots. Each ingress port $4840(j)$ is preferably integrated with a corresponding egress port, such as egress port $4860(j)$, in order to simplify exchange of control data.

As illustrated, ingress port 4840(0) connects to the master controller 5580 during time slots $\{7, 15, 23, 31, \ldots\}$, ingress port 4840(1) connects to the master controller during time slots $\{6, 14, 22, 30, \ldots\}$, and ingress port 4840(7) connects to the master controller during time slots $\{0, 8, 16, 24, \ldots\}$. The master controller 5580 connects to egress port 4860(0) during time slots $\{0, 8, 16, 24, \ldots\}$, connects to egress port 4860(1) during time slots $\{1, 9, 17, 25, \ldots\}$, and connects to egress port 4860(7) during time slots $\{7, 15, 23, 30, \ldots\}$.

Figure 62:
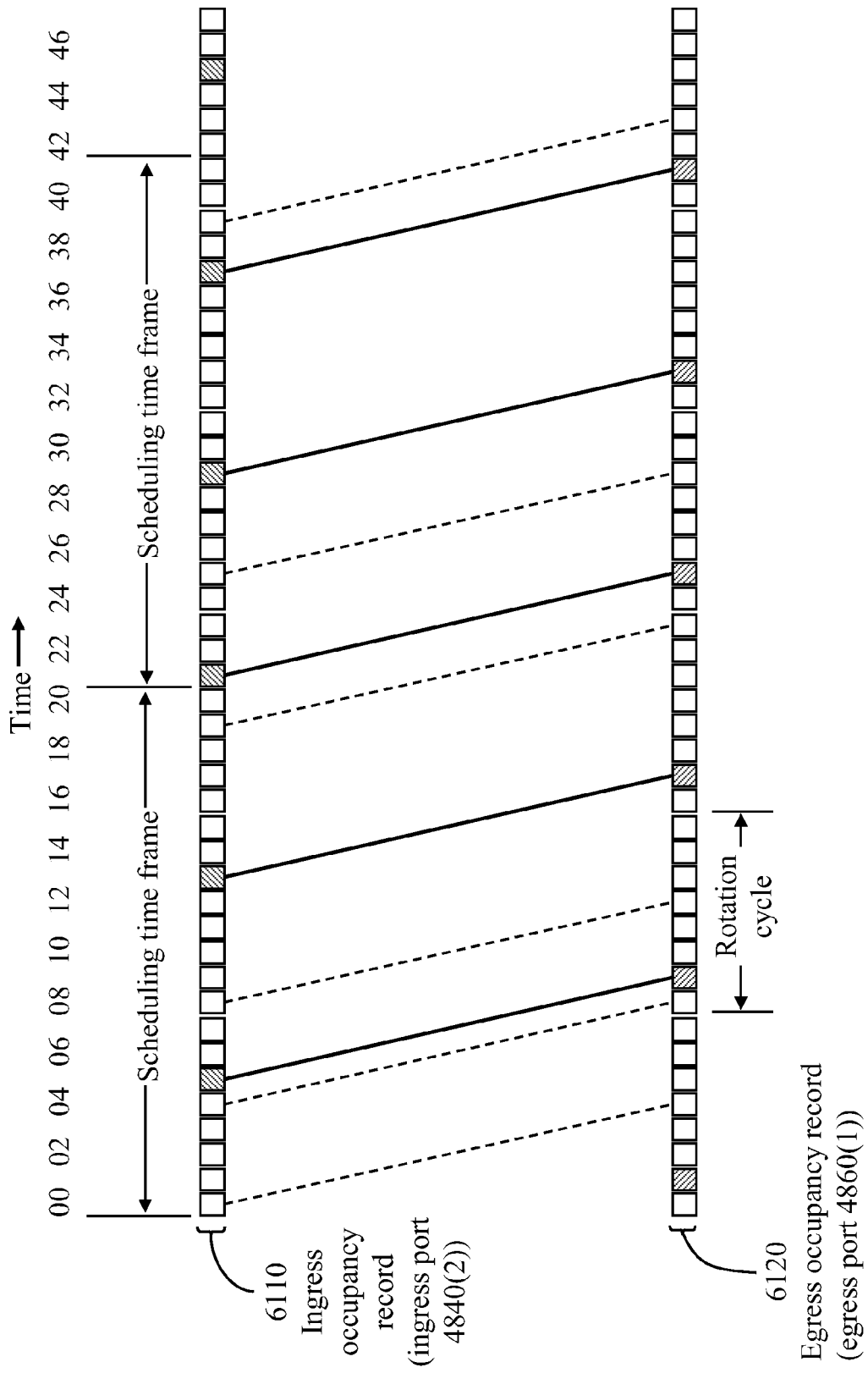
FIG. 62 illustrates a time-slot-matching process for scheduling a connection from an ingress port to an egress port in the latent space switch of FIG. 55 in accordance with an embodiment of the present invention.

FIG. 62 illustrates an ingress occupancy record 6110 of ingress port 4840(2) and egress occupancy record 6120 of egress port 4860(1) of latent space switch 5520 of FIG. 55. Each occupancy record has a number of entries equal to the number of time slots per scheduling time frame. A data segment received at an ingress port $4840(j)$ at time $t_1$ is delivered to an egress port $4860(k)$ during a time slot $t_2 = (t_1+j+k-L)_{modulo\ N}$, where N is the number of ingress ports (or egress ports) and L is the transposition index as described earlier. In the configuration of FIG. 55, N=8 and L=7. A data segment received during time slot $t_1$ is delivered to egress 4860(1) during time slot $t_2 = t_1+4$. Corresponding values of $t_1$ and $t_2$ are indicated in FIG. 62. A path from ingress port 4840(2) to egress port 4860(1) is available for a new connection request when ingress port 4840(2) is free (i.e., not in use and not reserved) during a time slot $t_1$ and egress port 4860(1) is free during time slot=$t_1+4$. To establish a connection, requiring a number σ>0 of time slots per scheduling frame, any ingress port 4840 to any egress port 4860, a number σ of available paths need be reserved. When a path is reserved, corresponding entries in an ingress occupancy record 6110 and an egress occupancy record are marked as busy. When the path is released, the corresponding entries are marked as available.

Figure 63:
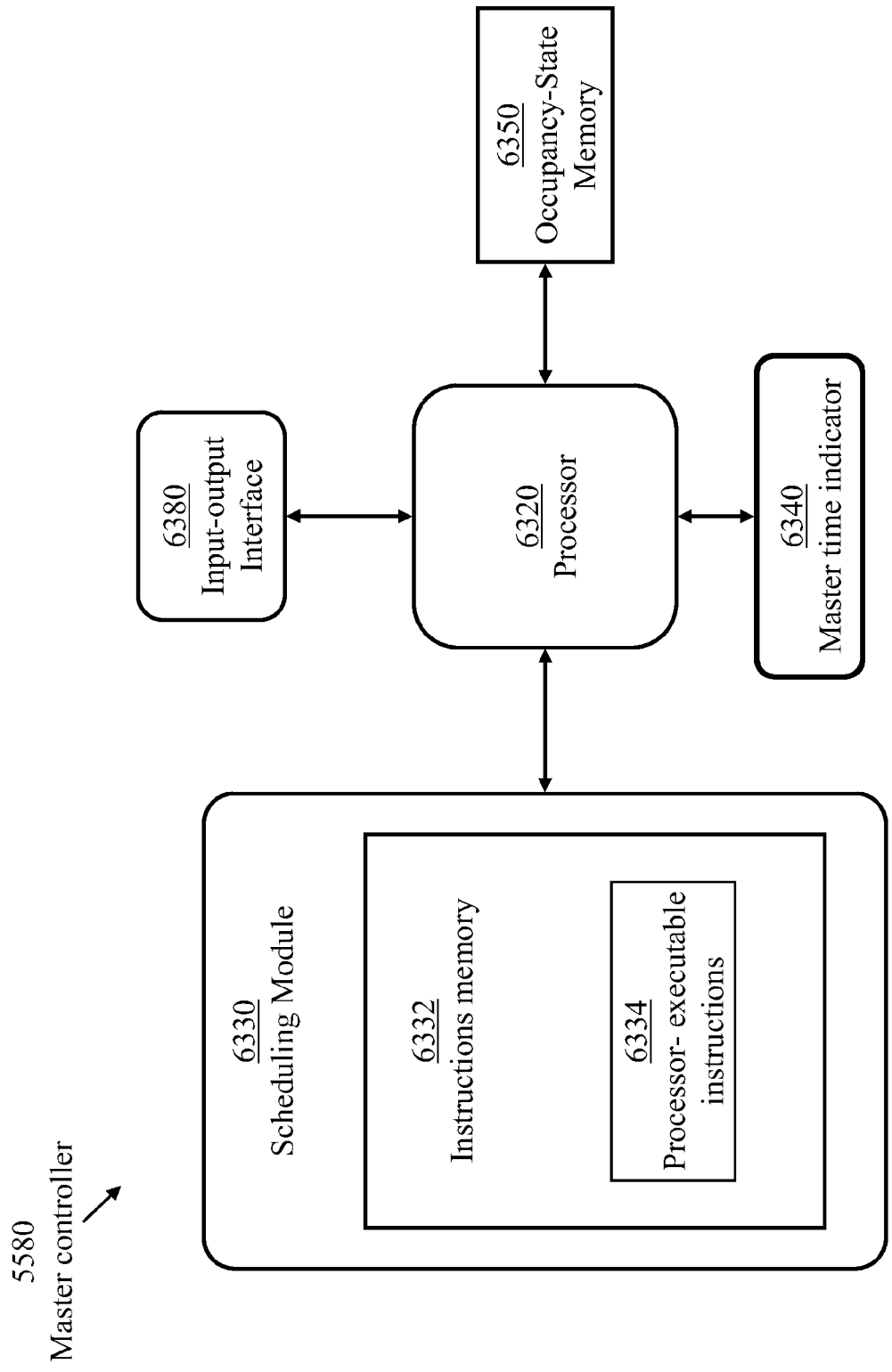
FIG. 63 details a master controller of the latent space switch of FIG. 55 in accordance with an embodiment of the present invention.

FIG. 63 illustrates a master controller 5580 of a latent space switch 5520 (FIG. 55). The master controller 5580 has a processor 6320 and a scheduling module 6330 which includes a memory device 6332 storing processor executable instructions 6334 which cause the processor to implement the time-locking and scheduling functions described above. Processor 6320 communicates with input and output ports of the latent space switch through an input-output interface 6380. Upon receiving a time indication from an edge controller of an edge node 120, processor 6320 communicates a corresponding reading of the master time indicator 6340 to the edge node. The edge controller then determines a reference time for an outbound port of the edge node leading to the master controller of the latent space switch 5520. A memory device 6350 stores current occupancy states of all inlets and all outlets during all time slots of a time frame.

Configuration Details

The N inlets 4824 of a rotator 4825 are indexed as 0 to (N−1) and are individually referenced as 4824(0), 4824(1), ..., 4824(N−1). Likewise, the N outlets 4826 of the rotator 4825 are indexed as 0 to (N−1) and are individually referenced as 4826(0), 4826(1), ..., 4826(N−1). The N transit memory devices 4850 are indexed as 0 to (N−1) and are individually referenced as 4850(0), 4850(1), ..., 4850(N−1).

If the rotator is an ascending rotator, then during a time slot t, 0≤t<N, an inlet of index j, 0≤j<N, connects through the rotator to an outlet of index k, 0≤k<N, determined as:

$k = \{+t+\Theta\}_{modulo\ N}$, where Θ (an integer) is an arbitrary offset.

If the rotator is a descending rotator, then during a time slot t, 0≤t<N, the rotator connects an inlet of index j, 0≤j<N to an outlet of index k, 0≤k<N, determined as:

$k = \{j-t+\Theta\}_{modulo\ N}$.

Without loss of generality, the offset Θ may be set to zero.

Figure 64:
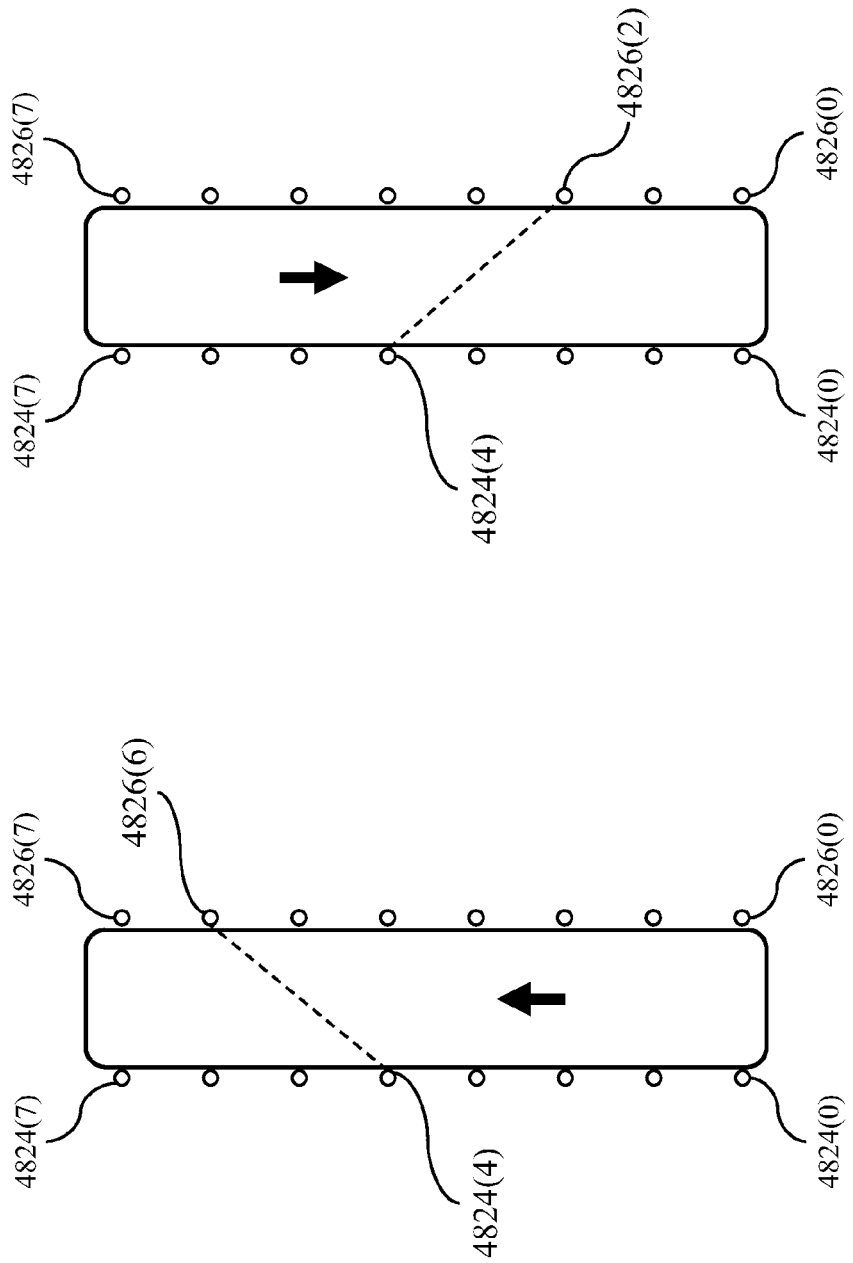
FIG. 64 illustrates inlet-outlet connectivity of an ascending single rotator and a descending single rotator.

FIG. 64 illustrates inlet-outlet connectivity of an ascending single rotator and a descending single rotator. An inlet and an outlet to which the inlet connects at the start of a rotation cycle (at t=0) are said to form a "paired inlet-outlet". With a zero offset (Θ=0), an inlet 4824(j) connects to an outlet 4826(j), 0≤j<N, at t=0 whether the rotator is an ascending rotator or a descending rotator. Thus, inlet 4824(4) and outlet 4826(4) form an inlet-outlet pair. At t=2, inlet 4824(4) connects to outlet 4826(6) if the rotator is operated in an ascending direction or connects to outlet 4826(2) if the rotator is operated in a descending direction.

An inlet 4824(j) and its transposed outlet 4826(L−j), 0≤j<N, where L is a "transposition order" which may be selected to be any integer in the range 0≤L<N, are said to form a "transposed inlet-outlet". Table-1, below, indicates an index of a transposed outlet 4826 corresponding to each inlet 4824 for different selections of the transposition order L. The connectivity of all transit-memory devices in a single-rotator latent space switch may be based on the same transposition order.

TABLE 1

Indices of inlets 4824(j) and corresponding transposed outlets 4826(L − j)

| Inlet index | Outlet index (transposition order L) |   |   |   |   |   |   |       |
|---|---|---|---|---|---|---|---|---|
|   | L = 0 | 1 | 2 | 3 | 4 | 5 | 6 | L = 7 |
| 0 | 0 | 1 | 2 | 3 | 4 | 5 | 6 | 7 |
| 1 | 7 | 0 | 1 | 2 | 3 | 4 | 5 | 6 |
| 2 | 6 | 7 | 0 | 1 | 2 | 3 | 4 | 5 |
| 3 | 5 | 6 | 7 | 0 | 1 | 2 | 3 | 4 |
| 4 | 4 | 5 | 6 | 7 | 0 | 1 | 2 | 3 |
| 5 | 3 | 4 | 5 | 6 | 7 | 0 | 1 | 2 |
| 6 | 2 | 3 | 4 | 5 | 6 | 7 | 0 | 1 |
| 7 | 1 | 2 | 3 | 4 | 5 | 6 | 7 | 0 |

Figure 65:
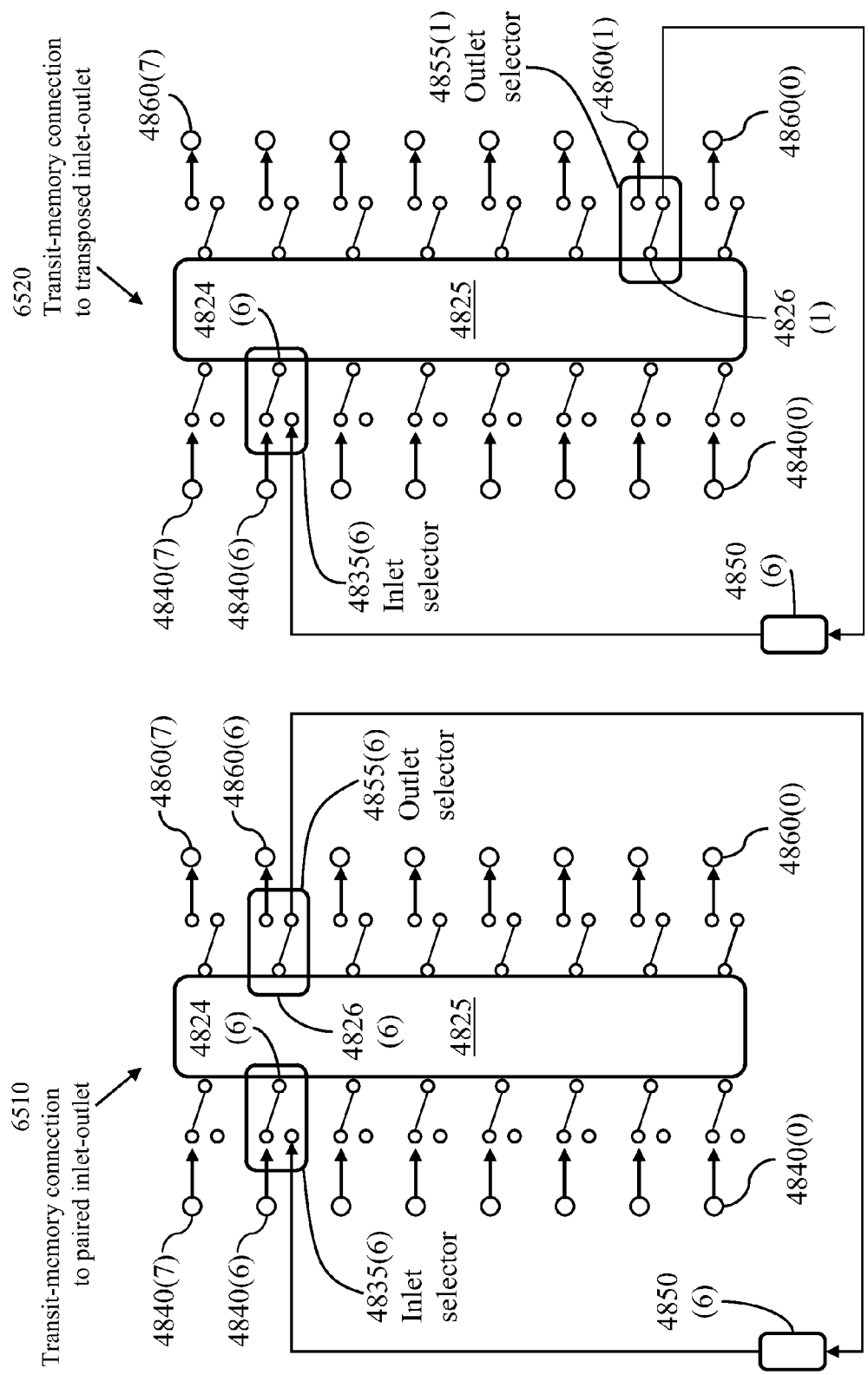
FIG. 65 illustrates connection of a transit memory device to an inlet and a peer outlet of a rotator and connection of a transit memory device to an inlet and a transposed outlet of the rotator.

As described earlier, each inlet 4824 is coupled to a respective inlet selector 4835 and each outlet 4826 is coupled to a respective outlet selector 4855. FIG. 65 illustrates a configuration 6510 where a transit memory device 4850(6) connects to an input selector 4835(6) and an outlet selector 4855(6) of a paired inlet-outlet {4824(6), 4826(6)}, and a configuration 6520 where the transit memory device 4850(6) connects to an input selector 4835(6) and an outlet selector 4855(1) of a transposed inlet-outlet pair {4824(6), 4826(1)}.

The data-transfer timing of FIGS. 57 and 58 is based on connecting each transit-memory device 4850 to a respective transposed inlet-outlet of rotator 4825 as illustrated in FIGS. 48-54. In the configurations illustrated in FIGS. 48 to 54, the number of inlets or outlets of the single rotator 4825 is N=8. Data transferred from an ingress port 4840(j) to an egress port 4860(k), 0≤j<N, 0≤K<N, waits in a transit memory device 4850(m), 0≤m<N, for a deterministic period of time, D, called "systematic switching delay".

FIG. 66 tabulates data-transfer timing of a single-rotator latent space switch with each transit memory device connected to a paired inlet-outlet, using an ascending rotator or a descending rotator. As illustrated in FIG. 66, if each transit memory device 4850(m) is connected to a paired inlet-outlet {4824(m), 4826(m)} of the rotator 4825, the systematic switching delay for data transferred from ingress port 4840(j) to egress port 4860(k) through a transit memory device 4850(m) is determined as:

$D^{(1)} = \{j+k-2 \times M\}_{modulo\ N}$, if the rotator 4825 is an ascending rotator; and $D^{(2)} = \{2 \times m-j-k\}_{modulo\ N}$, if the rotator 4825 is a descending rotator.

Thus, the systematic switching delay depends on the selected transit memory device. With j=5 and k=2, for example, the systematic switch delays D(1) and D(2) are:

$D^{(1)} = \{j+k-2 \times m\}_{modulo\ N} = \{7-2 \times m\}_{modulo\ 8}$, and $D^{(2)} = \{2 \times m-j-k\}_{modulo\ N} = \{2 \times m-7\}_{modulo\ 8}$.

If each transit memory device 4850(m) is connected to a transposed inlet-outlet {4824(m), 4826(L−m)}, 0≤L<N, of the rotator 4825, the systematic switching delay for data transferred from ingress port 4840(j) to egress port 4860(k) through a transit memory device 4850(m) is independent of the transit memory device used and is determined as:

$D^{(3)} = \{j-k\}_{modulo\ N}$, if the rotator 4825 is an ascending rotator; and $D^{(4)} = \{k-k\}_{modulo\ N}$, if the rotator 4825 is a descending rotator.

With j=5 and k=2, the systematic switch delay $D^{(3)}$ and $D^{(4)}$ are $D^{(3)} = \{j-k\}_{modulo\ N} = \{3\}_{modulo\ 8} = 3$, and $D^{(4)} = \{k-j\}_{modulo\ N} = \{-3\}_{modulo\ 8} = 5$.

Table-2 below illustrates the systematic switching delay for data transferred from an ingress port 4840(5) to an egress port 4860(2) during each time slot of a rotation cycle of 8 time slots. In the table, the time at which a data segment is transferred from the ingress port is denoted $t_1$. The index of the transit memory to which the ingress port connects during a time slot is denoted m. The time slot at which a data segment transferred from ingress port (5) is received at egress port 4860(2) is denoted:

$t_2^{(1)}$ for an ascending rotator and transit-memory connection to paired inlets-outlets;

$t_2^{(2)}$ for a descending rotator and transit-memory connection to paired inlets-outlets;

$t_2^{(3)}$ for an ascending rotator and transit-memory connection to transposed inlets-outlets; and $t_2^{(4)}$ for an ascending rotator and transit-memory connection to transposed inlets-outlets.

TABLE 2

Systematic Switching Delay

| | | \multicolumn{8}{c}{Time data transferred to transit memory: $t_1$} |
|---|---|---|---|---|---|---|---|---|---|

| | | 0 | 1 | 2 | 3 | 4 | 5 | 6 | 7 |
|---|---|---|---|---|---|---|---|---|---|
| | | \multicolumn{8}{c}{Index of transit memory: m} |
| | | 5 | 6 | 7 | 0 | 1 | 2 | 3 | 4 |
| Ascending rotator: | $t_2^{(1)}$ | 5 | 4 | 3 | 2 | 1 | 0 | 7 | 6 |
| Transit memory connected to paired inlet-outlet | $D^{(1)}$ | 5 | 3 | 1 | 7 | 5 | 3 | 1 | 7 |
| Descending rotator: | $t_2^{(2)}$ | 3 | 6 | 1 | 4 | 7 | 2 | 5 | 0 |
| Transit memory connected to paired inlet-outlet | $D^{(2)}$ | 3 | 5 | 7 | 1 | 3 | 5 | 7 | 1 |
| Ascending rotator: | $t_2^{(3)}$ | 3 | 4 | 5 | 6 | 7 | 0 | 1 | 2 |
| Transit memory connected to transposed inlet-outlet | $D^{(3)}$ | 3 | 3 | 3 | 3 | 3 | 3 | 3 | 3 |
| Descending rotator: | $t_2^{(4)}$ | 5 | 6 | 7 | 0 | 1 | 2 | 3 | 4 |
| Transit memory connected to transposed inlet-outlet | $D^{(4)}$ | 5 | 5 | 5 | 5 | 5 | 5 | 5 | 5 |

As indicated, the systematic switching delay is independent of the transit memory device 4850 when each transit memory connects to a transposed inlet-outlet pair.

Figure 67:
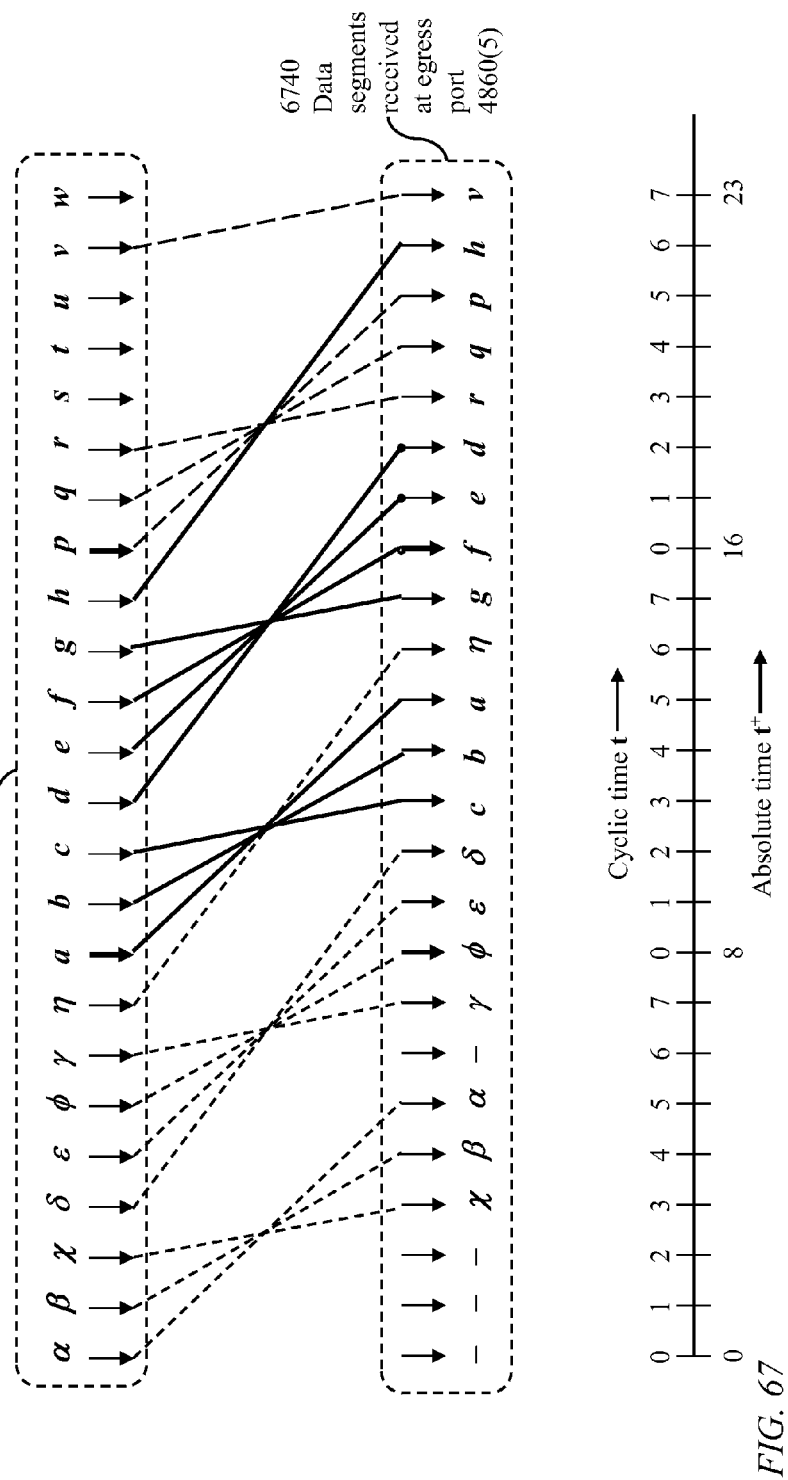
FIG. 67 illustrates data scrambling in a single-rotator latent space switch using an ascending rotator, where each transit memory device is connected to a peer inlet-outlet pair.

FIG. 67 illustrates data scrambling in a single-rotator latent space switch using an ascending rotator, where each transit memory device is connected to a paired inlet-outlet. A set 6720 of data segments, identified by alphabetical symbols, of a data stream from ingress port 4840(5) to egress port 4860(2) is received at egress port 4860(2) as a delayed set 6740 of a different order; for example, consecutive data segments labeled "a, b, c, d, e, f, g, h" transferred from ingress port 4840(5) at time instants 8 to 15 are received at egress port 4860(2) at time instants 11, 12, 13, 15, 16, 17, 18, and 22, in the order "c, b, a, g, f, e, d, h". FIGS. 67 to 70 indicate both cyclic time t and cumulative time t+.

Figure 68:
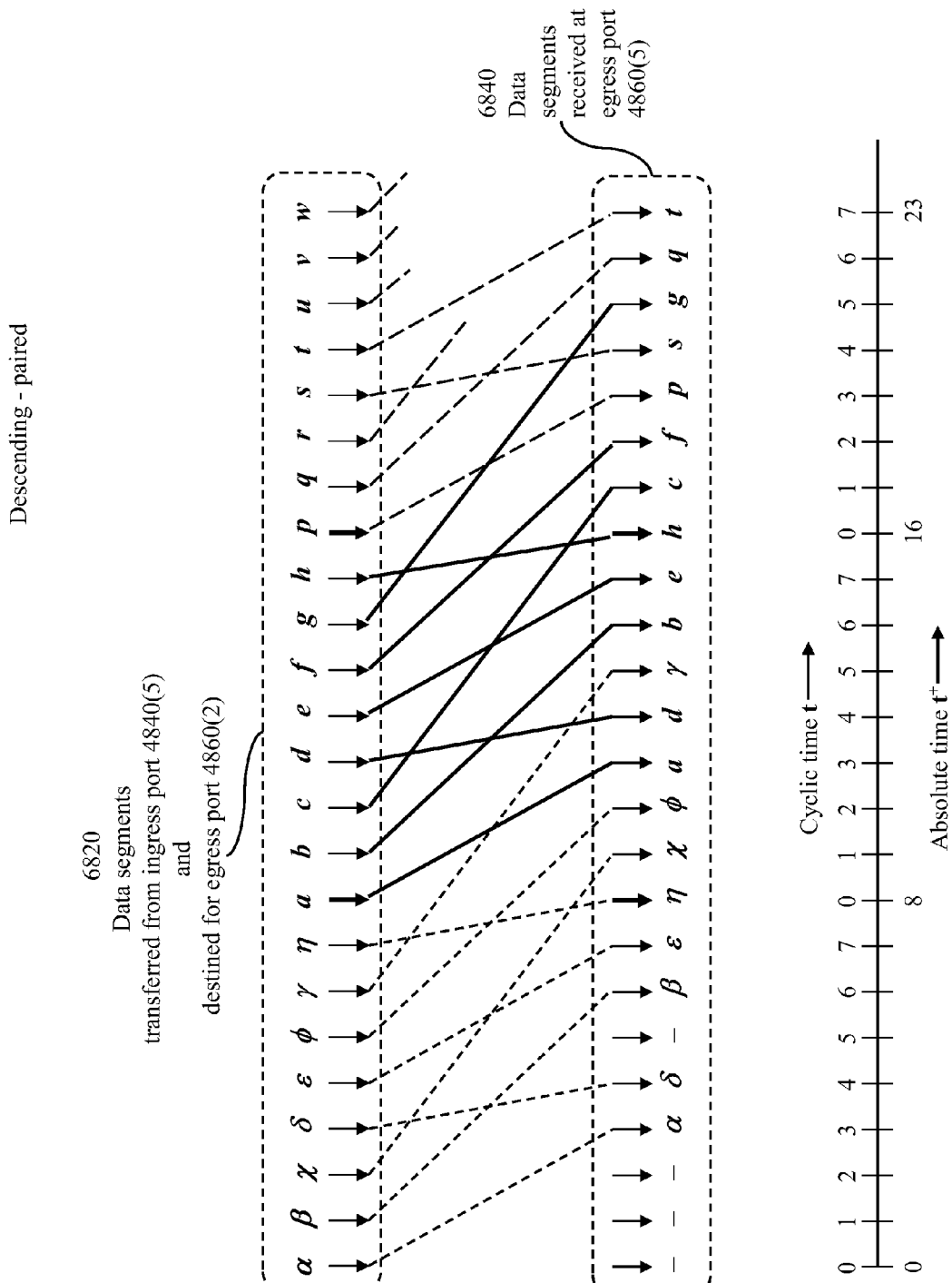
FIG. 68 illustrates data scrambling in a single-rotator latent space switch using a descending rotator, where each transit memory device is connected to a peer inlet-outlet pair.

FIG. 68 illustrates data scrambling in a single-rotator latent space switch using a descending rotator, where each transit memory device is connected to a paired inlet-outlet. A set 6820 of data segments of a data stream from ingress port 4840(5) to egress port 4860(2) is received at egress port 4860(2) as a delayed set 6840 of a different order; for example, consecutive data segments labeled "a, b, c, d, e, f, g, h" transferred from ingress port 4840(5) at time instants 8 to 15 are received at egress port 4860(2) at time instants 11, 12, 14, 15, 16, 17, 18, and 21, in the order "a, d, b, e, h, c, f, g".

The systematic switching delay of a data stream from an ingress port 4840(j) to an egress port 4860(k) in the configuration of FIG. 48 or FIG. 50 depends on the indices j, k, and the transposition order L; as indicated in FIG. 57, the systematic switching delay would be $(j+k-L)_{modulo\ N}$, for an ascending rotator. If each outlet selector of an outlet 4826(k) connects to an egress port 4860(L−k), the systematic switching delay becomes independent of the transposition order and would depend only on the indices j and k; as indicated in FIG. 58 the switching delay would be $(j-k)_{modulo\ N}$. FIG. 54 illustrates the single-rotator space switch of FIG. 50 with the outlet selector of each outlet 4826(k) connecting to an egress port 4860(L−k) of a transposed index (L−k).

It is noted, however, that the transposition order L is a fixed parameter of a selected switch configuration. Thus, data segments of a data stream are switched in proper order whether or not the systematic switching delay depends on the transposition order L.

The data-transfer timing illustrated in FIGS. 57 and 58 apply to a single-rotator latent space switch employing an ascending rotator. FIG. 59 and FIG. 60 tabulate corresponding data-transfer timing of a single-rotator latent space employing a descending rotator. As indicated in FIG. 59, the systematic switching delay experienced by a data stream from an ingress port 4840(j) to an egress port 4860(k) is determined as $(L-j-k)_{modulo\ N}$ (instead of $(j+k-L)_{modulo\ N}$, for the case of an ascending rotator).

For the configuration of FIG. 54, where the egress ports 4860 are transposed with respect to the ingress ports, FIG. 60 indicates that the systematic switching delay experienced by a data stream from an ingress port 4840(j) to an egress port 4860(k) is determined as $(k-j)_{modulo\ N}$ (instead of $(j-k)_{modulo\ N}$, for the case of an ascending rotator).

Figure 69:
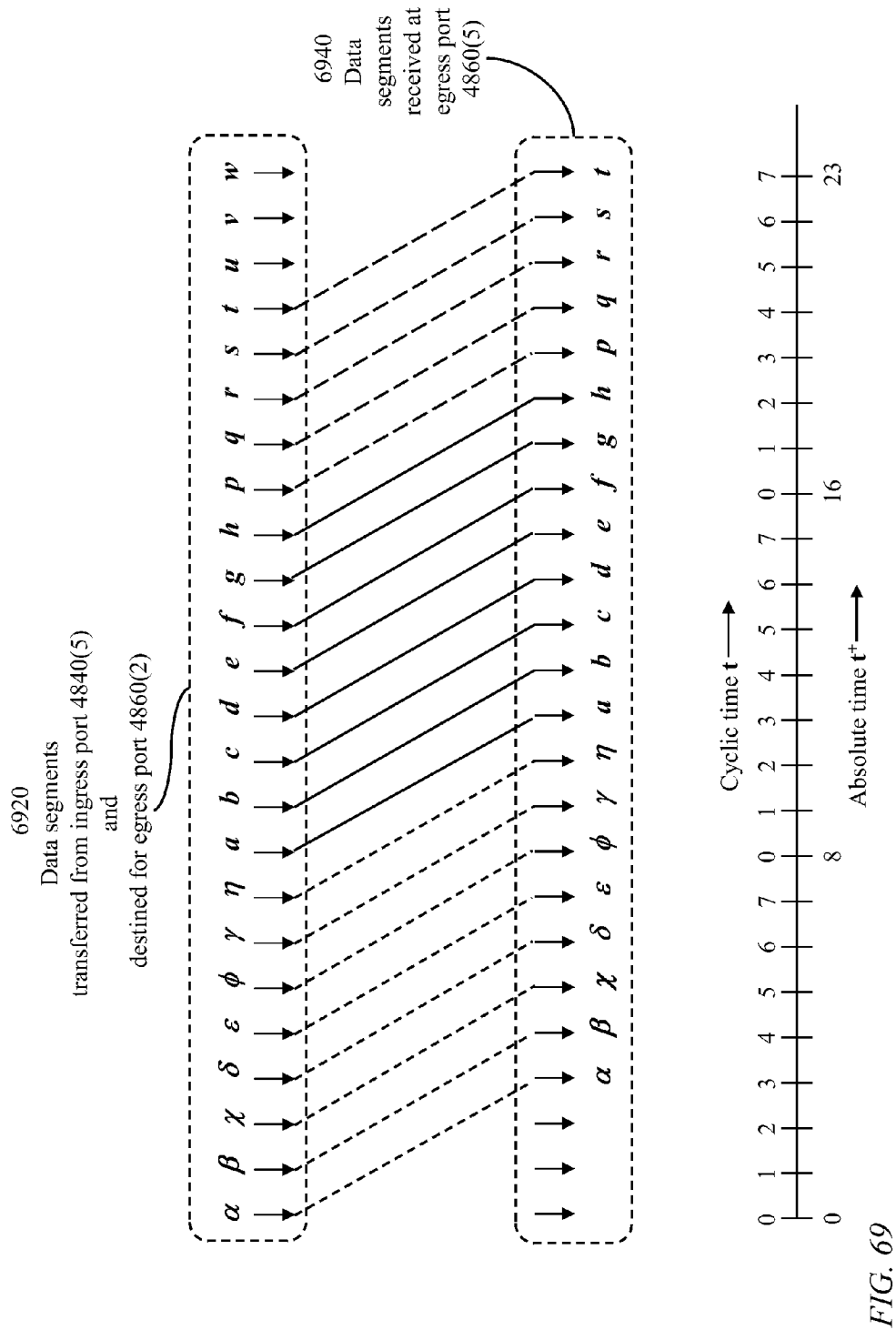
FIG. 69 illustrates preservation of data order in a single-rotator latent space switch using an ascending rotator, where each transit memory device is connected to a transposed inlet-outlet pair, in accordance with an embodiment of the present invention.

FIG. 69 illustrates preservation of data order in a single-rotator latent space switch using an ascending rotator, where each transit memory device is connected to a transposed inlet-outlet. A set 6920 of data segments transferred from an ingress port to an egress port is received as a delayed set 6940 which preserves the order of the data segments. As illustrated, consecutive data segments labeled "a, b, c, d, e, f, g, h" transferred from ingress port 4840(5) at time instants 8 to 15 are received in proper order at egress port 4860(2) at time instants 11 to 18, with a constant systematic switching delay of $D=(j-k)_{modulo\ N}$ (j=5, k=2, N=8, D=3).

Figure 70:
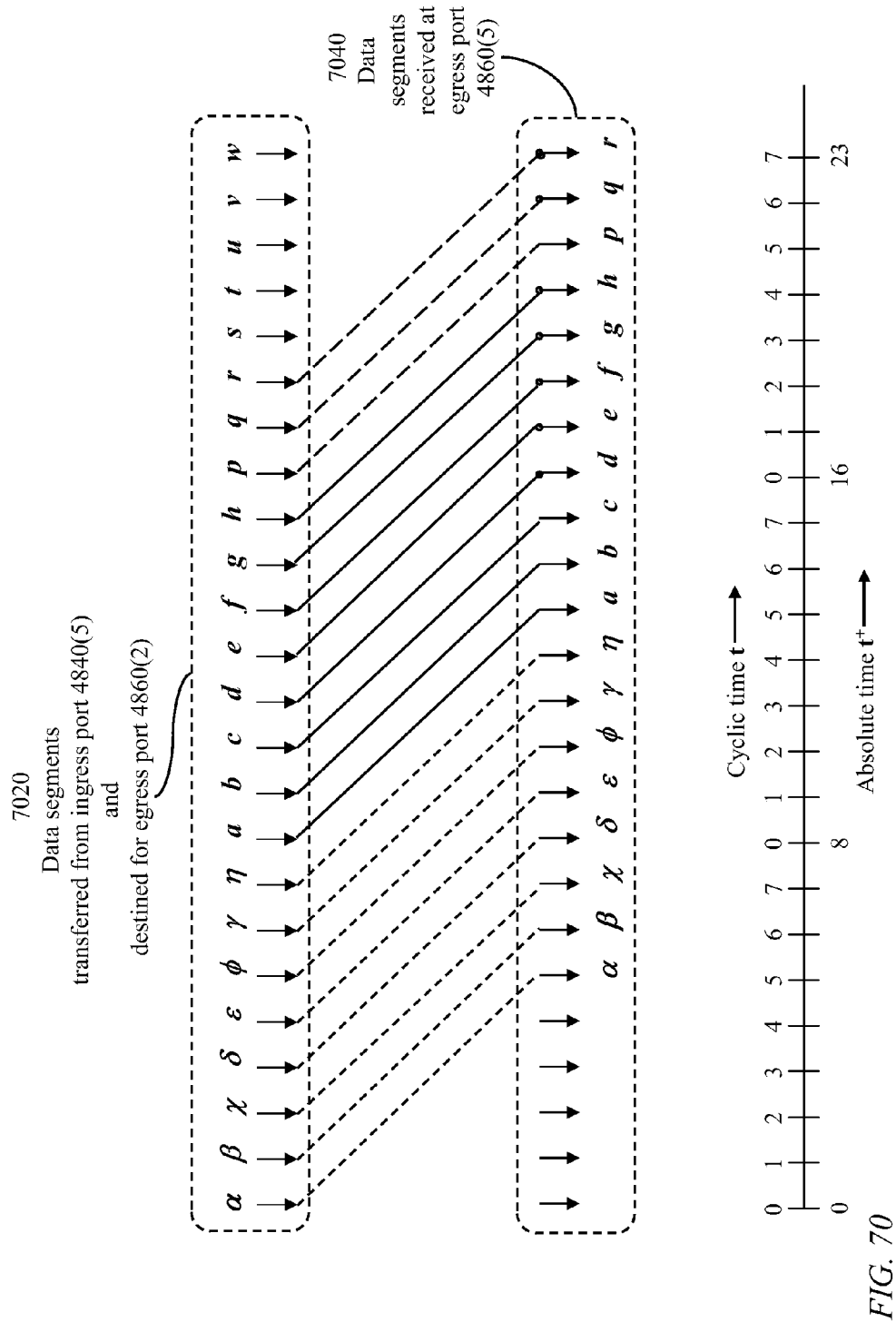
FIG. 70 illustrates preservation of data order in a single-rotator latent space switch using a descending rotator, where each transit memory device is connected to a transposed inlet-outlet pair, in accordance with an embodiment of the present invention.

FIG. 70 illustrates preservation of data order in a single-rotator latent space switch using a descending rotator, where each transit memory device is connected to a transposed inlet-outlet. A set 7020 of data segments transferred from an ingress port to an egress port is received as a delayed set 7040 which preserves the order of the data segments. As illustrated, consecutive data segments labeled "a, b, c, d, e, f, g, h" transferred from ingress port 4840(5) at time instants 8 to 15 are received in proper order at egress port 4860(2) at time instants 13 to 20, with a constant systematic switching delay of $D=(k-j)_{modulo\ N}$ (j=5, k=2, N=8, D=5).

Figure 71:
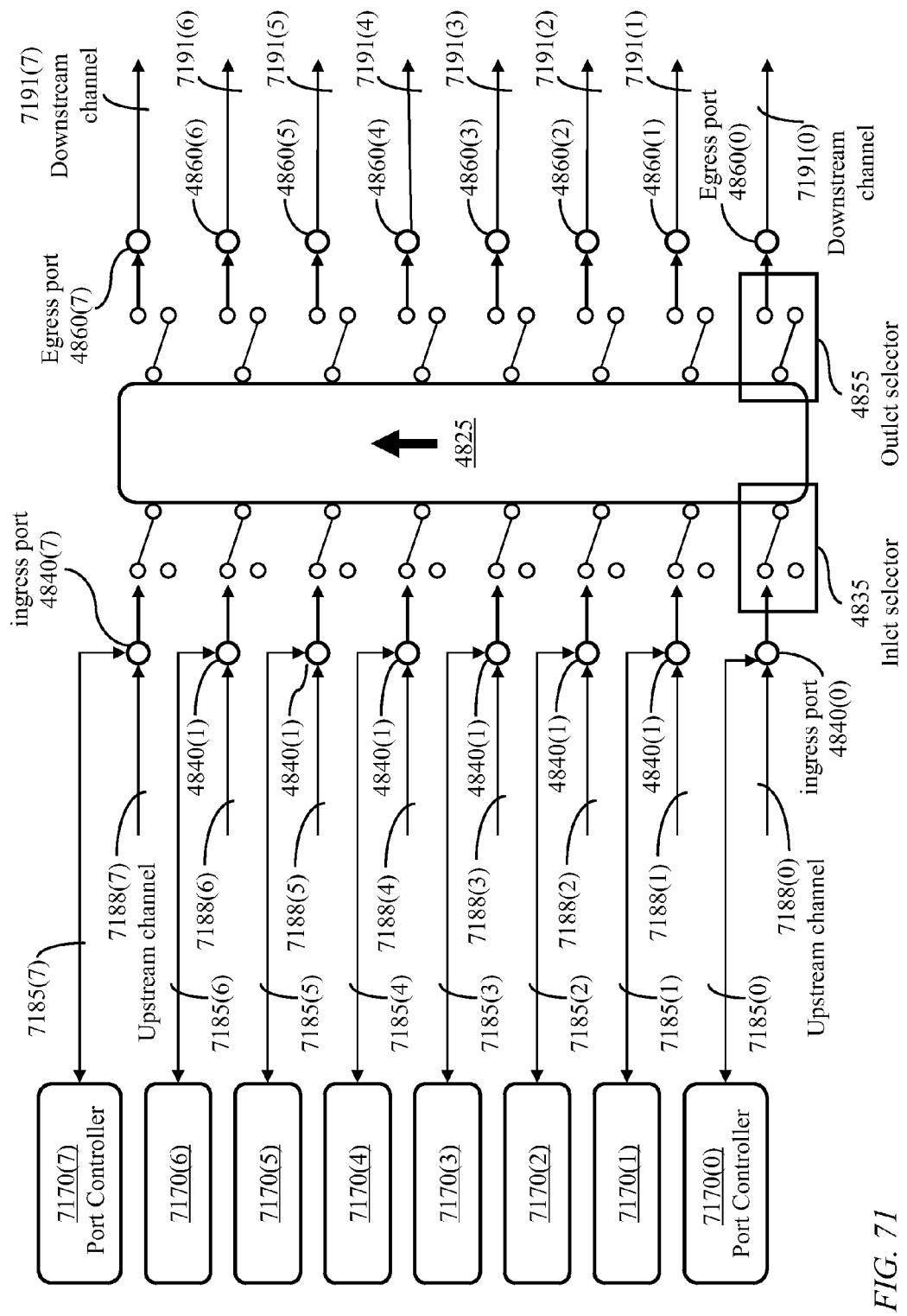
FIG. 71 illustrates port controllers each coupled to an ingress port of the single-rotator latent space switch of FIG. 48, where the ingress port and an aligned egress port connect to an inlet selector and an aligned outlet selector, in accordance with an embodiment of the present invention.

Each ingress port 4840(j) is integrated with an egress port 4860(j), 0≤j<N, to form an integrated access port accessible to external network elements, such as edge nodes. FIG. 71 illustrates port controllers 7170, individually referenced as 7170(0), 7170(1), . . . , 7170(7), connecting to ingress ports 4840 of the single-rotator latent space switch of FIG. 48 or FIG. 50. Each port controller 7170(j) has a dual channel 7185(j) to an ingress port 4840(j), 0≤j<N=8. The egress ports 4860 connect to outlet selectors of likewise indexed outlets. Thus, egress port 4860(0) connects to the outlet selector of outlet 4826(0), egress port 4860(1) connects to the outlet selector of outlet 4826(1), etc. Each ingress port 4840(j) has a likewise-indexed upstream channel 7188(j) carrying data from respective edge nodes or other data sources. Each egress port 4860(k) has a likewise-indexed downstream channel 7191(k) carrying switched data to respective edge nodes or other data sinks.

Figure 72:
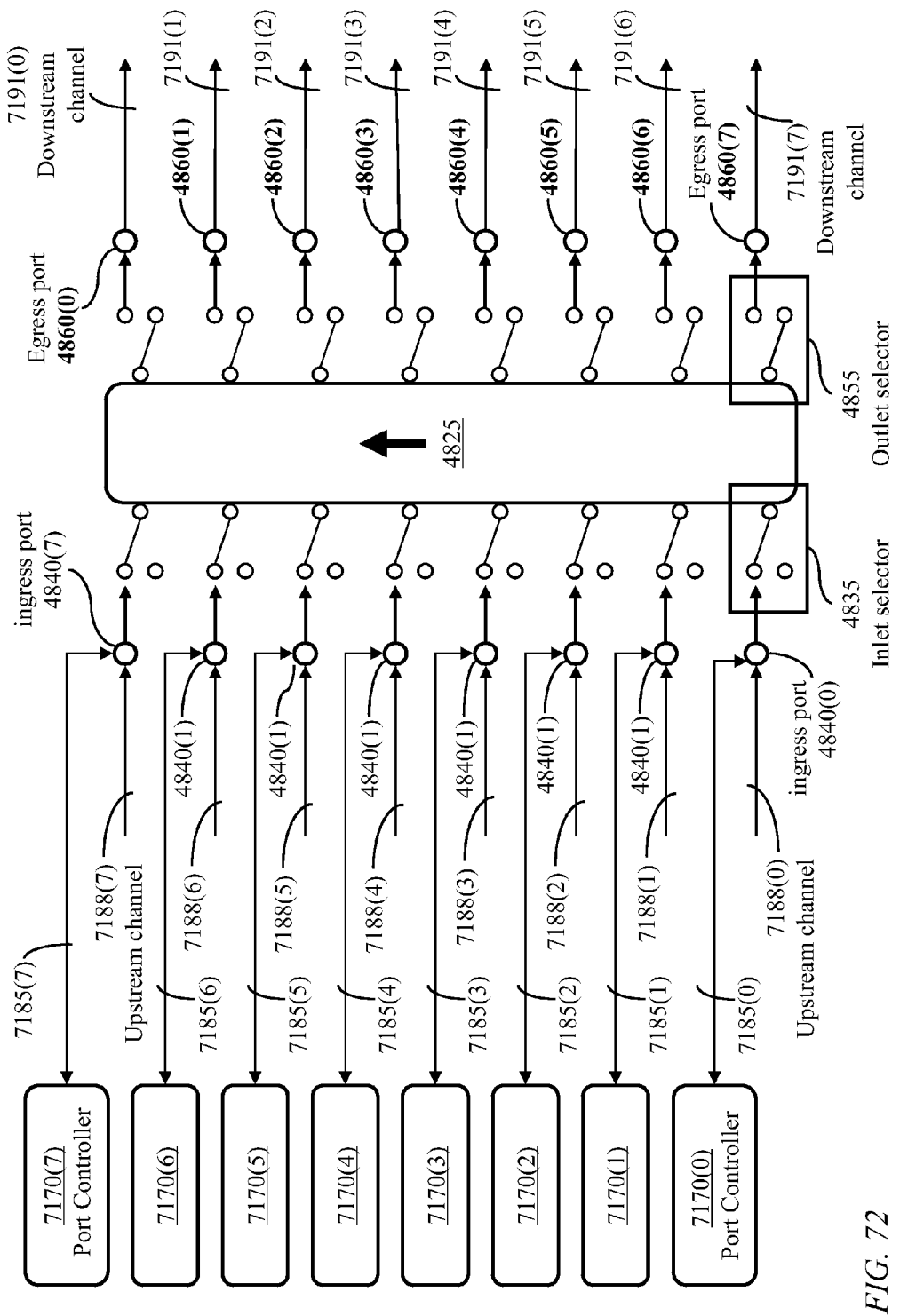
FIG. 72 illustrates port controllers each coupled to an ingress port of the single-rotator latent space switch of FIG. 53 or FIG. 54, where the ingress port and an aligned egress port connect to an inlet selector and a transposed outlet selector, in accordance with an embodiment of the present invention.

FIG. 72 illustrates the port controllers' connectivity of configuration of FIG. 71 applied to a configuration where each egress port 4860 connects to an outlet selector of an outlet of a transposed index. Thus, with a transposition order L of 7, egress port 4860(0) connects to the outlet selector of outlet 4826(7), egress port 4860(1) connects to the outlet selector of outlet 4826(6), etc.

Figure 73:
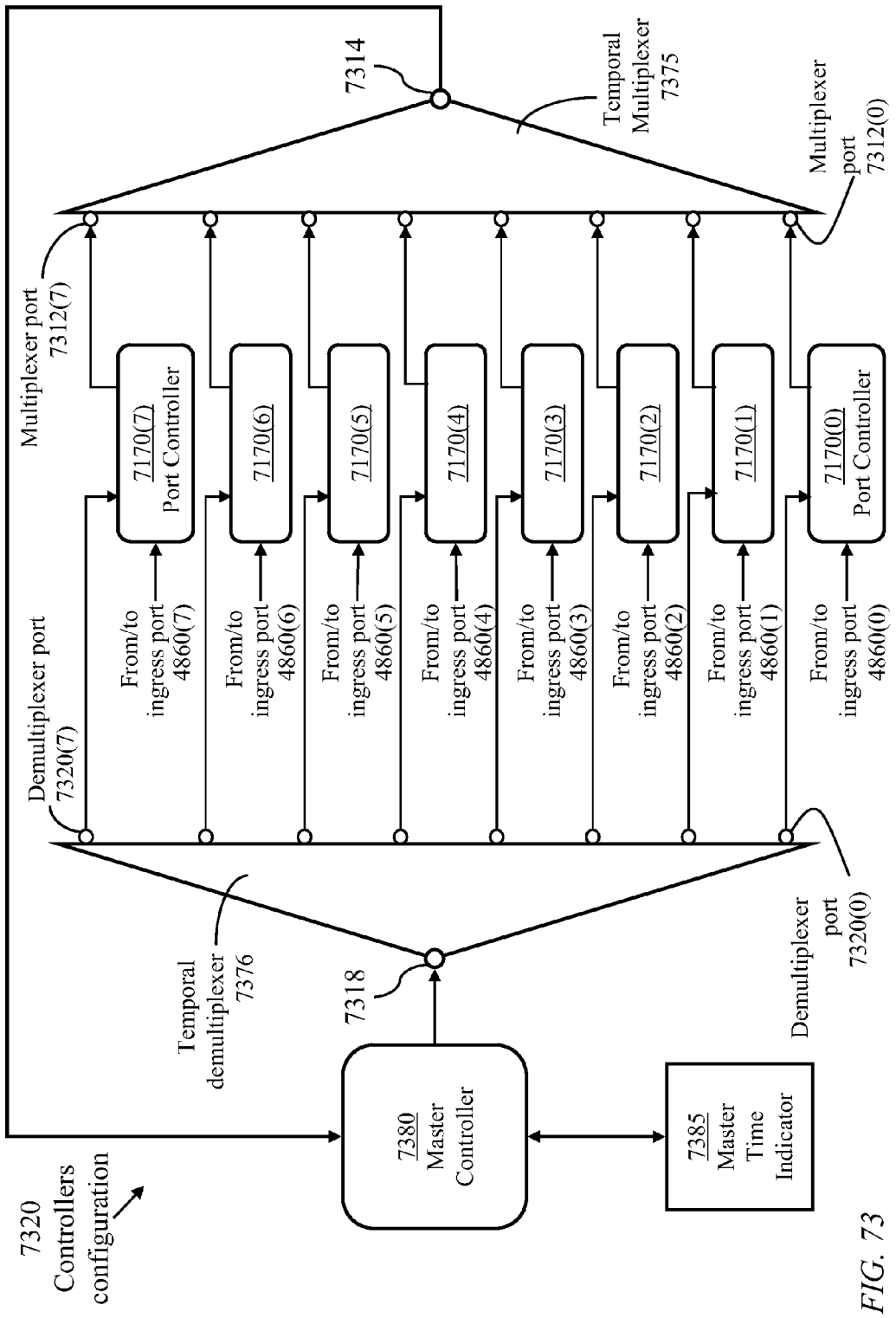
FIG. 73 illustrates a master controller for the single-rotator latent space switch of any of FIG. 48, 50, or 53, the master controller cyclically accesses the port controllers through a temporal multiplexer and a temporal demultiplexer, in accordance with an embodiment of the present invention.

FIG. 73 illustrates a master controller for the single-rotator latent space switch of any of FIG. 48, 50, or 53. The master controller cyclically accesses the port controllers 7170 through a temporal multiplexer 7375 and a temporal demultiplexer 7376. The temporal multiplexer 7375 has N multiplexer input ports 7312(0), 7312(1), . . . , 7312(N−1) and one multiplexer output port 7314 connecting to master controller 7380. The temporal demultiplexer 7376 has one demultiplexer input port 7318 connecting to master controller 7380 and N demultiplexer output ports 7320(0), 7320(1), ..., 73220(N−1). Each port controller 7170 has a channel to a multiplexer port 7312 and a channel from a demultiplexer port 7320. A master time indicator 7385 is coupled to the master controller and provides a reference time to be distributed by master controller 7380 to port controllers 7170 which, in turn, provide the reference time to external devices connecting to the port controllers 7170.

Figure 74:
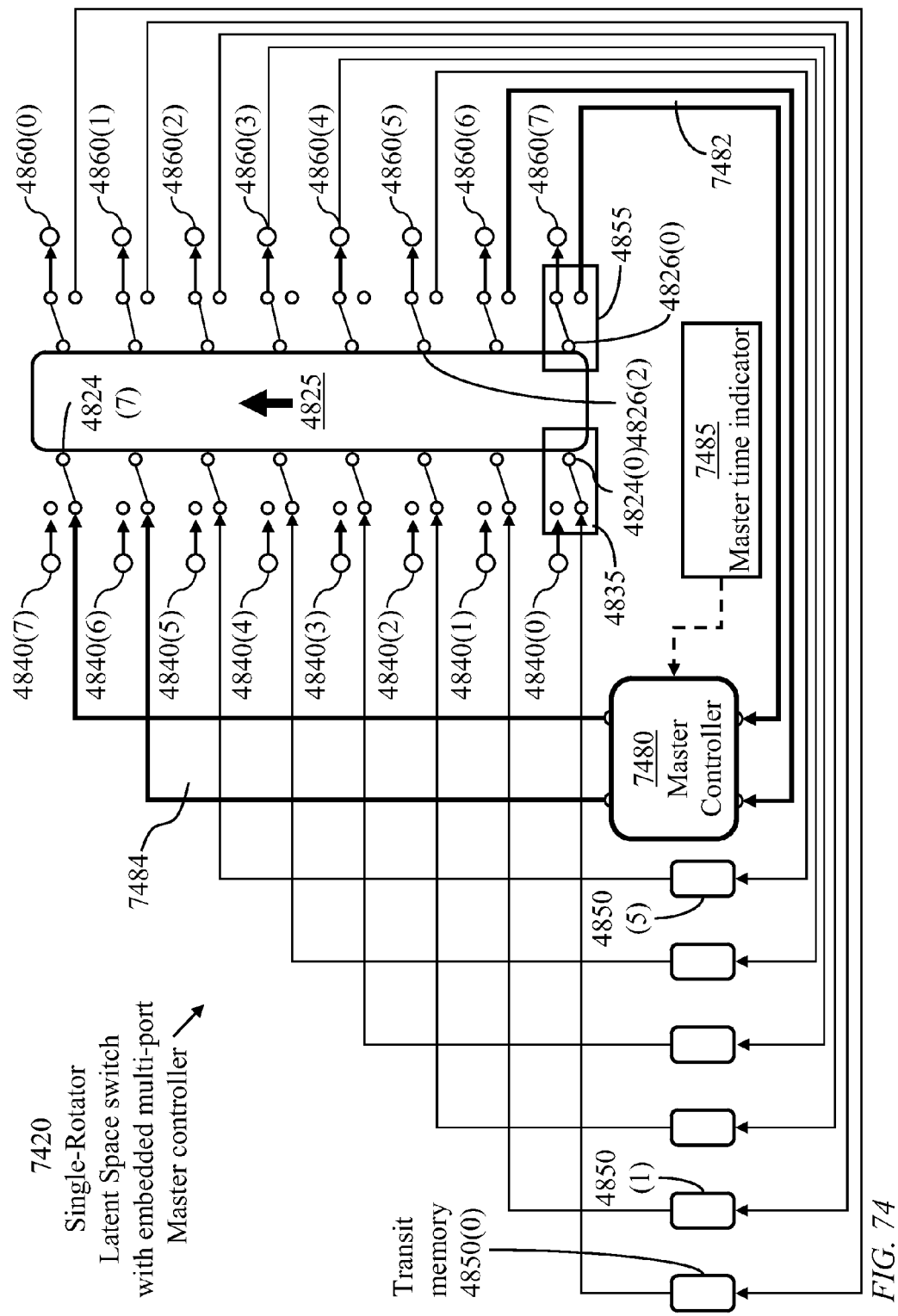
FIG. 74 illustrates a latent space switch having an embedded master controller connecting to two selected inlets, through respective inlet selectors, and corresponding transposed outlets, through respective outlet selectors, in accordance with an embodiment of the present invention.

A master controller may access port controllers 7170 through the single rotator, thus eliminating the multiplexer 7375 and the demultiplexer 7376. The master controller may connect to at least one inlet selector and at least one outlet selector. The ingress ports 4840 are individually integrated with respective egress ports 4860. Thus, a master controller may receive control signals from a specific ingress port 4840 through the single rotator 4825 and send control signals to an egress port integrated with the specific ingress port through the single rotator. FIG. 74 illustrates a latent space switch having an embedded master controller 7480 connecting to two selected inlets and corresponding transposed outlets of the latent space switch of FIG. 54. An upstream control channel 7482 connecting an outlet selector to master controller 7480 carries control signals from ingress ports 4840 through the rotator and a downstream control channel 7484 carries control signals from master controller 7480, through the rotator, to egress ports 4860 which are individually integrated with respective ingress ports. Such an arrangement has the advantage of enabling the master controller 7480 to connect to multiple inlets and multiple outlets, through respective inlet selectors and outlet selectors. When the number N of inlets, or outlets, is relatively large, for example for N>4000, the flow rate of control signals exchanged between the single-rotator latent space switch and external network elements connecting to the ingress ports 4840 and egress ports 4860 may require multiple upstream control channels 7482 to the master controller and multiple downstream control channels 7484 from the master controller. The upstream control channels 7482 and the downstream control channels preferably connect to transposed sets of inlet selectors and outlet selectors. For example, upstream control channels 7482 connect to outlet selectors of outlets 4826(0) and 4826(1) and downstream control channels 7484 connect to inlet selectors of inlets 4824(6) and 4824(7). Outlet 4826(0) and inlet 4824(7) are transposed with respect to each other; the transposition order of the configuration of FIG. 74 is L=7. Likewise, outlet 4826(1) and inlet 4824(6) are transposed with respect to each other.

A master time indicator 7485 is coupled to the master controller 7480 and provides a reference time to be distributed by master controller 7480 to egress ports 4860 which, in turn, provide the reference time to external devices.

Figure 75:
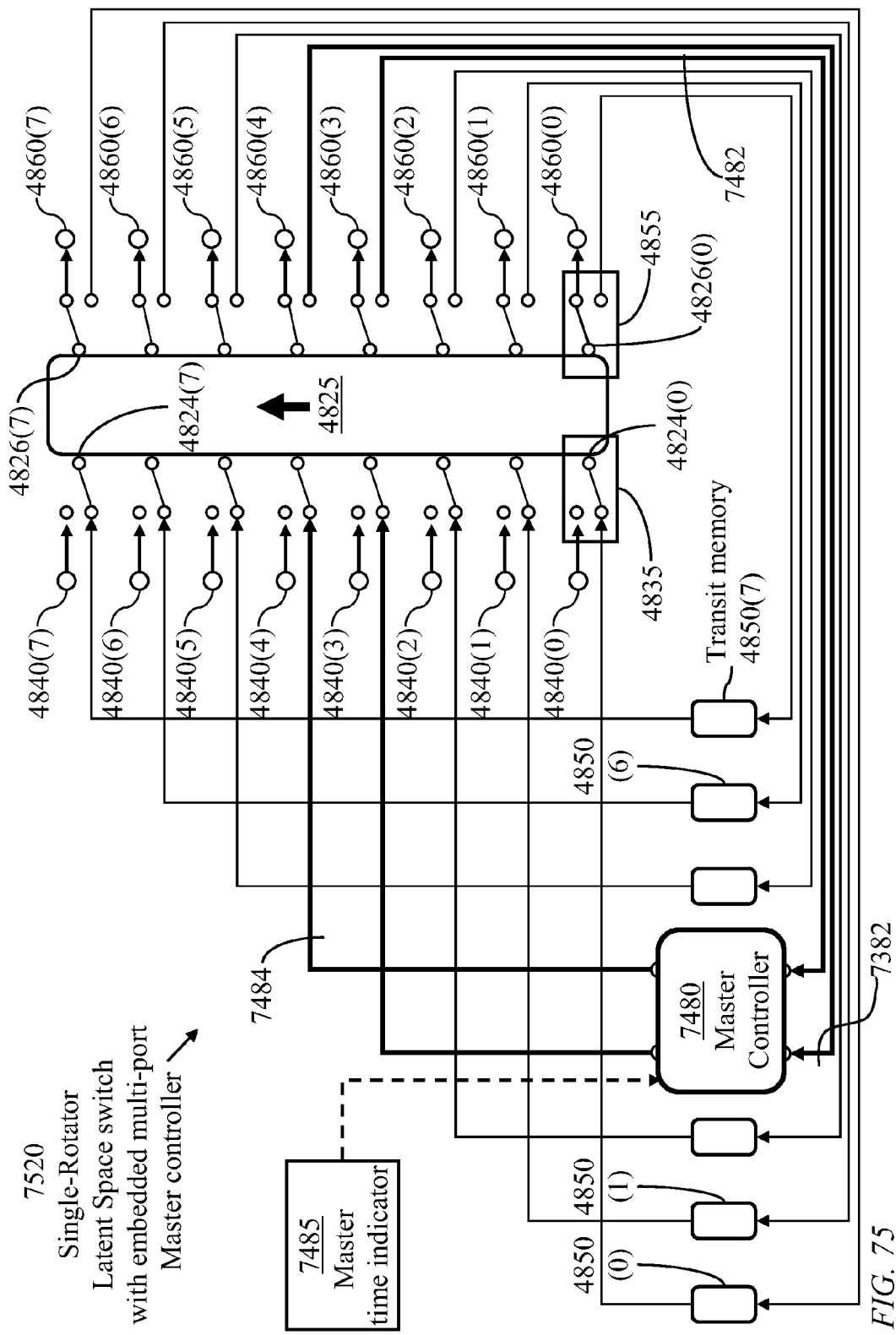
FIG. 75 illustrates a latent space switch similar to the latent space switch of FIG. 74 but with the embedded master controller connected differently to the rotator.

The master controller 7480 may connect to any inlet and a corresponding transposed outlet. FIG. 75 illustrates a connectivity pattern of the master controller 7480 of FIG. 74 where the upstream channels 7482 connect to outlet selectors of outlets 4826(3) and 4826(4) and the downstream control channels 7484 connect to inlet selectors of inlets 4824(3) and 4824(4). With L=7, outlet 4826(4) and inlet 4824(3) are transposed with respect to each other, and outlet 4826(3) and inlet 4824(4) are transposed with respect to each other. The latent space switch 7520 of FIG. 75 has an embedded master controller 7480 connecting to inlets 4824(3) and 4824(4), through respective inlet selectors, and corresponding transposed outlets 4826(4) and 4826(3), through respective outlet selectors.

Figure 76:
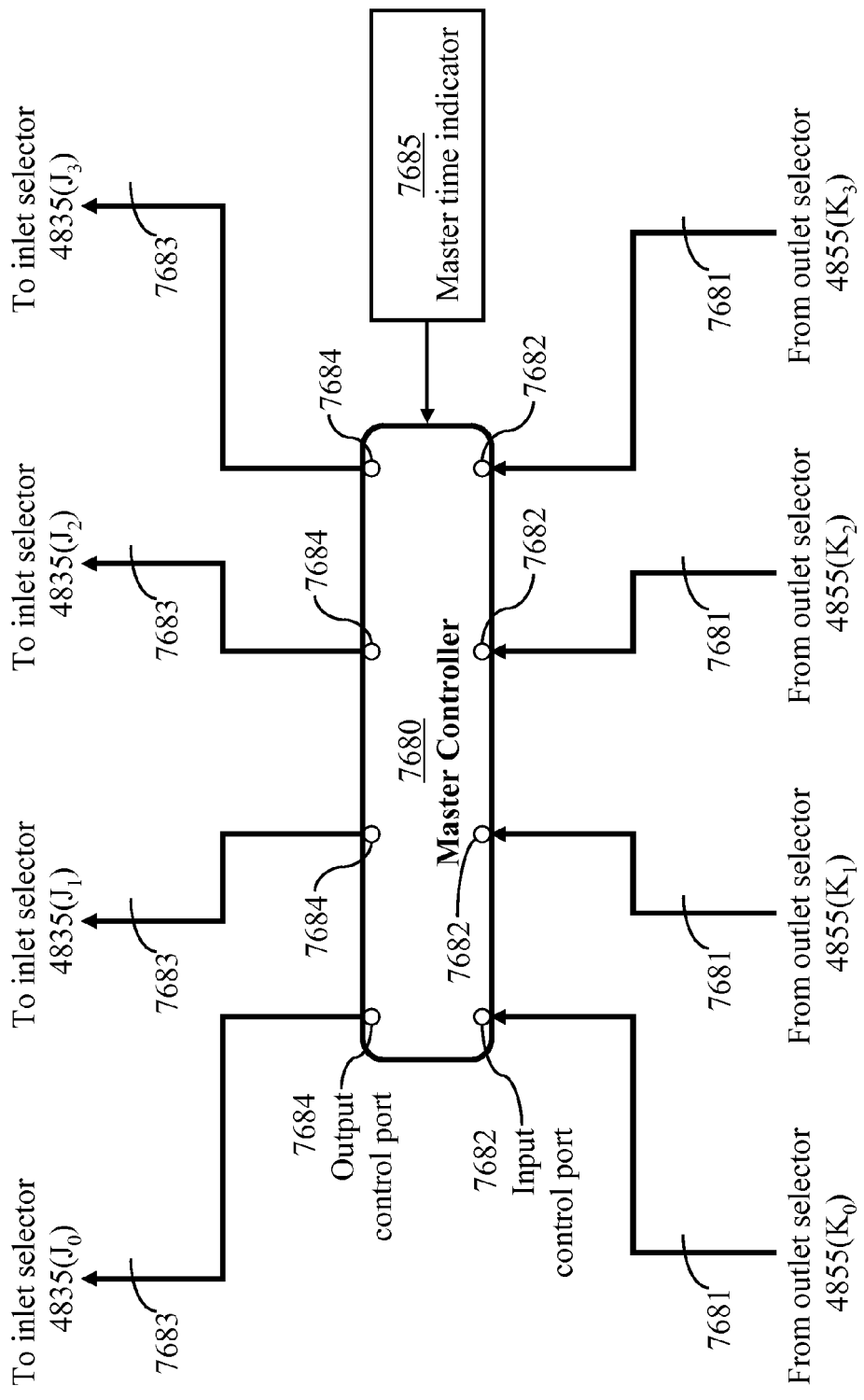
FIG. 76 illustrates a master controller connecting to four inlet selectors and corresponding transposed outlet selectors in a single-rotator latent space switch, of any of the configurations of FIGS. 48, 50, 52, 53, and 54 in accordance with an embodiment of the present invention.

FIG. 76 illustrates a master controller 7680 connecting to four inlet selectors and corresponding transposed outlet selectors in a single-rotator space switch of any of the configurations of FIGS. 48, 50, 52, 53 and 54. Four upstream control channels 7681, carrying control signals received from ingress ports 4840(0) to 4840(N−1) through the rotator 4825, connect four control outlets 4826($K_0$), 4826($K_1$), 4826($K_2$), 4826($K_3$), through respective outlet selectors 4855, to input control ports 7682 of the master controller 7680. Four downstream control channels 7683 connect output control ports 7684 of master controller 7680 to four control inlets 4824($J_0$), 4824($J_1$), 4824($J_2$), 4824($J_3$), through respective inlet selectors 4835. In general, the master controller 7680 may connect to a set of $\Omega$, $\Omega \geq 1$, control inlets and a set of $\Omega$ control outlets. Preferably the set of control inlets and the set control outlets are selected to be transposed sets so that each control inlet has a corresponding transposed control outlet. For example, with $\Omega=4$, the indices $J_0$, $J_1$, $J_2$, and $J_3$ of the control inlets and the indices $K_0$, $K_1$, $K_2$, and $K_3$ of the control outlets may be selected so that: $(J_0+K_0)=(J_1+K_1)=(J_2+K_2)=(J_3+K_3)=L$, L being a transposition index, $0 \leq L < N$. Preferably, the four control outlets are evenly spread so that $|K_1-K_0|$, $|K_2-K_2|$, $|K_3-K_2|$, and $|K_0-K_3|$ are equal or differ slightly.

The order of pairing control inlets and control outlets is arbitrary; for example the transposition of the set of control inlets and control outlets may be realized with:

$$(J_0+K_2)_{modulo\ N} = (J_1+K_3)_{modulo\ N} = (J_2+K_0)_{modulo\ N} = (J_3+K_1)_{modulo\ N} = L.$$

When the number N of inlets (or outlets) is large, master controller 7680 would have multiple input control ports 7682 and multiple output control ports 7684. The single rotator of FIG. 76 has 2048 inlets and 2048 outlets. With four upstream control channels, the indices $K_0$, $K_1$, $K_2$, and $K_3$ are selected to be 0, 512, 1024, and 1536. With L=(N−1), the corresponding indices of the transposed inlets $J_0$, $J_1$, $J_2$, and $J_3$ are (2047−0), (2047−512=1535), (2047−1024=1023), and (2047−1536=511), respectively.

A master time indicator 7685 is coupled to the master controller 7680. Master time indicator 7685 provides a reference time which may be distributed by master controller 7680 to egress ports 4860 which, in turn, may provide the reference time to external devices.

Figure 77:
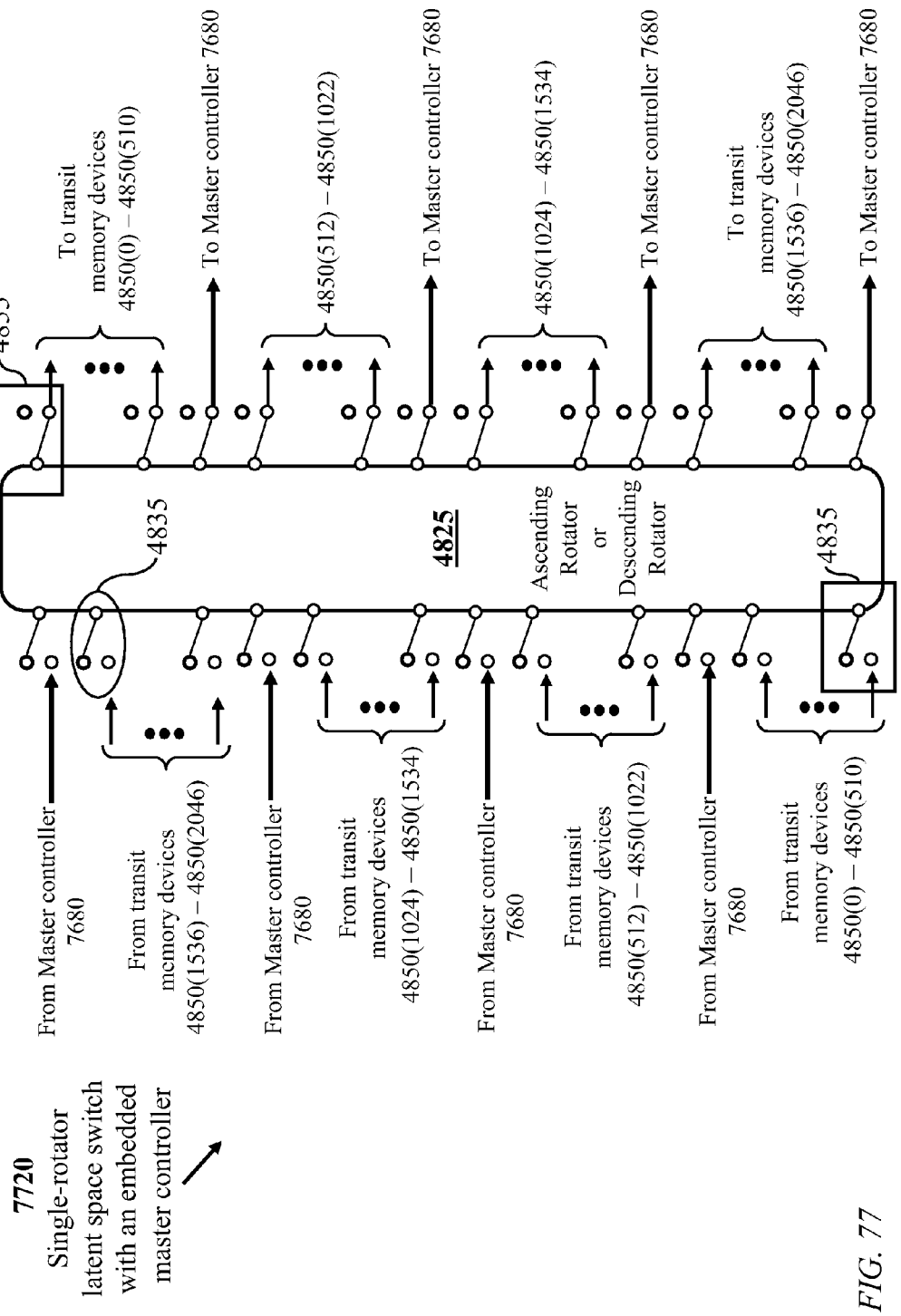
FIG. 77 illustrates connectivity of a rotator having 2048 inlets and 2048 outlets to the multi-port master controller of FIG. 76 and to transit memory devices, in accordance with an embodiment of the present invention.

FIG. 77 illustrates connectivity of a rotator having 2048 inlets and 2048 outlets to the master controller of FIG. 76 and to transit memory devices. The outlets connecting to upstream control channels 7681, through respective outlet selectors, have indices 0, 512, 1024, and 1536. The inlets to which the four downstream control channels 7683 connect through respective inlet selectors have indices 2047, 1535, 1023, and 511. Rotator 4825 of FIG. 77 supports N ingress ports and N egress ports, and (N−4) transit memory devices 4850. A transit-memory device 4850 and an ingress port alternately connect to a respective inlet 4824(j). A transposed outlet 4826(L−j) alternately connects to the transit-memory device and an egress port.

Figure 78:
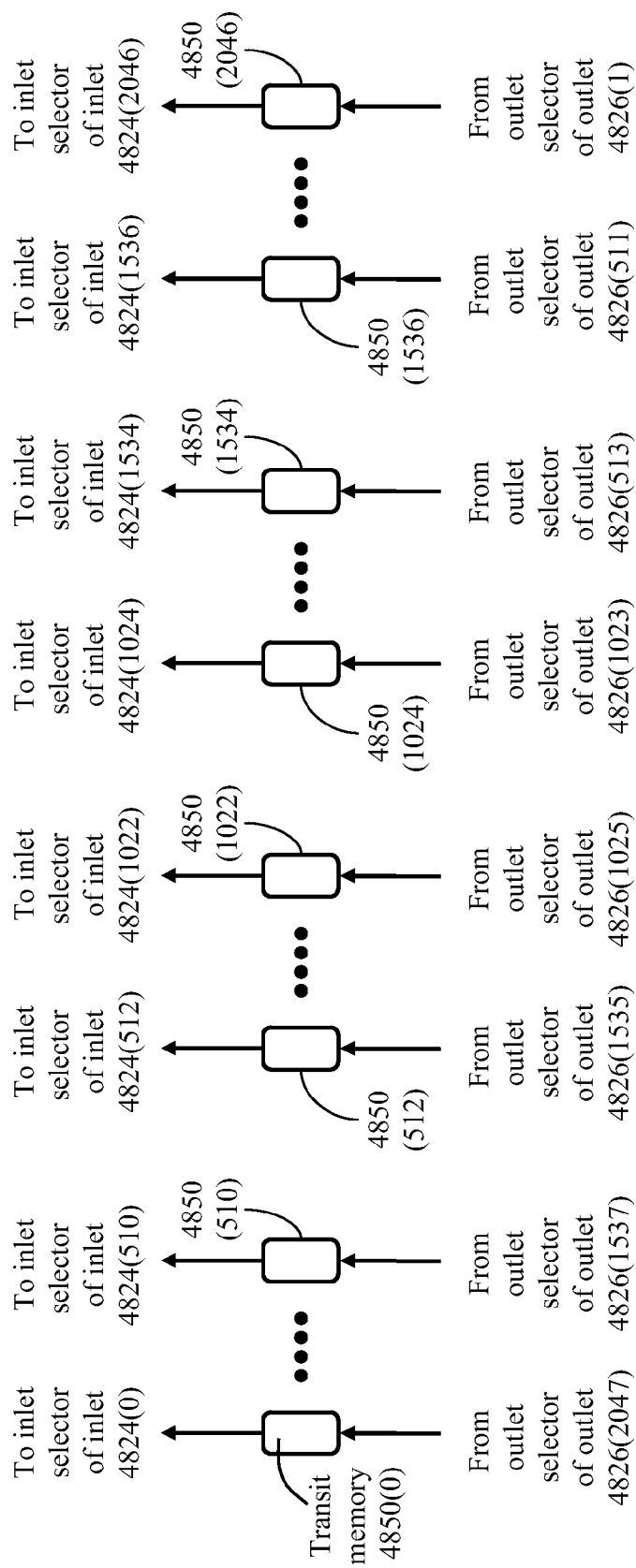
FIG. 78 illustrate connectivity of transit memory devices in a single-rotator space switch having 2048 inlets and 2048 outlets, hence 2048 inlet selectors and 2048 outlet selectors, where 2044 transit memory devices are arranged into four groups each connecting to consecutive inlet selectors and corresponding transposed outlet selectors so that the master controller of FIG. 76 connects to evenly spaced inlet selectors and corresponding evenly spaced outlet selectors, in accordance with an embodiment of the present invention.

FIG. 78 illustrates connectivity of transit memory devices in a single-rotator space switch having 2048 inlets, 2048 outlets, 2048 inlet selectors, and 2048 outlet selectors. With master controller 7680 connecting to four inlet selectors and corresponding transposed outlet selectors, 2044 transit memory devices 4850 connect to 2044 inlet selectors and 2044 outlet selectors. The transit memory devices are arranged into four groups each connecting to consecutive inlet selectors and corresponding transposed outlet selectors so that the master controller of FIG. 76 connects to evenly spaced inlet selectors and corresponding evenly spaced outlet selectors. Transit-memory devices 4850(0) to 4850(510) connect to inlet selectors 4835(0) to 4835(510) and corresponding transposed outlet selectors 4855(2047) to 4855(1537). Transit-memory devices 4850(512) to 4850(1022) connect to inlet selectors 4835(512) to 4835(1022) and corresponding transposed outlet selectors 4855(1535) to 4855(1025). Transit-memory devices 4850(1024) to 4850(1534) connect to inlet selectors 4835(1024) to 4835(1534) and corresponding transposed outlet selectors 4855(1023) to 4855(513). Transit-memory devices 4850(1536) to 4850 (2046) connect to inlet selectors 4835(1536) to 4835 (2046) and corresponding transposed outlet selectors 4855(511) to 4855(1).

WRITE and READ addresses

The single-rotator latent space switches of FIG. 48 or FIG. 50 use a rotator having 8 inlets and 8 outlets (N=8). Each of 8 transit memory devices 4850 connects to a transposed inlet-outlet pair with a transposition order of 7 (L=7). During time-slot 0 (t=0), an inlet 4824(j) connects to outlet 4826(j). With rotator 4825 operated as an ascending rotator the systematic switching delay for a connection from ingress port 4840(j) to egress port 4860(k) is determined as $\{j+k-L\}_{modulo\ N}$.

Preferably, each transit memory device 4850 is logically divided into N memory divisions, each memory division for holding data directed to a respective egress port. In the arrangement of FIG. 48, a transit memory device 4850(m), connects to outlets m, $(m+1)_{modulo\ N}$, $(m+2)_{modulo\ N}$, ..., $(m+N-1)_{modulo\ N}$, during time slots 0, 1, ..., (N−1). With memory divisions of equal lengths, a memory-READ address of a transit-memory device 4850(m) during a time slot t, 0≤t<N, is then proportional to $(m+t)_{modulo\ N}$. An up-counter, reset to state (L−m) during time slot 0 of a time frame of N time slots, may be coupled to a transit-memory device 4850(m) to provide an indication of memory-READ addresses during each time slot of the time frame.

Table-3, below, indicates states of up-counters coupled to the transit-memory devices 4850(m), 0≤m<N, of the single-rotator latent space switch of FIG. 48.)

TABLE 3 up-counter states during a time frame, configuration 4820, ascending rotator

| | Indices of egress ports connecting to memory device 4850(m): | | | | | | |
|---|---|---|---|---|---|---|---|
| t | m = 0 | m = 1 | m = 2 | m = 3 | m = 4 | m = 5 | m = 6 | m = 7 |
| 0 | 7 | 6 | 5 | 4 | 3 | 2 | 1 | 0 |
| 1 | 0 | 7 | 6 | 5 | 4 | 3 | 2 | 1 |
| 2 | 1 | 0 | 7 | 6 | 5 | 4 | 3 | 2 |
| 3 | 2 | 1 | 0 | 7 | 6 | 5 | 4 | 3 |
| 4 | 3 | 2 | 1 | 0 | 7 | 6 | 5 | 4 |
| 5 | 4 | 3 | 2 | 1 | 0 | 7 | 6 | 5 |
| 6 | 5 | 4 | 3 | 2 | 1 | 0 | 7 | 6 |
| 7 | 6 | 5 | 4 | 3 | 2 | 1 | 0 | 7 |

For the switch configuration of FIG. 53, with N=8, transposition order L of 7, and using an ascending rotator which connects inlet j to outlet k, $k=\{j+t\}_{modulo\ N}$, the transit delay (i.e., the systematic switching delay) for a connection from inlet j to outlet k equals $\{j-k\}_{modulo\ N}$.

The single-rotator latent space switches of FIG. 53 is similar to the single-rotator latent space switches of FIG. 50 except that each outlet 4826(k) accesses an egress port 4860 (L−k), where the transposition order L equals N−1=7. With rotator 4825 operated as an ascending rotator the systematic switching delay for a connection from ingress port 4840(j) to egress port 4860(k) is determined as $\{j-k\}_{modulo\ N}$.

A down-counter, reset to state m during time slot 0 of a time frame of N time slots, may be coupled to a transit-memory device 4850(m) to provide an indication of memory-READ addresses during each time slot of the time frame. Table-4, below, indicates states of down-counters coupled to the transit-memory devices 4850(m), 0≤m<N, of the single-rotator latent space switch of FIG. 53.

TABLE 4 down-counter states during a time frame, configuration 5320, ascending rotator

| | Indices of egress ports connecting to memory device 4850(m): | | | | | | |
|---|---|---|---|---|---|---|---|
| t | m = 0 | m = 1 | m = 2 | m = 3 | m = 4 | m = 5 | m = 6 | m = 7 |
| 0 | 0 | 1 | 2 | 3 | 4 | 5 | 6 | 7 |
| 1 | 7 | 0 | 1 | 2 | 3 | 4 | 5 | 6 |
| 2 | 6 | 7 | 0 | 1 | 2 | 3 | 4 | 5 |
| 3 | 5 | 6 | 7 | 0 | 1 | 2 | 3 | 4 |
| 4 | 4 | 5 | 6 | 7 | 0 | 1 | 2 | 3 |
| 5 | 3 | 4 | 5 | 6 | 7 | 0 | 1 | 2 |
| 6 | 2 | 3 | 4 | 5 | 6 | 7 | 0 | 1 |
| 7 | 1 | 2 | 3 | 4 | 5 | 6 | 7 | 0 |

With rotator 4825 operated as a descending rotator in the configuration of FIG. 48, the systematic switching delay for a connection from ingress port 4840(j) to egress port 4860(k) is determined as $\{L-j-k\}_{modulo\ N}$.

A down-counter, reset to state (L−m) during time slot 0 of a time frame of N time slots, may be coupled to a transit-memory device 4850(m) to provide an indication of memory-READ addresses during each time slot of the time frame. Table-5, below, indicates states of down-counters coupled to the transit-memory devices 4850(m), 0≤m<N, of the single-rotator latent space switch of FIG. 48.

TABLE 5 down-counter states during a time frame, configuration 4820, descending rotator

| | Indices of egress ports connecting to memory device 4850(m): | | | | | | |
|---|---|---|---|---|---|---|---|
| t | m = 0 | m = 1 | m = 2 | m = 3 | m = 4 | m = 5 | m = 6 | m = 7 |
| 0 | 7 | 6 | 5 | 4 | 3 | 2 | 1 | 0 |
| 1 | 6 | 5 | 4 | 3 | 2 | 1 | 0 | 7 |
| 2 | 5 | 4 | 3 | 2 | 1 | 0 | 7 | 6 |
| 3 | 4 | 3 | 2 | 1 | 0 | 7 | 6 | 5 |
| 4 | 3 | 2 | 1 | 0 | 7 | 6 | 5 | 4 |
| 5 | 2 | 1 | 0 | 7 | 6 | 5 | 4 | 3 |
| 6 | 1 | 0 | 7 | 6 | 5 | 4 | 3 | 2 |
| 7 | 0 | 7 | 6 | 5 | 4 | 3 | 2 | 1 |

With rotator 4825 operated as a descending rotator in the configuration of FIG. 53, the systematic switching delay for a connection from ingress port 4840(j) to egress port 4860(k) is determined as $\{k-j\}_{modulo\ N}$.

An up-counter, reset to state m during time slot 0 of a time frame of N time slots, may be coupled to a transit-memory device 4850(m) to provide an indication of memory-READ addresses during each time slot of the time frame. Table-6 below indicates states of up-counters coupled to the transit-memory devices 4850(m), 0≤m<N, of a single-rotator latent space switch of FIG. 53 using a descending rotator.

TABLE 6

Up-counter states during a time frame, configuration 5320, descending rotator

Indices of egress ports connecting to memory device 4850(m):

| t | m = 0 | m = 1 | m = 2 | m = 3 | m = 4 | m = 5 | m = 6 | m = 7 |
|---|---|---|---|---|---|---|---|---|
| 0 | 0 | 1 | 2 | 3 | 4 | 5 | 6 | 7 |
| 1 | 1 | 2 | 3 | 4 | 5 | 6 | 7 | 0 |
| 2 | 2 | 3 | 4 | 5 | 6 | 7 | 0 | 1 |
| 3 | 3 | 4 | 5 | 6 | 7 | 0 | 1 | 2 |
| 4 | 4 | 5 | 6 | 7 | 0 | 1 | 2 | 3 |
| 5 | 5 | 6 | 7 | 0 | 1 | 2 | 3 | 4 |
| 6 | 6 | 7 | 0 | 1 | 2 | 3 | 4 | 5 |
| 7 | 7 | 0 | 1 | 2 | 3 | 4 | 5 | 6 |

As described above, each transit-memory device 4850 may be logically partitioned into N memory sections (memory divisions), each memory section for holding a data segment directed to a respective egress port. During each time slot, an ingress port transfers a data segment destined for an egress port to a memory device to which the ingress port connects through the rotator. The WRITE address of the memory device is a function of the destined egress port and may vary during successive time slots. The occupancy state of the outlet leading to the destined egress port during each time slot is determined by a master controller 5580, 5680, 7380, 7480, or 7680 which oversees the occupancy states of all inlets and all outlets. The master controller selects, for each ingress port, an egress port during each time slot and communicates the selection to the port controller coupled to the ingress port. The port controller may determine a WRITE address and affix the WRITE address to a data segment to be transferred to the destined egress port.

Unlike the WRITE addresses in a memory device 4850 which may vary during successive time slots, the READ addresses are sequential. With each memory device logically partitioned into N sections, each section for storing data directed to a respective egress port of said N egress ports, data segments are read from successive sections during successive time slots. During the N time slots of a time frame, data segments directed to outlets {4826(0), 4826(1), . . . , 4826(N−1)} are read from a memory device of index m, 0≤m<N, from sections m, $(m+1)_{modulo\ N}, \ldots, (m+N-1)_{modulo\ N}$, if the rotator is an ascending rotator or from sections m, $(m-1)_{modulo\ N}, \ldots, (m-N+1)_{modulo\ N}$, if the rotator is a descending rotator. A memory controller of each memory device may be configured to sequentially generate memory addresses of the N sections. An up-counter or a down-counter may be used to determine successive memory-READ addresses as indicated in Table-3, Table-4, Table-5, and Table-6, above.

FIG. 79 illustrates settings of initial states of counters used to provide sequential READ-addresses of transit-memory devices 4850 for switch configurations employing an ascending rotator or a descending rotator and an up-counter or a down-counter. The index of an egress port to which a specific memory device connects during a time slot t is herein denoted E(t), 0≤t<N. A list of {E(0), E(1), . . . , E(N−1)} may be stored in an address memory (not illustrated) associated with a transit-memory device holding payload data segments. Preferably, each transit-memory device 4850(m) acquires N sequential READ addresses from a respective counter of N states triggered each time slot of the time frame.

Considering the configuration of FIG. 48 employing a descending rotator, a down-counter having a state of $(L-m)_{modulo\ N}$ during time slot t=0 of each time frame provides a READ-address for transit-memory device 4850(m) during each time slot. The corresponding systematic switching delay is then $\Delta=(L-j-k)_{modulo\ N}$. Using an up-counter in the configuration of FIG. 48 employing an ascending rotator, the up-counter may have a state of $(L-M)_{modulo\ N}$ during time slot t=0 of each time frame and the corresponding systematic switching delay is then $\Delta=(j+k-L)_{modulo\ N}$.

Considering the configuration of FIG. 53 employing a descending rotator, an up-counter having a state of m during time slot t=0 of each time frame provides a READ-address for transit-memory device 4850(m) during each time slot. The corresponding systematic switching delay is then $\Delta=(k-j)_{modulo\ N}$. Using a down-counter in the configuration of FIG. 53 employing an ascending rotator, the down-counter may have a state of m during time slot t=0 of each time frame and the corresponding systematic switching delay is then $\Delta=(j-k)_{modulo\ N}$.

Figure 80:
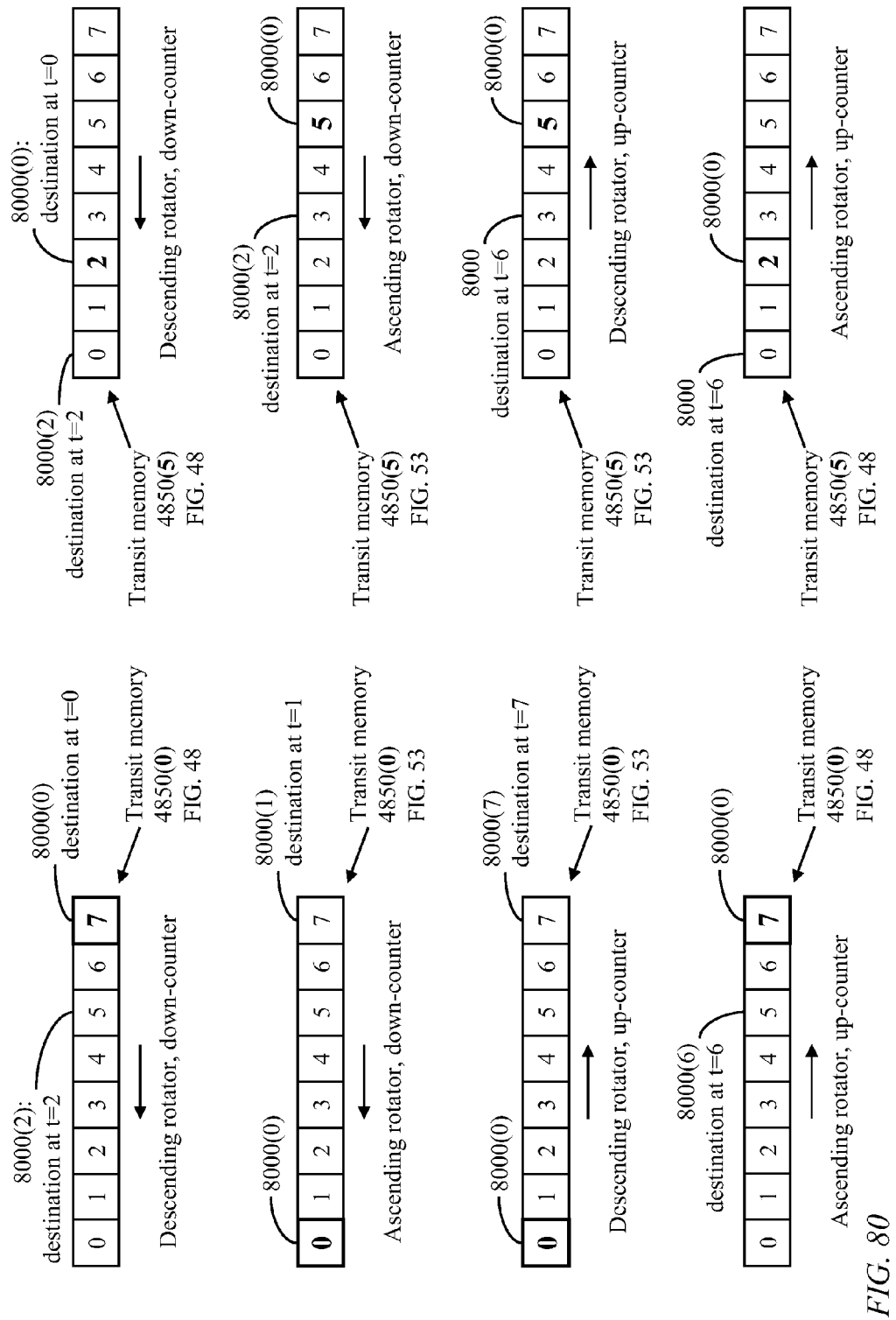
FIG. 80 illustrates settings of initial states of counters for exemplary switch configurations having a small number of dual ingress-egress ports.

FIG. 80 illustrates the counter settings of FIG. 79 for a case of N=8, L=7, m=0 and m=5. Identifiers 8000 of indices E(t) of memory sections to be read during N successive time slots of a time frame are illustrated. Using an ascending rotator and an up-counter in the configuration of FIG. 48, E(0) is set as $(L-m)_{modulo\ N}$, which equals 7 for m=0 and equals 2 for m=5. For m=0, the sections of memory device 4850(0) are read in the sequence 7, 0, 1, 2, 3, 4, 5, and 6 during time slots 0 to 7. For m=5, the sections of memory device 4850(5) are read in the sequence 2, 3, 4, 5, 6, 7, 0, and 1 during time slots 0 to 7.

Using a descending rotator and an up-counter in the configuration of FIG. 53, E(0) is set as m. For m=0, the sections of memory device 4850(0) are read in the sequence 0, 1, 2, 3, 4, 5, 6, and 7 during time slots 0 to 7. For m=5, the sections of memory device 4850(5) are read in the sequence 5, 6, 7, 0, 1, 2, 3, and 4 during time slots 0 to 7.

Using an ascending rotator and a down-counter in the configuration of FIG. 53, E(0) is set as m. For m=0, the sections of memory device 4850(0) are read in the sequence 0, 7, 6, 5, 4, 3, 2, and 1 during time slots 0 to 7. For m=5, the sections of memory device 4850(5) are read in the sequence 5, 4, 3, 2, 1, 0, 7, and 6 during time slots 0 to 7.

Using a descending rotator and a down-counter in the configuration of FIG. 48, E(0) is set as $(L-m)_{modulo\ N}$, which equals 7 for m=0 and equals 2 for m=5. For m=0, the sections of memory device 4850(0) are read in the sequence 7, 6, 5, 4, 3, 2, 1, and 0 during time slots 0 to 7. For m=5, the sections of memory device 4850(5) are read in the sequence 2, 1, 0, 7, 6, 5, 4, and 3 during time slots 0 to 7.

FIG. 81 illustrates indices of upstream control time slots of a time frame organized in 2048 time slots at selected ingress ports of the single rotator of FIG. 77, where the single rotator is an ascending rotator.

An ingress port 4840(j) receives payload data and control data from an edge node or any other external source. Both the payload data and control data are organized into data segments each having a duration of a time slot of N time slots of a repetitive time frame. The master controller 7680 receives upstream control data from the N ingress ports 4840 through a set of Ω, Ω>1, control outlets 4826(K₀), 4826(K₁), . . . , 4826(K_{Ω-1}). The master controller 7680 sends downstream control data, through the rotator, to the N egress ports 4860 from a set of Ω, Ω>1, control inlets 4824(J₀), 4824(J₁), . . . , 4824(J_{Ω-1}).

An ingress port 4840(j), 0≤j<N, accesses the Ω control outlets during upstream control time slots:

$\{(K_0-j)_{modulo\ N}, (K_1-j)_{modulo\ N}, \ldots, (K_{\Omega-1}-j)_{modulo\ N}\}$.

Thus, upstream control data from ingress port 4840(j) to the master controller 7680 interleave payload data during the Ω upstream control time slots. FIG. 81 illustrates the positions of Ω downstream control time slots (with Ω=4) within a time frame of N time slots, with N=2048, for ingress ports 4840(0), 4840(500), 4840(1000), 4840(1500), and 4840(2000). Ingress port 4840(0) accesses control outlets 4826($K_0$), 4826($K_1$), 4826($K_2$), and 4826($K_3$), during time slots 0, 512, 1024, and 1536, respectively. Ingress port 4840 (500) accesses control outlets 4826($K_1$), 4826($K_2$), 4826($K_3$), and 4826($K_0$), during time slots 12, 524, 1036, and 1548, respectively. Likewise, each of ingress ports 4840(1000), 4840(1500), and 4840(2000) accesses Ω control outlets in a respective order. During a time frame, each ingress port 4840(0) to 4840(N−1) accesses each of the Ω control outlets.

FIG. 82 illustrates indices of downstream control time slots of a time frame organized in 2048 time slots at each control inlet port of the single rotator of FIG. 77, where the single rotator is an ascending rotator.

The Ω control inlets access an egress port 4860(k), 0≤k<N, during downstream control time slots:

$$\{(k-J_0)_{modulo\ N}, (k-J_1)_{modulo\ N}, \ldots, (k-J_{\Omega-1})_{modulo\ N}\}.$$

Thus, downstream control data from the master controller 7680 to egress port 4860(k) interleave payload data during the Ω downstream control time slots. FIG. 82 illustrates the positions of Ω downstream control time slots (with Ω=4) within a time frame of N time slots, with N=2048, for egress ports 4860(0), 4860(500), 4860(1000), 4860(1500), and 4860 (2000). Egress port 4860(0) receives downstream control data from control inlets 4824($J_3$), 4824($J_2$), 4824($J_1$), and 4824 ($J_0$), during time slots 1, 513, 1025, and 1537, respectively. Egress port 4860(500) receives downstream control data from control inlets 4824($J_3$), 4824($J_2$), 4824($J_1$), and 4824 ($J_0$), during time slots 501, 1013, 1525, and 2037, respectively. Egress port 4860(1000) receives downstream control data from control inlets 4824($J_0$), 4824($J_3$), 4824($J_2$), and 4824($J_1$), during time slots 489, 1001, 1513, and 2025, respectively. Likewise, each of ingress ports 4840(1500), and 4840(2000) accesses Ω control outlets in a respective order. During a time frame, each of the Ω control inlets accesses each egress port 4860(0) to 4860(N−1). A control inlet 4824 is an inlet which connects, through an inlet selector, to a master controller rather than to a transit memory device. A control outlet 4826 is an outlet which connects, through an outlet selector, to the master controller rather than to a transit memory device.

In a switch configuration of a large dimension, having a large number of ingress ports and egress port, the master controller need be designed to handle control messages received at a high rate. The master controller may be devised to employ multiple coordinated scheduling units, with each scheduling unit having at least one processor. The master controller need also provide multiple input control ports for receiving upstream control messages and multiple output control ports for transmitting downstream control messages.

Figure 83:
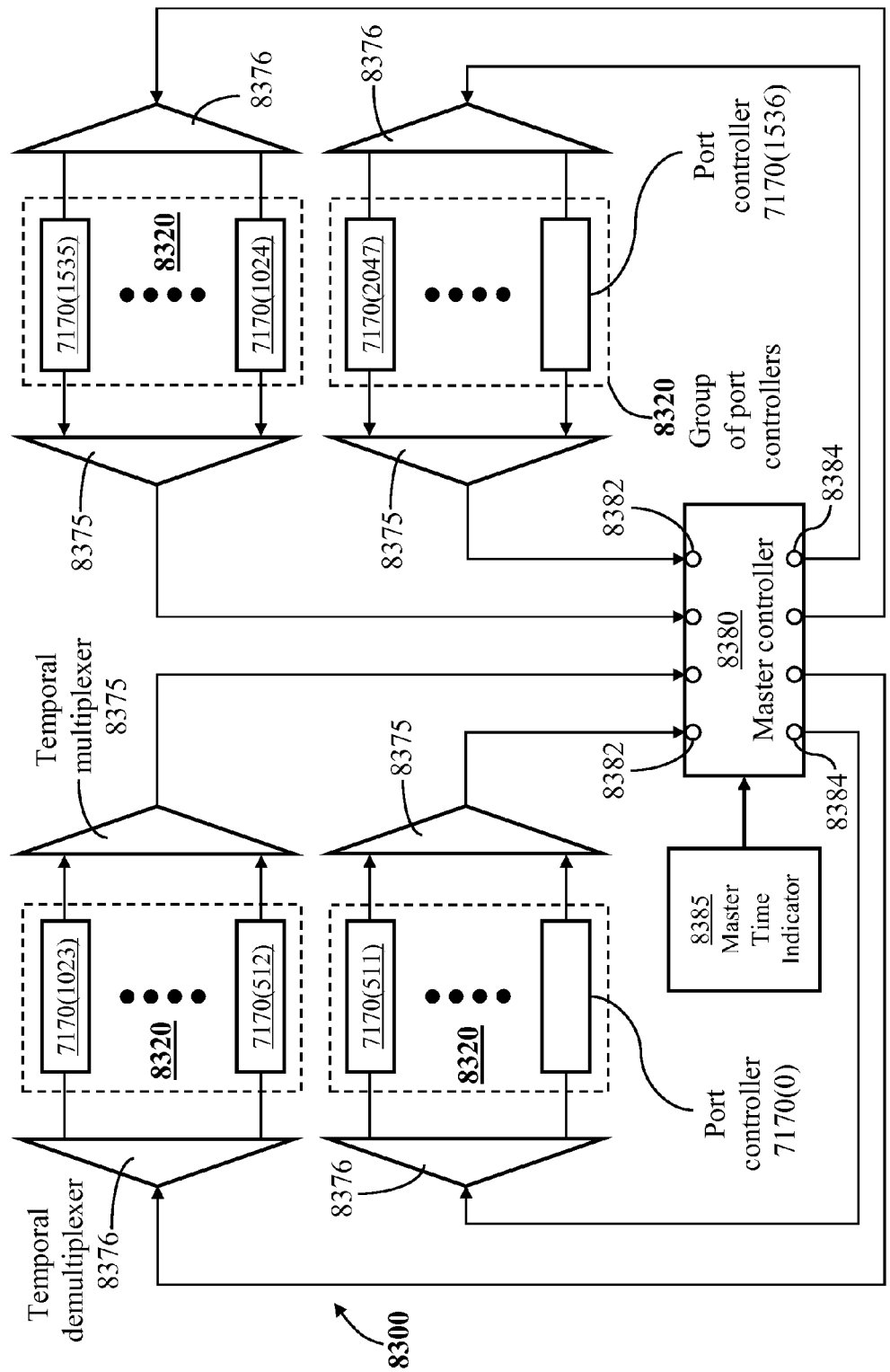
FIG. 83 illustrates a master controller connecting to subsets of port controllers, in accordance with an embodiment of the present invention.

FIG. 83 illustrates a control system 8300 for any of the switch configurations of FIG. 48, 50, 52, 53, or 54. Each of the latent space switches illustrated in FIGS. 48, and 51 to 54 has N ingress ports (4840), each for receiving data from respective external sources and N egress ports (4860), each for transmitting data to respective external sinks. Each ingress port 4840 may be communicatively coupled to a respective egress port 4860 or integrated with the respective egress port 4860 to form an integrated access port. Thus, each ingress port 4840 may share a port controller 7170 with an associated egress port 4860, and a control message directed to a port controller 7170 may be relevant to either the ingress port or the associated egress port.

The control system includes a set of N port controllers 7170 and a master controller 8380. Each access port has a port controller 7170 of the set of N port controllers. The set of port controllers is divided into a number Ω of subsets (groups) of port controllers. The master controller has Ω input control ports 8382 and Ω output control ports 8384, 0<Ω<⌊N/2⌋. The N port controllers are coupled to the master controller 8380 through Ω temporal multiplexers 8375 and Ω temporal demultiplexers 8376. In the illustrated control system 8300, the set of N port controllers is divided into four subsets (four groups) 8320 (Ω=4) and master controller 8380 has four input control ports 8382 and four output control ports 8384.

Each temporal multiplexer 8375 combines upstream control messages originating from a respective subset 8320 of port controllers 7170 and delivers multiplexed outcome to a respective input control port 8382. Each temporal demultiplexer 8376 distributes downstream control signals sent from a respective output control port 8384 to a respective subset 8320 of port controllers 7170.

A master time indicator 8385 is coupled to master controller 8380 for providing a reference-time indication to be distributed by the master controller 8380 to the port controllers 7170 which, in turn, may distribute the reference-time indication to external nodes.

The latent space switch may connect to geographically distributed external nodes where upstream channels from the external nodes to the latent space switch may experience widely varying propagation delays. Preferably, the ingress ports 4840 are not equipped with data buffers. Thus, data sent from external nodes to the ingress ports 4840 should arrive at scheduled time instants. To realize such time alignment, the master controller 8380 is configured to receive a reading of a source time indicator from an external controller and respond to the external controller by sending a corresponding reading of the master time indicator 8385 to enable the external controller to time lock to the master time indicator 8385. It is noted that techniques of time locking one network element to another are known in the art.

Latent Space Switch Configuration with an
Embedded Master Controller

FIGS. 55, 56, 74-78 illustrate configurations of latent space switches (5520, 5620, 7420, 7520, 7720) each using a single uniform rotator 4825 which may be an ascending rotator or a descending rotator.

Rotator 4825 cyclically connects each inlet 4824 of a set of N inlets to each outlet 4826 of a set of N outlets, N>2, during a rotation cycle. Indexing the N inlets as inlets 0 to (N−1), and the N outlets as outlets 0 to (N−1), rotator 4825 connects an inlet of index j, 0≤j<N, to an outlet of index $(j+\beta \times t)_{modulo\ N}$ during a time slot t, 0≤t<N, of a repetitive time frame, where β equals −1 if the rotator is a descending rotator and equals 1 if the rotator is an ascending rotator. Rotator 4825 is a uniform rotator because successive inlets connect to successive outlets during any time slot of the repetitive time frame.

External nodes access the latent space switch through N ingress ports 4840 and N egress ports 4860. Each ingress port is configured to receive connection requests and payload data from a respective set of data sources and each egress port is configured to transmit data to a respective set of data sinks. An ingress port 4840(j) is preferably coupled to a respective egress port 4860(j), 0≤j<N, to form an integrated access port 4840/4860. Thus, the integrated ingress ports and egress ports form N access ports. In the configurations of FIG. 55 and FIG. 56, an ingress port 4840(*j*) connects to inlet 4824(*j*) through an inlet selector and an egress port 4860(*j*) connects to a transposed outlet 4826(L−j) through an outlet selector, where the transposition order L equals 7.

Each access port is equipped with a port controller 7170 as illustrated in FIG. 71. FIG. 71 illustrates port controllers 7170 having dual links 7185 to the ingress ports 4840. However, it is understood that the port controllers may also communicate with the egress ports 4860 because each egress port 4860 is coupled to a respective ingress port 4840.

A set of inlet selectors 4835 and outlet selectors 4855 are coordinated so that during each time slot of the time frame:

(1) each access port combining an ingress port and an egress port alternately (successively) connects to a respective inlet through an inlet selector and a transposed outlet of the respective inlet through an outlet selector;

(2) Each memory device 4850 of a set of M memory devices, M<N, alternately (successively) connects to a respective inlet 4824, for transferring data to a respective destination egress port 4860 through said rotator, and a transposed outlet 4826 of the respective inlet for receiving data from a respective ingress port 4840; and (3) a master controller (5580, 5680, 7480, 7580, or 7680) alternately (successively) connects to a subset of (N−M) inlets 4824 and (N−M) transposed outlets 4826 of the subset of inlets.

Each ingress port is allocated (N−M) upstream control time slots for transferring upstream control messages to the master controller through the rotator and each egress port is allocated (N−M) downstream control time slots for receiving downstream control messages from the master controller.

The master controller sends downstream control messages to the port controllers 7170 through the subset of inlets and the rotator. The N port controllers 7170 send upstream control messages to the master controller through the rotator 4825 and the transposed outlets 4826 of the subset of inlets. The inlets of the subset of inlets connected to the master controller are preferably allocated in circular even spacing. Consequently, the corresponding transposed outlets connecting to the master controller are also evenly spaced. For example, the master controller 7680 of FIG. 76 connects to inlets 4824 of indices 511, 1023, 1535, and 2047 of a rotator having 2048 inlets and 2048 outlets (N=2048) as indicated in FIG. 82. The master controller connects to outlets 4826 of indices 0, 512, 1024, and 1536 as illustrated in FIG. 81.

Each memory device 4850 may hold up to N data segments (data units), each data segment directed to one egress port 4860. Each memory device 4850 may be logically partitioned into N memory sections, each memory section for holding data directed to a respective egress port 4860. This simplifies data transfer from a memory device 4850 to the egress ports; the controller of the memory device simply generates N sequential addresses of the memory sections. The initial memory section to be addressed during time slot 0 of the time frame is specific to each memory device as described with reference to FIGS. 79 and 80. A conventional counter may be used to generate circular sequential addresses for memory sections indexed as 0 to (N−1). An up-counter is used for an ascending rotator and a down-counter is used for a descending rotator.

An ingress port 4840 receives data segment from respective external data sources. The destination egress port of each received data segment is known. With each memory section dedicated to a respective egress port 4860, and with likewise-indexed memory sections for all of the M memory devices, a port controller coupled to ingress port 4840(*j*) may affix memory-WRITE addresses to data segments received at ingress port 4840(*j*).

A port controller 7170 may receive connection requests from data sources, or receive data from the data sources, categorize the data into data streams, and formulate respective connection requests. In either case, the port controller sends connection requests to the master controller and waits for indications of allocated memory devices for each connection.

A master time indicator (7385, 7485, or 7685) may be coupled to the master controller for providing a reference time indication to be distributed to external devices through the access ports.

Switching Methods

Figure 84:
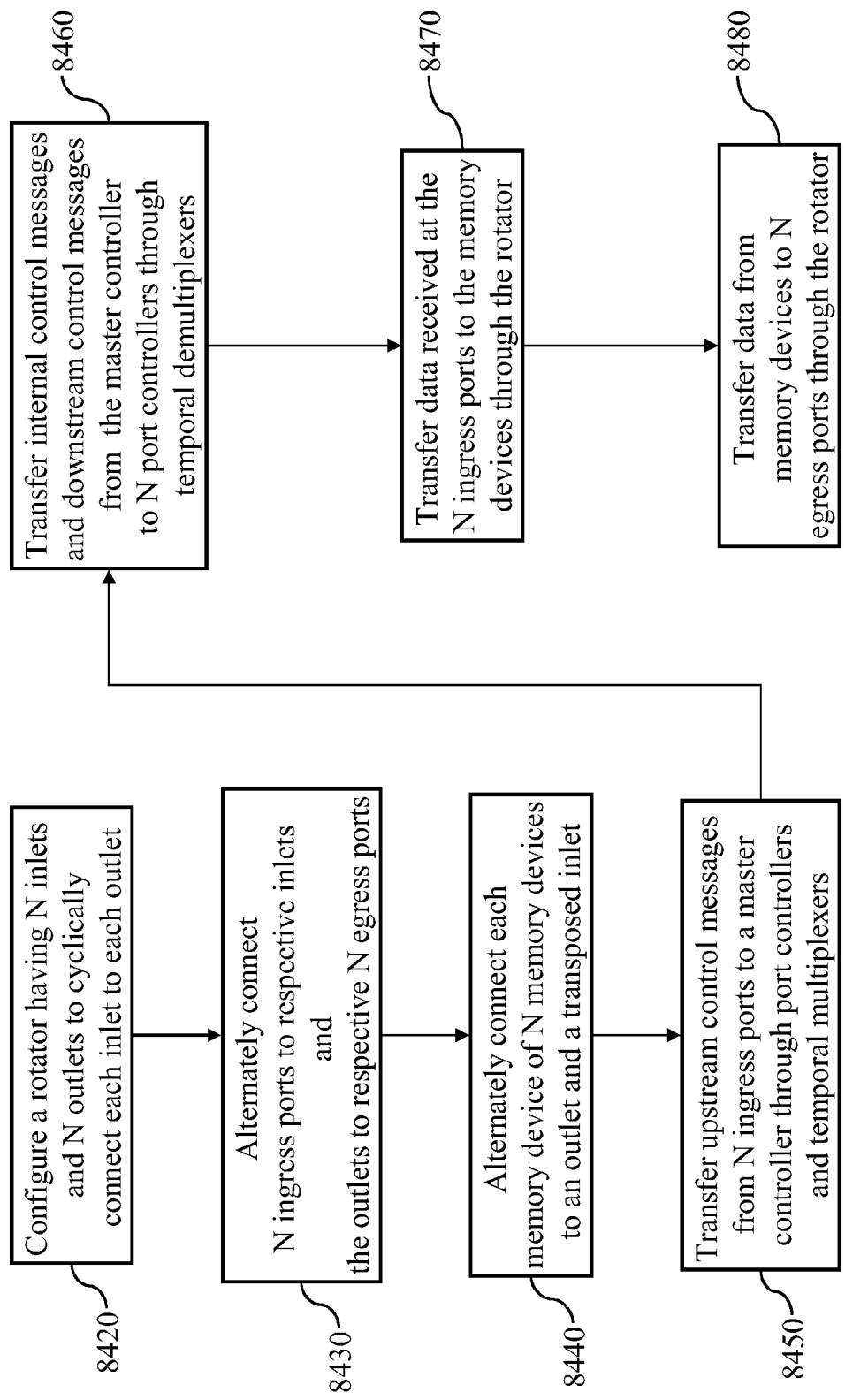
FIG. 84 illustrates a method of switching using a latent space switch having a single rotator and an external master controller coupled to access ports of the switch, in accordance with an embodiment of the present invention.

FIG. 84 illustrates a method of switching using a latent space switch (FIGS. 48-54) using a single rotator 4825 and having an exterior master controller (7380, 8380) coupled to port controllers 7170 (FIGS. 71, 73, 83) of access ports of the latent space switch.

In step 8420, a rotator having N inlets and N outlets is configured to cyclically connect each inlet to each outlet.

In step 8430, a set of inlet selectors and a set of outlet selectors are coordinated to alternately connect N ingress ports 4840 to respective inlets 4824 and the outlets 4826 to respective N egress ports 4860.

In step 8440, the set of inlet selectors and outlet selectors alternately connect each memory device 4850 of N memory devices to a respective outlet 4826 and a transposed inlet 4824 of the respective outlet.

In step 8450, port controllers 7170 transfer upstream control messages from the N ingress ports 4840 to the exterior master controller through temporal multiplexers (7375 or 8375).

In step 8460, the exterior master controller sends downstream control messages to N port controllers 7170 through temporal demultiplexers 7376 or 8376. The downstream control messages include messages to external nodes and internal control messages for timing transfer of data from ingress ports to the memory devices.

In step 8470, port controllers 7170 direct transfer of data received at the N ingress ports 4840 to the memory devices 4850 through the rotator 4825 according to timing data provided in the internal control messages.

In step 8480, data is transferred from the memory devices 4850 to the N egress ports 4860 through the rotator 4825.

Figure 85:
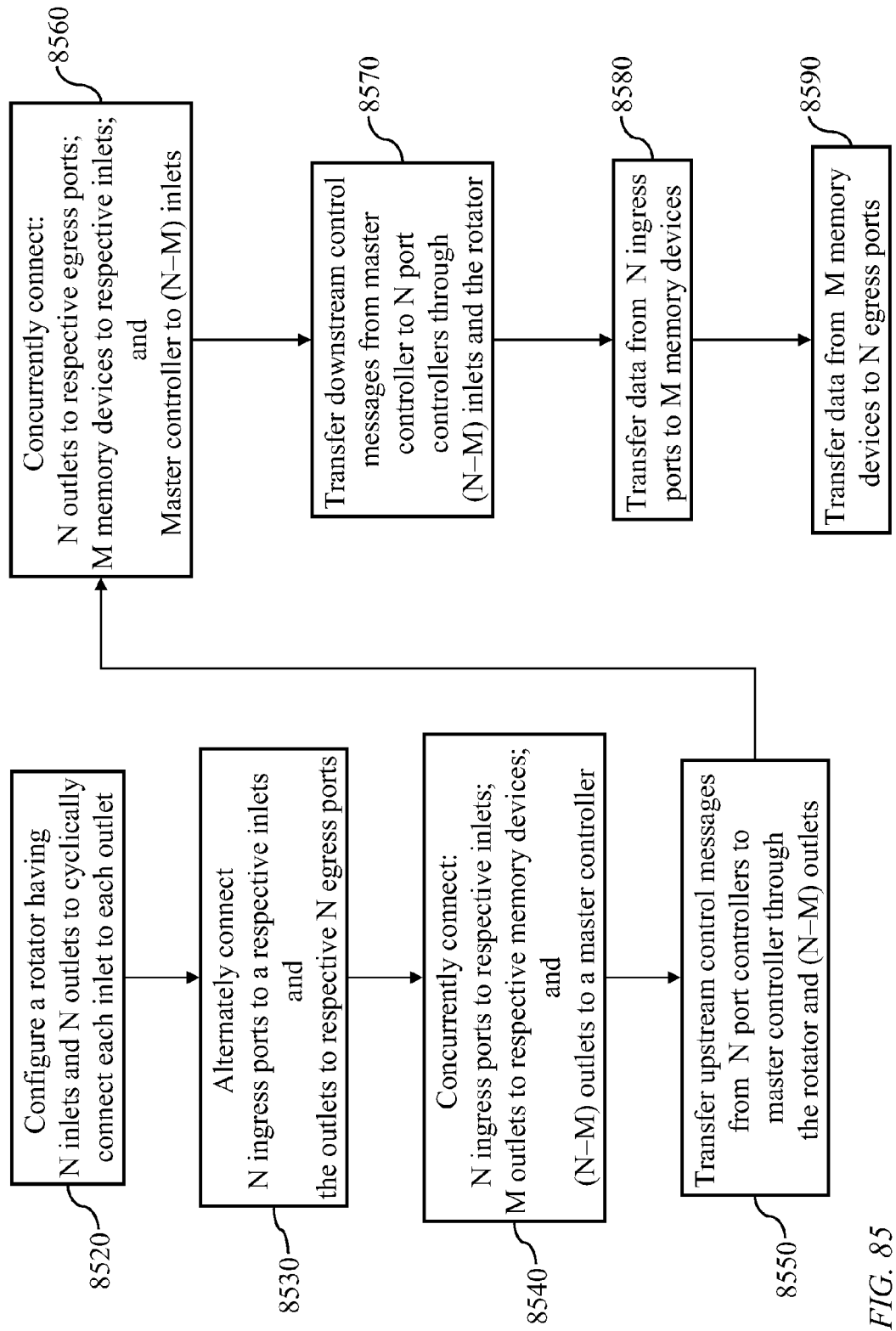
FIG. 85 illustrates a method of switching using a latent space switch having a single rotator and an embedded master controller accessible through the single rotator, in accordance with an embodiment of the present invention.

FIG. 85 illustrates a method of switching using a latent space switch (5520, 5620, 7420, 7520, or 7720) using a single rotator and having an interior master controller (5580, 5680, 7480, or 7680) accessible through the single rotator Steps 8520 and 8530 are similar to steps 8420 and 8430, respectively.

In step 8540, a set of inlet selectors and a set of outlet selectors are coordinated to concurrently connect: the N ingress ports 4840 to respective inlets 4824; M outlets 4826 to a set of M memory devices 4850, and the remaining (N−M) outlets 4826 to the interior master controller.

In step 8550, N port controllers, each coupled to an ingress port 4840 and an egress port 4860, send upstream control messages to the interior master controller through the rotator 4825 and (N−M) outlets 4826.

In step 8560, the coordinated inlet selectors and outlet selectors concurrently connect: N outlets 4826 to respective egress ports 4860; M memory devices to respective M inlets 4824; and the interior master controller to the remaining (N−M) inlets 4824.

In step 8570, the interior master controller sends downstream control messages to the N port controllers 7170 through (N−M) inlets 4824 and the rotator 4825. The downstream control messages include messages to external nodes and internal control messages for timing transfer of data from ingress ports 4840 to the memory devices 4850.

In step 8580, the N port controllers 7170 direct data transfer from the N ingress ports 4840 to the M memory devices 4850 during time slots indicated in the internal control messages.

In step 8590, data is transferred from the M memory devices 4850 to the N egress ports 4860 through the rotator 4825.

Transposing Rotator

Figure 86:
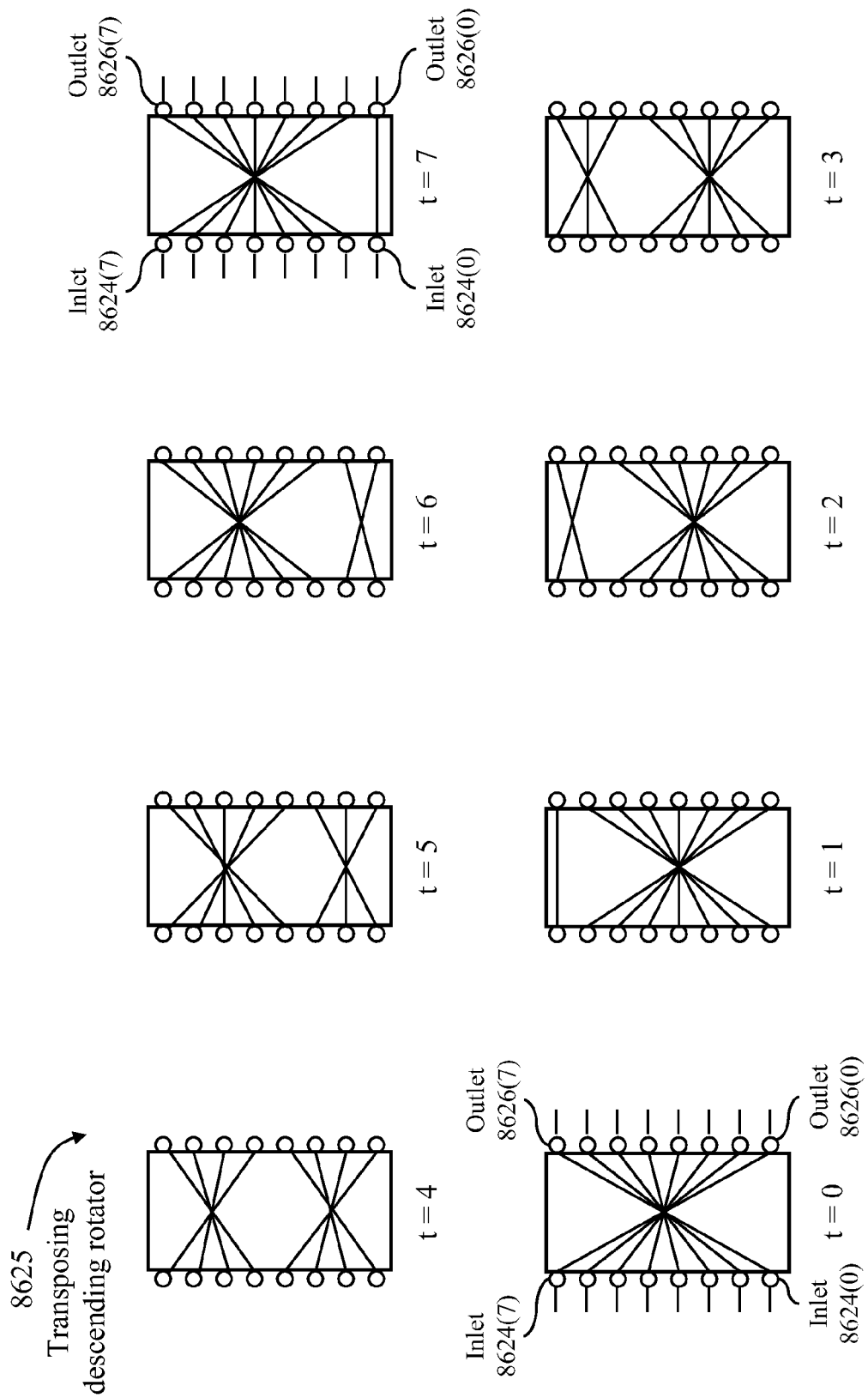
FIG. 86 illustrates a connectivity pattern of a transposing rotator of a transposition order of seven, in accordance with an embodiment of the present invention.

FIG. 86 illustrates a rotator 8625 similar to rotator 4825 of FIG. 48 but configured as a transposing rotator having N inlets and N outlets, N=8. With the N inlets indexed as inlets 0 to (N−1), and the N outlets indexed as outlets 0 to (N−1), transposing rotator 8625 connects an inlet of index j, $0 \le j < N$, to an outlet of index $(L-j+\beta \times t)_{modulo\ N}$, during a time slot t, $0 \le t < N$, of a time frame organized into N time slots, where L is a predetermined transposition order L, $0 \le L < N$, $\beta$ is an integer selected to equal −1, or +1. A value of $\beta$ of −1 results in a descending transposing rotator, and a value of $\beta$ of +1 results in an ascending transposing rotator. The illustrated exemplary rotator of FIG. 86 is a descending transposing rotator.

Figure 87:
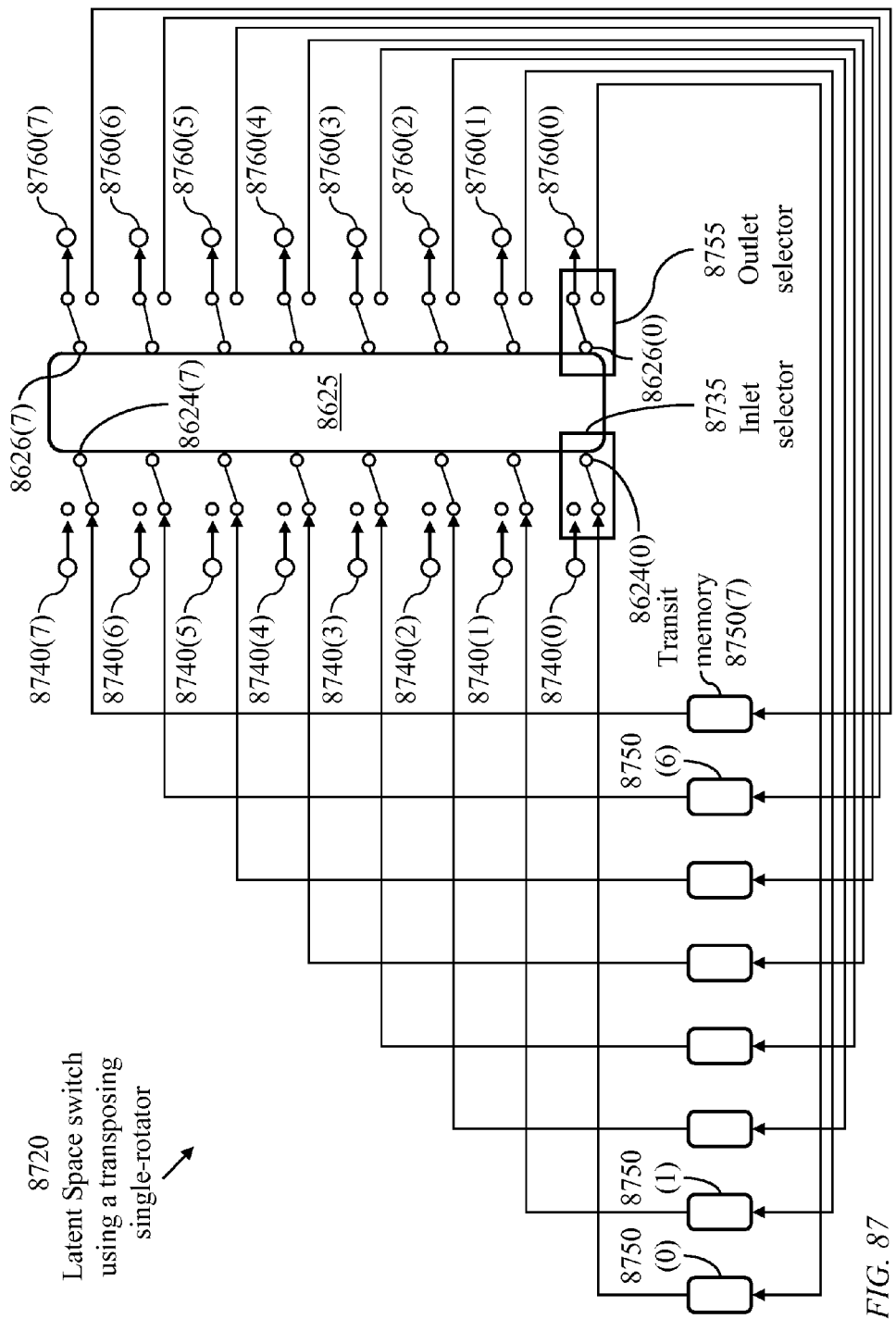
FIG. 87 illustrates a single-rotator latent space switch employing a transposing rotator, in accordance with an embodiment of the present invention.

FIG. 87 illustrates a latent space switch 8720 using a single transposing rotator 8625. Latent space switch 8720 has N memory devices, individually or collectively referenced as 8750, N>2, N ingress ports, individually or collectively referenced as 8740, for receiving data from external sources, and N egress ports for transmitting data to external sinks, individually or collectively referenced as 8760. The transposing rotator 8625 has N inlets, individually or collectively referenced as 8624, and N outlets, individually or collectively referenced as 8626. The transposing rotator 8625 is configured to cyclically connect each inlet 8624 to each outlet 8626, starting with a transposed outlet of each inlet, during a time frame organized into N time slots. A circular sum of an index of an inlet and an index of a transposed outlet of the same inlet equals a preselected transposition order L, $0 \le L < N$.

A bank of inlet selectors, individually or collectively referenced as 8735, alternately connect the ingress ports 8740 and the memory devices 8750 to the inlets 8624. A bank of outlet selectors, individually or collectively referenced as 8755, alternately connect the outlets 8626 to the memory devices 8750 and the egress ports 8760.

During each time slot: an inlet 8624(j) alternately connects to an ingress port 8740(j) and a respective memory device 8750(j) using an inlet selector 8735(j); and a peer outlet 8626(j) of inlet 8624(j) alternately connects to memory device 8750(j) and an egress port 8626(j) using an outlet selector 8755(j). Thus, during each time slot the N ingress ports 8624 concurrently transfer data to the N memory devices 8750 and, subsequently, the N egress ports 8760 concurrently read data from the N memory devices. Generally, a circular difference between an index of an inlet and an index of a peer outlet of the same inlet may be selected as an arbitrary constant. In the configuration of FIG. 87, the constant is selected to be zero.

Each memory device may be logically partitioned into N memory sections, each memory section for holding data directed to a respective egress port 8760. A controller (not illustrated) of a memory device 8750 may then generate sequential addresses of the memory sections.

The time slots of a time frame are indexed as time slots 0 to (N−1). If the transposing rotator is an ascending rotator ($\beta$ equals 1), a controller (not illustrated) of a memory device 8750(j) connecting to an inlet 8624(j), $0 \le j < N$, may be coupled to an up-counter (not illustrated) initialized to a value of j during time slot 0 of the time frame. The up-counter reading cyclically varies between 0 and (N−1), and the reading during any time slot determines a memory-READ address. If the transposing rotator is a descending rotator ($\beta$ equals −1), a controller of a memory device 8750(j) connecting to an inlet 8624(j), $0 \le j < N$, may be coupled to a down-counter initialized to a value of j during time slot 0 of the time frame. The down-counter reading cyclically varies between (N−1) and 0, and the reading during any time slot determines a memory-READ address.

The control system illustrated in FIGS. 71, 72, 73, and 83 for a latent space switch using a uniform rotator 4825 are also applicable to a latent space switch using a transposing rotator 8625. Thus, latent space switch 8720 may include N port controllers, similar to port controllers 7170, where an ingress port 8740(j) and an egress port 8760(j), $0 \le j < N$, share a port controller. The N port controllers may be organized into $\Omega$ groups, $\Omega \ge 1$. With at least one group having at least two port controllers, the number $\Omega$ of groups is in the range of $0 < \Omega \le \lceil N/2 \rceil$, where $\lceil x \rceil$ denotes the nearest integer higher than (or equal to) a number x.

A master controller, similar to master controller 8380 of FIG. 83, having $\Omega$ input control ports and $\Omega$ output control ports may be used for scheduling connections through the latent space switch 8720 and performing other control functions. The N port controllers are coupled to the master controller through $\Omega$ temporal multiplexers and $\Omega$ temporal demultiplexer.

Each temporal multiplexer time-multiplexes upstream control messages originating from a respective subset of port controllers and delivers multiplexed outcome to a respective input control port. Each temporal demultiplexer distributes downstream control signals sent from a respective output control port to a respective subset of port controllers.

A master time indicator may be coupled to the master controller for providing a reference-time indication to be distributed by the master controller to the port controllers which, in turn, may distribute the reference-time indication to external nodes.

As in the case of a latent space switch using a uniform rotator, each port controller organizes data received from a respective ingress port into data segments and affixes a WRITE address to each data segment according to a destination of said each data segment. Each port controller is configured to receive connection requests from respective data sources and communicate the connection requests to the master controller. The master controller allocates time slots for each accepted connection request and communicates indications of the allocated time slots to a respective port controller. Upon receiving indications of allocated time slots for a connection request, a port controller causes transfer of data segments relevant to an accepted connection request, together with corresponding memory WRITE addresses, from an ingress port 8740 to memory devices 8750 accessed through the transposing rotator 8625 during the allocated time slots.

It is noted that the connectivity pattern of port controllers 7170 to access ports (ingress ports and egress ports) illustrated in FIG. 71 also applies to the latent space switch of FIG. 87.

Figure 88:
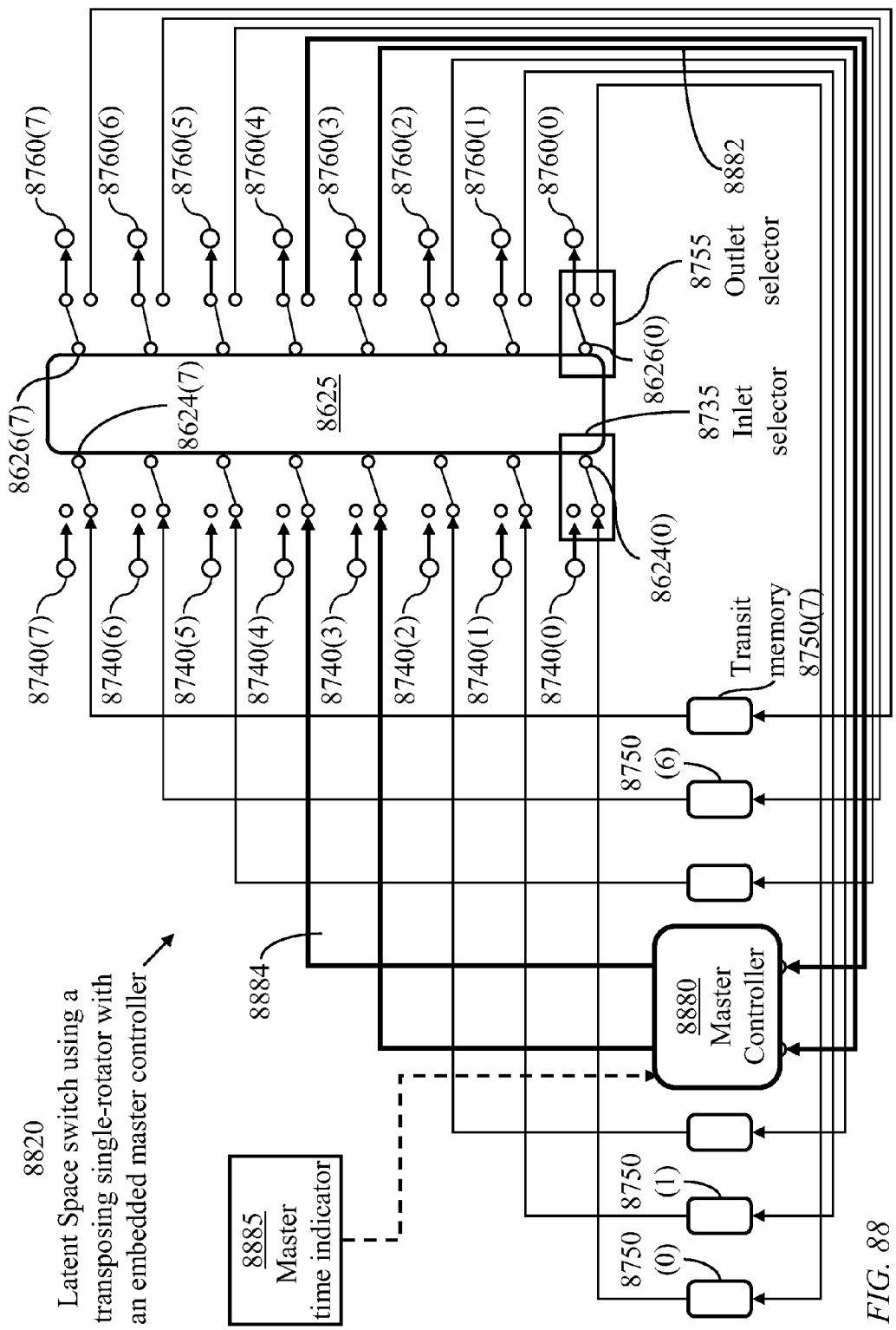
FIG. 88 illustrates a single-rotator latent space switch employing a transposing rotator, in accordance with an embodiment of the present invention.

FIG. 88 illustrates a latent space switch 8820 using a transposing rotator cyclically connecting each inlet of a set of N inlets 8624 to each outlet of a set of N outlets 8626 during a repetitive time frame of N time slots, indexed as time slots 0 to (N−1). During time slot 0, an inlet 8624(j) connects to a transposed outlet 8626(L−j) of inlet 8624(j).

A set of M memory devices, M<N, connects to M inlets 8624 through M inlet selectors and connects to M outlets 8626 through M outlet selectors. A memory device 8750(j) alternately connects to a respective inlet 8624(j) and a peer outlet 8626(j) of inlet 8624(j).

A master controller having a number $\Omega_1$ of input control ports, and a number $\Omega_2$ of input output control ports, where $1 \le \Omega_1 \le (N-M)$, $1 \le \Omega_2 \le (N-M)$, alternately connects to selected inlets 8624 and selected outlets 8626. With $\Omega_1 = \Omega_2 = \Omega$, the selected outlets are peers of the selected inlets.

The latent space switch 8820 interfaces with external nodes through a set of N ingress ports and a set of N egress ports. Each ingress port is preferably integrated with a peer egress port to form an integrated access port. Thus, the set of N ingress ports and the set of N egress ports form a set of N access ports. During a time slot t of the repetitive time frame, $0 \le t < N$, the transposing rotator connects an inlet 8624(j), $0 \le j < N$, to an outlet 8626(k), $k=(L-j+\beta \times t)_{modulo\ N}$, where L is a predetermined transposition order L, $0 \le L < N$, $\beta$ is an integer selected as one of −1 and +1.

During a time slot of the repetitive time frame, M outlets 8626 alternately connect to M egress ports 8760 and the M memory devices. The remaining outlets alternately connect to the remaining egress ports 8760 and the master controller.

During a time slot, the set of N access ports alternately connects to the set of N inlets and the set of N outlets. In other words the set of N ingress ports connects to the set of N inlets and subsequently the set of N outlets connects to the set of egress ports.

The set of N access ports connects to the set of N inlets for transferring data to the set of M memory devices and transferring control messages to the master controller.

The set of N access ports connects to the set of N outlets for receiving data read from the set of M memory devices and receiving downstream control messages from the master controller.

Individually, an access port 8740(j)/8760(j) alternately connects to an inlet 8624(j) and a peer outlet 8626(j), $0 \le j < N$, during each time slot. During time slot t, $0 \le t < N$, inlet 8624(j) connects to an outlet 8626$(L-j+\beta \times t)_{modulo\ N}$, where $\beta$ equals 1, if transposing rotator 8625 is an ascending rotator, or −1 if transposing rotator 8625 is a descending rotator. There are M outlets 8626 which individually connect to respective memory devices 8750 for transferring data, and at most (N−M) outlets 8626 which connect to the master controller 8880 for transferring upstream control messages to the master controller.

During time slot t, a data segment read from a memory device 8750(j) is received at egress port 8760$(L-j+\beta \times t)_{modulo\ N}$ through outlet 8626$(L-j+\beta \times t)_{modulo\ N}$ and a downstream control message sent from the master controller 8880 through an inlet 8624(m), m≠j, is received at outlet 8626$(L-m+\beta \times t)_{modulo\ N}$. Thus, each outlet 8626 may receive (payload) data during M time slots and downstream control messages during (N−M) time slots of the repetitive time frame.

Using controller 7680 in a latent space switch employing a transposing rotator instead of a uniform rotator, the indices $J_0$, $J_1$, $J_2$, and $J_3$ of inlets receiving control messages from the controller and the indices $K_0$, $K_1$, $K_2$, and $K_3$ of outlets transferring control messages to the controller would be selected so that $J_0 = K_0$, $J_1 = K_1$, $J_2 = K_2$, and $J_3 = K_3$.

The latent space switch 8820 interfaces with external network elements (not illustrated) through access ports {8740, 8760}. The access ports connect to the inlets 8624 through inlet selectors 8735 for transferring data to the memory devices 8750 and transferring upstream control messages to the master controller 8880 through the transposing rotator 8625 and upstream channels 8882. The access ports connect to the outlets 8626 through outlet selectors 8755 for receiving data read from the memory devices 8750 through the transposing rotator and receiving downstream control messages sent from the master controller 8880 through channels 8884 and the transposing rotator 8625. A master time indicator 8885 may be coupled to the master controller 8880 for providing a reference-time indication to be distributed by the master controller to the access ports.

Thus, during a rotation cycle of the transposing rotator 8625, each access port:
 (1) transfers data segments to the memory devices 8750 through the rotator;
 (2) transfers upstream control messages to the master controller 8880 through the rotator and channels 8882;
 (3) receives data segments read from the memory devices 8750 through the rotator; and
 (4) receives downstream control messages from the master controller 8880 through the rotator and channels 8884.

Switching Methods Based on Use of a Transposing Rotator

A method of switching according to the present invention is based on configuring a transposing rotator 8625 having N inlets, 8624(0) to 8624(N−1) and N outlets 8626(0) to 8626(N−1), N>2, to cyclically connect each inlet to each outlet during a rotation cycle of N time slots so that, during time slot t, $0 \le t < N$, an inlet 8624 of index j, $0 \le j < N$, connects to an outlet 8626 of index $(L-j+\beta \times t)_{modulo\ N}$, where L is a predetermined transposition order L, $0 \le L < N$, and $\beta$ is an integer selected as one of −1 and +1. Thus, at the start of each rotation cycle, the transposing rotator 8625 connects an inlet to a transposed outlet of the inlet.

During each time slot of the rotation cycle:
 (1) N ingress ports 8740 connect to the N inlets 8624 and, alternately, the N outlets 8626 connect to N egress ports 8760; and
 (2) a memory device 8750(j) of a set of N memory devices 8750 connects to a respective inlet 8624(j) and, alternately, a peer outlet 8626(j) of inlet 8624(j) connects to memory device 8750(j).

The alternate connections are coordinated so that the N ingress ports 8740 connect to the N inlets and the outlets 8626 connect to the N memory devices 8750 simultaneously. Consequently, the N memory devices 8750 connect to the N inlets 8624 and the N outlets 8626 connect to the N egress ports 8760 simultaneously.

Upon receiving data at the N ingress ports 8740, to be selectively switched to the N egress ports 8760, the data is transferred to the N memory devices through rotator 8625 and transferred from the N memory devices to the N egress ports through the rotator 8625. A data segment (data unit) transferred from an ingress port 8740(j) during time slot t of the rotation cycle is stored in a memory device 8750(L−j+

$t)_{modulo\ N}$, if the transposing rotator is an ascending rotator, or in a memory device $8750(L-j-t)_{modulo\ N}$, if the transposing rotator is a descending rotator. For the case of an ascending transposing rotator, a data segment (data unit) transferred from a memory device $8750(L-j+t)_{modulo\ N}$ is transferred to an egress port $8760(k)$, $0 \le k < N$, during time slot $\tau = (k-j+t)_{modulo\ N}$. Thus the systematic switching delay is: $\tau - t = (k-j)_{modulo\ N}$. For the case of a descending transposing rotator, a data segment (data unit) transferred from a memory device $8750(L-j-t)_{modulo\ N}$ is transferred to an egress port $8760(k)$, $0 \le k < N$, during time slot $\tau = (j-k+t)_{modulo\ N}$. Thus the systematic switching delay is: $\tau - t = (j-k)_{modulo\ N}$.

The control system of FIG. 83 may be employed in any of latent space switches 4820, 5020, 5320, 5420, or 8720.

A method of switching according to another embodiment comprises configuring a rotator 8625 (FIG. 86, FIG. 88) having N inlets and N outlets, N>M, to cyclically connect each inlet to each outlet during a rotation cycle and initializing the rotator so that each inlet 8624 connects to a respective transposed outlet 8626. Each inlet 8624 is connected to an inlet selector 8735 and each outlet 8626 is connected to an outlet selector 8755. The inlet selectors 8735 and the outlet selectors 8755 are time-coordinated to alternately connect:

(1) N ingress ports 8740 to the N inlets 8624 and the N outlets 8626 to the N egress ports 8760;
(2) each memory device 8750 of a set of M memory devices, M>1, to a respective inlet 8624 and a peer outlet 8626 of the respective inlet; and
(3) a master controller 8880 to a set of (N−M) inlets 8624 and peer outlets 8626 of the set of (N−M) inlets.

An ingress port 8740 and a peer egress port 8760 form an access port {8740, 8760}. Each access port {8740, 8760} has a port controller 7170 and the method further comprises transferring, under control of port controllers 7170 of the N access ports:

(a) data received at the N ingress ports from data sources to the set of M memory devices;
(b) control messages from the N ingress ports to the master controller; and
(c) data from the set of M memory devices to the N egress ports for transmission to data sinks.

The method further comprises sending downstream control messages from the master controller 8880 to a port controller 7170 of each access port. The downstream control messages indicate allocated time slots for transferring data among the access ports; from each ingress port to each egress port. The downstream control messages may be sent from a port controller 7170 to an external node (not illustrated).

Exchange of Control Messages

As described above, the set of N ingress ports and the set of N egress ports form a set of N access ports. Each access port has a port controller 7170. With a large number N of access ports (N=8000 for example), the access ports may be divided into a number of groups of access ports 8740/8760 and the port controllers 7170 of each group 8320 of port controllers may communicate with an input control port 8382 and an output control port 8384 of a master controller having multiple input control ports 8382 and multiple output control ports 8384.

Each port controller 7170 is allocated at least one upstream control time slot of a control time frame and at least one downstream control time slots in the control time frame. A control time frame may be divided into a large number of control time slots. The duration of the control time slot is independent of the duration of a rotation cycle of the rotator

8625 and the number of control time slots is independent of the number N of time slots of a rotation cycle.

The upstream control time slots allocated to port controllers 7170 of a group are non-coincident so that upstream control messages from port controllers of a group can be multiplexed onto a channel connecting to an input control port 8382. Likewise, the downstream control time slots allocated to port controllers 7170 of a group are non-coincident so that downstream control messages from an output control port 8384 of the master controller port may be sent on a channel connecting an output control port 8340 to a demultiplexer which distributes the downstream control messages to the individual port controller 7170 of the group.

Replacing the uniform rotator 4825 of the latent space switch of FIG. 77 with a transposing rotator 8625, each transit memory device would connect to a peer inlet-outlet pair and the multi-port master controller would connect to a number of peer inlet-outlet pairs. The upstream control time slots and downstream control time slots for a master controller connecting to outlets of specific indices (0, 512, 1024, and 1536, for example) would be determined as indicated in Table-7 and Table-8 below. Table-7 and Table-8 also indicate corresponding control time slots for the case of a uniform rotator.

TABLE 7

Upstream control time slots

Control Time Slots: inlet j, outlet k

| K: Index of outlet connecting to Master Controller | Uniform Ascending Rotator | | Transposing Ascending Rotator | |
|---|---|---|---|---|
| | Upstream: $(K-j)_{modulo\ N}$ Ingress: j = 1000 | Downstream: $(K-k)_{modulo\ N}$ Egress: k = 500 | Upstream: $(K+j-L)_{modulo\ N}$ Ingress: j = 1000 L = 2047 | Downstream: $(K+k-L)_{modulo\ N}$ Egress: k = 500 |
| 0 | 1048 | 1548 | 1001 | 501 |
| 512 | 1560 | 12 | 1513 | 1013 |
| 1024 | 24 | 524 | 2025 | 1525 |
| 1536 | 536 | 1036 | 489 | 2037 |

TABLE 8

Downstream control time slots

Control Time Slots: inlet j, outlet k

| K: Index of outlet connecting to Master Controller | Uniform Descending Rotator | | Transposing Descending Rotator | |
|---|---|---|---|---|
| | Upstream: $(j-K)_{modulo\ N}$ Ingress: j = 1000 | Downstream: $(k-K)_{modulo\ N}$ Egress: k = 500 | Upstream: $(L-j-K)_{modulo\ N}$ Ingress: j = 1000 L = 2047 | Downstream: $(L-k-K)_{modulo\ N}$ Egress: k = 500 |
| 0 | 1000 | 500 | 1001 | 1547 |
| 512 | 488 | 2036 | 1513 | 1035 |
| 1024 | 2024 | 1524 | 2025 | 523 |
| 1536 | 1512 | 1012 | 489 | 11 |

FIG. 89 tabulates data-transfer timing of a single-rotator latent space switch of FIG. 87. Referring to FIG. 87, with rotator 8625 configured as an ascending transposing rotator, ingress port 8740(j) connects inlet 8624(j) which connects to outlet 8626|L−j+t₁| during a first part of a time slot t₁, 0≤t₁<N.

With static ordinary connections of order L from the rotator 8625 to the transit memory devices, outlet 8626|L−j+$t_1$| connects to a transit memory device 8750|L−j+$t_1$|. With static ordinary connections from the transit memory devices 8650 to the ascending rotator 8625, a transit memory device 8750|L−j+$t_1$| connects to inlet 8624|L−j+$t_1$| of rotator 8625. In order to reach egress port 8760(k), which connects outlet 8626(k), transit data in transit memory device 8750|L−j+$t_1$| is transferred from inlet 8624|L−j+$t_1$| to an outlet 8626(k) during a time slot $t_2$, where k=|j−$t_1$+$t_2$|. Thus, the transit delay is $t_2$−$t_1$=|k−j|, i.e., $\{k-j\}_{modulo\ N}$, as indicated in FIG. 89. Employing a descending rotator instead of an ascending rotator, the transit delay is determined as |j−k|, i.e., $\{j-k\}_{modulo\ N}$.

It is noted that the exemplary structure of master controller 5580 illustrated in FIG. 63 is applicable to any of master controllers 5680, 7380, 7480, 7580, or 7680.

In view of the description above, it will be understood that modifications and variations of the described and illustrated embodiments may be made within the scope of the inventive concepts.

The invention has been described with reference to particular example embodiments. The described embodiments are intended to be illustrative and not restrictive. Further modifications may be made within the purview of the appended claims, without departing from the scope of the invention in its broader aspect.

What is claimed is:

1. A latent space switch comprising:
   N memory devices; N>2;
   N ingress ports;
   N egress ports; and
   a rotator having N inlets indexed as inlets 0 to (N−1) and N outlets indexed as outlets 0 to (N−1), each inlet connecting to a corresponding inlet selector of a set of N inlet selectors, and each outlet connecting to a corresponding outlet selector of a set of N outlet selectors, said rotator cyclically connecting said each inlet to said each outlet during a repetitive time frame organized into N time slots so that an inlet of index j, 0≤j<N, connects to an outlet of index $(j+\beta \times t)_{modulo\ N}$ during a time slot t, 0≤t<N, of said repetitive time frame, where β is one of −1 and 1;
   wherein, during each time slot of said time frame:
      each memory device and a respective ingress port alternately connect to a respective inlet of said N inlets through a respective inlet selector; and
      a transposed outlet of said respective inlet alternately connects to said each memory device and a respective egress port through a respective outlet selector.

2. The latent space switch of claim 1 wherein said plurality of inlet selectors and said plurality of outlet selectors are time-coordinated so that, alternately:
   said N ingress ports connect to said N memory devices; and subsequently
   said N memory devices connect to said N egress ports,
thereby, during said repetitive time frame, each said ingress port cyclically accesses said each memory device, and said each memory device cyclically accesses each egress port of said N egress ports.

3. The latent space switch of claim 1 wherein a circular sum of an index of said respective ingress port and an index of said respective egress port equals a predetermined transposition order L, 0≤L<N, said N ingress ports being indexed as 0 to (N−1) and said N ingress ports being indexed as 0 to (N−1).

4. The latent space switch of claim 1 wherein an index of said respective ingress port equals an index of said respective egress port, said N ingress ports being indexed as 0 to (N−1) and said N ingress ports being indexed as 0 to (N−1).

5. The latent space switch of claim 1 wherein said each memory device is logically organized into N sections, each section for holding data directed to a respective egress port of said N egress ports.

6. The latent space switch of claim 5 further comprising a memory controller of said each memory device configured to sequentially generate memory-READ addresses during each time slot of said repetitive time frame.

7. The latent space switch of claim 1 further comprising:
   N port controllers, each port controller coupled to a corresponding ingress port of said N ingress ports;
   a master controller;
   a temporal multiplexer for time-multiplexing control signals sent from said N port controllers to said master controller; and
   a temporal demultiplexer for distributing control signals sent from said master controller to said N port controllers.

8. The latent space switch of claim 7 wherein said each port controller is configured to:
   sort data segments received at an ingress port coupled to said each port controller according to destination egress ports;
   determine memory-WRITE address for each data segment according to a destination egress port of said each data segment; and
   affix said memory-WRITE address to said each data segment.

9. A latent space switch comprising:
   a rotator having:
      N outlets and N outlet selectors, N>2, each outlet alternately accessing two output ports of a respective outlet selector during each time slot of a repetitive time frame organized into N time slots, wherein a designated output port of said two output ports is configured to transmit data to external sinks; and
      N inlets and N inlet selectors, each inlet alternately accessing two input ports of a respective inlet selector during said each time slot, wherein a designated input port of said two input ports is configured to receive data from external sources, said each inlet cyclically connecting to said each outlet during said repetitive time frame;
   N memory devices, each memory device connecting to a respective inlet, through an inlet selector, and a transposed outlet of said respective inlet, through an outlet selector; and
   N up-counters, each up-counter determining a memory-READ address to a respective memory device during each time slot of said N time slots, said each up-counter providing cyclical output between 0 and (N−1).

10. The latent space switch of claim 9 wherein said N inlet selectors and said N outlet selectors are time coordinated so that said each inlet accesses said designated input port and, successively, said each outlet accesses said designated output port during said each time slot.

11. The latent space switch of claim 9 wherein a circular sum of indices of said respective inlet and said transposed outlet equals a predetermined transposition order L, 0≤L<N, said inlets being sequentially indexed as 0 to (N−1) and said outlets being sequentially indexed as 0 to (N−1).

12. The latent space switch of claim 9 wherein said each memory device is logically partitioned into N memory sections, each memory section for holding a data segment directed to a respective outlet of said N outlets.

13. The latent space switch of claim 9 wherein:
said rotator is an ascending rotator connecting an inlet of index j to an outlet of index $\{j+t\}_{modulo\ N}$, during a time slot t of said repetitive time frame, $0 \le t < N$; and
an up-counter, of said N up-counters, coupled to a memory device of index m, $0 \le m < N$, is initialized to a value of $(L-m)_{modulo\ N}$ during time slot t=0.

14. A latent space switch comprising:
a rotator having:
  N outlets and N outlet selectors, N>2, each outlet alternately accessing two output ports of a respective outlet selector during each time slot of a repetitive time frame organized into N time slots, wherein a designated output port of said two output ports is configured to transmit data to external sinks; and
  N inlets and N inlet selectors, each inlet selector having two input ports alternately accessing a respective inlet during said each time slot, wherein a designated input port of said two input ports is configured to receive data from external sources, each inlet cyclically connecting to said each outlet during said repetitive time frame;
N memory devices, each memory device connecting to a respective inlet, through an inlet selector, and a transposed outlet of said respective inlet, through an outlet selector; and
N down-counters, each down-counter coupled to a respective memory device for determining a memory-READ address during each time slot of said N time slots, said each down-counter providing cyclical output between (N−1) and 0.

15. The latent space switch of claim 14 wherein:
said rotator is a descending rotator connecting an inlet of index j to an outlet of index $\{j-t\}_{modulo\ N}$, during a time slot t of said repetitive time frame, $0 \le t < N$; and
a down-counter, of said N down-counters, coupled to a memory device of index m, $0 \le m < N$, is initialized to a value of $(L-m)_{modulo\ N}$ during time slot t=0.

16. A latent space switch comprising:
N memory devices, N>2;
N ingress ports, each for receiving data from respective external sources;
N egress ports, each for transmitting data to respective external sinks;
and
a single rotator having N inlets and N outlets, said single rotator connecting each inlet to each outlet during a time frame organized into N time slots;
during each time slot of said time frame:
  said each inlet alternately connects to a respective ingress port and a respective memory device; and
  a transposed outlet of said each inlet alternately connects to said respective memory device and a respective egress port.

17. The latent space switch of claim 16 further comprising:
a set of N port controllers, each port controller dedicated to a corresponding ingress port of said N ingress ports and a peer egress port of said corresponding ingress port;
a master controller having $\Omega$ input control ports and $\Omega$ output control ports, $0 < \Omega < N/2$;
$\Omega$ temporal multiplexers, each temporal multiplexer combining upstream control messages from a respective subset of said set of N port controllers to a respective input control port; and
$\Omega$ temporal demultiplexer, each temporal demultiplexer for distributing downstream control signals sent from a respective output control port to a respective subset of said set of N port controllers.

18. The latent space switch of claim 17 further comprising a master time indicator coupled to said master controller for distributing time indications of said master time indicator to external nodes.

19. The latent space switch of claim 17 wherein said master controller is configured to:
receive a reading of a source time indicator from an external controller; and
send a corresponding reading of said master time indicator to said external controller to enable said external controller to time lock to said master time indicator.

20. The latent space switch of claim 17 wherein:
each memory device is logically organized into N sections, each section for holding data directed to a respective egress port of said N egress ports; and
a counter of N states determines a memory-READ address of said each memory device.

21. A method of switching comprising:
receiving data at N ingress ports, N>2, to be selectively switched to N egress ports;
configuring a rotator having N inlets indexed as inlets 0 to (N−1) and N outlets indexed as outlets 0 to (N−1) to cyclically connect each inlet to each outlet during a time frame of N time slots so that an inlet of index j, $0 \le j < N$, connects to an outlet of index $(j + \beta \times t + \Theta)_{modulo\ N}$, during a time slot t, $0 \le t < N$, of said time frame, where $\beta$ is an integer selected as one of +1 and −1, $\Theta$ is an arbitrary integer;
during each time slot of said time frame:
  alternately connecting said N ingress ports to said N inlets and said N outlets to said N egress ports through N inlet selectors and N outlet selectors; and
  alternately connecting each memory device of a set of N memory devices to a respective outlet and a transposed inlet of said respective outlet;
transferring data from said N ingress ports to said N memory devices; and
transferring data from said N memory devices to said N egress ports.

22. The method of claim 21 wherein a circular sum of an index of said respective outlet and an index of said transposed inlet equals a predetermined transposition order L, $0 \le L < N$, said N inlets being indexed as inlets 0 to (N−1) and said N outlets being indexed as outlets 0 to (N−1).

23. The method of claim 21 further comprising:
communicatively coupling each ingress port to a respective egress port;
arranging N port controllers, each port controller coupled to an ingress port and a respective peer egress port, into $\Omega$ subsets of port controllers, $\Omega > 1$;
time-multiplexing upstream control messages originating from each said subset of port controllers and delivering multiplexed outcome to a respective input control port of a master controller having $\Omega$ input control ports and $\Omega$ output control ports; and
distributing downstream control signals from each output control port of said master controller to a respective subset of port controllers.

* * * * *